(12) United States Patent  
Brown et al.

(10) Patent No.: US 10,438,610 B2
(45) Date of Patent: *Oct. 8, 2019

(54) VIRTUAL ASSISTANT CONVERSATIONS

(71) Applicant: Verint Americas Inc., Alpharetta, GA (US)

(72) Inventors: Fred Brown, Colbert, WA (US); Tanya M Miller, Colbert, WA (US); Mark Zartler, Garland, TX (US); Molly Q Brown, Colbert, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,715

(22) Filed: Aug. 25, 2014

(65) Prior Publication Data

US 2014/0365223 A1  Dec. 11, 2014

Related U.S. Application Data

(63) Continuation of application No. 12/014,229, filed on Jan. 15, 2008, now Pat. No. 10,176,827.

(51) Int. Cl.
| | |
|---|---|
| *G10L 25/48* | (2013.01) |
| *G06F 16/332* | (2019.01) |
| *G06F 17/28* | (2006.01) |
| *G10L 15/18* | (2013.01) |
| *G06N 5/02* | (2006.01) |
| *G06F 16/63* | (2019.01) |

(52) U.S. Cl.
CPC .......... *G10L 25/48* (2013.01); *G06F 16/3329* (2019.01); *G06F 16/63* (2019.01); *G06F 17/28* (2013.01); *G06N 5/02* (2013.01); *G10L 15/18* (2013.01)

(58) Field of Classification Search
CPC ....... G10L 21/00; G06Q 10/10; G06F 17/277; G06F 17/2775; G06F 17/2785; G06F 17/279

See application file for complete search history.

(56) References Cited

U.S. PATENT DOCUMENTS

| 5,278,980 A | 1/1994 | Pedersen et al. |
| 5,339,391 A | 8/1994 | Wroblewski et al. |

(Continued)

FOREIGN PATENT DOCUMENTS

| CN | 103051669 | 4/2013 |
| WO | WO2011088053 | 7/2011 |

OTHER PUBLICATIONS

U.S. Appl. No. 13/774,381, filed Feb. 22, 2013, Fred A. Brown et al., "Interaction with a Portion of a Content Item through a Virtual Assistant," 68 pages.

(Continued)

*Primary Examiner* — Robert J Utama
(74) *Attorney, Agent, or Firm* — Meunier Carlin & Curfman LLC

(57) ABSTRACT

A virtual assistant may communicate with a user in a natural language that simulates a human. The virtual assistant may be associated with a human-configured knowledge base that simulates human responses. In some instances, a parent response may be provided by the virtual assistant and, thereafter, a child response that is associated with the parent response may be provided.

10 Claims, 107 Drawing Sheets

(56) References Cited

U.S. PATENT DOCUMENTS

| | | | |
|---|---|---|---|
| 5,418,948 A | 5/1995 | Turtle | |
| 5,535,120 A | 7/1996 | Chong et al. | |
| 5,615,112 A | 3/1997 | Liu Sheng et al. | |
| 5,677,835 A | 10/1997 | Carbonell et al. | |
| 5,682,539 A | 10/1997 | Conrad et al. | |
| 5,727,174 A | 3/1998 | Aparicio, IV et al. | |
| 6,012,053 A | 1/2000 | Pant et al. | |
| 6,112,177 A * | 8/2000 | Cosatto et al. | 704/260 |
| 6,144,938 A * | 11/2000 | Surace et al. | 704/257 |
| 6,175,829 B1 | 1/2001 | Li et al. | |
| 6,282,507 B1 | 8/2001 | Horiguchi et al. | |
| 6,285,978 B1 | 9/2001 | Bernth et al. | |
| 6,353,817 B1 | 3/2002 | Jacobs et al. | |
| 6,388,665 B1 | 5/2002 | Linnett et al. | |
| 6,396,951 B1 | 5/2002 | Grefenstette | |
| 6,401,061 B1 | 6/2002 | Zieman | |
| 6,658,627 B1 | 12/2003 | Gallup et al. | |
| 6,661,418 B1 * | 12/2003 | McMillan et al. | 345/473 |
| 6,757,362 B1 | 6/2004 | Cooper et al. | |
| 6,826,540 B1 * | 11/2004 | Plantec et al. | 705/7.32 |
| 6,829,603 B1 | 12/2004 | Cahi et al. | |
| 6,834,120 B1 | 12/2004 | LeClerc et al. | |
| 6,987,514 B1 | 1/2006 | Beresin et al. | |
| 6,999,932 B1 * | 2/2006 | Zhou | 704/277 |
| 7,058,902 B2 | 6/2006 | Iwema et al. | |
| 7,076,430 B1 * | 7/2006 | Cosatto et al. | 704/275 |
| 7,194,483 B1 | 3/2007 | Mohan et al. | |
| 7,263,493 B1 | 8/2007 | Provost et al. | |
| 7,337,158 B2 | 2/2008 | Fratkina et al. | |
| 7,426,697 B2 | 9/2008 | Holecek et al. | |
| 7,483,829 B2 | 1/2009 | Murakami et al. | |
| 7,536,413 B1 | 5/2009 | Mohan et al. | |
| 7,539,656 B2 | 5/2009 | Fratkina et al. | |
| 7,548,899 B1 | 6/2009 | Del Favero, Jr. et al. | |
| 7,558,792 B2 | 7/2009 | Bier | |
| 7,599,831 B2 | 10/2009 | Ford | |
| 7,610,382 B1 | 10/2009 | Siegel | |
| 7,711,547 B2 | 5/2010 | Abir | |
| 7,739,604 B1 | 6/2010 | Lyons et al. | |
| 7,797,146 B2 * | 9/2010 | Harless et al. | 703/12 |
| 7,818,183 B2 | 10/2010 | Schoenberg | |
| 7,912,701 B1 | 3/2011 | Gray et al. | |
| 7,970,663 B2 | 6/2011 | Ganz et al. | |
| 8,160,979 B1 | 4/2012 | Evans et al. | |
| 8,346,563 B1 | 1/2013 | Hjelm et al. | |
| 8,352,266 B2 | 1/2013 | Farmaner et al. | |
| 8,401,842 B1 | 3/2013 | Ginzburg et al. | |
| 8,433,556 B2 | 4/2013 | Fraser et al. | |
| 8,473,420 B2 | 6/2013 | Bohus et al. | |
| 8,510,276 B2 | 8/2013 | Haiby et al. | |
| 8,519,963 B2 | 8/2013 | Kocienda et al. | |
| 8,670,979 B2 | 3/2014 | Gruber et al. | |
| 8,677,377 B2 | 3/2014 | Cheyer et al. | |
| 8,731,929 B2 | 5/2014 | Kennewick et al. | |
| 8,756,326 B1 | 6/2014 | Elberse et al. | |
| 8,762,152 B2 | 6/2014 | Bennett et al. | |
| 8,930,191 B2 | 1/2015 | Gruber et al. | |
| 8,942,986 B2 | 1/2015 | Cheyer et al. | |
| 8,943,094 B2 | 1/2015 | Brown et al. | |
| 9,117,447 B2 | 8/2015 | Gruber et al. | |
| 9,202,171 B2 | 12/2015 | Kuhn | |
| 9,501,741 B2 | 11/2016 | Cheyer et al. | |
| 2001/0000356 A1 | 4/2001 | Woods | |
| 2001/0033298 A1 | 10/2001 | Slotznick | |
| 2001/0044751 A1 | 11/2001 | Pugliese, III et al. | |
| 2001/0049688 A1 | 12/2001 | Fratkina et al. | |
| 2001/0053968 A1 | 12/2001 | Galitsky et al. | |
| 2002/0008716 A1 | 1/2002 | Colburn et al. | |
| 2002/0032591 A1 | 3/2002 | Mahaffy et al. | |
| 2002/0123994 A1 | 9/2002 | Schabes et al. | |
| 2002/0129031 A1 | 9/2002 | Lau et al. | |
| 2002/0198885 A1 | 12/2002 | Streepy, Jr. | |
| 2003/0004908 A1 | 1/2003 | Linthicum et al. | |
| 2003/0041307 A1 | 2/2003 | Park | |
| 2003/0061029 A1 | 3/2003 | Shaket | |
| 2003/0088547 A1 | 5/2003 | Hammond | |
| 2003/0126089 A1 | 7/2003 | Fukuoka et al. | |
| 2003/0126090 A1 * | 7/2003 | Fukuoka | G06Q 10/10 705/54 |
| 2003/0142829 A1 | 7/2003 | Avigni | |
| 2003/0212544 A1 | 11/2003 | Acero et al. | |
| 2004/0107088 A1 | 6/2004 | Budzinski | |
| 2004/0117352 A1 * | 6/2004 | Schabes | G06F 17/30684 |
| 2004/0141013 A1 | 7/2004 | Alcazar et al. | |
| 2004/0186705 A1 | 9/2004 | Morgan et al. | |
| 2005/0027694 A1 | 2/2005 | Sauermann | |
| 2005/0054381 A1 | 3/2005 | Lee et al. | |
| 2005/0096913 A1 * | 5/2005 | Coffman | G10L 15/22 704/275 |
| 2005/0120276 A1 | 6/2005 | Kolawa et al. | |
| 2005/0243986 A1 * | 11/2005 | Kankar | H04M 3/493 379/201.01 |
| 2006/0004826 A1 | 1/2006 | Zartler | |
| 2006/0020466 A1 | 1/2006 | Cousineau et al. | |
| 2006/0036430 A1 | 2/2006 | Hu | |
| 2006/0037076 A1 | 2/2006 | Roy | |
| 2006/0047632 A1 | 3/2006 | Zhang | |
| 2006/0067352 A1 | 3/2006 | John et al. | |
| 2006/0074689 A1 * | 4/2006 | Cosatto et al. | 704/275 |
| 2006/0080107 A1 | 4/2006 | Hill | |
| 2006/0092978 A1 | 5/2006 | John et al. | |
| 2006/0161414 A1 | 7/2006 | Carignano et al. | |
| 2006/0206483 A1 | 9/2006 | Knepper et al. | |
| 2006/0253427 A1 | 11/2006 | Wu et al. | |
| 2007/0043687 A1 | 2/2007 | Bodart et al. | |
| 2007/0100790 A1 | 5/2007 | Cheyer et al. | |
| 2007/0106670 A1 | 5/2007 | Yoakum et al. | |
| 2007/0130112 A1 | 6/2007 | Lin | |
| 2007/0134631 A1 | 6/2007 | Hardy et al. | |
| 2007/0156677 A1 | 7/2007 | Szabo | |
| 2007/0185702 A1 | 8/2007 | Harney et al. | |
| 2007/0197296 A1 | 8/2007 | Lee | |
| 2007/0242656 A1 | 10/2007 | Klassen et al. | |
| 2007/0265533 A1 | 11/2007 | Tran | |
| 2007/0294229 A1 * | 12/2007 | Au | G06F 17/30864 |
| 2008/0005158 A1 | 1/2008 | Zartler et al. | |
| 2008/0010268 A1 | 1/2008 | Liao et al. | |
| 2008/0016040 A1 | 1/2008 | Jones et al. | |
| 2008/0036756 A1 | 2/2008 | Gaos et al. | |
| 2008/0091406 A1 | 4/2008 | Baldwin et al. | |
| 2008/0133444 A1 | 6/2008 | Gao et al. | |
| 2008/0162498 A1 | 7/2008 | Omoigui | |
| 2008/0222734 A1 | 9/2008 | Redlich et al. | |
| 2008/0235604 A1 | 9/2008 | Ebert | |
| 2008/0305815 A1 | 12/2008 | McDonough | |
| 2009/0006525 A1 | 1/2009 | Moore | |
| 2009/0030800 A1 | 1/2009 | Grois | |
| 2009/0063427 A1 | 3/2009 | Zuta et al. | |
| 2009/0070103 A1 | 3/2009 | Beggelman et al. | |
| 2009/0077488 A1 | 3/2009 | Ording | |
| 2009/0089100 A1 | 4/2009 | Nenov et al. | |
| 2009/0119095 A1 | 5/2009 | Beggelman et al. | |
| 2009/0119587 A1 | 5/2009 | Allen et al. | |
| 2009/0157386 A1 | 6/2009 | Zhou | |
| 2009/0171923 A1 | 7/2009 | Nash et al. | |
| 2009/0182702 A1 * | 7/2009 | Miller | 706/60 |
| 2009/0204677 A1 | 8/2009 | Michaelis et al. | |
| 2009/0216691 A1 | 8/2009 | Borzestowski et al. | |
| 2009/0225041 A1 | 9/2009 | Kida et al. | |
| 2009/0227223 A1 | 9/2009 | Jenkins | |
| 2009/0228264 A1 | 9/2009 | Williams et al. | |
| 2009/0235356 A1 | 9/2009 | Jensen et al. | |
| 2009/0248399 A1 | 10/2009 | Au | |
| 2009/0271205 A1 | 10/2009 | Finn et al. | |
| 2010/0005122 A1 | 1/2010 | Jackson | |
| 2010/0030549 A1 | 2/2010 | Lee et al. | |
| 2010/0050237 A1 | 2/2010 | Bokor et al. | |
| 2010/0070448 A1 | 3/2010 | Omoigui | |
| 2010/0070871 A1 | 3/2010 | Liesche et al. | |
| 2010/0153398 A1 | 6/2010 | Miller et al. | |
| 2010/0169336 A1 | 7/2010 | Eckhoff-Hornback et al. | |
| 2010/0218113 A1 | 8/2010 | White et al. | |
| 2010/0226490 A1 | 9/2010 | Schultz et al. | |
| 2010/0235808 A1 | 9/2010 | Dayan et al. | |

(56) References Cited

U.S. PATENT DOCUMENTS

| | | |
|---|---|---|
| 2010/0281012 A1 | 11/2010 | Imig et al. |
| 2010/0312547 A1 | 12/2010 | Van Os et al. |
| 2011/0071819 A1 | 3/2011 | Miller et al. |
| 2011/0078105 A1 | 3/2011 | Wallace |
| 2011/0119196 A1 | 5/2011 | Ventura et al. |
| 2011/0179126 A1 | 7/2011 | Wetherell et al. |
| 2011/0213642 A1 | 9/2011 | Makar et al. |
| 2011/0282664 A1 | 11/2011 | Tanioka et al. |
| 2011/0288947 A1 | 11/2011 | Biran |
| 2011/0301982 A1 | 12/2011 | Green, Jr. et al. |
| 2011/0307245 A1 | 12/2011 | Hanneman et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |
| 2012/0041903 A1 | 2/2012 | Beilby et al. |
| 2012/0078891 A1 | 3/2012 | Brown et al. |
| 2012/0110473 A1 | 5/2012 | Tseng |
| 2012/0117005 A1 | 5/2012 | Spivack |
| 2012/0221502 A1 | 8/2012 | Jerram et al. |
| 2012/0245926 A1 | 9/2012 | Montyne et al. |
| 2012/0253825 A1 | 10/2012 | Di Fabbrizio et al. |
| 2012/0265528 A1 | 10/2012 | Gruber et al. |
| 2012/0284040 A1 | 11/2012 | Dupin |
| 2012/0311541 A1 | 12/2012 | Bullard et al. |
| 2013/0017523 A1 | 1/2013 | Barborak et al. |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0040748 A1 | 2/2014 | Lemay et al. |
| 2014/0047001 A1 | 2/2014 | Phillips |
| 2014/0053102 A1 | 2/2014 | Lee et al. |
| 2014/0074454 A1 | 3/2014 | Brown et al. |
| 2014/0098948 A1 | 4/2014 | Kulkarni et al. |
| 2014/0115456 A1 | 4/2014 | White et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0363697 A1 | 12/2015 | Spivack |
| 2016/0012186 A1 | 1/2016 | Zasowski et al. |
| 2016/0110071 A1 | 4/2016 | Brown et al. |
| 2017/0132220 A1 | 5/2017 | Brown et al. |
| 2017/0277993 A1 | 9/2017 | Beaver et al. |

OTHER PUBLICATIONS

U.S. Appl. No. 13/774,519, filed Feb. 22, 2013, Fred A. Brown et al, "Virtual Assistant Transfer between Smart Devices," 65 pages.
Final Office Action for U.S. Appl. No. 12/014,229, dated Nov. 25, 2013, Tanya M. Miller, "Active Lab", 15 pages.
Final Office Action for U.S. Appl. No. 12/636,571, dated Nov. 7, 2013, Tanya Miller, "Leveraging Concepts With Information Retrieval Techniques and Knowledge Bases", 31 pages.
Non-Final Office Action for U.S. Appl. No. 12/564,546, dated Dec. 21, 2011, Tanya Miller et al., "Apparatus, System, and Method for Natural Language Processing", 12 pages.
Final Office Action for U.S. Appl. No. 12/564,546, dated Feb. 26, 2013, Tanya Miller et al., "Apparatus, System, and Method for Natural Language Processing", 15 pages.
Final Office Action for U.S. Appl. No. 13/341,261, dated Feb. 27, 2014, Fred A. Brown, "Providing Variable Responses in a Virtual-Assistant Environment", 32 pages.
Non-Final Office Action for U.S. Appl. No. 12/014,229, dated Mar. 15, 2013, Tanya M. Miller, "Active Lab", 14 pages.
Non-Final Office Action for U.S. Appl. No. 12/636,571, dated Apr. 12, 2013, Tanya Miller et al., "Leveraging Concepts With Information Retrieval Techniques and Knowledge Bases", 31 pages.
Non-Final Office Action for U.S. Appl. No. 12/564,546, dated Jun. 12, 2013, Tanya Miller et al., "Apparatus, System, and Method for Natural Language Processing", 18 pages.
Office action for U.S. Appl. No. 13/341,261, dated Aug. 14, 2013, Brown et al., "Providing Variable Responses in Virtual-Assistant Environment", 22 pages.
Office action for U.S. Appl. No. 12/636,571, dated Aug. 14, 2014, Miller et al., "Leveraging Concepts With Information Retrieval Techniques and Knowledge Bases", 35 pages.
"AskJennMediaCoverage", retrieved on Nov. 12, 2014, 76 pages.
Cassell, et al., "Embodied Conversational Agents", MIT Press, 2000, pp. 272 and 275.
Office action for U.S. Appl. No. 14/302,096, dated Oct. 8, 2014, Brown, "Active Lab", 27 pages.
Office Action for U.S. Appl. No. 13/341,261, dated Nov. 6, 2014, Fred A. Brown, "Providing Variable Responses in a Virtual-Assistant Environment", 26 pages.
Final Office Action for U.S. Appl. No. 14/293,673, dated Dec. 4, 2014, Fred A. Brown, "Virtual Assistant Conversations", 22 pages.
Office Action for U.S. Appl. No. 14/315,852, dated Dec. 4, 2014, Fred Brown, "Virtual Assistant Conversations for Ambiguous User Input and Goals", 15 pages.
Office Action for U.S. Appl. No. 14/451,009, dated Dec. 4, 2014, Fred Brown, "Wearable-Based Virtual Agents", 9 pages.
Office action for U.S. Appl. No. 14/293,529, dated Sep. 10, 2014, Brown et al., "Virtual Assistant Team Identification", 13 pages.
Office action for U.S. Appl. No. 14/293,619, dated Sep. 8, 2014, Brown et al., "Virtual Assistant and Acquisitions Training", 15 pages.
Office action for U.S. Appl. No. 14/293,673, dated Sep. 8, 2014, Riegler et al., "Virtual Assistant Conversations", 22 pages.
Office action for U.S. Appl. No. 14/467,221, dated Oct. 9, 2014, Brown, "Context-Based Virtual Assistant Conversations", 24 pages.
PCT Search Report and Written Opinion dated Nov. 12, 2014 for PCT Application No. PCT/US14/31047, 14 Pages.
"Undercover Virtual Agent Article", KOMO News, retrieved Nov. 12, 2014, 2 pages.
Office Action for U.S. Appl. No. 12/014,229, dated Feb. 13, 2015, Tanya M. Miller, "Active Lab", 16 pages.
Office action for U.S. Appl. No. 14/293,586, dated Feb. 17, 2015, Brown et al., "Virtual Assistant Team Customization", 11 pages.
Office action for U.S. Appl. No. 14/467,221, dated Feb. 17, 2015, Brown et al., "Context-Based Virtual Assistant Conversations", 5 pages.
Final Office Action for U.S. Appl. No. 14/293,529, dated Feb. 23, 2015, Fred A. Brown, "Virtual Assistant Team Identification", 17 pages.
Office Action for U.S. Appl. No. 14/302,096, dated Jan. 12, 2015, Fred Brown, "Active Lab", 4 pages.
"The Armys Robot Recruiter", Transcript from New York Public Radio, Aug. 8, 2014, 3 pages.
Office action for U.S. Appl. No. 14/293,673, dated Jan. 15, 2016, Brown et al., "Virtual Assistant Conversations", 29 pages.
Office action for U.S. Appl. No. 14/451,009, dated Jan. 5, 2016, Brown et al., "Wearable-Based Virtual Agents", 10 pages.
Office action for U.S. Appl. No. 12/014,229, dated Nov. 19, 2015, Inventor #1, "Active Lab", 8 pages.

(56) References Cited

OTHER PUBLICATIONS

Pandorabots Inc., "AIML Targeting: Supervised Learning for Bots", uploaded on Oct. 29, 2009, at https:// www.youtube.com/watch?v=aGe30NTVDOk, 5 pages.
"Case Study With Alme, Alaska Airlines soars", retrieved on Apr. 10, 2015 at <<http://www.nextit.com/media/downloads/Case-study-Alaska-Air.pdf>>, 3 pages.
"Frost & Sullivan Commends Next IT for Leading the Virtual Agent Applications Industry in Competitive Strategy Innovation", Frost & Sullivan, Dec. 18, 2014, 5 pages.
"Meet Jenn, Your Virtual Assistant at alaskaair.com", retrieved on Apr. 13, 2015 at <<http://www.alaskaair.com/content/about-us/site-info/ask-jenn.aspx>>, 1 page.
Final Office Action for U.S. Appl. No. 14/315,852, dated Apr. 10, 2015, Fred Brown, "Virtual Assistant Conversations for Ambiguous User Input and Goals", 18 pages.
Final Office Action for U.S. Appl. No. 14/293,619, dated Apr. 13, 2015, Fred A. Brown, "Virtual Assistant Acquisitions and Training", 17 pages.
Office action for U.S. Appl. No. 13/341,261, dated May 21, 2015, Brown et al., "Providing Variable Responses in Virtual-Assistant Environment", 30 pages.
Final Office Action for U.S. Appl. No. 14/451,009, dated May 21, 2015, Fred Brown, "Wearable-Based Virtual Agents", 10 pages.
Final Office Action for U.S. Appl. No. 12/636,571, dated Jun. 12, 2015, Tanya Miller, "Leveraging Concepts With Information Retrieval Techniques and Knowledge Bases", 37 pages.
Final Office Action for U.S. Appl. No. 14/293,529, dated Jun. 15, 2015, Fred A. Brown, "Virtual Assistant Team Identification", 16 pages.
Final Office Action for U.S. Appl. No. 14/293,586, dated Jul. 24, 2015, Fred A. Brown, "Virtual Assistant Team Customization", 14 pages.
Office Action for U.S. Appl. No. 14/293,673, dated Jul. 24, 2015, Fred A. Brown, "Virtual Assistant Conversations", 25 pages.
Final Office Action for U.S. Appl. No. 14/302,096, dated Jul. 29, 2015, Fred Brown, "Active Lab", 7 pages.
Office Action for U.S. Appl. No. 14/293,619, dated Aug. 13, 2015, Fred A. Brown, "Virtual Assistant Acquisitions and Training", 17 pages.
PCT Search Report and Written Opinion dated Sep. 2, 2015 for PCT Application No. PCT/US15/33594, 9 pages.
"SGT STAR Wins Intelligent Assistant Award", San Francisco, Calif (PRWEB) Sep. 24, 2014, PRWEB Online Visibility from Vocus, 2 pages.
"TAM", Case Study Meet Juli—TAM Airlines' most famous new hire, Next IT Corporation, Jun. 2013, 2 pages.
Office action for U.S. Appl. No. 14/467,221, dated Feb. 18, 2016, Brown et al., "Context-Based Virtual Assistant Conversations", 14 pages.
Office action for U.S. Appl. No. 14/293,619, dated Feb. 26, 2016, Brown et al., "Virtual Assistant Acquisitions and Training", 16 pages.
Office action for U.S. Appl. No. 14/293,529, dated Mar. 17, 2016, Brown et al., "Virtual Assistant Team Identification", 19 pages.
Office action for U.S. Appl. No. 14/293,586, dated Mar. 17, 2016, Brown et al., "Virtual Assistant Team Customization", 13 pages.
Office action for U.S. Appl. No. 12/636,571, dated Mar. 24, 2016, Miller et al., "Leveraging Concepts With Information Retrieval Techniques and Knowledge Bases", 31 pages.
Office action for U.S. Appl. No. 13/341,261, dated Mar. 24, 2016, Brown et al., "Providing Variable Responses in a Virtual-Assistant Environment", 30 pages.
Office Action for U.S. Appl. No. 14/293,529, dated Oct. 1, 2015, Fred A. Brown, "Virtual Assistant Team Identification", 18 pages.
Office Action for U.S. Appl. No. 13/341,261, dated Sep. 23, 2015, Fred A. Brown, "Providing Variable Responses in a Virtual-Assistant Environment", 26 pages.
Office Action for U.S. Appl. No. 14/315,852, dated Sep. 24, 2015, Fred Brown, "Virtual Assistant Conversations for Ambiguous User Input and Goals", 6 pages.
Office action for U.S. Appl. No. 14/293,619, dated Oct. 6, 2016, Brown et al., "Virtual Assistant Acquisitions and Training", 17 pages.
Office action for U.S. Appl. No. 14/446,153, dated Aug. 25, 2016, Brown et al., "Conversational Virtual Healthcare Assistant", 13 pages.
Office action for U.S. Appl. No. 14/293,529, dated Aug. 31, 2016, Brown et al., "Virtual Assistant Team Identification", 18 pages.
Office Action for U.S. Appl. No. 13/341,261, dated Sep. 15, 2016, Fred A. Brown, "Providing Variable Responses in a Virtual-Assistant Environment", 29 pages.
Office action for U.S. Appl. No. 14/293,586, dated Sep. 23, 2016, Brown et al., "Virtual Assistant Team Customization", 9 pages.
Office Action for U.S. Appl. No. 14/302,096, dated Sep. 27, 2016, Brown et al., "Regression Testing", 6 pages.
AppleKeynotes, "Apple Special Event 2011—Siri Introduction", YouTube, retrieved on Oct. 21, 2016 at <<https://www.youtube.com/watch?v=agzltTz35QQ>>, Mar. 22, 2013, 1 pages.
The Supplementary European Search Report dated Oct. 31, 2016 for European Patent Application No. 14785575.3, 10 pages.
The Extended European Search Report dated Mar. 17, 2017 for European patent application No. 14785575.3, 16 pages.
Office Action for U.S. Appl. 14/293,529, dated Jan. 31, 2017, Fred A. Brown, "Virtual Assistant Team Identification", 20 pages.
Office action for U.S. Appl. No. 14/293,673, dated Nov. 1, 2016, Brown et al., "Virtual Assistant Conversations", 34 pages.
Office action for U.S. Appl. No. 12/014,229, dated Nov. 16, 2016, Miller, "Active Lab", 8 pages.
Office action for U.S. Appl. No. 14/467,221, dated Nov. 3, 2016, Brown et al., "Context-Based Virtual Assistant Conversations", 15 pages.
Office action for U.S. Appl. No. 13/865,789, dated Nov. 7, 2016, Brown et al., "Virtual Assistant Focused User Interfaces", 20 pages.
Office action for U.S. Appl. No. 12/636,571, dated Feb. 15, 2017, Miller et al., "Leveraging Concepts With Information Retrieval Techniques and Knowledge Bases", 35 pages.
Office Action for U.S. Appl. No. 13/341,261, dated Feb. 7, 2017, Fred A. Brown, "Providing Variable Responses in a Virtual-Assistant Environment", 34 pages.
Final Office Action for U.S. Appl. No. 14/293,673, dated Apr. 25, 2017, Fred A. Brown, "Virtual Assistant Conversations", 32 pages.
Office action for U.S. Appl. No. 13/865,789, dated May 19, 2017, Brown et al., "Virtual Assistant Focused User Interfaces", 22 pages.
Office action for U.S. Appl. No. 14/293,619, dated May 4, 20017, Brown et al., "Virtual Assistant Acquisitions and Training", 18 pages.
Langkilde, Irene et al., "Automatic Prediction of Problematic Human-Computer Dialogues in 'How May I Help You?'", AT&T Labs Research, 1999, 5 pages.
Walker, Marilyn et al., "Learning to Predict Problematic Situations in a Spoken Dialogue System: Experiments with How May I Help You?", AT&T Labs Research, NAACL 2000 Proceedings of the 1st North American chapter of the Association for Computational Linguistics conference, Seattle, Washington, Apr. 29-May 4, 2000, 8 pages.
Office Action for U.S. Appl. No. 14/837,282, dated Jan. 20, 2017, Spivack, "System and Method for Providing Distributed Intelligent Assistance", 16 pages.
Office Action for U.S. Appl. No. 13/271,175, dated Oct. 7, 2014, Nova T. Spivack, "System and Method for Providing Distributed Intelligent Assistance", 14 pages.
Final Office Action for US Patent Application 13/271,175, dated May 30, 2014, Nova T. Spivack, "System and Method for Providing Distributed Intelligent Assistance", 14 pages.
Office Action for U.S. Appl. No. 12/014,229, dated Jun. 8, 2017, Tanya M. Miller, "Active Lab", 10 pages.
Non-Final Office Action for U.S. Appl. No. 13/271,175, dated Jul. 19, 2013, Nova T Spivack, "System and Method for Providing Distributed Intelligent Assistance", 13 pages.

(56) References Cited

OTHER PUBLICATIONS

Office Action for U.S. Appl. No. 14/837,282, dated Oct. 20, 2015, Nova T. Spivack, "System and Method for Providing Distributed Intelligent Assistance", 8 pages.

Krahmer, Emiel et al., "Problem Spotting in Human-Machine Interaction", IPO, Center for Research on User-System Interaction, Sixth European Conference on Speech Communication and Technology, Sep. 5-9, 1999, Budapest, Hungary, 4 pages.

Office action for U.S. Appl. No. 14/446,153, dated Mar. 25, 2016 Brown et al., "Conversational Virtual Healthcare Assistant", 7 pages.

Final Office Action for U.S. Appl. No. 14/446,153, dated Apr. 29, 2015, Fred A. Brown, "Conversational Virtual Healthcare Assistant", 9 pages.

Final Office Action for U.S. Appl. No. 13/449,927, dated Apr. 9, 2015, Fred A. Brown, "Conversation User Interface", 35 pages.

Office action for U.S. Appl. No. 14/451,009, dated Jul. 15, 2016, Brown et al., "Wearable-Based Virtual Agents", 6 pages.

Office Action for U.S. Appl. No. 13/607,414, dated Jul. 21, 2015, Fred A. Brown, "Conversational Virtual Healthcare Assistant", 25 pages.

Office Action for U.S. Appl. No. 13/449,927, dated Aug. 15, 2014, Fred A. Brown, "Conversation User Interface", 29 pages.

Office Action for U.S. Appl. No. 14/446,153, dated Sep. 18, 2015, Fred A. Brown, "Conversational Virtual Healthcare Assistant", 11 pages.

Office Action for U.S. Appl. No. 14/446,153, dated Sep. 26, 2014, Fred A. Brown, "Conversational Virtual Healthcare Assistant", 7 pages.

Office Action for U.S. Appl. No. 14/293,619, dated Oct. 5, 2017, Fred A. Brown, "Virtual Assistant Acquisitions and Training", 21 pages.

Office action for U.S. Appl. 14/467,221, dated Jul. 25, 2017, Brown et al., "Context-Based Virtual Assistant Conversations", 15 pages.

Office Action for U.S. Appl. 14/467,715, dated Jul. 25, 2017, Brown et al., "Virtual Assistant Conversations", 12 pages.

\* cited by examiner

| Vocab Group | |
|---|---|
| Vocab Term 1 | Vocab Term 2 |
| Synonyms:<br>• Synonym 1<br>• Synonym 2<br>• Synonym 3 | Synonyms:<br>• Synonym 1<br>• Synonym 2<br>• Synonym 3 |
| Vocab Term 3 | Vocab Term 4 |
| Synonyms:<br>• Synonym 1<br>• Synonym 2<br>• Synonym 3 | Synonyms:<br>• Synonym 1<br>• Synonym 2<br>• Synonym 3 |

CREATE NEW PROJECT

[Project Info] [Client Review]

Client Services

[                                        ]

[Delete]

Add Server

Display Name

[                    ]  [Add]

Connection String

[            ]

Connection Provider

[NHibernate Connection Drive Connection Provider]

Dialect

[NHibernate DialectMSSql2000Dialect]

Driver Class

[NHibernate DialectMSSql2000Dialect]

[CREATE PROJECT]  [CANCEL]

FIG. 9

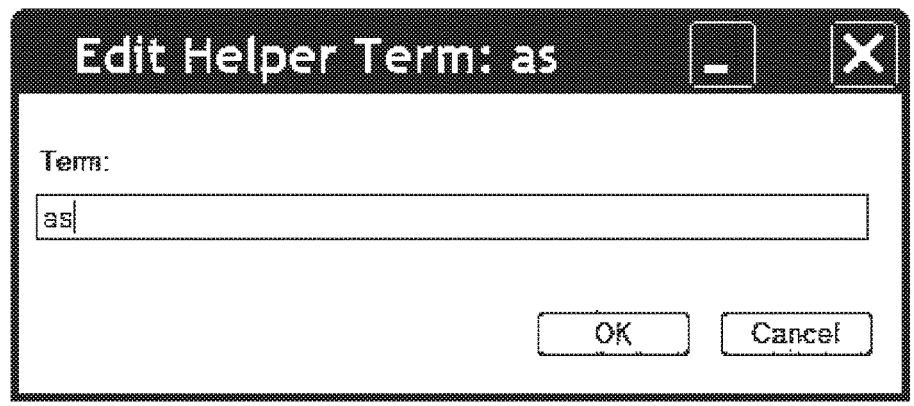
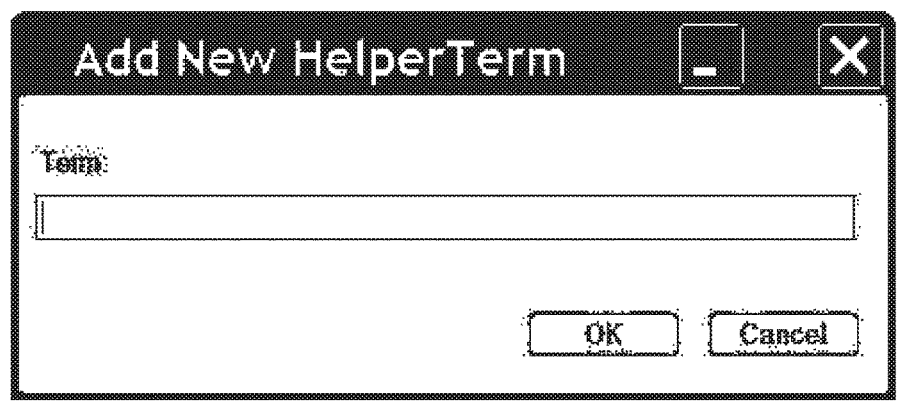
FIG. 36

PROJECT FILES

Group

Vocab Term

Natural Language

Yeti

Term

Yeti Vocab

☐ Add Plural Forms        ☐ Add Possessive Forms

Synonyms

Abominable snowman
Abominable-snowman
Abominable snowmen
Abominable snowman's
Abominable-snowman
Abominable snowmen's
Yeti
Yeti
Yeti

[ Add ]  [ Update ]  [ Delete ]  [ Cancel ]
                                 [ Close ]

Dynamic Function Editor

Name

Type

Cascade Group

Lex File

Pattern Override

Print Order    Save    Cancel

FIG. 111

App Call Editoir

Name

Type

Output Type

Required Parameter Display →  Required Parameters

Required Parameter Field →

Print Order    Save    Cancel

FIG. 112

| Match Data | App Calls | Brain Variables | Web Page | Fpml Error Messages | LoadData | Rav |
|---|---|---|

| Name | Value |
|---|---|
| _ds | <array></array> |
| _last | null |
| _seq_hits | 0 |
| _seq_nohits | 1 |
| Additional_JobS | |
| age | |
| AppCall_Results | |
| AppCallNavOK | true |
| AppEvents_ds | <array></array> |
| army_system_id | |
| auto_nav_to_url | true |
| AutoNavOK | true |
| Best_Match_Ch | null |
| Bestmatch___A | null |
| BestMatch_Chil | null |
| BestMatch_Infa | null |
| caps | |
| Data_Mining_Ph | null |
| Destinations | |
| Dislike | <plist><item><key>count</key><v>1</v></item></plist> |
| dont_understan | 1 |
| DontUnderstand | I am not positive that I understand what you are asking. Try rephrasing yo |
| DontUnderstand | Good question. I'm not sure how to answer that. Please try rewording you |

FIG. 118

| Match Data | App Calls | Brain Variables | Web Page | Fpml Error Messages | LoadData | Ra\

Learning C:\Next IT Work\projects\Alaska\FPML\Test\Alaska.fpml...

Loading C:\Next IT Work\projects\Alaska\FPML\Test\_FPMLSearch.fpml...

Loading IR Database 'C:\Next IT Work\projects\Alaska\FPML\Test\IR\FPMLSearch\IRDB\FPMLSearch.irdb'

IRDLL 'C:\Program Files\Next IT\ActiveLab\irdll.dll'

C:\Next IT Work\projects\Alaska\FPML\Test\_FPMLSearch.fpml[20]: error- Error Loading IR Database: C:\Next IT Work\projects\Alaska\FPML\Test\IR\FPMLSearch\IRDB\FPMLSearch.irdb Loading C:\Next IT Work\projects\Alaska\FPML\Test\_BotDirResponseConstants.fpml...

Loading C:\Next IT Work\projects\Alaska\FPML\Test\setup_tag.fpml...

Loading C:\Next IT Work\projects\Alaska\FPML\Test\teardown_tag.fpml...

Loading C:\Next IT Work\projects\Alaska\FPML\Test\BadWordsTest_concepts.fpml...

Loading C:\Next IT Work\projects\Alaska\FPML\Test\Hyphenations - Other_vocabulary.fpml...

Loading C:\Next IT Work\projects\Alaska\FPML\Test\Contractions_vocabulary.fpml...

Loading C:\Next IT Work\projects\Alaska\FPML\Test\AlaskaAirline - General_vocabulary.fpml...

Loading C:\Next IT Work\projects\Alaska\FPML\Test\Places - Mexican Cities Served_vocabulary.fpml...

FIG. 121

```
Brain Variables | Web Page | Fpml Error Messages | LoadData | Raw Match Data
<?xml version="1.0" encoding="ISO-8859-1"?>
<matchData>
<cascade type="enter">
<name>Bestmatch___Awards</name>
<input>what is your favorite food?</input>
</cascade>

<preProcessed>
what is your favorite food
</preProcessed>
<cascade type="enter">
<name>Pre_Concepts</name>
<input>what is your favorite food?</input>
</cascade>

<cascade type="enter">
<name>Pre_Vocabulary</name>
<input>what is your favorite food?</input>
</cascade>

<cascade type="enter">
<name>General_Vocabulary</name>
<input>what is your favorite food?</input>
</cascade>

<preProcessed>
askwhat your favoritevocab foodvocab
</preProcessed>
<cascade type="enter">
<name>Post_Vocabulary</name>
<input>askwhat your favoritevocab foodvocab?</input>
</cascade>
```

FIG. 122

| Name | Value |
|---|---|
| AutoNavOK | true |
| age | |

Add
Edit
Delete
Clear All
Copy Record Set Xml To Clipboard

```xml
<?xml version="1.0" encoding="ISO-8859-1"?>
<matchData>
<cascade type="enter">
<name>Bestmatch__Awards</name>
<input>what is your favorite food?</input>
</cascade>

<preProcessed>
what is your favorite food
</preProcessed>
<cascade type="enter">
<name>Pre_Concepts</name>
<input>what is your favorite food?</input>
</cascade>

<cascade type="enter">
<name>Pre_Vocabulary</name>
<input>what is your favorite food?</input>
</cascade>

<cascade type="enter">
<name>General_Vocabulary</name>
<input>what is your favorite food?</input>
</cascade>

<preProcessed>
askwhat your favoritevocab foodvocab
</preProcessed>
<cascade type="enter">
<name>Post_Vocabulary</name>
<input>askwhat your favoritevocab foodvocab</input>
</cascade>
```

Brain Variables | Web Page | Fpml Error Messages | LoadData | Raw Match Data

VIRTUAL ASSISTANT CONVERSATIONS

RELATED APPLICATIONS

This Application claims priority to and is a continuation of U.S. patent application Ser. No. 12/014,229, filed Jan. 15, 2008, which is incorporated herein by reference.

BACKGROUND

Creating and maintaining knowledge bases that are used for various projects can be a time consuming task. In the past, a great deal of human effort has been required to create and maintain knowledge bases in terms of developing, debugging and maintaining such knowledge bases. Errors that present themselves in a knowledge base can often cascade or grow when such knowledge bases are deployed and used by various applications. Thus, an important consideration in knowledge base development concerns accurately developing and deploying the knowledge base.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a tool, referred to herein as "Active Lab" that can be used to develop, debug, and maintain knowledge bases. These knowledge bases (KBs) can then engage various applications, technology, and communications protocols for the purpose of task automation, real time alerting, system integration, knowledge acquisition, and various forms of peer influence.

In at least some embodiments, a KB is used as a virtual assistant that any real person can interact with using their own natural language. The KB can then respond and react however the user wants: answering questions, activating applications, or responding to actions on a web page.

BRIEF DESCRIPTION OF THE DRAWINGS

The same numbers are used throughout the drawings to reference like features.

FIG. 3 illustrates a vocab group in accordance with one or more embodiments.

DETAILED DESCRIPTION

Overview

Figure 1:
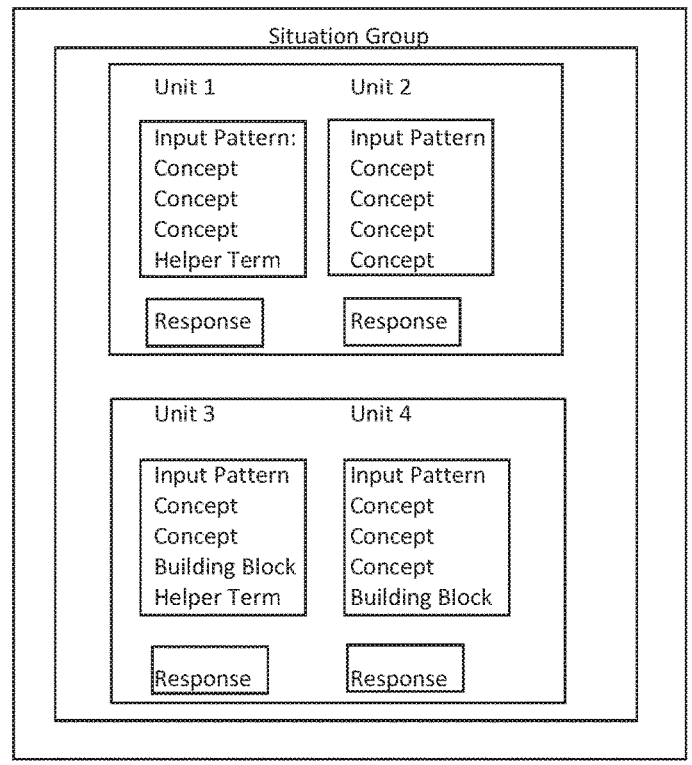
FIG. 1 illustrates a situation group in accordance with one or more embodiments.

Various embodiments provide a tool, referred to herein as "Active Lab" that can be used to develop, debug, and maintain knowledge bases. These knowledge bases (KBs) can then engage various applications, technology, and communications protocols for the purpose of task automation, real time alerting, system integration, knowledge acquisition, and various forms of peer influence.

In at least some embodiments, a KB is used as a virtual assistant that any real person can interact with using their own natural language. The KB can then respond and react however the user wants: answering questions, activating applications, or responding to actions on a web page.

In the discussion that follows, various terminology will be used. The following glossary is provided to assist the reader in the discussion that follows:

Agent: Agents are entities programmed to respond to inputs in a pre-determined fashion. They are often used to mimic a human consciousness.

AppCalls: AppCalls are Unit responses that perform application operations instead of simply generating a text response.

Building Blocks: Building Blocks are sets of vocabulary or Concepts, often used to group together terms and Concepts that can be associated with one another, but are not always synonymous.

Cascade: Cascades are graphical representations of the load order and match type of vocabulary, Concepts, and Units within the database.

Concepts: Concepts serve as the bricks of Units. As such, they are composed of Vocab Terms, Helper Terms, and Wild Cards arranged in specific input patterns that trigger the Concept's activation.

Context IQ Engine, the: The Context IQ Engine is essentially the algorithm that tracks and processes user inputs.

Data Mining: Data-mining is the targeted recursion of a set of FPML. After the results for a particular input have been achieved, the remainder of the input is run through a specific cascade, which is a self-sufficient FPML set in its own right.

Dependencies: Dependencies for a Concept or Vocab Term are all those objects which depend upon the aforementioned term or Concept for operation.

Dockable Window: Dockable windows are objects made visible by means of the View menu. These windows can be dragged and dropped at any location on the screen, and may be docked either on the right-hand side of the screen, or the top. When docked, multiple windows can be accessed via tabs.

FPML: A programming language, FPML, short for Functional Presence Mark-up Language is used to govern the behavior of Active Lab projects.

Helper Terms: Helper Terms are words or phrases that are commonly used, but have only one meaning. As such, they are not of sufficient importance to devote separate Vocab Terms and Concepts to them. Helper Terms may be used in both Concepts and Units.

Input Files: Input Files are *.txt files that contain words and/or phrases. They are used in Record Lists and Concepts.

Input Patterns: Input patterns determine the triggering of Concepts and Units. In Concepts, input patterns are composed of Vocab Terms, Wild Cards, and Helper Terms. In Units, input patterns are in turn composed of Concepts and Helper Terms. In both Concepts and Units, input patterns may be configured to trigger only if the input is in a specific order, or by proximity. All Concepts and Units must have at least one input pattern, and many have more than one.

Projects: Projects are the knowledge base storage configuration within the lab.

Situations: Situations are groups of related Units. For instance, a group of Units that all deal with the personality of a project may be grouped together under a personality situation.

Synonyms: Synonyms are words that share the same definition with one another and may be used interchangeably. Linguist's note: This is not entirely true. Many words may have the same definition, but carry different connotations. While they could technically be substituted, doing so would alter the reader's understanding of the sentence.

Test Questions: Test questions are sample inputs that are intended to trigger Units and Concepts. They are generally archetypal in nature, and are used as a guide for input patterns.

Units: Units are composed of Concepts and Helper Terms arranged in input patterns. When those input patterns are triggered, the Unit activates a response, in the form of text or an AppCall.

Units, Nested: Like Units, except that their response is contingent upon another Unit. A nested Unit may only be triggered immediately after its parent Unit has been triggered. This allows for continuity in conversation with the project.

User: The user is the individual human being who operates the software.

Vocab: Short for "Vocabulary," Vocab Terms form the basis of Concepts, and consist themselves of synonyms.

Wild Cards: Wild Cards function as placeholders within Concepts for any random word or words.

In the discussion that follows, a section entitled
Principles of Active Lab

Knowledge bases (KB) cover the entire scope of a project, including all the information that ActiveAgent uses, along with all of its capabilities. The files themselves are written in a programming language known as FPML (Functional Presence Markup Language), a language similar to XML. This includes master FPML files, optional FPML files, and lex files. For additional information on FPML, the reader is referred to the following U.S. patent applications, the disclosures of which are incorporated by reference herein: Ser. Nos. 10/839,425 and 11/169,142.

Active Lab is a visual tool (GUI) that allows the user to easily create and maintain a knowledge base without the necessity of knowing the actual FPML code.

The discussion that follows provides some of the principles behind what ActiveAgent can do, and how it works. Instructions for physically putting these Concepts into the lab will come later, along with more advanced uses of each of these principles.

Principles of a Knowledge Base

To begin understanding how to create a knowledge base, we will start with the idea of an input and a response by ActiveAgent. Consider the following input and response:

Input: How much does it cost to have a savings account?
Response: Our savings accounts are free to have, but do require that you maintain a balance of $300.

Units

First, let's examine the response. The response is a known answer in the knowledge base. When a response is paired together with patterns that will trigger it, it is called a Unit. A group of Units can be categorized into Situation Groups which are similar to folders in Windows®, and are used mainly for organizational purposes due to the large number of responses a KB may have.

Next, we must determine what questions should solicit that response. It turns out there are many different ways to phrase questions, all of which should be taken into account:

Input:
How much does it cost to have a savings account? What's the price of a savings account?
$$ of a savings account?
Saving's accounts: cost?
Do I have to pay for savings accounts?
What are the restrictions of a savings account? Is there a minimum balance I have to maintain to have a savings account?
How much is a savings account?

These questions are then listed with the Unit for the purposes of testing to make sure that when they are asked, this particular response is given.

Concepts

A Concept is a breakdown of the critical ideas in a test question. In the above list of possible questions there seems to be three main themes:

Cost,
Savings Account, and Minimum Balance. Notice that not all of these Concepts exist in every possible question. Some questions have the idea of Cost, some Minimum Balance, and all have the Concept of Savings Account. To make a successful Unit, these Concepts are listed within the Unit and paired in such a way that this combination of Concepts is unique within the KB. This is called a
Pattern. A Unit may have multiple patterns featuring different combinations of Concepts. For example:
Cost AND Savings Account=Unit Response
Minimum Balance AND Savings Account=Unit Response Note that a pattern for a Unit includes at least one Concept, however it is not recommended to have more than four Concepts in a pattern. A Concept is made up mostly of Vocab, Helper Terms, and Building Blocks, which are described individually below.

Vocab

A Vocab is a grouping of unambiguous synonyms and misspellings. The name of a particular grouping of synonyms is known as a Vocab Term. Vocab Terms are usually end with the suffix "vocab."

AccountVocab
  Account
  Accounts
  Accounts
  Account's
PriceVocab
  Price
  Prices
  Prise
  Prises
  Cost
  Costs
  Cost's In the example of PriceVocab, the word cost is included because for this KB the user wants the words price and cost to be synonymous.

Helper Terms

A Helper Term is a word that has no unambiguous synonyms, however functions almost the same way as a Vocab, and mostly consists of conjunctions. Here are some examples of common Helper Terms:

and
is
for
the

Building Blocks

A Building Block is a list of either Vocab/Helper Terms or a list of Concepts that may be useful categorized together. As an example, consider the following:

Anatomy (Vocab Building Block):
  armvocab
  legvocab headvocab
shouldervocab
feetvocab Now that these Vocab Terms are bundled together, they can be used in a Concept pattern. Here is an example use of a Vocab Building Block:

surgeryvocab AND Anatomy (Building Block)
brokenvocab AND myvocab AND Anatomy (Building Block)

In this example, because the Anatomy Building Block contained five Vocab Terms, it turned what would have been ten patterns into two. Also notice that Vocab Terms, which include all the synonyms and misspellings, are also included in this example. As another example, consider the following:

Types of Accounts (Concept Building Block)
Savings Accounts
Checking Accounts
Money Market Accounts
Investment Accounts This Building Block would then be used to reduce the number of patterns necessary.

Creating Concepts

A Concept is made of patterns of Vocab, Helper Terms, and Building Blocks listed within the Concept. Here are the patterns that would make up the Savings Account Concept:

savingsvocab AND accountvocab
accountvocab AND for AND savingsvocab
interestvocab AND bearingvocab AND accountvocab Notice that the word "for" is a Helper Term and does not end with the suffix "vocab." In Concepts, two things that are important are Order and Proximity, both of which are optional when creating any given pattern.

If Order is selected, a pattern will only trigger if it is received in that order. For example, a person would have to type in "savings account" to trigger the above example. If a person typed in "account savings" this pattern would not trigger because it is not in the correct order.

If Proximity is selected, a pattern will only trigger if the inputs are received next to each other. For example, a person would have to type in "savings account" to trigger the above example. If a person typed in "savings in my account" the pattern would not trigger because "savings" and "account" were not typed in next to each other.

Note that for most input patterns, it is important to have both Order and Proximity selected. In the above example, "Savings Account" has a very different meaning than "Account Savings" and "Savings in my Account." Concepts also have their own associated test questions similar to Units for the purposes of testing.

Examples of Savings Account test questions can include:
Do you have savings accounts at your bank?
What's a savings account?
Do you have any interest bearing accounts?

The Unit, Concept, and Vocab Relationship

The relationship between these principles can be stated simply:

Units are made of patterns of Concepts.
Concepts are made of patterns of Vocab and Helper Terms.
Vocabs are made of lists of synonyms.

The biggest benefit of this system is its flexibility. Once a Vocab has been created, it can be used in any number of Concepts, and once a Concept is created, it can be used in any number of Units. Conversely, any Unit or Concept can have any number of patterns, and the same Vocab or Concept can be used multiple times within each Unit or Concept.

Figure 2:
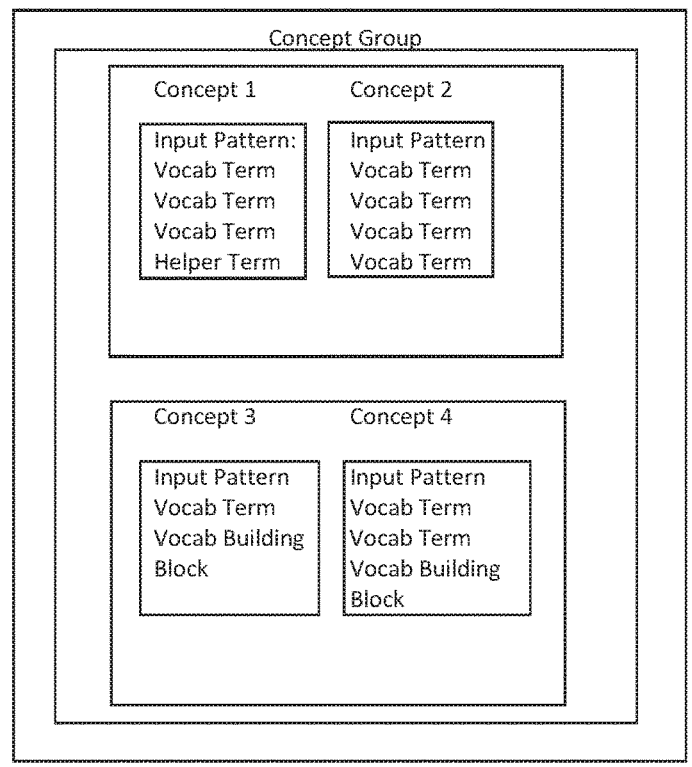
FIG. 2 illustrates a concept group in accordance with one or more embodiments.
Figure 4:
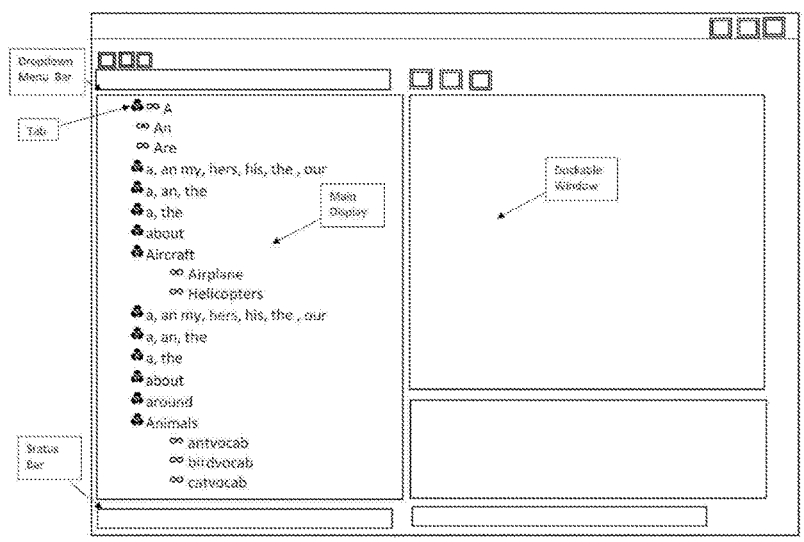
FIGS. 4-135 illustrate user interfaces in accordance with one or more embodiments.

FIGS. 1-3 show a visual representation of the relationship between all of these principles, as well as the ways Helper Terms and Building Blocks can also apply.

In FIG. 1, input patterns for Units can contain any number of combinations of Concepts, Building Blocks, and Helper Terms. The most common input patterns contain combinations of Concepts, with Building Blocks and Helper Terms used less often.

In FIG. 2, input patterns for Concepts can contain any number of combinations of Vocab, Building Blocks, and Helper Terms. The most common input patterns contain combinations of Vocab, with Building Blocks and Helper Terms used less often.

Context IQ Engine

The Context IQ Engine (CIE) is a term used to describe the part of ActiveAgent that actually does the processing of the FPML code written using Active Lab. The CIE has different functions relative to FPML code, and part of Active Lab is determining which functions to use, and in what order.

Cascades

Completing a single process through use of the CIE is known as a cascade. Any numbers of cascades can, and usually do, run every time the FPML is activated.

Here is an example of the simplest set of cascades necessary for a virtual agent:

Pre-Vocab—a cascade that takes in contractions and outputs separate words.
Vocab—a cascade that takes in all synonyms and outputs Vocab.
Post-Vocab—a cascade that takes in separate compound words and outputs single Vocab words.
Concept—a cascade that takes in Vocab, and Helper Terms and outputs Concepts.
Unit—a cascade that takes in Concepts and outputs the response.

In this example, each cascade is necessary for a single person's input to output a response, and can do very different things. The Vocab cascade only does substitution; it inputs words and outputs Vocab. The Concept cascade inputs Vocab and Helper Terms, and then outputs all Concepts that have patterns that include those terms. This is known as Match All because it outputs all matches, not just the most accurate one. The Unit cascade inputs Concepts, but only outputs one response. This is known as a Best Match and is a mathematical calculation done by the Context IQ Engine, with the Unit with the highest scoring pattern giving the response.

Static Files

Static Files are individual FPML files that are written by hand without the help of Active Lab's user interface. The most common files include setups and teardowns, as well as a lex file that handles special cases that Active Lab is currently not set up to handle. These are most commonly established during the initial creation of the project, and usually don't need to be modified during general use.

Common Terms

Within this document, the following terms are important to the proper understanding of Active Lab:

Cascades—A cascade is a layer of FPML processing and is essentially a "mini" fpml runtime contained within a larger runtime. It contains most, if not all, the processing features available to a global runtime, including preprocessing, a specialized lexer, setups and teardowns, chunkers, unit nodes, functions, etc.

Static Files—Static files are .fpml files that remain unchanged, such as lex files.

Input Files—Input files are text files that list various user inputs that can be easily categorized, such as a list of names.

Group—A group is a term that refers to separating similar items into smaller lists for organizational purposes. For example: a Concept Group is a group of similar Concepts.

The following describes some aspects of an Active Lab Family and Concepts:

| Component | Description |
| --- | --- |
| Active Lab | Develops, edits, and manipulates knowledge bases. |
| Chat Review | An application used to review chat logs and make change requests to Active Lab. |
| Approval Manager | A web application used to approve changes and change requests for knowledge bases. |
| FPML Database | An archive of all the FPML used by the lab and its sundry applications for a given project. This database may be a SQL Server or PostgreSQL... |
| Chat Review Database | An archive of all chats involving knowledge bases created via Active Lab. |
| Agent | Agent is a program that enables the user to place a KB on a website, simulating a human being. |

Basics of Active Lab

The following describes the basic components of Active Lab in accordance with one or more embodiments. It also provides directions for getting started with Active Lab.

Components of Active Lab

The main application window has several components that allow access to Active Lab features. The following table describes the main features of the illustrated main application window.

| Component | Description |
| --- | --- |
| Dropdown Menu Bar | Contains the following dropdown menus:<br>File<br>View<br>Admin<br>Help |
| Tabs | The following tabs are found in Active Lab:<br>Tests<br>Chat Review<br>Debugger<br>Concept Editor<br>Unit Editor<br>Editor |
| Main Display | Displays currently selected/active tab. |
| Dockable Window display | Dockable windows selected from View are displayed here. |
| Status Bar | Status of the program is displayed here. |

Menu Bar

Figure 5:
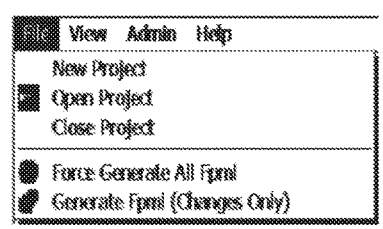

The menu bar contains four dropdown menus: File, View, Admin, and Help, which include the sub-menus illustrated in FIG. 5 and described in the following table:

| Menu | Selections |
| --- | --- |
| File | → New project opens a Create New Project window<br>→ open project opens a Browse window to select an existing project (*.proj) file.<br>→ close project closes currently open project |

| Menu | Selections |
| --- | --- |
| | → Force Generate All Fpml Loads all the FPML from the database associated with the open project.<br>→ Generate Fpml (Changes Only) Loads only those portions of the FPML database associated with the open project that have been changed. |
| View | Each of the selections in the View menu opens the dockable window of the same name. |
| Admin | → Application Data opens the Application Editor window. Note: you must have a project loaded in order to use this selection.<br>→ Deployment<br>→ Deploy Fpml opens the Deploy Fpml window.<br>→ configure Deployment opens the Deployment Configuration window.<br>→ Deploy to Content Management opens the Deploy to Content Management window.<br>→ Generate Deployment Files creates Agent configuration files independent of deployment. Not needed when deploying.<br>→ Fpml Reports Fpml Statistics creates an Excel spreadsheet that includes percentage passed of all Situation Groups, along with other statistics.<br>→ Print Unit Prints all Units and their test questions.<br>→ Manage Users opens the Manage Users window. Note: You must have a project loaded in order to use this selection.<br>→ Print Status<br>→ set Print Status<br>→ Test Sets the users print status to test.<br>→ Production Sets the users print status to production.<br>→ View Promotion Suggestions opens the Print Status window.<br>→ Project Files opens the Project Files window.<br>→ Remove Cached Files From Database removes all FPML files that are cached for local use.<br>→ Text To Speech opens the Text-To-Speech File Management window.<br>→ View/Edit Load Order opens the Load Order window. |
| Help | → About displays version information for the software. |

All activity begins with the File menu.

Dockable Windows

The dockable windows are the set of windows normally positioned on the right hand side of Active Lab, with each window differentiated by its own tab at the bottom. All dockable windows are opened and closed via the View menu. They may be docked on either the right side of the screen or the top, or allowed to float freely. When docked, multiple windows can be accessed through their corresponding tabs. The following table describes the components available through the dockable windows feature.

| Component | Description |
| --- | --- |
| Building Blocks | View → Building Blocks opens or closes the Building Blocks dockable window. This window displays all of the available Building Blocks. |

| Component | Description |
| --- | --- |
| Cascades | → View cascades opens or closes Cascades. This window displays all the Vocab files, Concepts, and Units in relationship to one another. |
| Change Requests | View → change Requests opens or closes Change Requests. This window allows the user to view the change requests made over the duration of the project's existence. |
| Components | View → components opens or closes Components. This window allows the user to view and change all the Variables, Functions, AppCalls, and Record Lists that are available for the project. |
| Concepts | View → concepts opens or closes Concepts. This window displays all of the Concepts within their respective groups, and allows the user to edit existing Concepts and create new Concepts and Concept Groups. |
| Directives | View → Directives opens or closes Directives. This window displays all of the available Units that are the top most Unit in a directive. |
| Dynamic Functions | View → Dynamic Functions opens or closes Dynamic Functions. This window displays all the Dynamic Functions associated with the project, and allows the user to create and edit them. |
| Helper Terms | View → Helper Terms opens or closes Helper Terms. This window displays all of the available Helper Terms, and allows the user to create and edit Helper Terms. |
| Input Files | View → Input Files opens or closes Input Files. This window displays all the input files associated with a given project, and allows the user to create and edit them. |
| Knowledge Tree | View → Knowledge Tree opens or closes Knowledge Tree. This window allows the user to create a Knowledge Tree hierarchy to organize Concepts and potential Concepts for personal organization purposes. |
| Lex Types | View → Lex Types opens or closes Lex Types. This window allows the user to view the lex types associated with a given project. |
| Resource Files | View → Resource Files opens or closes Recourse Files. This window allows the user to view and edit all the resource files, or non FPML files, in the project. |
| Response Blocks | View → Response Blocks opens or closes Response Blocks. This window allows the user to view and manipulate Response Blocks. |
| Search Control | View → search Control opens or closes Search Control. This window allows the user to search for Units, Concepts, and Vocab by phrase, dependency, and name. Open by Default |
| Static Files | View → static Files opens or closes Static Files. This window allows the user to view and manipulate static files. |
| Test Conditions | View → Test Conditions opens or closes Test Conditions. This window allows the user to manipulate the value of Variables for the purposes of testing. |
| Unit Search | View → unit Search opens Unit Search. This window displays a search view of all Units, and allows the user to search for Unit responses by Concepts. |
| Units | View → units opens or closes Units. This window displays all of the available Units, and allows the user to edit existing Units and create new Units. Unprintable Items View unprintable Items opens or closes Unprintable Items. This window displays those Vocab Terms, Concepts, and Units that are unprintable, either by virtue of being blank, or because of some error. |
| Unused Items | View → unused Items opens or closes Unused Items. This window displays items that are in the database but not associated with the open project. |
| Urls | View → urls opens or closes Uris. This window displays all of the available URLs, and allows the user to edit, create, and delete URLs. |
| Vocab | View → Vocab opens or closes Vocab. This window displays all of the Vocab Terms available in addition to all of their constituent synonyms, and allows the user to edit existing Vocab Terms and create new Vocab Terms. Wild Cards View Wild Cards opens or closes Wild Cards. This window provides the user with access to Wild Cards. |
| Web Links | View → web Links opens or closes Web Links. This window displays all Web Links associated with the project, and allows the user to create and edit them. |

Searches

Searches enable users to find Concepts and Units by words occurring within their input patterns and/or responses (as appropriate). This sub-section discusses the components of Search and Unit Search. With respect to FIG. 6, the following describes how search functionality works in accordance with one or more embodiments.

1. Type in a word or phrase in the Search field of the Search dockable window.
2. Press <Enter> or click <Update>, which will add the phrase the "Phrases" tree in the main window.
3. Repeat steps 1-2 as often as desired.
4. Click <Search Now>.
5. The results will appear in the top pane, organized by Unit, Concept, and Vocab.

Search contains the following components:

| Component | Description |
| --- | --- |
| Button Bar | The button bar contains the following:<br><Back and Forward Navigation>: Navigates between searches.<br><Edit>: Opens selected item for editing.<br><Remove from Search>: Deletes selected phrase from search criteria.<br><Search Now>: Executes search.<br><Clear All>: Clears all phrases from search. |
| Search Display | Displays search phrases, Vocab inside and outside of blocks, Building Blocks, Helper Terms inside and outside of blocks, Concepts inside and outside of blocks. |
| Search Field | Type search phrase here. |
| <Update> | Adds search phrase to search. |

With respect to performing a search, consider the following. Searches in dockable windows only find text that appears in the display names of individual items. Performing a search in a normal dockable window uses the following procedure:

1. In the dockable window's Search field, type in the desired text.
2. Click ✱ <Search>.
3. The results will appear in the display list highlighted in red.

Searching for text that occurs within the makeup of a Concept or Unit requires the use of Search and Unit Search, respectively.

To run a search for a Concept, use the following procedure:
1. In Search, type a phrase in the Search field.
2. Click <Update> to add the phrase to the search.
3. Repeat steps 1 & 2 as often as desired.
4. Ensure that the FPML for the project is up-to-date by clicking <Generate FPML>.
5. Click <Search Now> to run the search for all the phrases added to the search. Search results will appear in the display.

To run a search for a Unit in the Unit Search dockable window, use the following procedure:
1. In Unit Search dockable window, type a Concept name into the Search field. This will add the Concept to the Concepts display.
2. Select either <Filter On Patterns> or <Filter On Units>.
3. Repeat steps 1 & 2 as often as needed.
4. Click <Search Units Containing Concepts>.
5. Results appear in the Search Results display.

To run a search for a Unit in the Unit Search window, use the following procedure:
1. In Unit Search, type a Concept name or phrase into the Input field.
2. Select either <Match All> or <Match Any>.
3. Repeat steps 1 & 2 as often as needed.
4. Click <Search>.
5. Results appear in the Units Containing Input Concepts and Response Concepts displays.

Tabs

Active Lab's main window contains five main tabs, in addition to the dockable windows described above. A brief description of each can be found in the following table.

| Tab | Description |
| --- | --- |
| Tests | Allows the user to view the status of all the tests in a given project, specifically those for Units and Concepts. From this tab, the user may run all of the tests at once. |
| Debugger | Allows the user to interact with the FPML, and to view the causes of errors in Units, Concepts, and Vocab. The debugger also displays match data for Vocab, Concepts, and Units. |
| Concept Editor | Provides an interface for building and maintaining Concepts, including test questions, input patterns, and components. |
| Units Editor | Provides an interface for building and maintaining Units, including test questions, input patterns, components and responses. |
| Editor | Allows the user to create and edit lex files and raw FPML. |

Status Bar

Figures 6, 7:
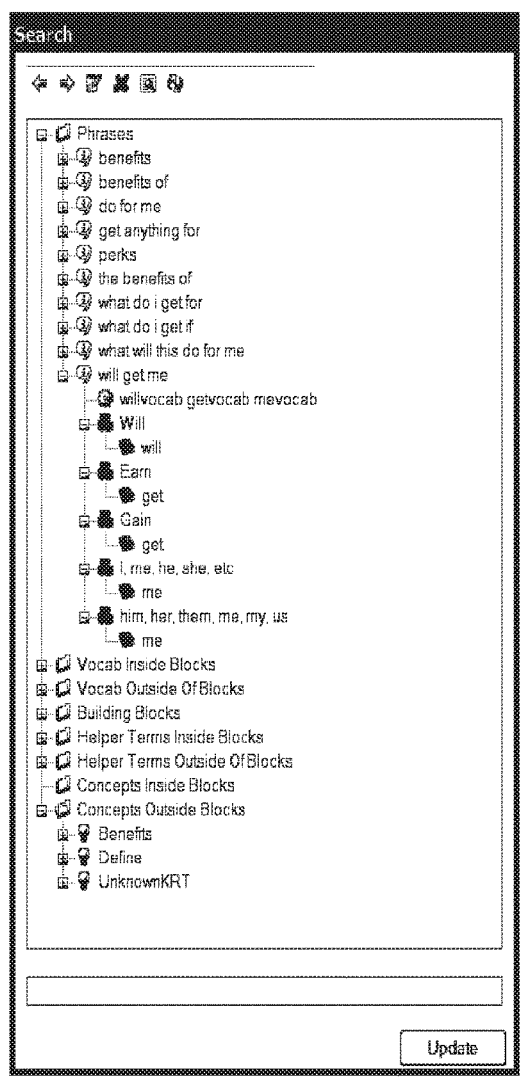

The status bar, located at the bottom of the main window, shows the operations currently being undertaken by the program, and the current progress. An example of this is shown in FIG. 7.

The full utility of Active Lab comes when handling knowledge bases (KBs). There are many things to take into consideration when creating a KB, including defining the scope, domain, and terminology surrounding the KB. Conversation directions should also be laid out before creating the KB in Active Lab. Other preparations vary depending on the specific KB. The section below entitled "Project Management" provides additional information in this regard. For information on modifying KBs directly, reference should be made to the sections below entitled "Vocabulary", "Concepts" and "Units".

Project Management

Each project represents an FPML knowledge base (KB) storage configuration, which tells lab what databases to use for the KB components, which comprise Units, Concepts, and Vocabulary. Active Lab features many means by which the user can create, edit, view, and manipulate aspects of a project. This section details the configuration of KBs through the file menu options, the file menu, searches, administrating a project, and cascades.

Projects

Projects serve as a collection of configuration information for a KB, enabling the user to manipulate the KB through Active Lab. Each project is connected to a database, where all of its constituent components are stored. Multiple projects can work from the same database.

Figure 8:
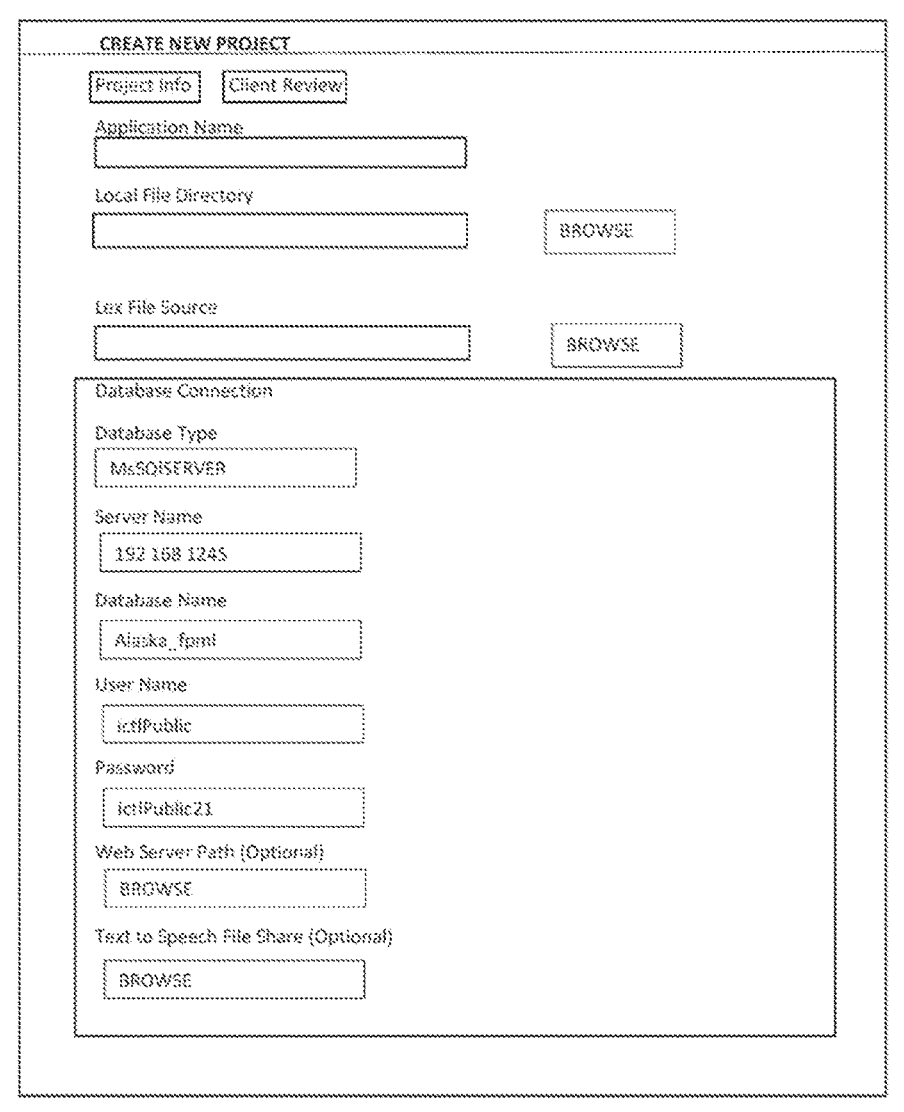

Create New Project is accessed through the File menu by selecting New Project. This window allows the user to specify the foundational specifications of the project. Create New Project contains two tabs: Project Info, and Chat Review. As an example, consider FIG. 8 which shows an example "Create New Project" Window". Create New Project contains the following components:

| Component | Description |
| --- | --- |
| Tabs | The following tabs are provided to allow you to configure the project:<br>Project Info<br>Chat Review |
| <Create Project> | Creates a project file with the specified configurations. |
| <Cancel> | Closes the window without creating a project. |

Project Info allows you to set the basic parameters of the project, including the name of the project, its local file directory, the project's database connection settings, user settings, and web server and subversion servers. Project Info contains the following components:

| Component | Description |
| --- | --- |
| Application Name | This text field contains the name of the project. |
| Local File Directory | This field contains a text field displaying the location on your local machine where the project's FPML files will be stored.<br><Browse> opens a Browse for Folder window, where you can select the desired Local File Directory. |
| Lex File Source | This field contains a text field displaying the location on your local machine where the project's lex file will be stored.<br><Browse> opens a Browse for Folder window, where you can select the desired Local File Directory. |
| Database Connection | Displays the following fields:<br>Database Type: This drop-down list indicates the type of database the project will use:<br>  MsSqlServer<br>  PostgreSQL<br>Server Name: This text field contains the IP or DNS name of the server housing the database.<br>Database Name: This text field contains the name of the database.<br>User Name: This text field contains the user ID used to connect to the database.<br>Password: This text field contains the password used with the User Name to connect to the database. |

| Component | Description |
| --- | --- |
| Web Server Path | Will append all Url relative paths with Web Server Path. This means that all Urls without a full path will have the Web Server Path appended to the front of it. |
| Text to Speech File Share | Location of Text-To-Speech files. |
| <Create Project> | Creates the project |
| <Cancel> | Closes the Create New Project window without creating the project. |

The Chat Review tab of Create New Project stores the location of Agent Chat Log databases. Chat Review contains the following components:

| Component | Description |
| --- | --- |
| Chat Servers | This field contains the following:<br>Chat Servers display: List of chat servers connected to Chat Review.<br><Delete>: Removes Chat Server from list. |
| Add Server | This field contains the following:<br>Display Name: This text field contains the name of the chat server.<br><Add>: Add new Chat Server<br>Connection String: This text field contains the connection string for the new server.<br>Connection Provider: This drop-down list provides selections for the connection provider of the new server.<br>Dialect: This drop-down list provides selections for the dialect of the new server.<br>Driver Class: This drop-down list provides selections for the driver class of the new server. |

Project Files

The database that the Knowledge Base is created from can have multiple projects associated with it. A project file is a file that can point to either part of or all of the database. When multiple users use identical project files, all those users will be working on the same part of the database (also known as the same project) at the same time.

The Project Files window, accessed from the dropdown →Admin→Project Files, can be used to access all the different projects that have been saved in the database. When a user has already has a project open, this window will be filled out when opened. Clicking <Connect> will display all project files associated with the database. These project files can then be downloaded by highlighting them and clicking <Download>.

Figure 10:
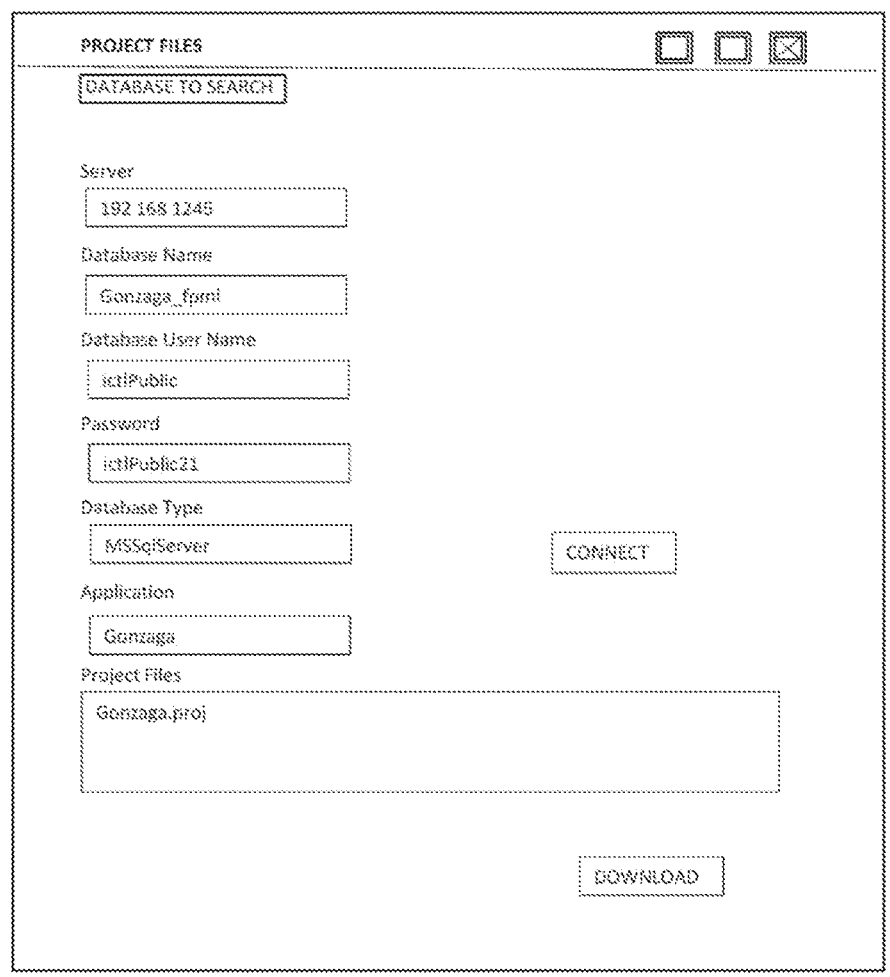

Currently, most projects are stored on the same server with identical passwords. This means that if a user has a project open, they can view the project files of a different database simply by changing Database Name field and clicking <Connect>. With respect to the Project Files window, consider the following in connection with FIG. 10.

| Component | Description |
| --- | --- |
| Database to Search | This field has the following components:<br>Server field: Contains the IP address where the database is stored. Defaults to address of the current project.<br>Database Name field: Contains the name of the project. Default to current project.<br>Database User Name field: Contains the name of the user name needed to access the database. Default to current project.<br>Database Password field: Contains the password needed to access the database. Default to current project.<br>Database Type dropdown: Chooses from the available database types:<br>  MsSQLServer<br>  PostgreSQL<br><Connect>: Connects to the server and brings up all available projects. |
| Application | Field displays the name of the application associated with project selected in Project Files display. |
| Project Files Display | Shows all project files saved on the database. There are two icons that will appear:<br>Project File<br>No Project Files Found In Database |
| Download | Downloads selected project to a local site. |

Application Data

Figure 11:
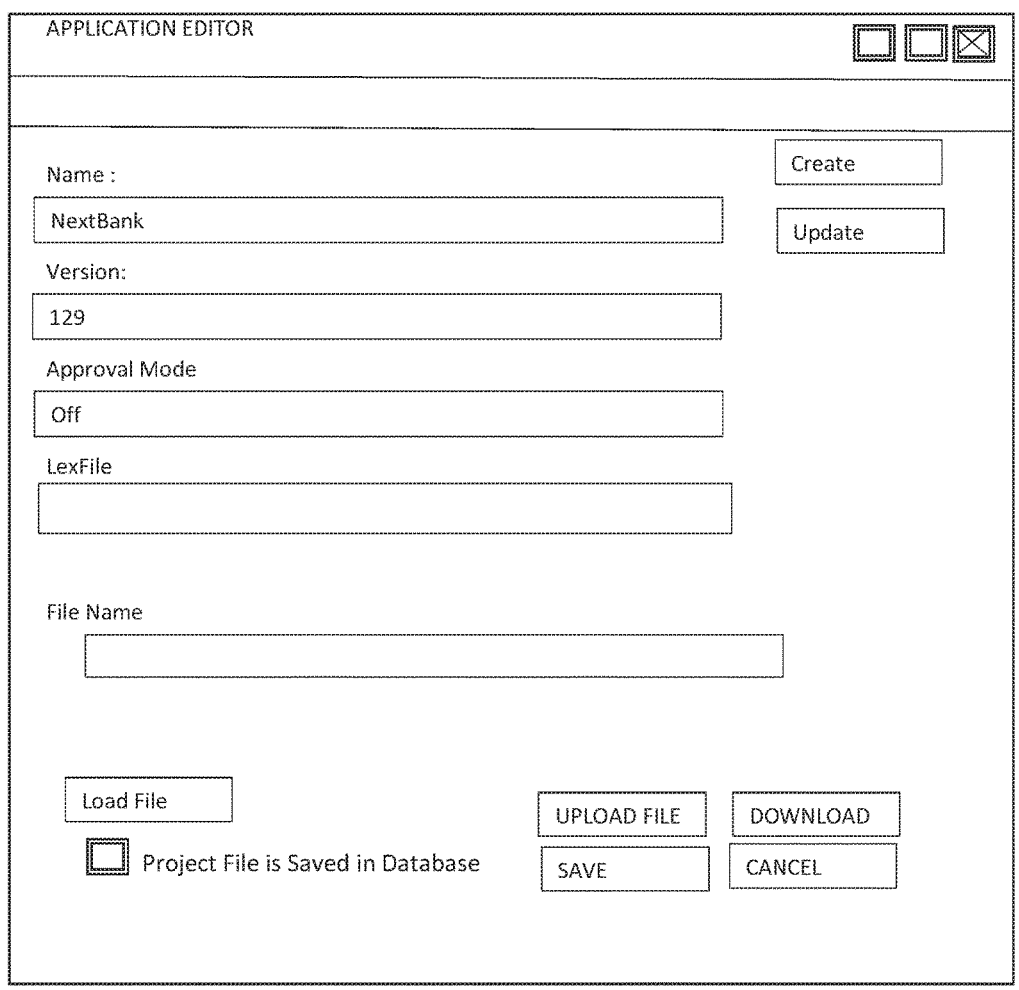

Application data can be viewed by selecting Application Data from the Admin menu. This selection opens up Application Editor, which displays the project name, the version of the project, and the lex file associated with it. Once a project has been opened, you can view and change parts of the configuration through Application Editor, as well as copy projects to and from the database. AS an example, consider the following in connection with FIG. 11. Application Editor has the following components:

| Component | Description |
| --- | --- |
| Name | Name of the project |
| Version | Version of the project. |
| Approval Mode | This dropdown sets the approval mode for the project.<br>On<br>Off |
| File Name | Name of the associated lex file.<br>This field also contains the following button:<br><Load File>: This button opens a Browse window to select a lex file for the project. |
| Project File | Sets project file to be saved in the database:<br><Project File is Saved in Database>: check box that shows where the project file is currently saved in the database.<br><Upload File>: This button opens a Browse window to select a project file. Chosem project file will be saved to the database as a Project File associated with that database.<br><Download>: This button opens a Browse window to save the project file to a local location. |
| <Save> | Saves changes. |
| <Cancel> | Cancels changes/ |

Manage Users

Figure 12:
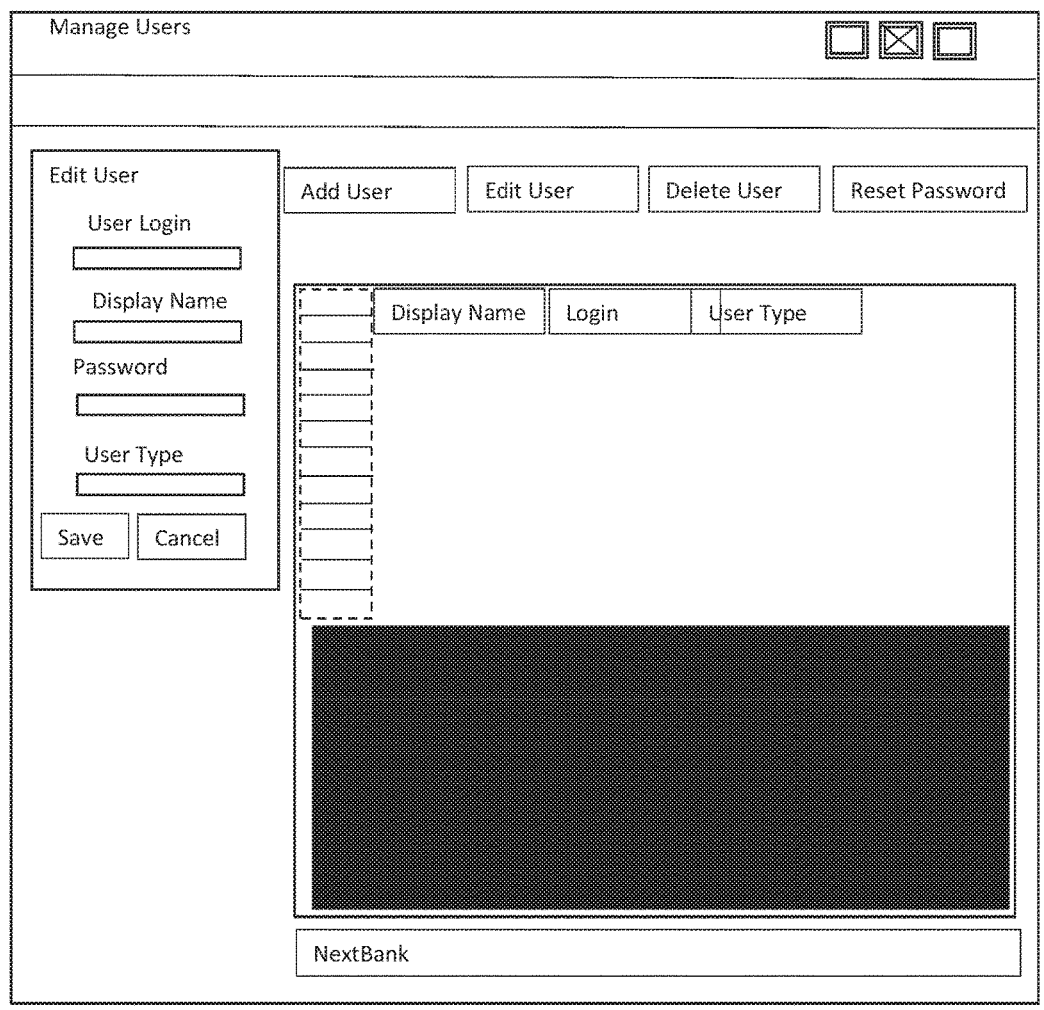

Selecting Manage Users from the Admin menu opens the Manage Users window, which allows a user to view and edit user information, specifically display name, login name, password, and user type. With respect to Manage Users, consider the following in connection with FIG. 12. Manage Users contains the following components:

| Component | Description |
|---|---|
| Edit User | This field contains the following:<br>User Login: Login name of selected user.<br>Display Name: Display name of selected user.<br>Password: Selected user's password.<br><Change>: Changes selected user's password.<br>User Type: Drop-down list selects user's type.<br><Save>: Saves changes to selected user's properties.<br><Cancel>: Cancels changes made to selected user's properties. |
| Operations | This field contains the following:<br><Add User>: Adds new user to Users.<br><Edit User>: Edits selected user.<br><Delete User>: Deletes selected user.<br><Reset Password>: Resets selected user's password. |
| Users | Display lists all users, with display name, login name, and user type. |

Deployment

Figure 13:
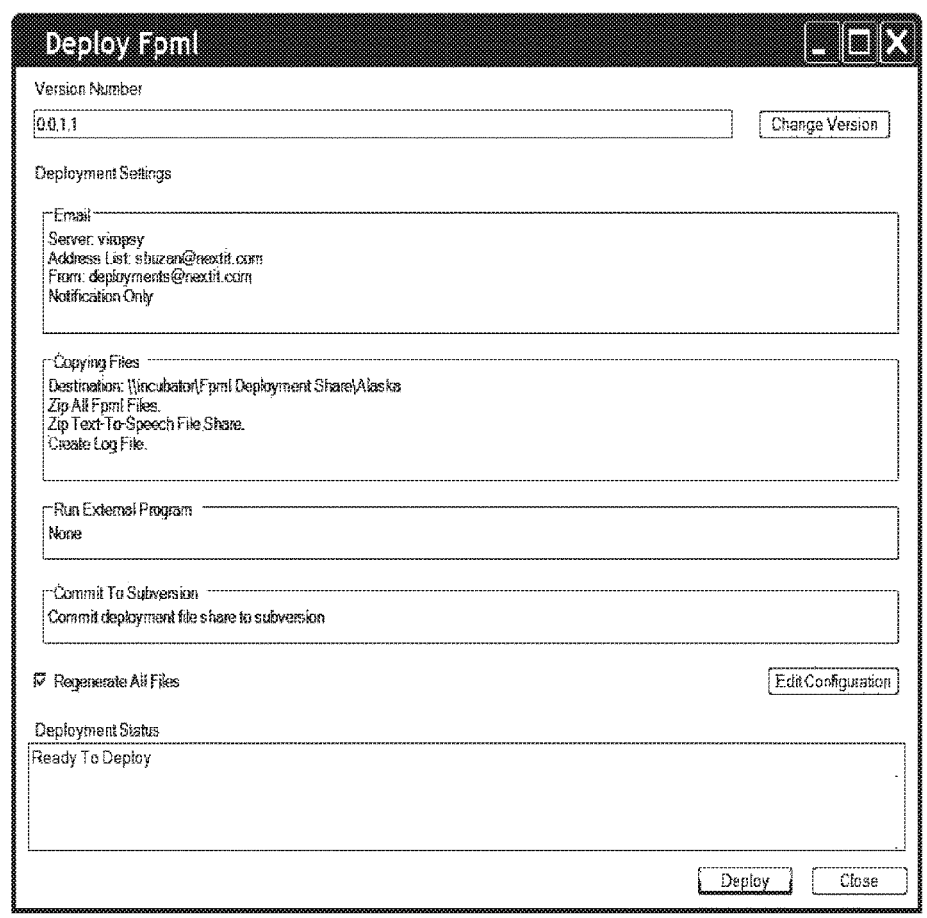

Deployment is the process of moving all the FPML files associated with the project from a user's local copy to another location, usually to a test or production server. To configure the deployment, select Deployment →Configure Deployment from the Admin menu. This will open the Deployment Configuration window. The user can select a means by which the test environment manager can be notified of changes to the FPML. The files may be transferred either by direct e-mail to the test environment manager, or by copying the files to a shared directory. With respect to a Deploy FPML Window, consider the following in connection with FIG. 13. Deploy Fpml contains the following components:

| Component | Description |
|---|---|
| Change Version | Changes the version number of the project |
| Deployment Settings | Display of Email server, Email list, Notification list, and copy directory. |
| Regenerate All Files | If selected, all files are regenerated with each update. |
| <Edit Configuration> | Edits deployment configuration. |
| Deployment Status | Display of deployment. Can be edited by clicking in the window. |
| <Deploy> | Deploys the FPML to directory selected in the Deployment Configuration window. |
| <Close> | Closes Window |

Figure 14:
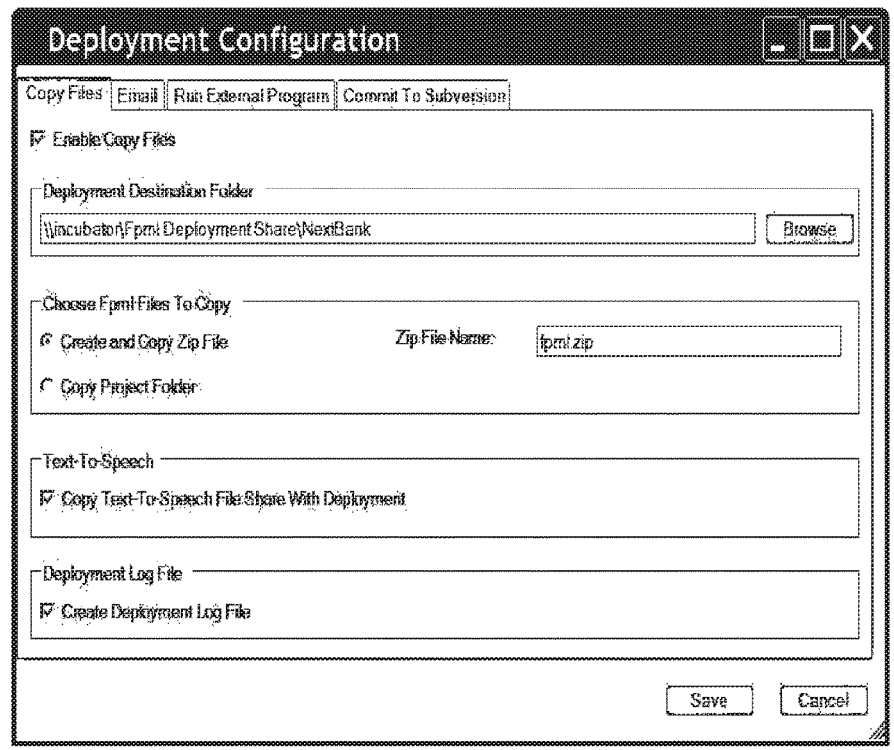

A Deployment Configuration Window allows the user to set up the deployment configuration. This includes the destination folder, email settings, and whether to include copies or Text-to-Speech. With respect to this window, consider the following in connection with FIG. 14. Deployment Configuration contains four tabs across the top of the window (described in the table just below):

Copy Files, Email, Run External Program, and Commit To Subversion.

| Component | Description |
|---|---|
| Copy Files | This tab contains the following items:<br>Enable Copy Files: If checked, will activate file copy for deployment. If unchecked, this tab will be grayed out.<br>Deployment Destination Folder: Folder where FPML files will be copied into when deployed.<br><Browse> Opens Browse window to find a shared directory.<br>Choose FPML Files To Copy:<br><Create and Copy Zip File> radio button: if selected, files will be copied in compressed (*.zip) format.<br>Zip File Name: Type name of (*.zip) file here.<br><Copy Project Folder> radio button: If selected, files copied uncompressed.<br>Text-To-Speech: If check box Copy Text-To-Speech File Share With Deployment: If selected, all Text-to-Speech files will be included in the deployment.<br>Create Deployment Log File: If check box Create Deployment Log File is selected, a log file will be generated in the deployment. |
| Email | This tab contains the following items:<br>Server Name: Name of the email server from which the deployment will be sent. Contact your system administrator for more details.<br>Email From: E-mail address deployment notifications will come from.<br>Email Address List: Input field for all the e-mail addresses that will be notified when the project is deployed, one address per line.<br>Attach Deployment Files With Email: If selected, this option sends the updated files to the users in the Address List as an attached .zip file. Default: Not selected. |
| Run External Program | This tab contains the following items:<br>Choose Program To Run: Type name of program that will run when FPML deployment is complete.<br><Browse> Opens Browse window to find file. |
| Commit To Subversion | This tab contains the following items:<br>Commit Deployed Files to SVN:<br>Check box that indicates whether the deployed files will be committed to Subversion, a file management program.<br>Fpml Service Uri: Location of Web Service that manages the FPML and SVN integration. |
| <Save> | Saves deployment configuration. |
| <Cancel> | Closes window without saving deployment configuration. |

FPML Reports

Figure 15:
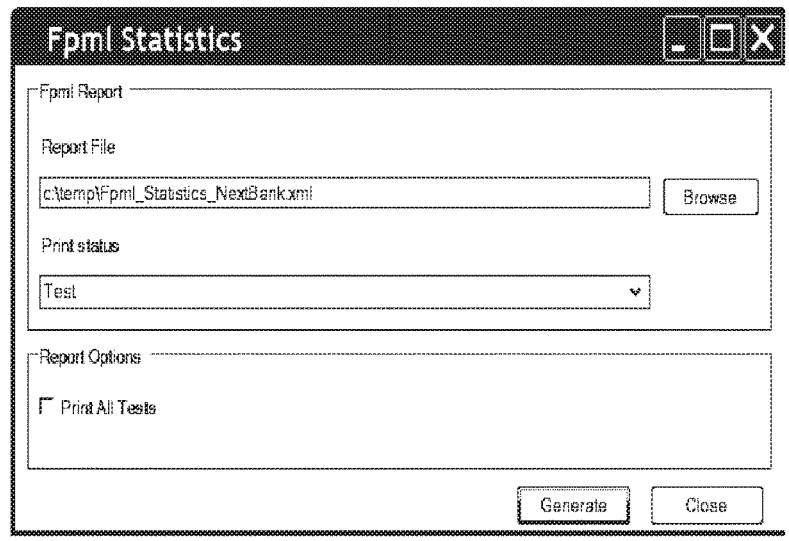

Active Lab has functionality that creates documents that may be useful to the user. In one or more embodiments, there are two documents that Active Lab can create: FPML Statistics which is an Excel® spreadsheet displaying the percentage statistics of Unit test questions and Print Units which is an Excel® spreadsheet displaying all the Units along with their respective test questions. [00103] To create the FPML Statistics spreadsheet, follow these procedures in connection with the user interface shown in FIG. 15:

1. Open FPML Statistics window by following Admin→FPML Reports→Fpml Statistics.
2. Type in destination folder and name of file to be created.
3. Select destination folder and document name by typing in Report File field, or by clicking <Browse> to open a browse window to find a destination folder.
4. Select Print Status of Test, Production, or InActive.
5. Click <Generate> to create file.

FPML Statistics contains the following components:

| Component | Description |
| --- | --- |
| Report File | Type destination folder and document name here.<br><Browse> Opens Browse window to find a directory. |
| Print Status | Contains three options:<br>Production<br>Test<br>InActive |
| <Print All Test> | Check to have all Unit tests from project printed in the document. |
| <Generate> | Click to create the document |
| <Close> | Closes window without creating the document. |

Figure 16:
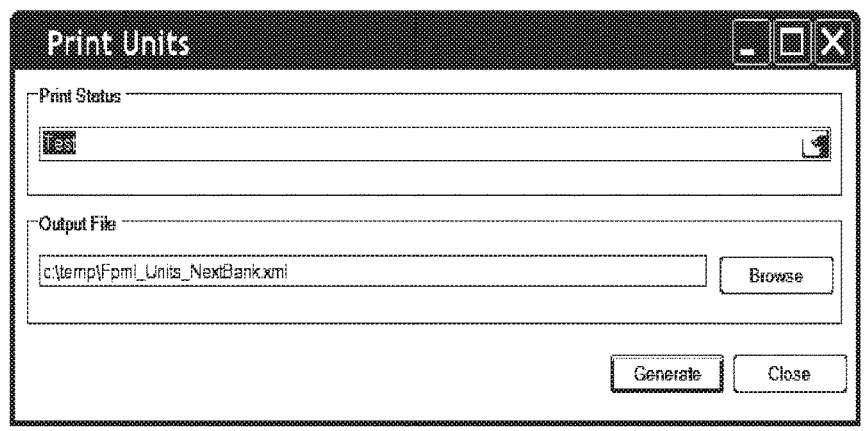

To create the FPML Units spreadsheet, follow these procedures in connection with the user interface shown in FIG. 16:

1. Open Print Units window by following Admin→FPML Reports
   →Print
   Units.
2. Select Print Status of Test, Production, or InActive.
3. Select destination folder and document name by typing in Output File field, or by clicking <Browse> to open a browse window to find a destination folder.
4. Click <Generate>

Print Units contains the following components:

| Component | Description |
| --- | --- |
| Print Status | Contains three options:<br>Production<br>Test |
| Output File | Type destination folder and document name here.<br><Browse> Opens Browse window to find a directory. |
| <Generate> | Click to create the document |
| <Close> | Closes window without creating the document. |

Text To Speech Management

Text-To-Speech (TTS) refers to the ability to translate on-screen text into audio speech. TTS files can be generated automatically, or can be pre-recorded voice files. The Text-To-Speech File Management window allows the user to easily manage importing large sets of TTS files.

Figure 17:
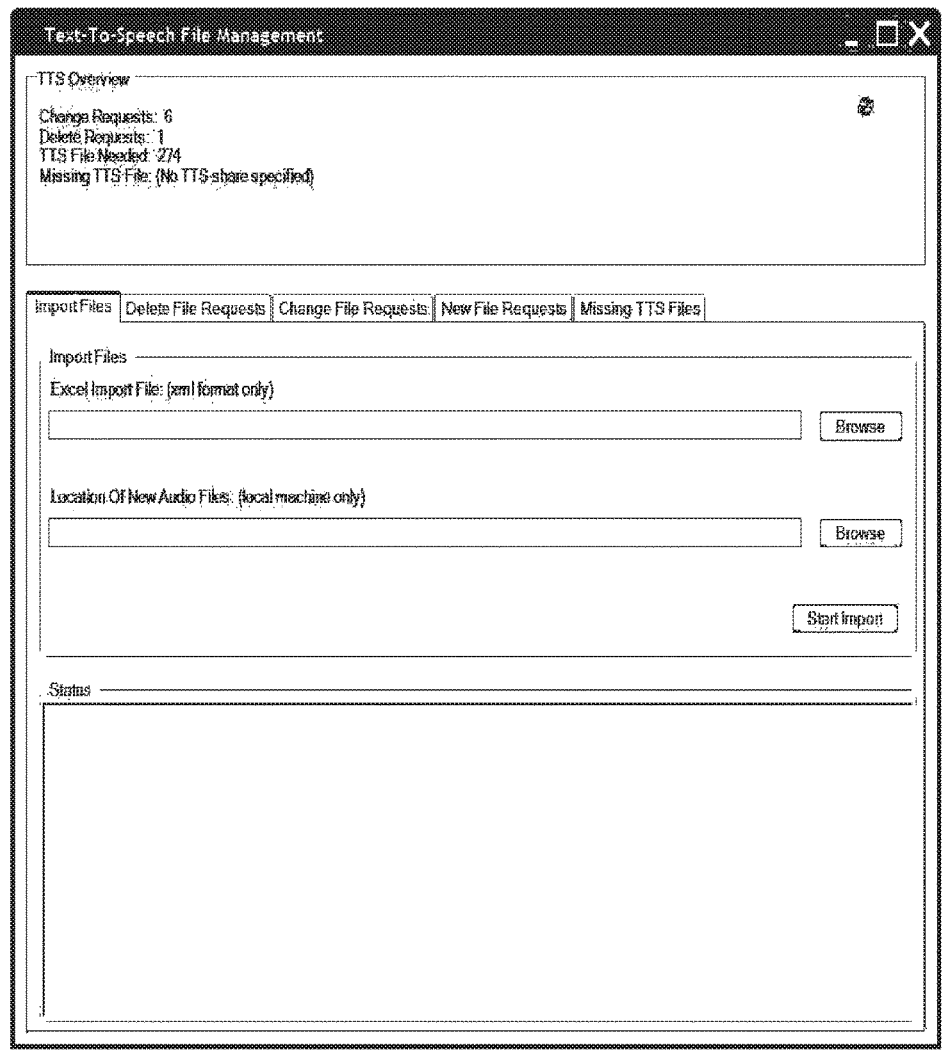

Text-To-Speech File Management is accessed by selecting Text-To-Speech from Admin as indicated in the user interface of FIG. 17. Text-To-Speech File Management includes an overview section and five tabs as described below:

| Component | Description |
| --- | --- |
| TTS Overview | This section displays statistics regarding the status of Text-to-Speech files for Units within the project<br>Change Requests: Number of changed responses needing new TTS files.<br>Delete Requests: Number of TTS files no longer used.<br>TTS File Needed: Number of responses still needing TTS files.<br>Missing TTS File: Number of items that have an assigned TTS file, but the file cannot be located.<br><Refresh>: Refreshes TTS Overview display. |
| Import Files | This tab allows the user to import and attach pre-recorded voice files to the project.<br>Excel Import File: The file path to the spreadsheet that identifies Units with corresponding audio files. The spreadsheet must be saved as an XML file.<br>Location of New Audio Files: Directory where the audio files are saved.<br><Browse>: Allows user to navigate to the particular file or directory location.<br><Start Import>: Executes the import of the audio files.<br>Status: Shows the results of the import. |
| Delete File Requests | This tab allows the user to delete audio files that are no longer used.<br><Show Delete File Requests>: Executes a search for all audio files that are no longer assigned to a Unit.<br><Clear List in Database>: Clears the references to deleted files from the database.<br><Delete Files From Share>: Deletes the actual audio files from the shared directories.<br>Display: Shows the unused audio files to be deleted. |
| Change File Requests | This tab allows the users to create an XML file showing the Units with responses that have changed since the last audio recording.<br><Dump Change Requests to Xml File>: Creates an XML file that can be opened in Excel listing the Units with changed responses.<br>Status: Shows progress and results of the file export. |
| New File Requests | This tab allows the user to send the new requests to an Excel spreadsheet<br><Dump New Requests to Excel>: Creates an XML file that can be opened in Excel that lists all of the new Units added since the last time TTS files were imported. Once updated with the audio file names, this file can become the import file.<br>Status: Shows the progress and results of the file export. |
| Missing TTS Files | This tab allows the users to view items that have an assigned audio file, but the file cannot be found for some reason.<br><View Missing Files>: Executes the search for missing files.<br>Display: Shows the results of the missing file search. |

Cascades

A cascade represents a single function of the Context IQ Engine (CIE). Each cascade takes an input, processes that input through the CIE, and then gives an output.

The order that the cascades are listed is very important because many cascades only take the output of previous cascades. When an input is received, it is processed through all cascades in the order listed on the View/Edit Load Order window. There are many different types of cascades, some of which are unique to a project.

When it comes to Concepts and Units in particular, there are two types of outputs that are very important: One is called "Match All" and the other is called "Best Match." A cascade that is set to "Match All" will output all matches to the input pattern that is received. A cascade that is set to "Best Match" will only have one output, which is calculated by the CIE based on the highest scoring pattern. If there is a tie in a "Best Match" cascade, then the output will be the last item that was calculated.

Concepts Groups can be set to either "Match All" or "Best Match" depending on the user. The majority of Concepts are usually set into "Match All" cascades, because Units take the input of multiple Concepts. Concepts are usually set into "Best Match" cascades when their patterns are so similar that they almost always triggered at the same time.

As an example, consider the following two Concepts—Home Equity and Home Equity Loan. The first Concept will always trigger because it will contain patterns that are also in the second Concept, therefore they should be put in their own "Best Match" cascade so only one can be outputted.

Units must always be assigned to "Best Match" cascades. The reason for this is because the output of a Unit is a response. This way, when an input is received, only one response is outputted.

Vocab is processed through the Context IQ Engine using cascades that only do substitution: it takes in a synonym replaces it with the name of its corresponding Vocab Term. This usually needs to be done three times for full effectiveness: the first time called the Pre-Vocab cascade where contractions are separated into separate words; the second time called the Vocab cascade where Vocab Terms are substituted for words; and a third time called the Post-Vocab cascade where multiple Vocab Term phrases are combined into single Vocab Terms, mainly for use in compound words.

Figure 18:
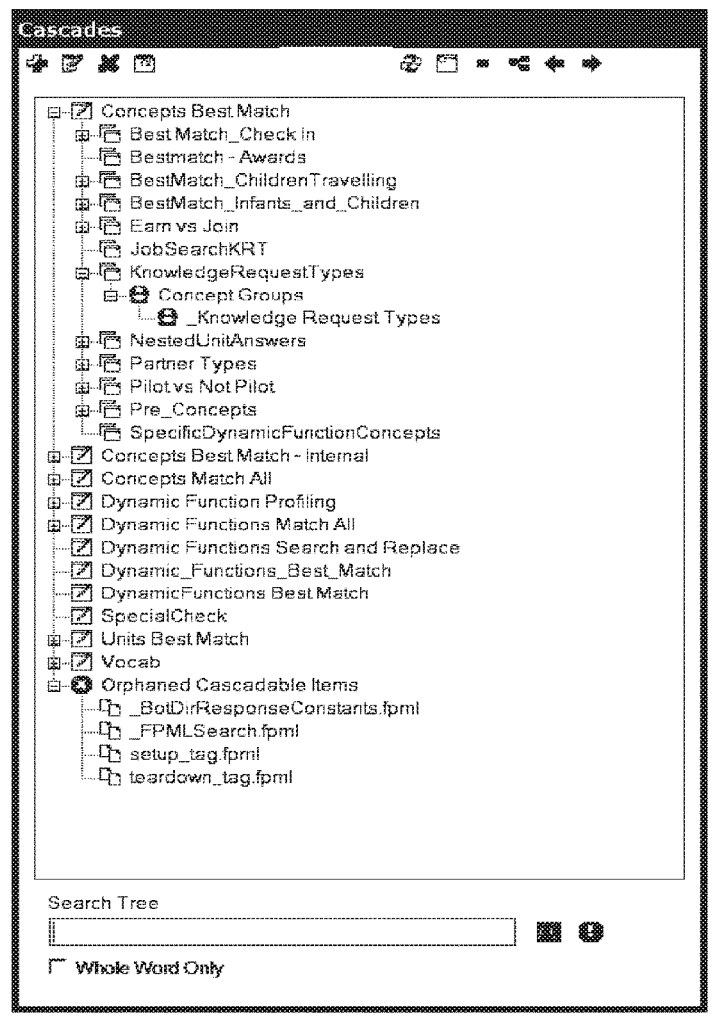

The Cascades dockable window, shown in FIG. 18, is where cascades are created and the type of output for cascades are determined. A user can also move items between cascades in this window. Cascades contain the following components:

| Component | Description |
| --- | --- |
| Button Bar | The button bar contains the following:<br><Add>: Adds new cascade.<br><Edit>: Edits selected cascade.<br><Delete>: Deletes selected cascade from the project.<br><View/Modify Order>: Opens View/Edit Load Order window. |
| Cascades | Display list of all available cascades and their constituents. Cascades are represented thusly:<br>Cascade type<br>Cascade Group |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 19:
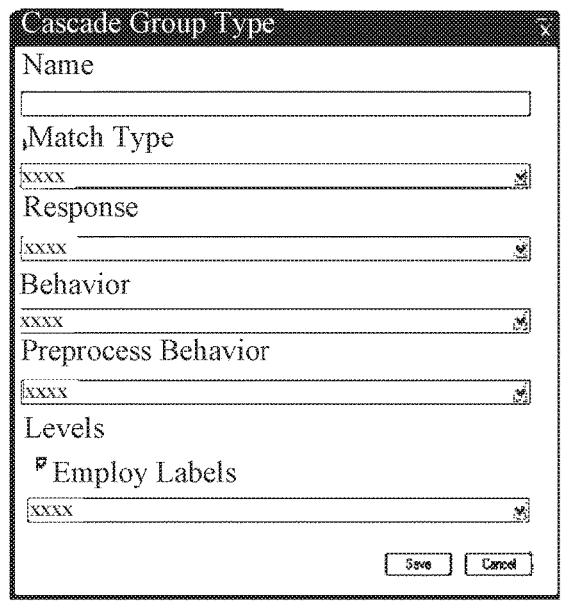

Cascades are organized by type. In Cascade Group Type, shown in FIG. 19, the user may edit the name, match type, response, behavior, pre-process action, and level settings. Cascade Group Type contains the following components:

| Component | Description |
| --- | --- |
| Name | Text input field for the name of the group |
| Match Type | Drop-down list allows for selection of match type. Choose from the following:<br>Best: only output highest scoring match.<br>All: output all pattern matches. |
| Response | Drop-down list allows for selection of response from the following:<br>Standard (Default)<br>Concept<br>Final<br>Can final |
| Behavior | Drop-down list allows for selection of behavior from the following:<br>Normal (Default)<br>Recursive<br>Search_replace<br>Stacked_ cascades<br>Ignore cascades |
| Pre-Process Action | Drop-down list allows for selection of the pre-process action from the following:<br>Return (Default)<br>Internal<br>Can_ final<br>Pre_pass_through |
| Domain Object Type | Drop-down list allows selection of what type of object can inserted into the cascade group:<br>All<br>Units<br>Concepts<br>Vocab<br>DynamicFunctions<br>DynamicFunctionsBestMatch |
| Level | This field contains the following:<br>Enable Levels checkbox: this should only be used for cascades housing dynamic functions.<br>Levels: this drop-down list allows for the selection of levels. |
| <Save> | Saves settings and closes window. |
| <Cancel> | Closes window without saving settings. |

Figure 20:
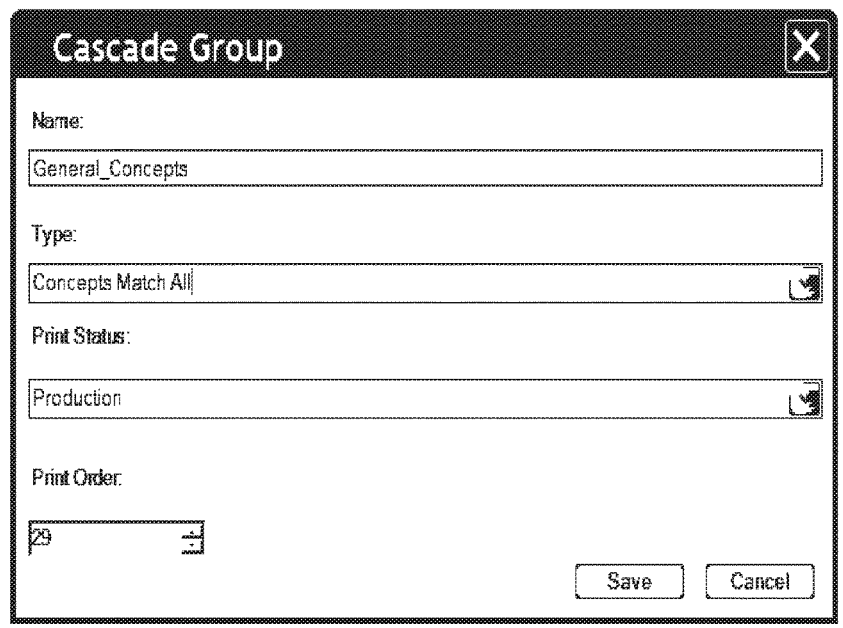

Cascade Groups represent the primary grouping of all components of a KB. Cascade Group, as shown in the user interface of FIG. 20, allows the user to give the cascade group a name, the type of cascade it will be, as well as its print order. Cascade Group contains the following components:

| Component | Description |
| --- | --- |
| Name | Text input field for the name of the cascade |
| Type | Drop-down list for selection of cascade type. Choose from any cascade group created for the project. |

| Component | Description |
| --- | --- |
| Print Status | Set Print Status of the cascade to one of three options:<br>Production<br>Test<br>InActive |
| Print Order | Print order of the cascade. This affects when its components will trigger in relation to the other cascades. |
| <Save> | Saves settings and closes window. |
| <Cancel> | Closes window without saving settings. |

Load Order

Figure 21:
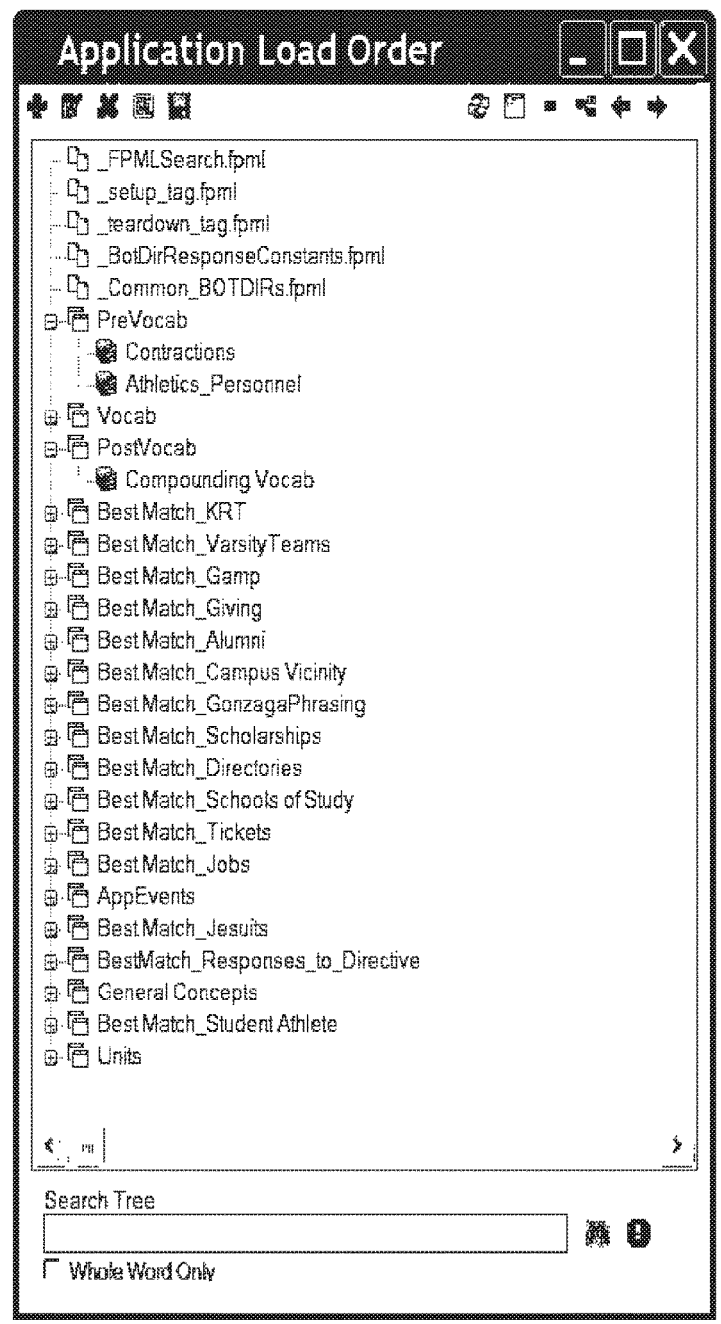

Selecting View/Edit Load Order from the Admin menu opens the Application Load Order window as shown in FIG. 21. Load Order determines what order static files and cascades are processed when an input is received. This window allows the user to drag and drop Vocab, Unit, and Concept Groups into different cascades. This ordering is very important because some cascades take the input of what other cascades output. Application Load Order has the following components:

| Component | Description |
| --- | --- |
| <Remove Selected Item From application> | Removes the highlighted from the project. |
| <Save> | Saves any changes to load order and closes the window. |
| <Refresh> | Refreshes window. |
| <New Window> | Opens new Application Load Order window. |
| <Collapse All> | Collapses tree to smallest size. |
| <Expand All> | Expands tree to maximum size. |
| Main Window | Tree view of all items in the project in their load order. |

Unused Items

An Unused Item is an item contained in the database, but not used in the current project. This can occur in many ways: newly created projects that point to an existing database will show all the items in that database as unused; and groups of Vocab, Units, and Concepts can be removed from a project, but not from the database, so they can be available for other projects.

Figure 22:
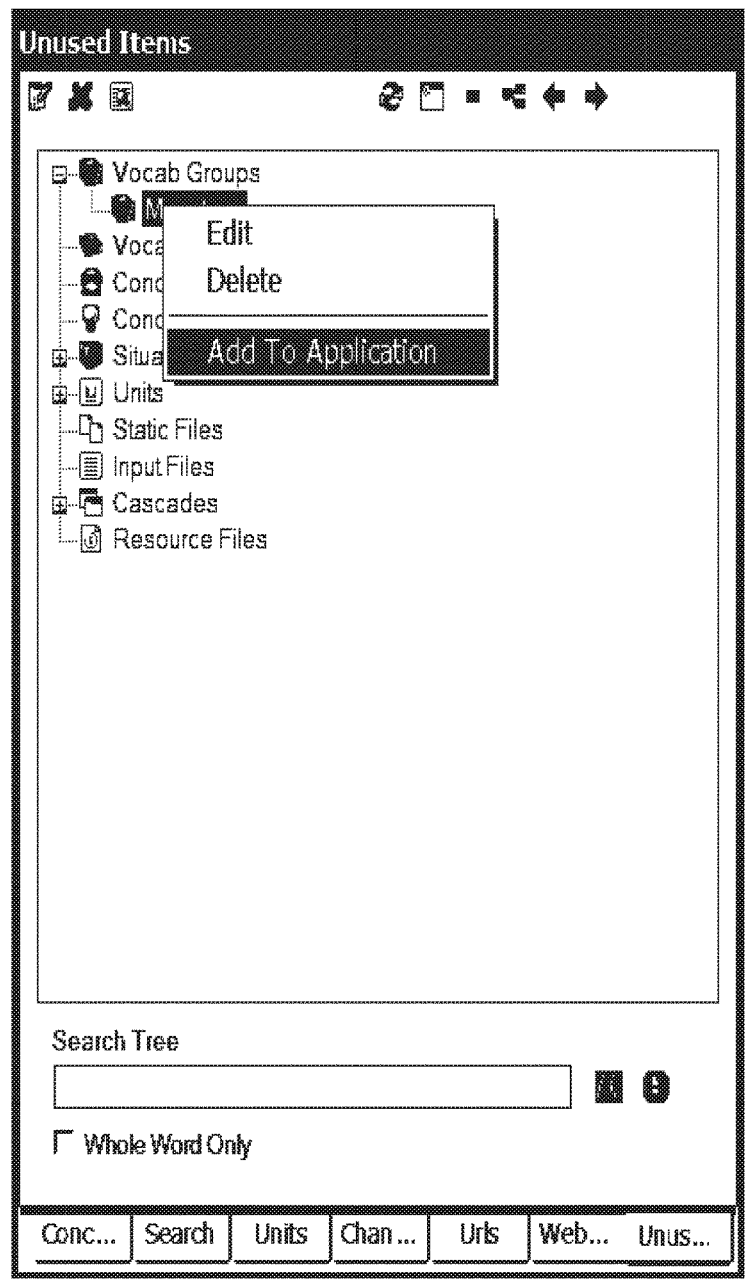

In the Unused Items dockable window, as shown in FIG. 22, the user can view all items in the database that are not included in the existing project. This window also allows these items to be added to the current project by selecting→Add To Application from the right-click menu. The Unused Items dockable window contains the following components:

| Component | Description |
| --- | --- |
| Button bar | The button bar contains the following:<br><Edit>: Edits selected item.<br><Delete>: Deletes selected item.<br><Show Dependencies>: Note: Currently not supported.<br><Refresh>: Refreshes Unused Items display.<br><New Window>: Opens copy of current window.<br><Collapse All> Collapses entire tree.<br><Expand All> Expands entire tree.<br><Back and Forward Navigation>: Navigates between searches. |
| Unused Items | Displays all items in the database not used by the current project. The following is a list of all the different possible Unused Item types.<br>Vocab Groups<br>Vocab Terms<br>Concept Groups<br>Concepts<br>Situation Group<br>Units<br>Static Files<br>Input Files<br>Cascades<br>Resource Files |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |
| Right-Click Menu | Unused Items contains the following right-click menu:<br>→ Edit: Open edit window corresponding selected item.<br>→ Delete: Delete selected item from the database.<br>→ Add To Application: Adds selected item to the current project. Item will appear in its corresponding dockable window. |

Resource Files

Figure 23:
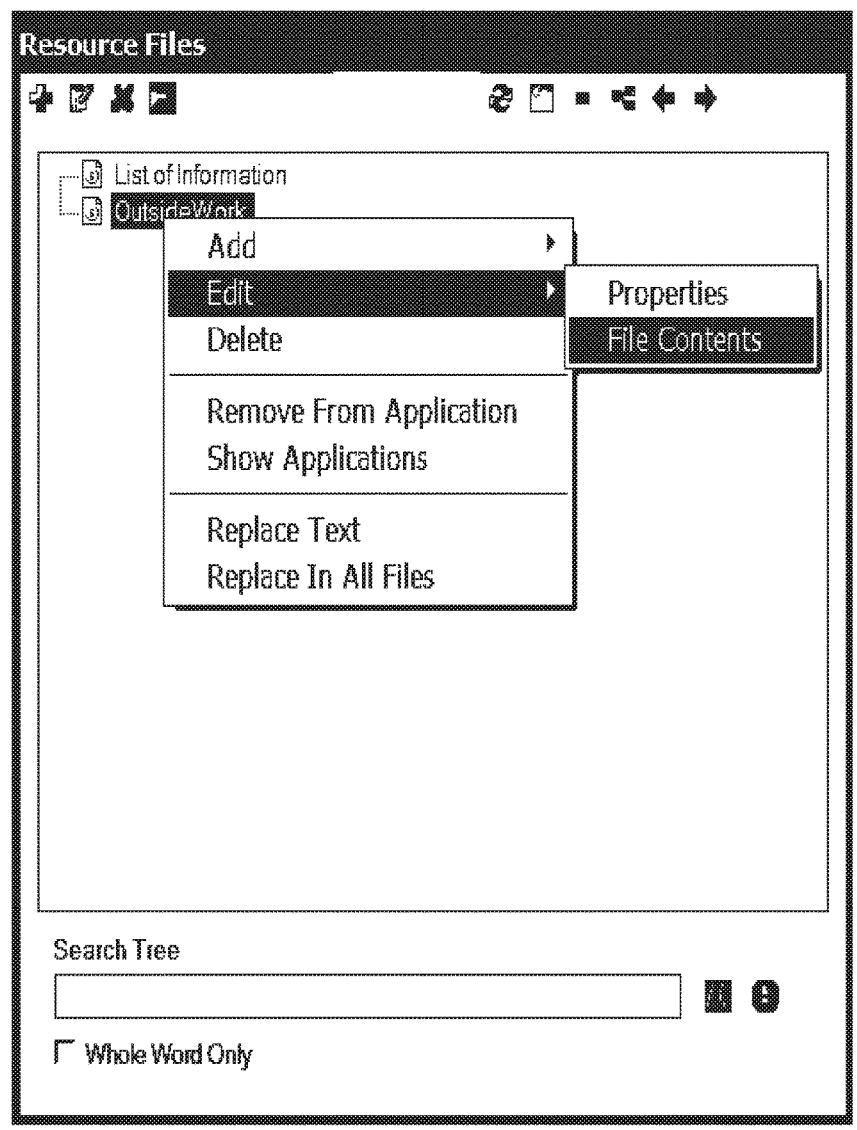

The Resource Files dockable window, as shown in FIG. 23, allows the user to view and edit all the Resource Files, or non-FPML files, in the project.

The Resource Files dockable window contains the following components:

| Component | Description |
| --- | --- |
| Button bar | The button bar contains the following:<br><Add>: Opens Resource File Editor.<br><Edit>: Opens selected Resource file in Editor tab.<br><Delete>: Deletes selected Resource File.<br><Browse For Folder>: Opens a Browse window to search for Resource Files.<br><Refresh>: Refreshes Resource Files display.<br><New Window>: Opens copy of current window.<br><Collapse All> Collapses entire tree.<br><Expand All>Expands entire tree.<br><Back and Forward Navigation>: Navigates between searches. |
| Resource Files | Displays all Resource Files in the project. Resource Files |
| Search Tree | This field contains the following:<br>Input Text Field: Searches cascades for specific text.<br><Search>: Executes search.<br><Search Options>: Opens Search Options window. |

-continued

| Component | Description |
|---|---|
| | Whole Word Only Checkbox: Limits search to complete word matches. |
| Right-Click Menu | Resource Files contains the following right-click menu:<br>→Add<br>    Resource File: Opens Resource File Editor.<br>    Directory: Opens Browse window to search for new Resource File<br>→Edit<br>    Properties: Opens Resource File Editor.<br>    File Contents: Opens selected Resource File in Editor tab.<br>→    Delete: Delete selected file.<br>→    Remove From Application: Removes selected file from current project, but does not delete it from the database.<br>→    Show Applications: Displays all application that use selected file.<br>→    Replace Text<br>→    Replace In All Files: Opens Replace Text window. |

Managing Projects

This section provides detailed instructions for creating projects and interacting with the project management tools. To create a new project, use the following procedure in connection with the user interfaces shown in FIGS. 24 and 25:

1. Select File→New Project to open a Create New Project window.
2. Type the Application Name.
3. Click <Browse> under Local File Directory to select a local directory where the FPML files will be generated, or type the path in the Local File Directory text field.
4. Click <Browse> under Lex Field Source to select a local directory where the lex file will be found, or type the path in the Local File Directory text field.
5. Configure the Database Connection as follows:
   a. Select the Database Type from the drop-down menu
   b. Type in the Server Name in the appropriate field.
   c. Type in the Database Name in the appropriate field.
   d. Type in the User Name of your choice in the appropriate field.
   e. Type in the Password.
6. Type in the Web Server Path or skip to step 6.
7. Type in the Subversion Service or skip to step 7.
8. Click on Chat Review or skip to step 9.
9. Configure the Chat Review as follows:
   a. Type in the Display Name of the chat server.
   b. Type in the Connection String of the chat server.
   c. Select the Connection Provider for the chat server.
   d. Select the Dialect for the chat server.
   e. Select the Driver for the chat server.
   f. Click <Add>.
   g. Repeat steps a-g for each chat server to be added.
10. Click <Create Project> to open the new project, or click <Cancel> to exit the Create New Project window without creating a new project.

Figure 24:
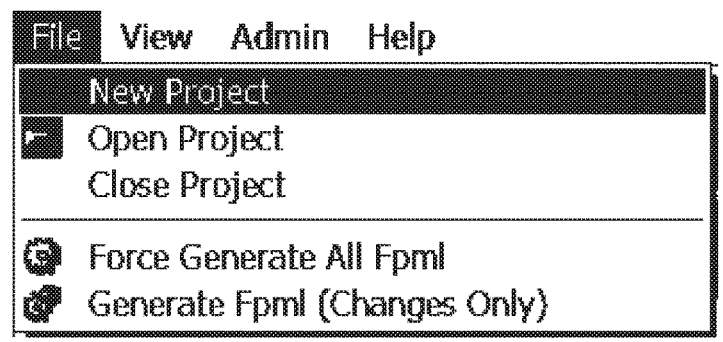
Figure 25:
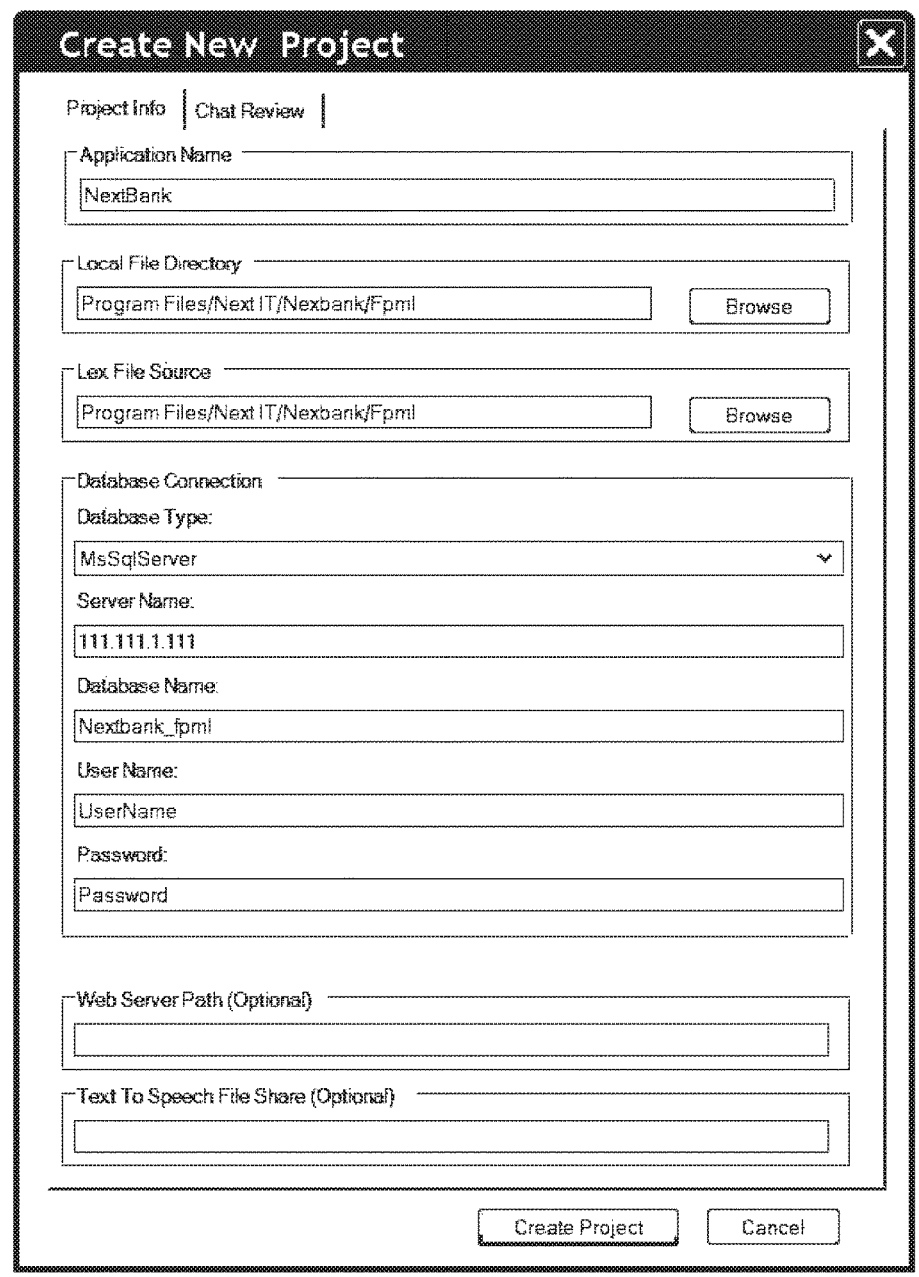

To opening an existing project, using the user interface of FIG. 24, complete the following actions:
1. Select File open Project
2. Browse for the project (*.proj) you want to open.
3. Click <Open> to open the selected project, or click <Cancel> to continue without opening a project.

Within Active Lab, configuration settings that may be changed are found in Application Editor. To change these configurations, use the following procedure:
1. Select Application Data from the Admin menu to open Application Editor.
2. Make any changes desired to the Name or skip to step 3.
3. Make any changes desired to the Version or skip to step 4.
4. Make any changes desired to the Approval Mode or skip to step 5.
5. Change the lex file using the following procedure or skip to step 6.
   a. Click <Load File> to open a Browse window.
   b. Browse to the desired location and select the lex file.
   c. Click <Open>.
6. Click <Upload File> to open a Browse window that will select an existing project or skip to step 7.
7. Click <Download File> to open a Browse window to save the project as a (*.proj) file in selected directory or skip to step 8.
8. Click <Save> to close the window and save changes OR click <Cancel> to close the window without saving changes.

Project deployment involves sending the project files from one location to another, usually from the user's local hard drive to a test or production environment. There are two methods of deployment: by email or by copying the project files to a shared directory. You may select one or both of these methods as the situation warrants.

Before deploying a project, the following steps can be used to ensure a stable set.
1. Click <Generate All FPML> or select→File→Force Generate All FPML.
2. Wait for FPML generation to complete.
3. Close Active Lab.
4. Reopen Active Lab.
5. Open the project by selecting File→open Project and browsing to project file.

Figure 26:
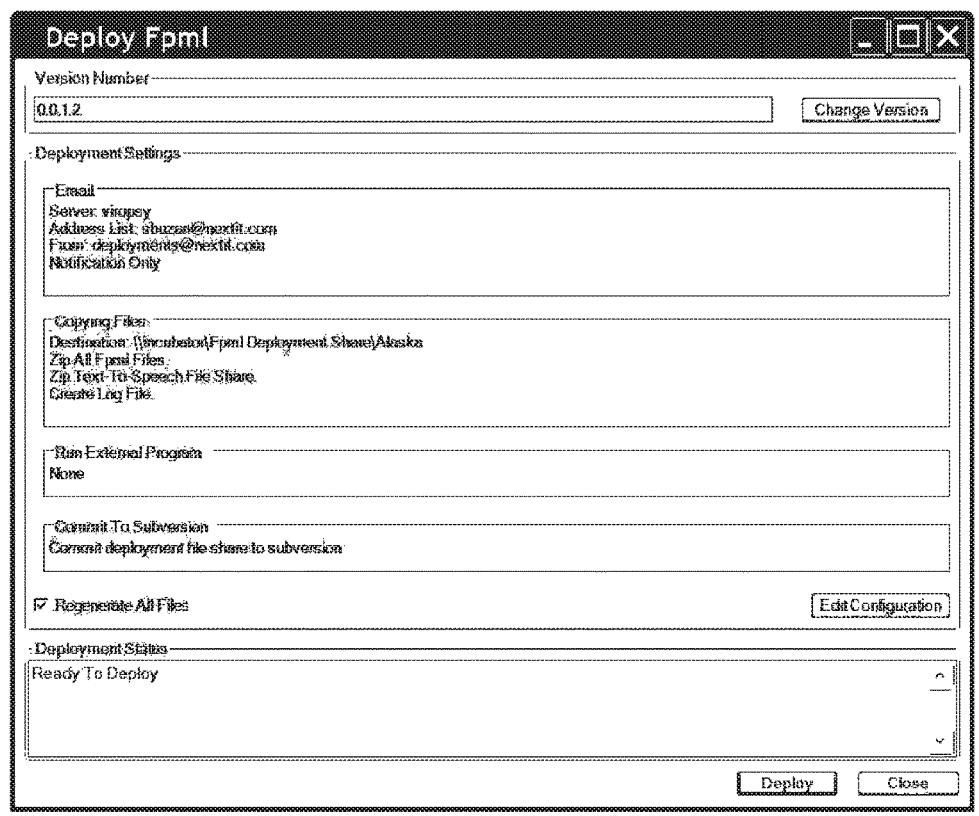
Figure 27:
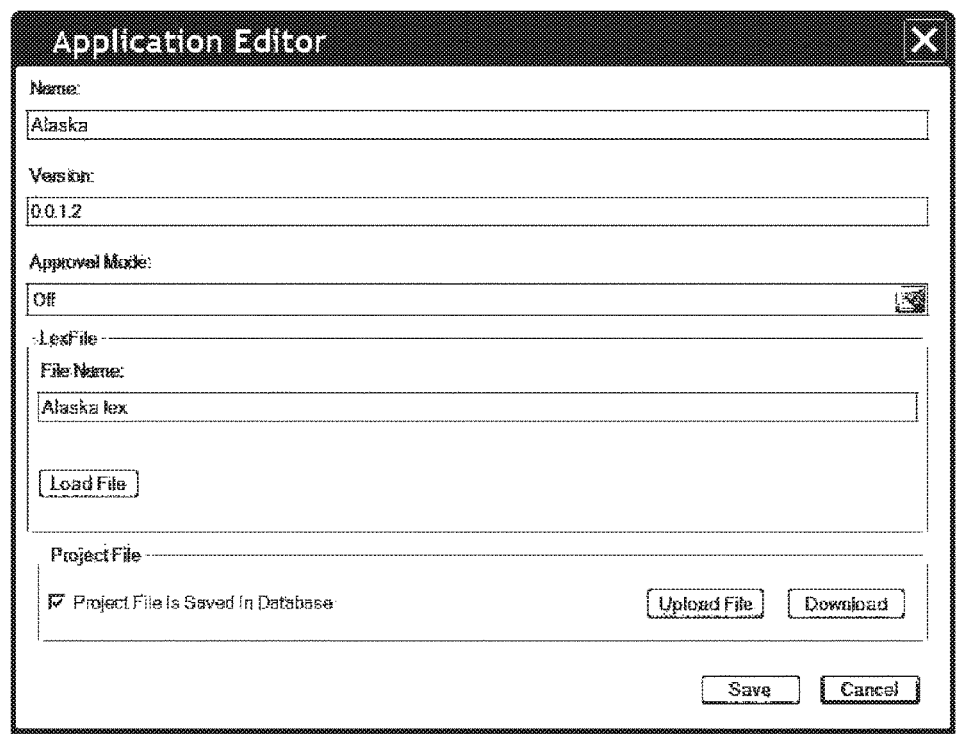
Figure 28:
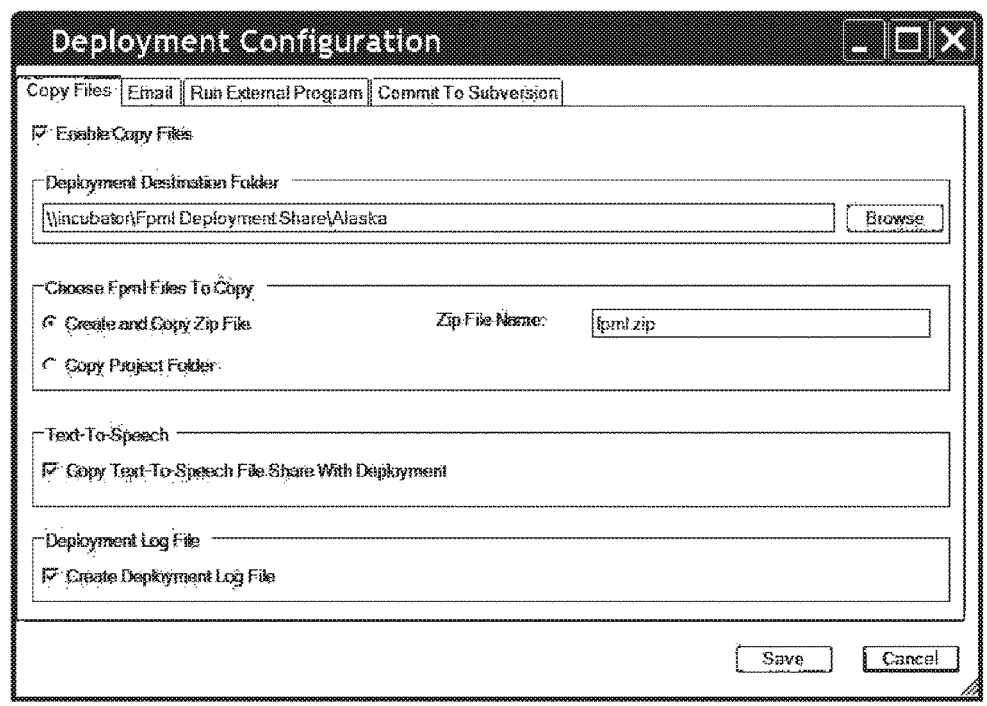

Once the above steps have been completed, it is very important not to do any other activity in Active Lab before you deploy, or it may interfere with the deployment. This means that after opening the project, you continue directly to the following steps, without doing any other activity.
1. Select Admin→Deployment→Deploy FPML open Deploy FPML window as shown in FIG. 26.
2. Click <Change Version> to open Application Editor (FIG. 27).
3. Edit Version field to desired number.
Click <Save>. Window will close.
4. Return to deploy FPML window.
5. Click <Edit Configuration> to open Deployment configuration window (FIG. 25) or skip to step 24.
6. Click <Enable Copy Files> to deploy to a shared directory, or skip to step 12.
7. Type or browse to the Deployment Destination Folder of your choice. This is where the deployed files will be copied.
8. Select Create and Copy Zip File or Copy Project Folder.
   a. If Create and Copy Zip File is selected, enter Zip File Name in appropriate field.

Figure 29:
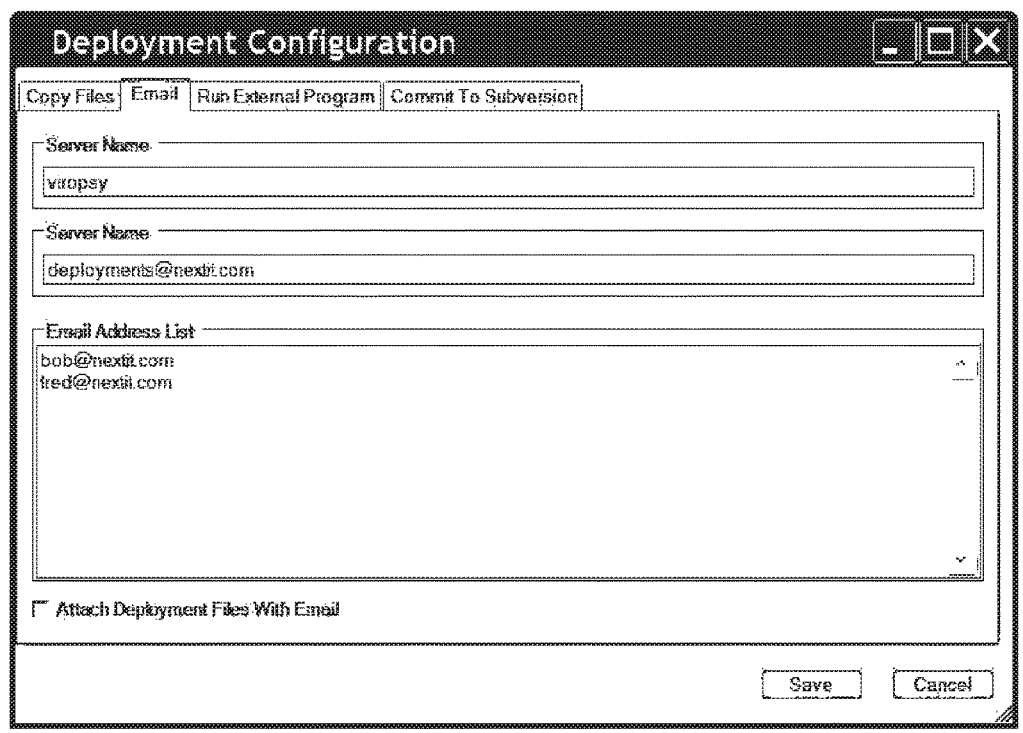
Figure 30:
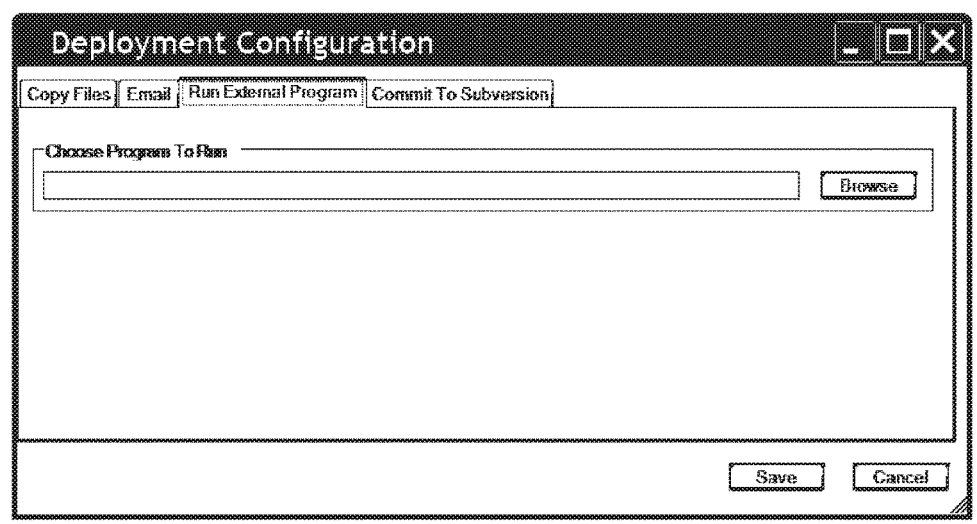

9. Select Copy Text-To-Speech File Share With Deployment (Optional).
10. Select Create Deployment Log File (Optional).
11. Click Email tab (FIG. 29) or skip to step 18.
12. Type the Server Name in the first field. This should be your local network email server.
13. Type the e-mail address the e-mail will originate from in the second field.
14. Type in the email address to which the pertinent files will be sent in the Email Address List.
15. Repeat step 10 as often as desired, one address per line.
16. Select Attach Deployment Files With Email to ensure that the files will be sent. If this is not selected, the addresses listed will only receive a notification.
17. Click Run External Program tab (FIG. 30) or skip to step 20.
18. Type in or browse to appropriate file.
19. Click Commit To Subversion tab or skip to step 22.
20. Click <Commit Deployed Files to SVN>. (Optional)
21. Click <Save> to close the window and save the deployment settings. The window will close
22. Return to Deploy FPML window.
23. Examine the Deployment Settings to ensure that all is in order.
24. Examine Deployment Status. If it reads "Ready To Deploy," click <Deploy>.

Creating a List of Units Requiring Audio Files

When the Unit responses have been finalized, one can generate a spreadsheet of the ones requiring new audio files. If you have previously imported voice files, this will be a two step process. First, generate a list of new requests; and secondly, generate a list of responses changed since the last recording.

New Requests:
1. Admin→Text-To-Speech to open Text-To-Speech File Management.
2. Click on New File Requests tab
3. Click <Dump New Requests to Excel>.
4. Click <OK> in response to the "Please Choose an xml file" window.
5. In the Save As window, choose a name and location for the file. Click <Save>.
6. The file will be created and the results displayed in the Status field.

Changed Responses:
1. Admin→Text-To-Speech to open Text-To-Speech File Management.
2. Click on Change File Requests tab
3. Click <Dump Change Requests to Xml File>.
4. Click <OK> in response to the "Please Choose an xml file" window.
5. In the Save As window, choose a name and location for the file. Click <Save>.
6. The file will be created and the results displayed in the Status field.

When updated with the names of the audio files, these spreadsheets can be used as TTS import files.

Vocabulary

Active Lab uses vocabulary to allow the user a way to define important terms in a project as well as group synonyms together in order to streamline the Concept, Unit building, and maintenance process. This section contains a description of the details and principles surrounding vocabulary as well as instructions on creating and maintaining vocabulary within Active Lab.

Vocabulary is at the core of defining a Knowledge Base. Concepts and Units build on the foundation of vocabulary. The purpose of vocabulary is to group synonymous words together to be used in formulating input patterns for Concepts and Units. Vocabulary also vastly streamlines the maintenance involved in managing a KB.

The way that vocabulary is streamlined in the KB is by grouping synonyms together under a single label, called a Vocab Term. Synonyms can include any unambiguous synonyms, misspellings, tenses, pluralities, and/or possessive forms. Together, a list of Synonyms and its corresponding Vocab Term are known as a Vocab.

Figure 31:
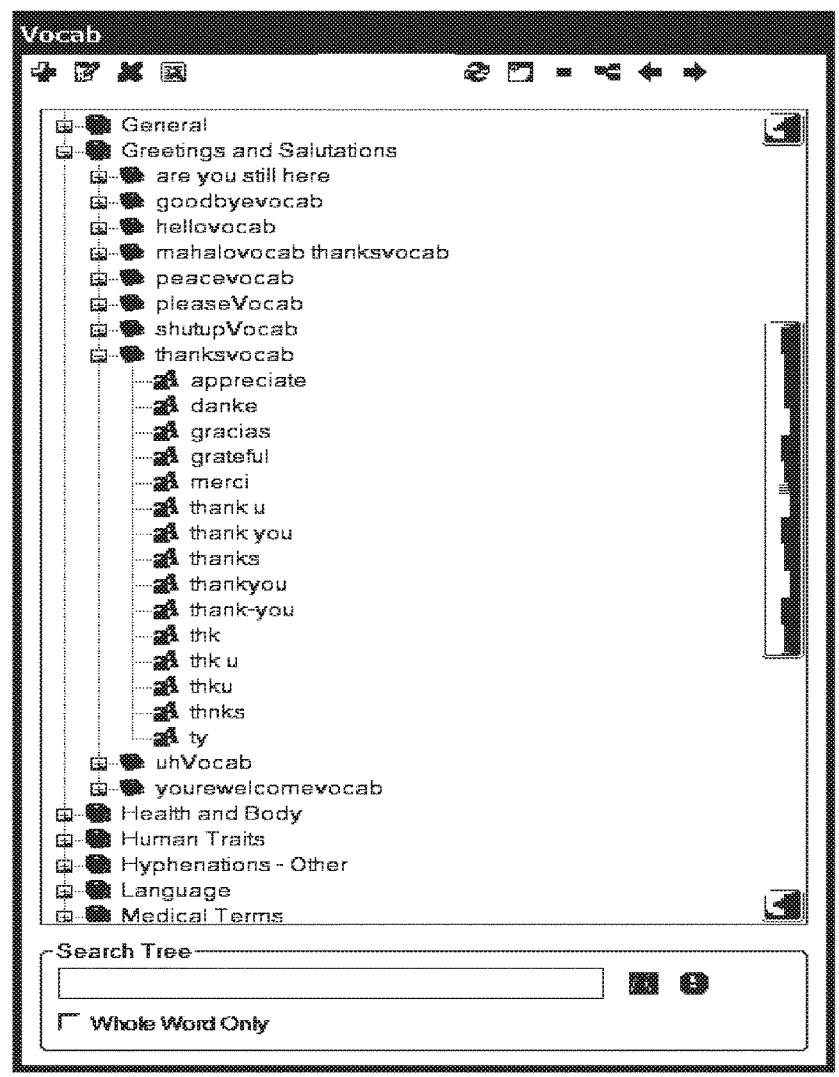

Vocab functions as a substitution algorithm: when a word is entered, it is substituted for its corresponding Vocab Term. This way, only the Vocab Term needs to be used when creating patterns later on. Vocab Terms are organized into Vocab Groups, mainly for organizational purposes. Vocab Groups can then be assigned to different cascades. Vocab is primarily viewed in the Vocab dockable window (See FIG. 31), which allows the user to view all the Vocab Terms associated with the currently open project.

The Vocab dockable window contains the following components:

| Component | Description |
| --- | --- |
| Button Bar | The button row contains the following buttons:<br><Add>: Adds new Vocab Term.<br><Edit>: Opens Vocab Editor with selected term loaded.<br><Delete>: Deletes the selected Vocab Term, and all of its synonyms from the project.<br><Show Dependencies>: Shows the Concepts and Building Blocks that use the selected Vocab Term.<br><Refresh>: Refreshes Vocab display and collapses open groups.<br><New Window>: Opens copy of current window.<br><Collapse All> Collapses entire tree.<br><Expand All> Expands entire tree.<br><Back and Forward Navigation>: Navigates between searches. |
| Vocab display tree | This tree shows vocabulary organized as follows:<br>Vocab Group<br>    Vocab Term<br>        Synonym<br>Expand and Collapse: these expand and collapse Vocab Groups to show Vocab Terms, and Vocab Terms to show synonyms. |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 32:
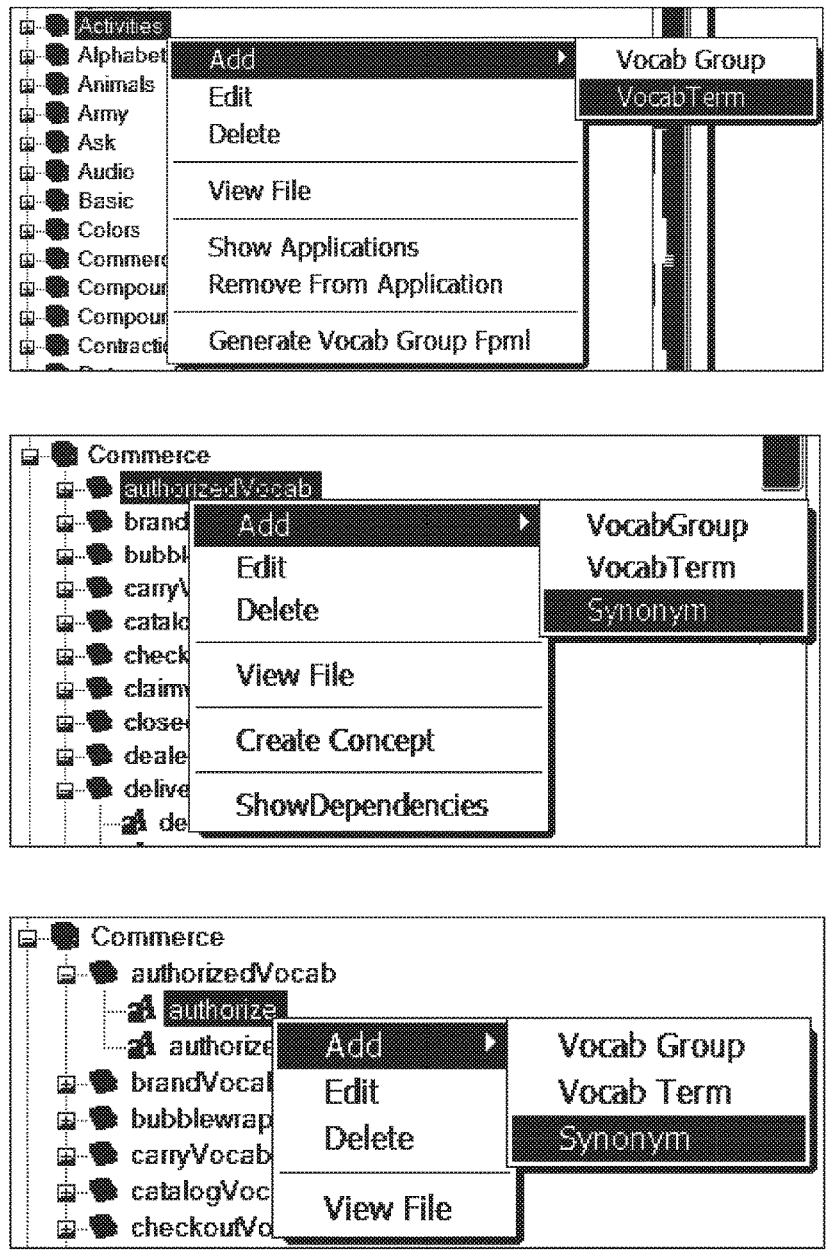

The Vocab dockable window has three different right-click menus (shown in FIG. 32) that appear, based on whether one right-clicks on the Vocab Group, Vocab Term, or Synonym. The following selections are available:

| Selection | Description |
|---|---|
| Add | → Vocab Group: opens Add New Vocab Group.<br>→ Vocab Term: opens Vocab Editor.<br>→ Synonym: Opens Vocab Editor with highlighted Vocab loaded. |
| Edit | Opens selected item for editing in its respective window. |
| Delete | Deletes selected item from the project. |
| Show Applications (Vocab Group only) | Shows all applications that use selected Vocab Group. |
| Remove From Application (Vocab Group only) | Removes selected Vocab Group from current project. Vocab Group can now be found in Unused Items. |
| Show Dependencies (Vocab Term only) | Shows all Concepts and Building Blocks using the term. |
| Create Concept | Creates a Concept in the Concent tab using current Vocab Term. |
| View File | Views FPML file containing current Vocab Term in the Edit tab. |

Vocab Groups are sets of Vocab Terms that are categorically similar. For instance, the Vocab Terms "dog," "cat," and "parrot" might be placed in a Vocab Group called "animals." Vocab Groups are used to simplify Vocab management within cascades and projects. Individual groups can be added and removed from projects, and can be moved around, in, and between cascades. Each Vocab Term can only belong to one Vocab Group.

Figure 33:
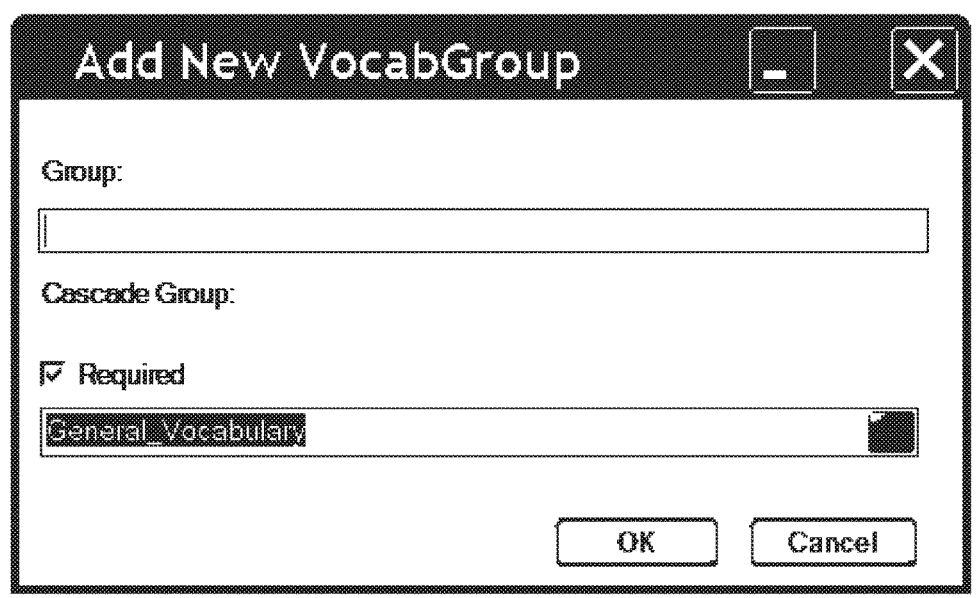

The Add New Vocab Group window (FIG. 33) consists of the following components:

| Component | Description |
|---|---|
| Group | The desired group name. |
| Required Cascade Group | Check to assign Vocab Group to a The desired cascade group. |
| <OK> | Confirms Vocab Group creation. |
| <Cancel> | Closes window without creating new group. |

Figure 34:
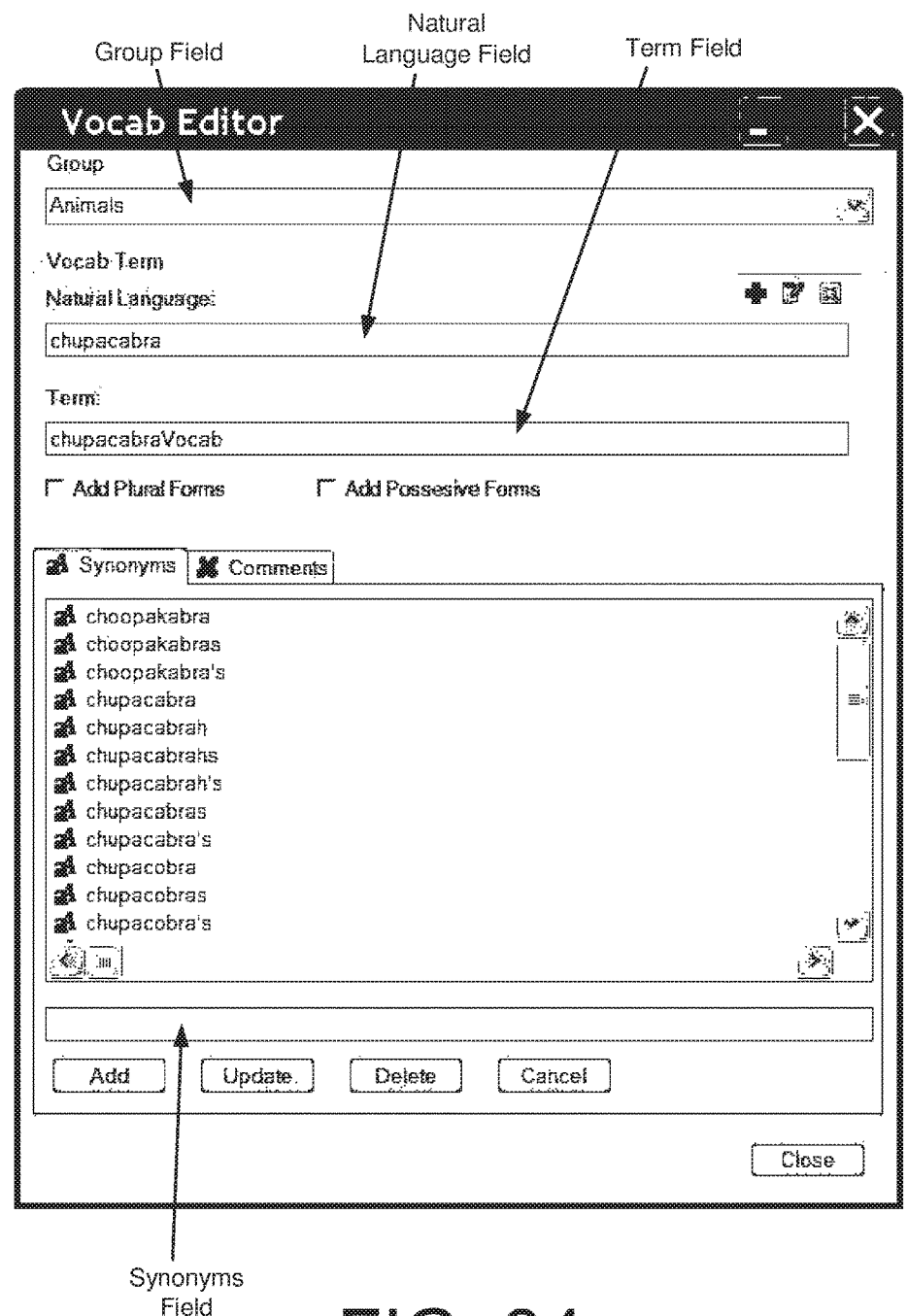

Vocab Terms are used to simplify maintenance of Concepts and Units by converting all synonymous words into a single term. Thus, Vocab Terms act as a form of substitution. In cases of ambiguous synonyms, create two separate Vocab Terms to be placed in a Building Block together later on. Vocab Terms are created via the Vocab Editor (See FIG. 34), which is accessed by either right-clicking in Vocab or by clicking <Add> in Vocab. The following are components found in the Vocab Editor window:

| Component | Function |
|---|---|
| Group | Drop-down list for the group to which the term will belong |
| Vocab Term | This field contains the following components:<br>Button Row: Contains<br>  <Add>: adds term to Vocab Group.<br>  <Edit>: edits natural language or term.<br>  <Show Dependencies>: Shows all Concepts and Building Blocks in which the term appears.<br>Natural Language: Text field for the word as it would appear in natural language.<br>Term: Text field for the term as it is listed in Vocab. Typically, this ends in "-vocab" ("help" would be "helpvocab").<br>Add Plural Forms: Selection, if checked, adds all terms synonyms with an "s" on the end. Default: not selected.<br>  Add Possessive Forms: Selection, if checked, adds a version of each synonym ending in "'s." |
| Synonyms tab | This field contains the following:<br>Display: list of all manually typed synonyms in the term.<br>Input Field for the entry of synonyms.<br>  <Add>: Adds synonym to term.<br>  <Update>: Makes changes to selected synonym.<br>  <Delete>: Deletes selected synonym.<br>  <Cancel>: Cancels changes made to synonym. |
| Comments tab | This field contains the following:<br>Display: The current comment for the Vocab.<br>The comments display will be marked with one of the following icons:<br>  Currently no comments.<br>  Comments exist for this vocab.<br>The following buttons are used:<br>  <Save Comments>: Save current comments.<br>  <Clear Comments>: clears all comments. |
| <Close> | Closes the Vocab Editor window. |

Figure 35:

Helper Terms are commonly used words and phrases that are used to build sentences, and have no synonyms or common misspellings, such as "is," "or," or "but." Helper Terms are also used for words that should not be made into Vocab, especially those that are only necessary for a single Concept or Unit. Some names/proper nouns that you want to reuse in response may be used as Helper Terms. Helper Terms can be used anywhere Vocab is used, and also directly in Units. The Helper Terms dockable window is shown in FIG. 35 and includes the following components:

| Component | Description |
|---|---|
| Button Row | Row of buttons contains:<br>  <Add>: Add new Helper Term.<br>  <Edit>: Opens Edit Helper Term with selected Helper Term loaded.<br>  <Delete>: Deletes selected Helper Term from the project.<br>  <Show Dependencies>: Shows all Concepts and Units that use selected Helper Term.<br>  <Refresh>: Reloads Helper Terms display.<br>  <New Window>: Opens copy of current window.<br>  <Collapse All> Collapses entire tree.<br>  <Expand All> Expands entire tree. |

| Component | Description |
| --- | --- |
| Display | <Back and Forward Navigation>: Navigates between searches. List of all Helper Terms defined in the project. |
| Search Tree | This field contains the following: Input Text Field: Searches cascades for specific text. <Search>: Executes search. <Search Options>: Opens Search Options window. Whole Word Only Checkbox: Limits search to complete word matches. |

The Add New Helper Term and Edit Helper Term windows (see FIG. 36) both contain the following components:

| Component | Description |
| --- | --- |
| Term field | Helper Term name |
| <OK> | Confirms creation or change of Helper Term |
| <Cancel> | Closes window without creating or editing Helper Term. |

Building Blocks serve as a means to group related Vocab and Helper Terms and Concepts together. There are two types of Building Blocks: Standard and Phrase.

Standard Building Blocks provide a useful means for associating terms or Concepts that are commonly though not always related to one another, specifically ambiguous Vocab, or words with multiple meanings based on context, such as "arm," which can mean a part of the body or to ready a weapon.

Phrase Building Blocks are used to group short patterns of Vocab and/or Helper Terms together in a particular order. When a phrase Building Block is used in an input pattern, that pattern will only trigger when an input is received that exactly matches the order, from top to bottom, that is listed in the Building Block.

Building Blocks composed of Concepts are represented by a first type of icon, while those composed of Vocab Terms are represented by a second type of icon. Vocab and Helper Term Building Blocks can be used in Concept input patterns, while Concept Building Blocks can be used in Unit input patterns.

Figure 37:
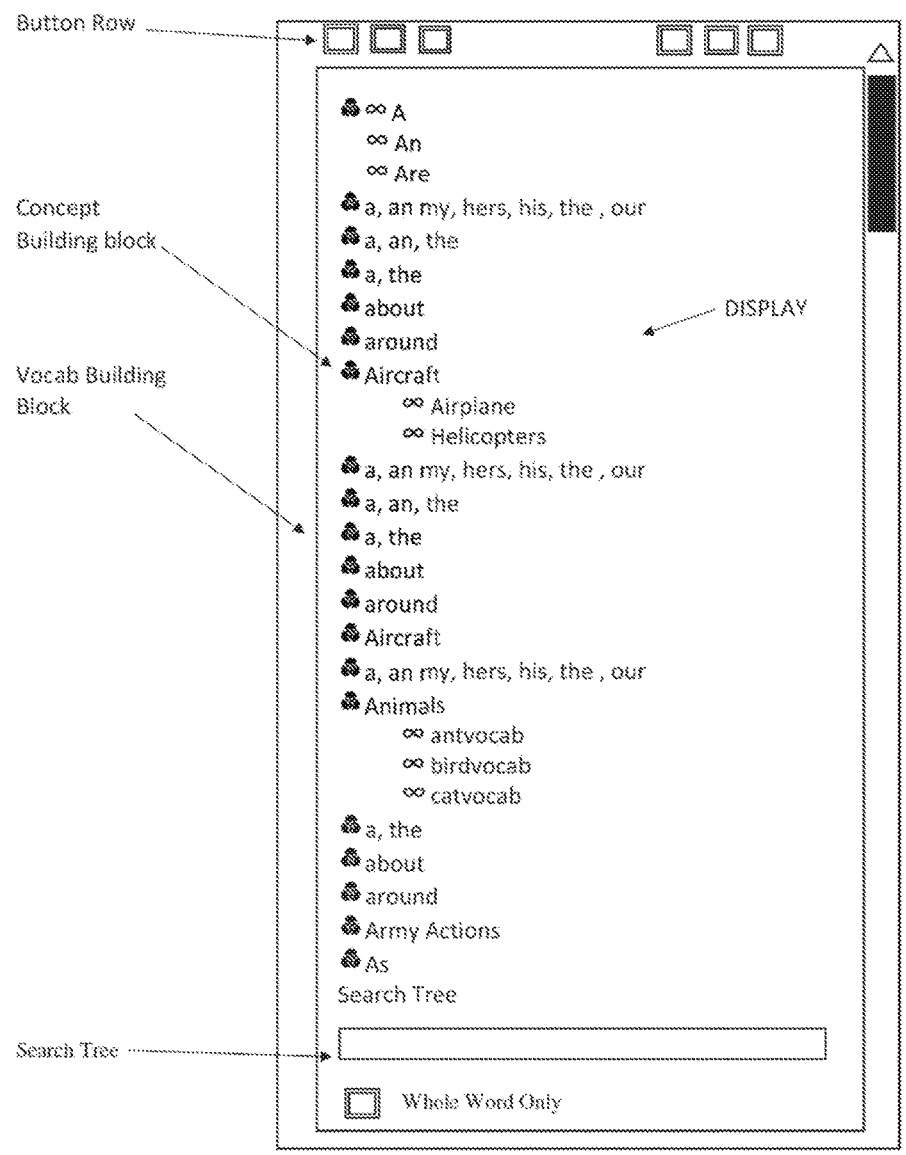

Building Blocks can be nested. This means that Building Blocks can be used to make other Building Blocks. Building Blocks has a dockable window shown in FIG. 37 and contains the following components:

| Component | Description |
| --- | --- |
| Button Row | Contains the following buttons: <Add>: Opens Building Block Editor. <Edit>: Opens Building Block Editor with selected Building Block loaded. <Delete>: Deletes selected Building Block. <Show Dependencies>: Shows all Concepts or Units in which the selected Building Block appears. <Refresh>: Reloads Building Blocks display. |

| Component | Description |
| --- | --- |
| Display | <New Window>: Opens copy of current window. <Collapse All> Collapses entire tree. <Expand All> Expands entire tree. <Back and Forward Navigation>: Navigates between searches. Lists Building Blocks and their constituent parts. |
| Search Tree | This field contains the following: Input Text Field: Searches cascades for specific text. <Search>: Executes search. <Search Options>: Opens Search Options window. Whole Word Only Checkbox: Limits search to complete word matches. |

Figure 38:
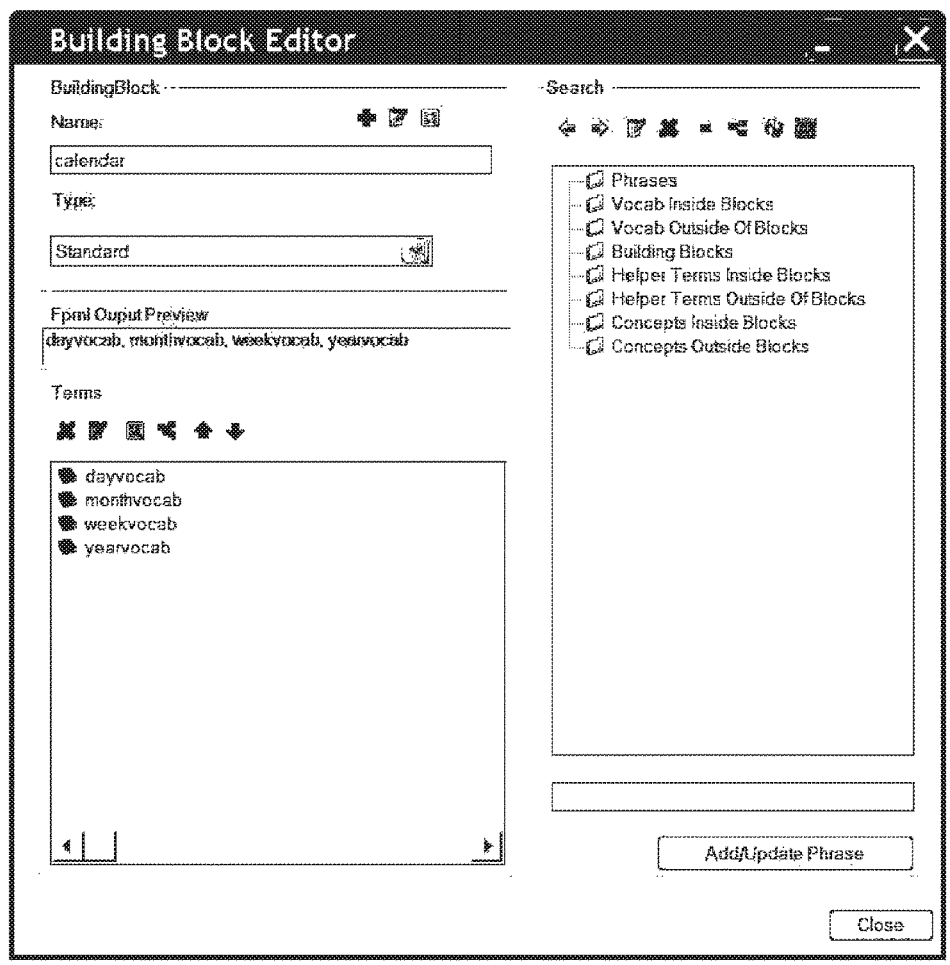

Building Block Editor (FIG. 38) allows the user to create new standard and phrase Building Blocks, populate it with pre-existing Vocab, Helper Terms, and Concepts, and edit its contents. The Building Block Editor contains the following components:

| Component | Description |
| --- | --- |
| Building Block | This field contains the following: Name: Text field for Building Block name. Type: Choose type of building block: Standard Phrase Button Row: Contains the following buttons: <Add>: Adds the Building Block to the project. <Edit Name>: Updates changes to the name. <Show Dependencies>: Shows all Concepts and Units that use the Building Block. |
| Terms | Contains the following: Display: List of Vocab Terms, Helper Terms, and/or Concepts in the Building Block. This field contains the following: Name: Text field for Building Block name. <Remove Component>: Deletes selected term from the current Building Block. <Edit Term>: Edit selected item in its own pop up window. <Show Term Dependencies>: Shows dependencies of selected term in pop up window. <Show Term In Main Window>: Display selected term in its corresponding dockable window. <Move Up/Down>: Move term up or down relative to the other terms in the Building Block. Only available for Building Block phrases. |
| Search | Same as Search dockable window. |
| <Close> | Closes window. |

Managing Vocabulary

Figure 39:
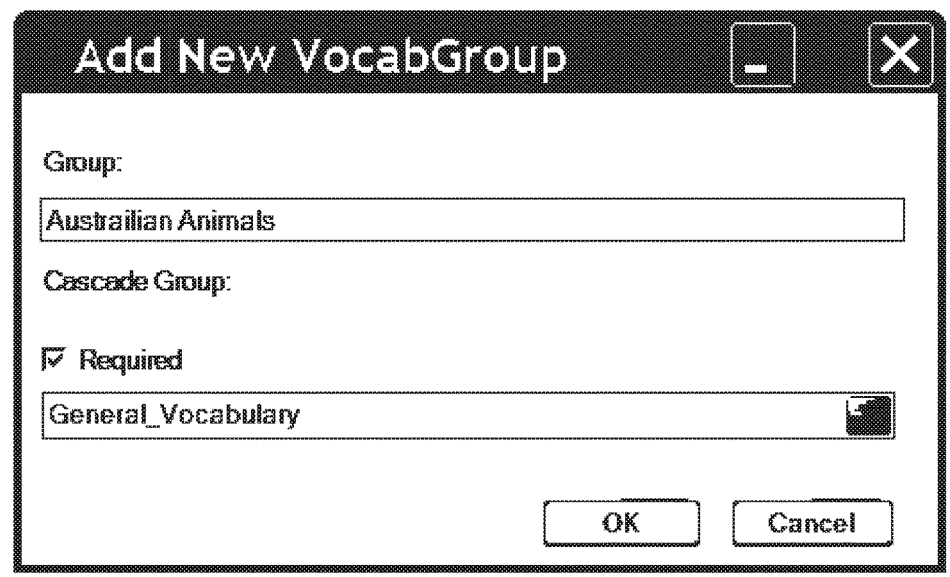

This section describes how to create, edit, and delete Vocab Groups, Vocab Terms, Helper Terms, and Building Blocks. Creating a Vocab Group can be performed in the following way.
1. In the Vocab dockable window, right click anywhere and select Add→New Vocab Group to open the Add New Vocab Group window (FIG. 39).
2. In the Add New Vocab Group window, enter a name for the group in the Group field.
3. Select the appropriate cascade group from the Cascades Group drop-down menu. Note: for Vocab Groups, the selection should end in "vocab". Most words will be found in the General_Vocabulary cascade.
4. Click the <OK> button to add the Vocab Group to the database OR click <Cancel> to continue without adding the Vocab Group to the database.

Because Vocab Groups are shared across projects that share the same database, deleting a Vocab Group from the database affects the functionality of all projects attached to it. For this reason, it is best to remove the group from the project rather than deleting it from the database. Note: Vocab Groups may only be removed if they have no dependencies. To remove a Vocab Group from a project, use the following procedure:
1. In Vocab, right-click on the desired Vocab Group and select Remove From Application.
2. The group will disappear from the list.

As noted above, it is generally not recommended to delete Vocab Groups. However, should it be necessary to delete a Vocab Group from the database altogether, use the following procedure:
1. Select the desired Vocab Group and click <Delete> OR right-click on the desired Vocab Group and select Delete.
2. In the Confirm Delete dialogue, click <Yes> to delete the group OR click <No> to close the dialogue without deleting.

To create Vocab terms, consider the following in connection with FIG. 40:
1. Right click on an empty portion of the Vocab dockable window and select Add→New Vocab Term OR click the <Add> button at the top of the window.
2. Select the Group to which the Vocab Term will belong from the drop-down menu.
3. Type the Natural Language form of the term.
4. Select Add Plural Forms and/or Add Possessive Forms if desired.
5. Click <Add> or press the <enter> key, which will generate the name for the term.
6. Click in the Synonym text field
7. Type the desired synonym and press <Enter> or click <Add> to add the synonym to the list.
8. Repeat steps 6-7 for each additional synonym.
9. Click the <Close> button when finished.

Adding new synonyms can be accomplished as follows:
1. Right click on an existing Vocab Term and select Add→Synonym, OR double-click on said existing Vocab Term OR highlight the desired Vocab Term and click  <Edit> to open the Vocab Editor window.
2. Click on the Synonyms text field.
3. Type the desired synonym and press <Enter> or click <Add>.
4. Repeat steps 2 & 3 for each additional synonym you wish to add.
5. Click the <Close> button when finished.

Editing a Vocab Term can take the form of adding or deleting synonyms, changing the title of the term, or changing the Vocab Group to which it belongs. To edit an existing Vocab Term use the following procedure:
1. Open the Vocab Editor window either by right clicking the desired Vocab Term and selecting Edit OR double-clicking on said Vocab Term OR highlighting the Vocab Term and clicking the <Add> button.
2. Make any desired changes to the Natural Language field, Term field, or Group drop-down menu, and click the <Edit Names or Vocab Group> button.
3. Select a synonym from the Synonyms display. Make any changes as needed in the Synonyms field, and click <Update>.

Editing a synonym in Vocab Editor uses the following procedure:
1. Double click on the synonym you wish to edit.
2. Modify the text in the Synonym text field as desired.
3. Click <Update> to add the changes to the term OR click <Cancel> to cancel the changes.
4. Repeat steps 1-3 for each synonym to be edited.
5. Click <Close> to close the window.

To delete synonyms, use the following procedure:
1. Double-click on the desired synonym in the Synonyms display list.
2. Click <Delete>.
3. In the Confirm Delete dialogue, click <Yes> to delete the synonym OR click <No> to close the dialogue without deleting.
4. Repeat steps 1-3 for each synonym to be deleted.
5. Click <Close> to close the window.

To remove a Vocab Term from a project:
1. Right click on the Vocab Term in question and select Delete OR select the term and click <Delete>.
2. In the Confirm Delete dialogue, click <Yes> to delete the term OR click <No> to close the dialogue without deleting.

Figures 41, 42:
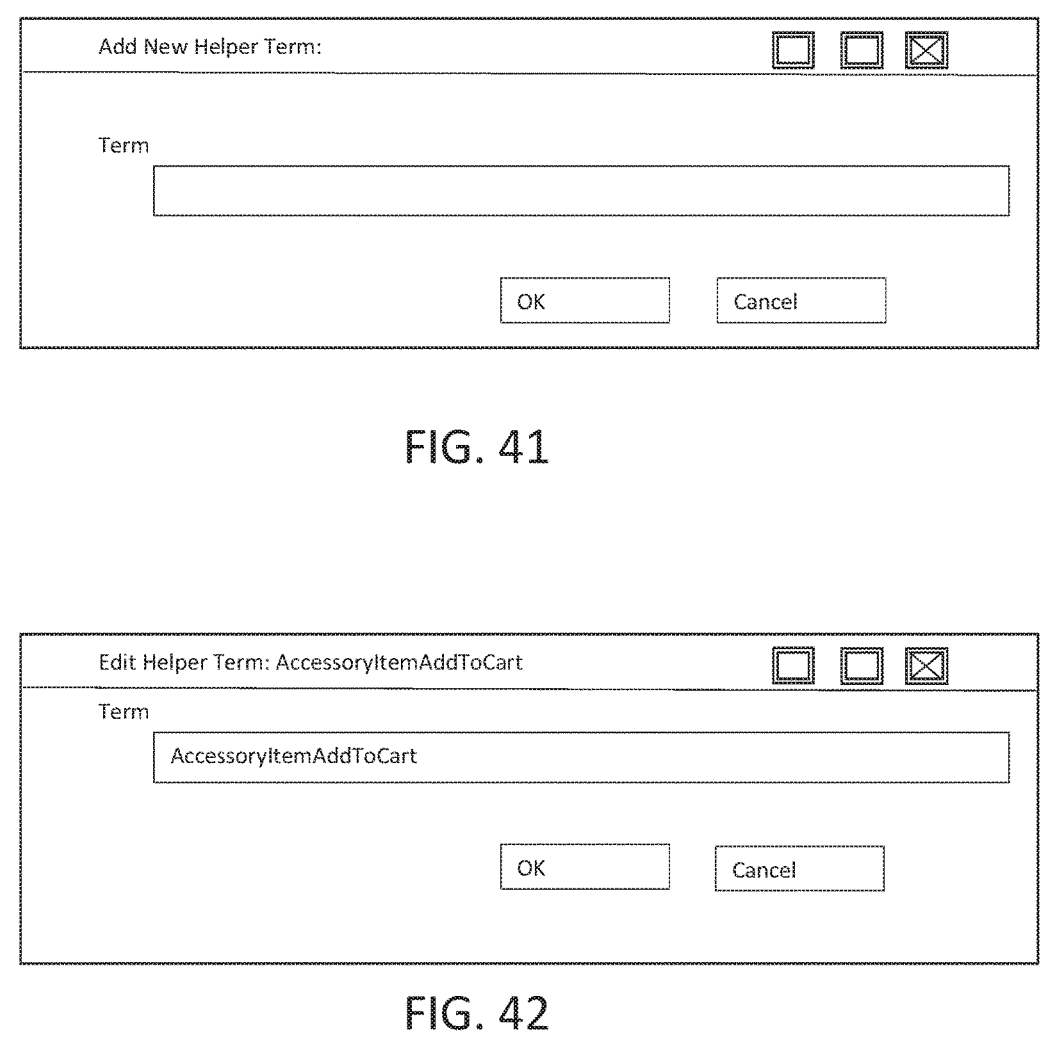

To create a Helper Term, consider the following in connection with FIG. 41.
1. In the Helper Terms dockable window, click the <Add> button, or right click in the window and select Add, either of which will open the Add New Helper Term window.
2. Type the desired term in the Term field
3. Click <OK> to save the term, or click <Cancel> to close the window and continue without adding the term.

With respect to editing Helper Terms, consider the following in connection with FIG. 42.
1. In Helper Terms, select the desired Helper Term and click <Edit> OR right-click on the desired Helper Term and select Edit, OR double-click on the desired Helper Term to open Edit Helper Term.
2. Make any changes desired to the text in the Term field.
3. Click <OK> to close the window and save the changes OR click <Cancel> to close the window without saving the changes.

With respect to deleting Helper Terms, use the following procedure:
1. In Helper Terms, select the desired Helper Term.
2. Click <Delete> OR right click on the term and select Delete.
3. In the Confirm Delete box that appears, click <OK> to delete the file OR click <Cancel> to close the box without deleting the term.

Figure 43:
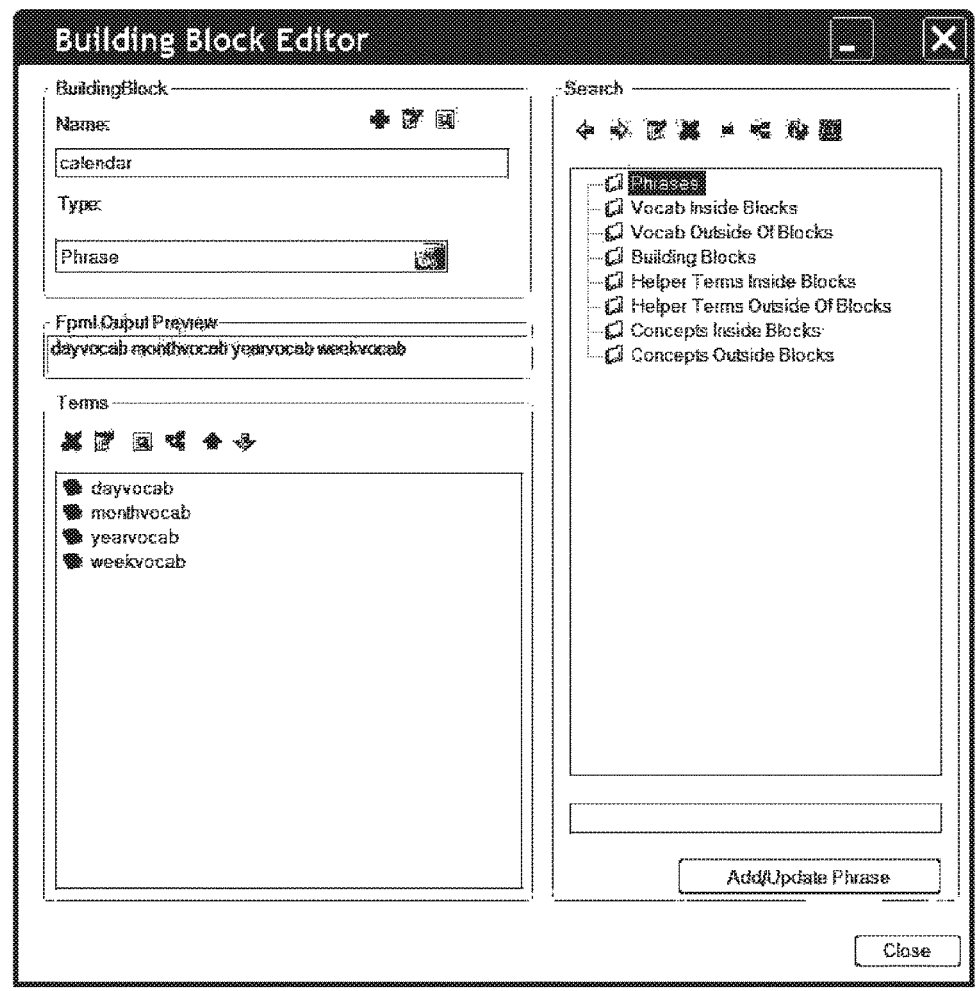

With respect to creating, editing and deleting Building Blocks, consider the following in connection with FIG. 43.

To create a Building Block, use the following procedure:
1. In the Building Blocks dockable window, click the <Add> button OR right click anywhere in the window and select Add from the right click menu, either of which will open up the Building Block Editor window.
2. Type name for the Building Block in the Name field and click <Add> or press <Enter>.
3. Select a Standard or Phrase from the Type dropdown.
4. Drag and drop Vocab Terms, Helper Terms, or Building Blocks from the Vocab, Helper Terms, or Building Block dockable windows OR drag and drop Concepts from the Concepts dockable window OR manually type the a term into the text field at in the Search section of the Building Block Editor, press <Search>, and drag and drop the results into the Terms display. A Building Block may contain either vocabulary (Vocab and Helper Terms) or Concepts.
5. Click <Close> when done.

To edit a Building Block, use the following procedure:
1. Select the desired Building Block and click <Edit> OR double-click on the desired Building Block OR right-click on the desired Building Block and select Edit to open Building Block Editor.
2. Add new components to the Building Block by using the steps described above or skip to step 3.
3. Remove the desired terms/Concepts or skip to step 4.
   a. Double-click on the desired term or Concept. b. Click <Remove>.
4. Click <Close>.

To delete a Building Block, use the following procedure:
1. Select the desired Building Block in Building Blocks.
2. Click <Delete> OR right-click to open the right-click menu and select Delete.
3. In the Confirm Delete box, click <OK> to delete the Building Block OR click <Cancel> to close the box without deleting the Building Block.

Concepts

Concepts can serve as the middle step in the Vocab, Concept, and Unit process. It is an important step in the process that defines the meanings behind groups of words and phrases. This section details what a Concept is, as well as the processes involved in creating and editing Concepts.

In the English language, groups of words and phrases can imply a particular meaning. This meaning could be a goal, as in the phrase, "tell me about", or it can be an idea, such as "a refreshing drink". A group of all the possible phrasings that can define a meaning is known as a Concept. These Concepts are then used to create input patterns for any number of Units later on.

The Basics of Concepts

Concepts are composed of input patterns of Vocab Terms, Building Blocks, Wild Cards, and Helper Terms. A Concept is considered triggered (or "hit") when it receives an input pattern that completely matches at least one of its patterns.

Concept Groups

Concepts are organized into groups by subject matter. The placement of Concept Groups in a cascade determines load order, and whether they are "Best Match," or "Match All." If a Concept Group is in a cascade labeled "Best Match," only the constituent Concept with the best matching input pattern is triggered. If, on the other hand, the Concept Group is in a cascade labeled "Match All," any Concept in this cascade having an input pattern matching the user's input will trigger.

Material Concepts

Knowledge Bases created by Active Lab can be used for many different things, even the use of functions not currently supported by the Lab. One of these uses is to help create Information Retrieval (IR) databases, which are used for other advance types of searching.

For use with these IR searches, Active Lab has the functionality to mark a Concept as a Material Concept, which will have a specific functionality within the IR search.

Generic Concept

For every Concept Group, one Concept can be marked as the Generic Concept. The Generic Concept will trigger any time any Concept triggers from that Concept Group.

Concepts Dockable Window

Figure 44:
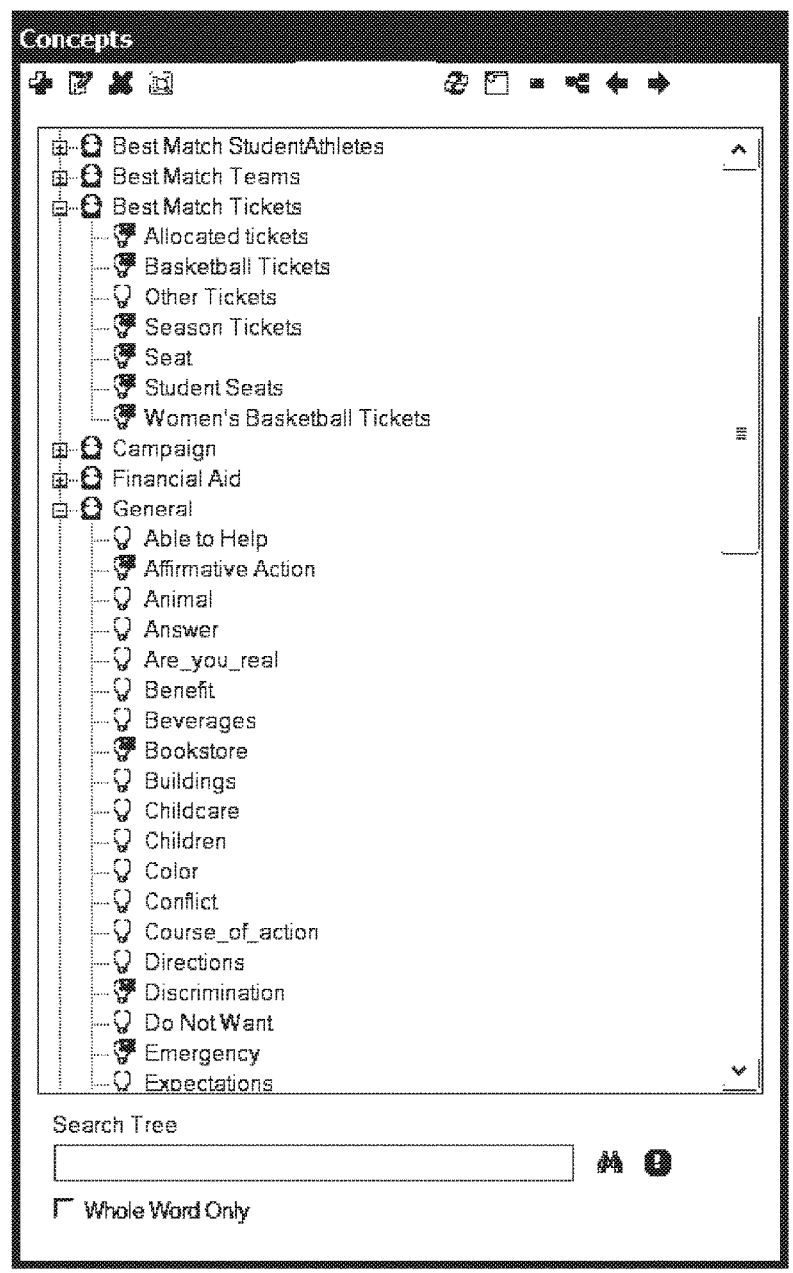

The Concepts dockable window, as shown in FIG. 44, allows the user to view, create, and manage Concepts and Concept Groups using a simple drag- and-drop interface. Concepts contain the following components:

| Component | Description |
|---|---|
| Button Bar | The button bar contains the following (along with their corresponding right-click menu selections):<br>    <Add>: Creates new Concept.<br>    <Edit>: Opens Concepts with selected Concept loaded for editing.<br>    <Delete>: Deletes selected Concept from project.<br>    <Show Dependencies>: Shows all Units and Building Blocks in which the selected Concept appears.<br>    <Refresh>: Refreshes display list<br>    <New Window>: Opens copy of current window.<br>    <Collapse All> Collapses entire tree.<br>    <Expand All> Expands entire tree.<br>    <Back and Forward Navigation>: Navigates between searches. |
| Concepts | Display lists all available Concepts in their respective groups thusly:<br>    (red icon) Match All Concept Group<br>      (blue icon) Best Match Concept Group<br>        Concept<br>          Material Concept |
| Search Tree | This field contains the following:<br>    Input Text Field: Searches cascades for specific text.<br>    <Search>: Executes search.<br>    <Search Options>: Opens Search Options window.<br>    Whole Word Only Checkbox: Limits search to complete word matches. |

Figure 45:
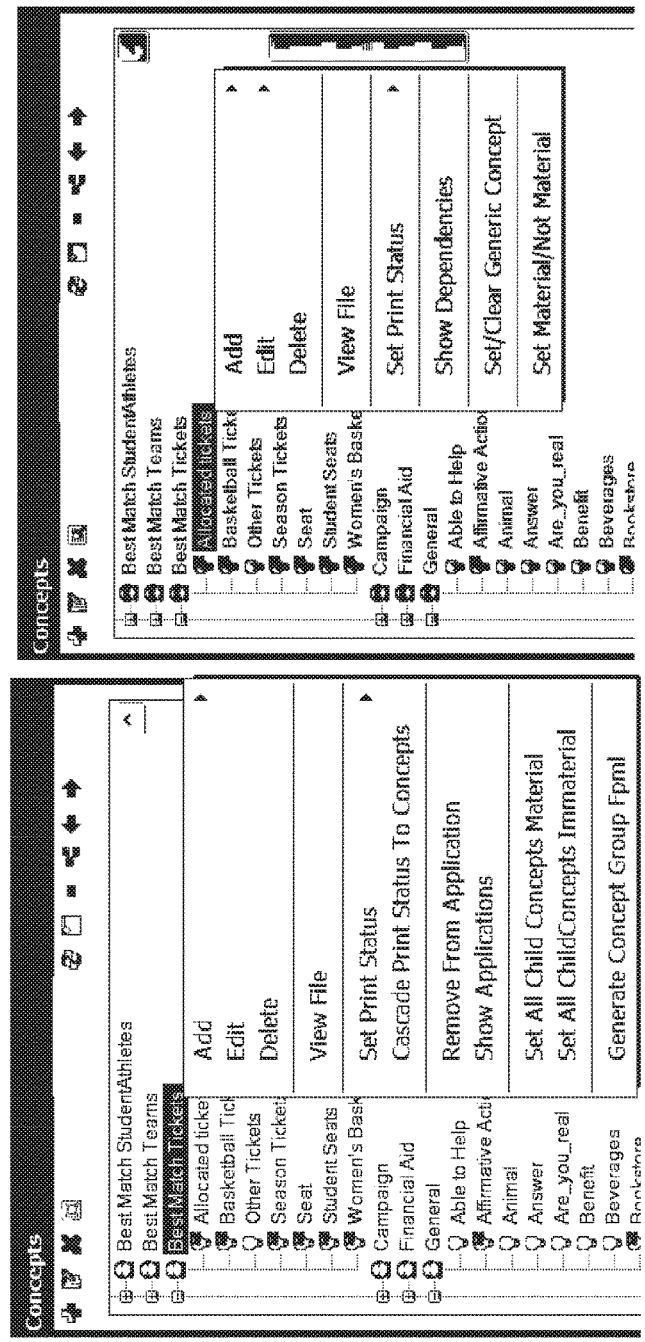

Concepts also has two right-click menu options, as shown in FIG. 45: the first option comes from right-clicking a Concept Group, the second from right-clicking a Concept. The right-click menu options have the following components:

| Component | Description |
|---|---|
| Add | → concept Group: opens Add New Concept Group.<br>→ concept: opens Concept Editor tab, with Concept Group field set to current Concept Group. |

| Component | Description |
| --- | --- |
| Cascade Print Status To Concepts (from Concept Group) | Changes the print status of all Concepts in selected Concept Group to the print status of the Concept Group. |
| Delete | Deletes selected Concept or Concept Group. |
| Edit (from Concept Group) | Opens Edit Concept Group window. |
| Edit (from Concept) | → In Main Editor: opens Concept in Concept Editor in main window.<br>→ In Pop-Up: opens Concept Editor in its own pop-up window. |
| Generate Concept Group FPML (from Concept Group) | Generate FPML file for selected Concept Group |
| Remove From Application (from Concept Group) | Removes selected Concept Group from the current project. |
| Set All Child Concepts Immaterial (from Concept Group) | Changes the status of all Concepts in selected Concept Group to Not Material |
| Set All Child Concepts Material (from Concept Group) | Changes the status of all Concepts in selected Concept Group to Material |
| Set/Clear Generic Concept | Set or clear Concept as the Generic Concept for its Concept Group. |
| Set Material/Not Material (from Concept) | Toggle the status of Concept between Material and Not Material. |
| Set Print Status | Sets Print Status of selected item to:<br>    Test<br>    Production<br>    InActive |
| Show Applications (from Concept Group) | Shows all applications selected Concept Group is used in. |
| Show Dependencies (from Concept) | Opens Dependencies window and shows all dependencies of selected Concept. |
| View File | Opens FPML file of selected Concept Group in Editor tab of the main window. |

Concepts Editor Tab

Figure 46:
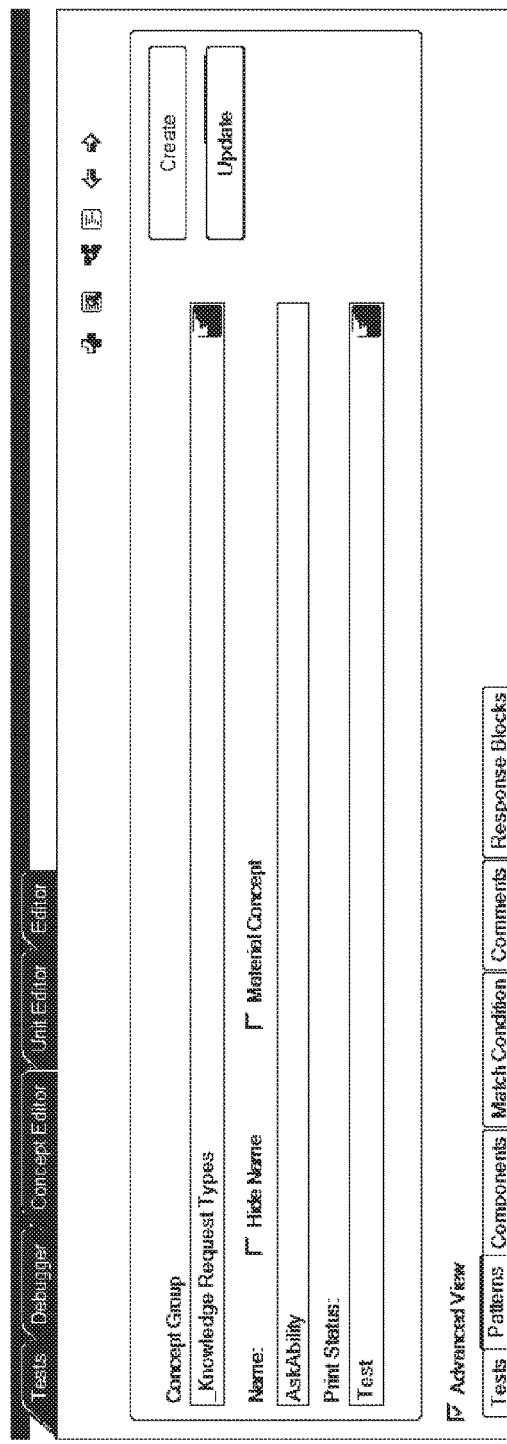

Concepts are comprised of two principle components: tests and patterns. Patterns are made up of Vocab Terms, Helper Terms, Building Blocks, and Wild Cards and determine what phrases trigger the Concept. Tests are ways to make sure that the Concept is working as intended. FIG. 46 and the following table lists the components available at the top of the Concept Editor tab. (This does not include tabs within the Concept Editor, which are described later on.)

| Component | Description |
| --- | --- |
| Group | This field contains the following:<br>Drop-down list: The name of the group to which the Concept will belong.<br><Add>: Adds a new Unit to a giVen group.<br><Show Dependencies>: Opens the Show Dependencies window, which displays all of the components affected by the Concept.<br><Show in Main Tree>: Opens Concept in Concept dockable window.<br><Find in FPML File>: Opens Concept file in Editor.<br><Forward> and <Back>: Navigates between previously opened Concepts. |
| Hide Narne Checkbox | Check to not allow the Concept to be passed out of its cascade. Default not checked. |
| Material Concept Checkbox | Check to change status of the Concept to Material. Default not checked. |
| Name | Text field: Shows the name of the Concept. |
| <Create> | Creates the new Concept. |
| <Update> | Updates any changes to the name of the Unit. |
| Print Status | This dropdown contains the following options:<br>    Test<br>    Production<br>    InActive |
| <Advanced View> selection | Makes the Components, Match Condition, Comments, and Response blocks tabs visible. |
| Tabs | The default tabs of Concepts are Tests and Patterns |

Tests Tab

Figure 47:
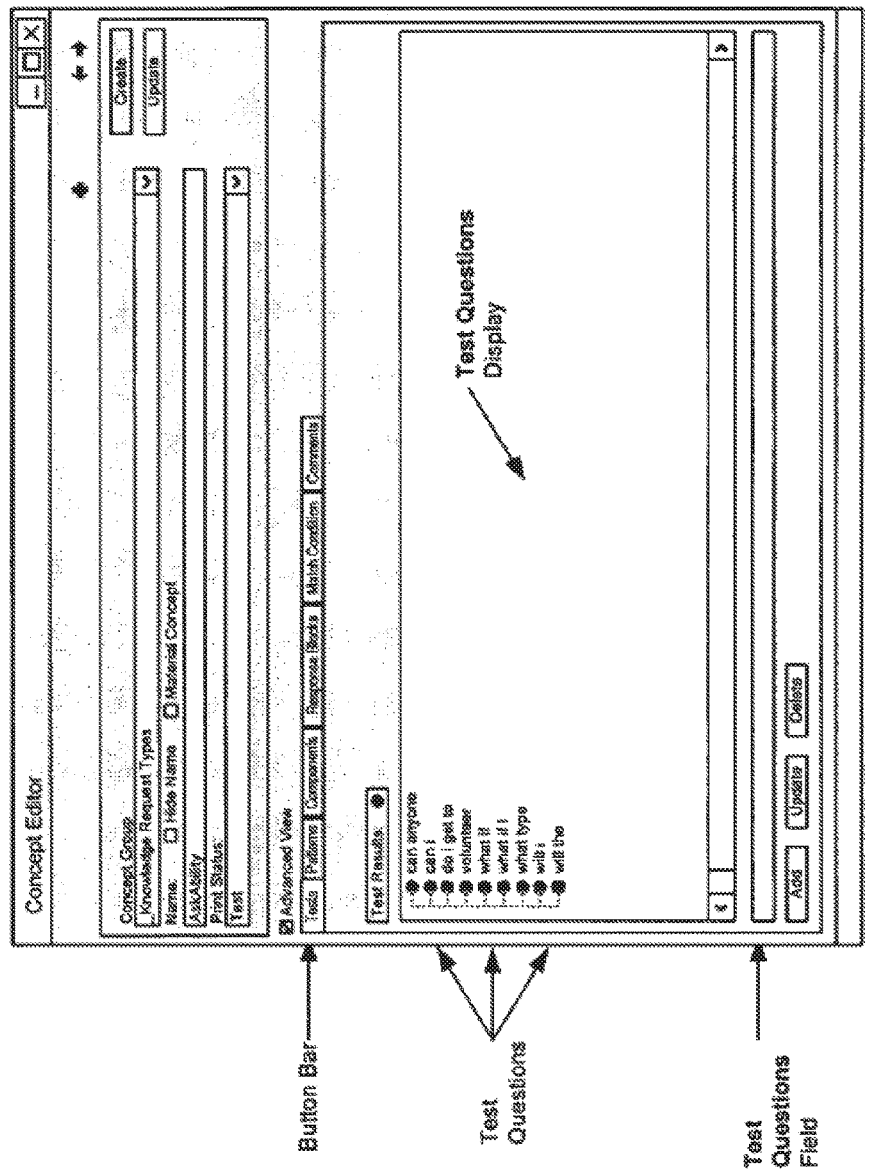

Tests allows the user to create and edit test questions. Test questions represent user inputs that should cause the Concept to trigger. When looking at the set of test questions, it is best to consider the ideas involved. Ideal test questions should represent complete user inputs. In this manner, each Concept can be tested to see how it interacts with other Concepts. Test questions serve as a useful guide for the creation of input patterns. The Tests tab, as shown in FIG. 47, found under Concepts functions in much the same way as the main Tests tab, though it focuses solely on the tests for the open Concept. Tests contains the following components:

| Component | Description |
| --- | --- |
| Button Bar | The button bar contains the following:<br><Run Tests>: Runs tests to ensure that Concept is triggered when expected. |

| Component | Description |
|---|---|
| | \<Refresh\>: Clears information from tests so that they may be run from the beginning.<br>\<Collapse All\> Collapses test tree.<br>\<Expand All\> Expands test tree.<br>\<Edit Test Question\>: Allows user to edit a selected test question from the Test Questions box. Note: a test question must be selected in order for this button to function.<br>\<Delete Test Question\>: Allows user to delete a selected test question from the Test Questions display. Note: a test question must be selected in order for this button to function.<br>\<Set Question Active/Inactive\>: Toggles a questions status as either active or inactive. Inactive questions are not tested, and do not affect the status of the Concept.<br>\<Debug Question\>: Opens Debug tab and displays the processes that led to the test's result.<br>\<Test Potential Conflicts\>: Opens Tests tab with all Concepts whose input patterns include any item in the selected Concept's input pattern, as well as all Units using that Concept. |
| Test Questions | This field contains the following:<br>Display: Displays all test question inputs by the user, as well as their test status. A green circle indicates that the test succeeded; a yellow circle indicates that the test has yet to be run or is InActive; and a red circle indicates that the test failed.<br>Text input field: Input test questions here.<br>\<Add\>: Adds test question from Test Questions field to the Test Questions box.<br>\<Update\>: Updates changes made to selected test question in Test Questions field.<br>\<Delete\>: Deletes selected test question from Test Questions box. |

Figure 48:
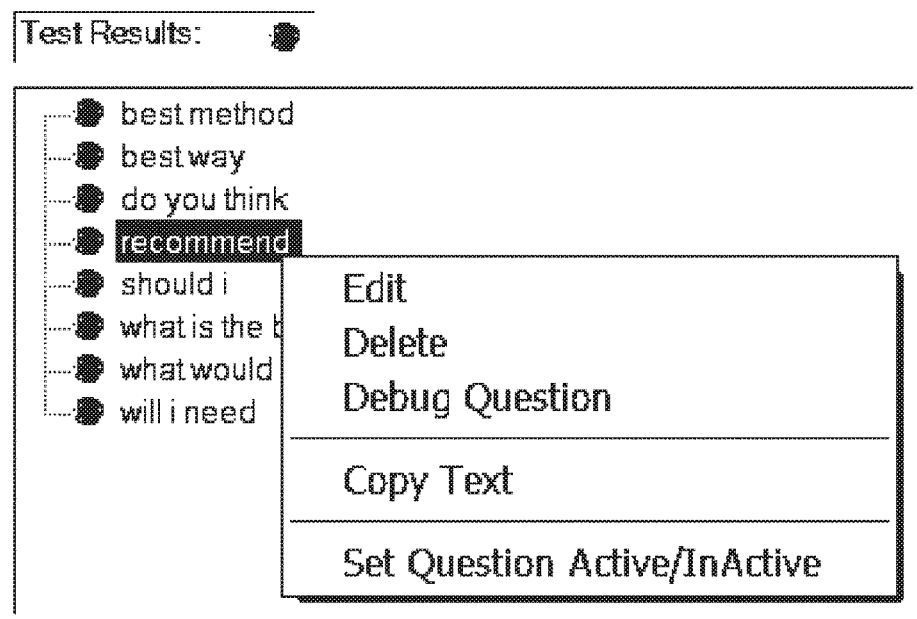

Tests also includes a right-click menu, as shown in FIG. 48, when you click on a test question and contains the following components:

| Component | Description |
|---|---|
| Edit | Copies test question into Test Questions field below. |
| Delete | Deletes selected test question. |
| Debug Question | Opens Debugger in main window with selected test question loaded. |
| Copy Text | Copies selected test into Windows clipboard |
| Set Question Active/Inactive | Toggles selected test question between Active and InActive status. |

Figure 49:
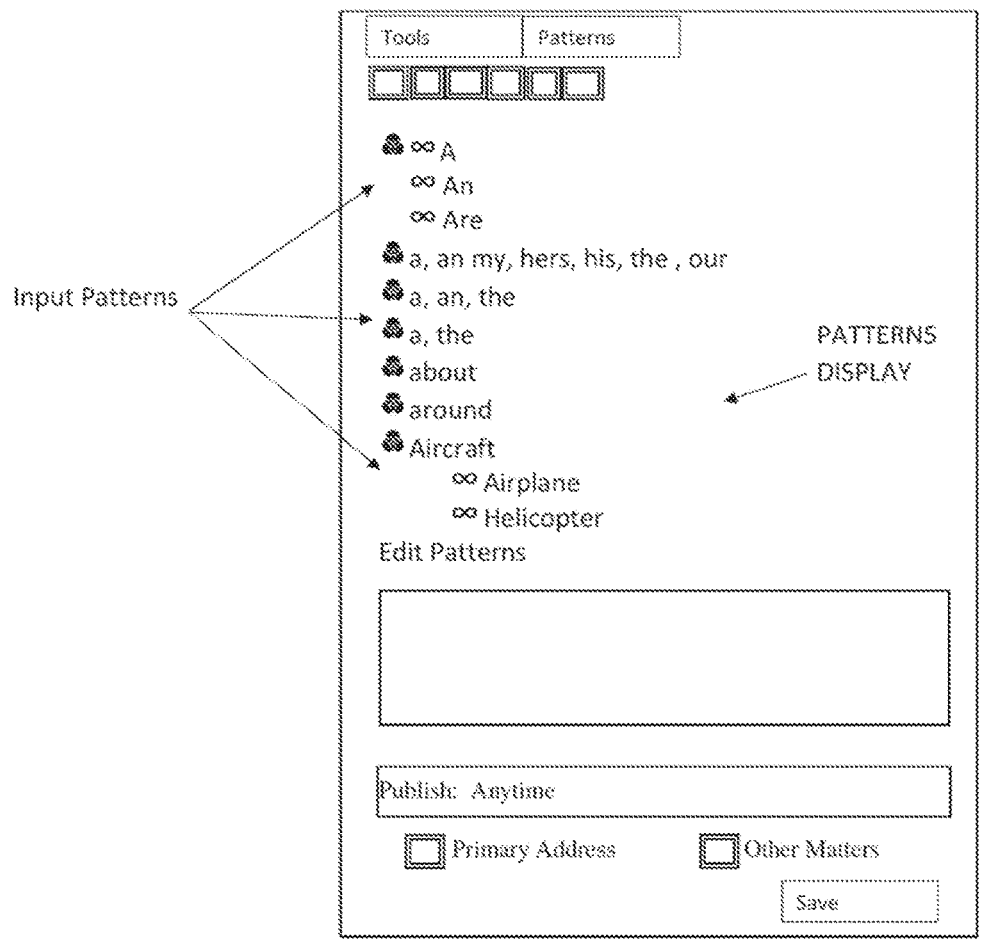

Patterns, as shown in FIG. 49, allows the user to create and edit input patterns for the Concept and contains the following components:

| Component | Description |
|---|---|
| Button Bar | The button bar contains the following:<br>\<Add\>: Adds a blank pattern.<br>\<Refresh\>: Refreshes display and collapse all pattern trees.<br>\<Collapse All\> Collapses tree.<br>\<Expand All\> Expands tree.<br>\<Edit\>: Allows user to edit pattern name, position, and proximity/order selections.<br>\<Delete\>: Deletes selected pattern.<br>\<Test Potential Conflicts\>: Opens Tests tab with all Concepts whose input patterns include any item in the selected Concept's input pattern, as well as all Units using that Concept. |
| Patterns | Displays all the patterns created for the Concept. Input patterns are represented thusly:<br>Active input pattern<br>Inactive input pattern |
| Edit Pattern | This field contains the following:<br>Position: Allows user to select where the pattern must be located in the input in order to trigger the Concept. There are four options:<br>AnyWhere<br>Beginning<br>End<br>Entire<br>Substitute<br>Order Matters checkbox: When selected, Vocab Terms in input must be in the same order as displayed in the pattern to trigger. Default: selected.<br>Proximity Matters checkbox: When selected, the Vocab Terms in the pattern must be adjacent in the input in order to trigger. Default: selected.<br>\<Save\>: Saves changes made to Position, and Order/Proximity selections. |

Figure 50:
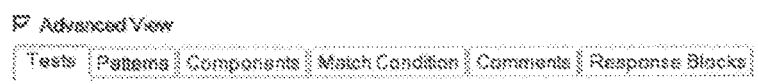

The tabs shown in FIG. 50 are only available when \<Advanced View\> is selected. Advanced Tabs has the following components:

| Tab | Description |
|---|---|
| Components | This tab allows the user to add Variables, Function Calls, AppCalls, and Record Lists to the Concept. |
| Match Condition | This tab allows the user to create and edit pre- and post-conditions. |
| Comments | This tab allows the user to leave comments associated with the Concept. Note: Comments do not in any way affect the functioning of the software, as they are intended to allow the user to comment on the thought processes and reasoning that went into the designing of the Concept. |
| Response Blocks | In this tab, the user may input response blocks in conjunction with the Response Blocks dockable window. For more information. |

As discussed earlier, the Concepts Builder function is accessed either by means of the Concepts Editor tab, or by right clicking in the Concepts dockable window.

Creating a New Concepts Group

Figure 51:
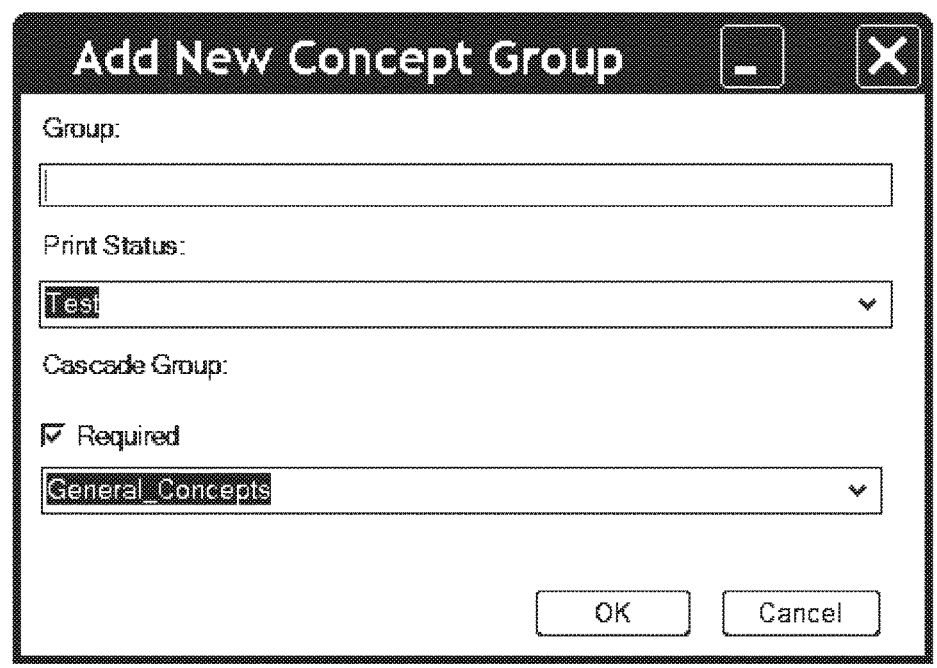

New Concept Groups are created using the following procedure in connection with the user interface shown in FIG. 51:

1. Right click on a blank space in the Concepts dockable window and select Add concept Group to open the Add New Concept Group window.
2. Enter the name of the new Concept Group in the Group field.
3. Choose a Print Status from the Print Status drop.
4. Select a Cascade Group from the Cascade Group drop-down menu.
5. Click <OK> to create the new Concept group OR click <Cancel> to close the window without creating a new Concept Group.

Adding New Concepts

Figure 52:
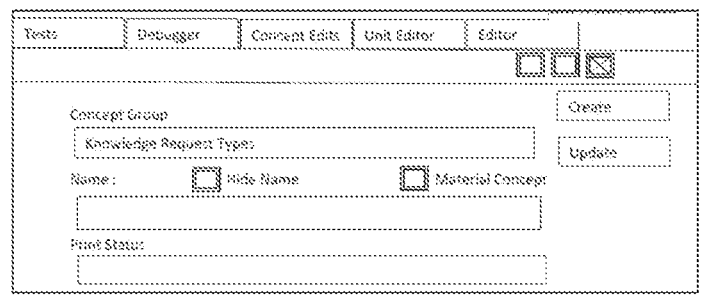

New Concepts can be added using the following procedure in connection with the user interface shown in FIG. 52:
1. Click <Add> in the Concepts dockable window OR right click on blank space in the Concepts dockable window and select Add→concept, which opens the Concept Editor tab, or Click <Add> in the Concept Editor tab of the main display.
2. Choose Concept Group from drop-down menu.
3. Enter the name of the Concept in the Name field
4. Click <Create>.

Adding Questions

Figure 53:
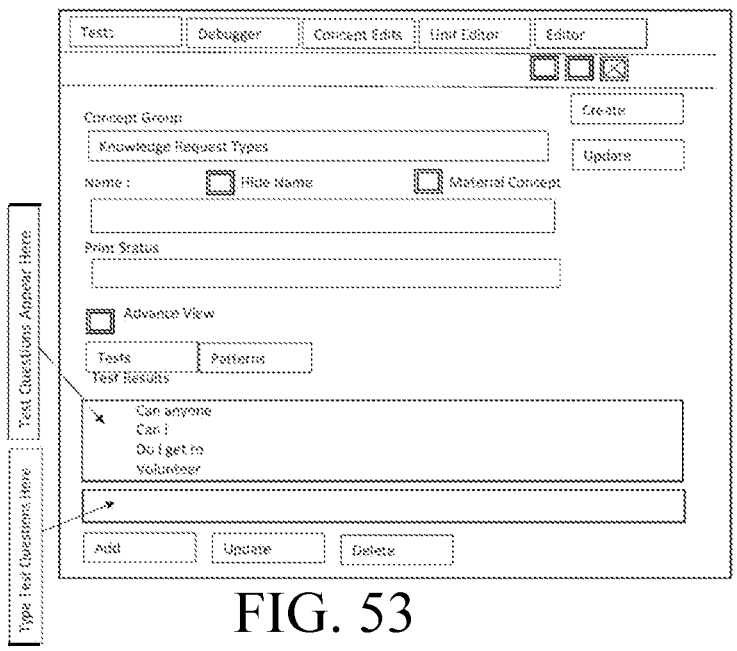

Once a Concept has been created, the user can add test questions on the Tests tab using the following procedure in connection with the user interface shown in FIG. 53:
1. Type the question in the Test Question field. Note: For Concepts, test questions are often single words or short phrases; however there is no limit to the size of test question.
2. Click <Add> or press <Enter>
3. Repeat steps 1 & 2 as often as desired.

Creating Patterns

Figure 54:
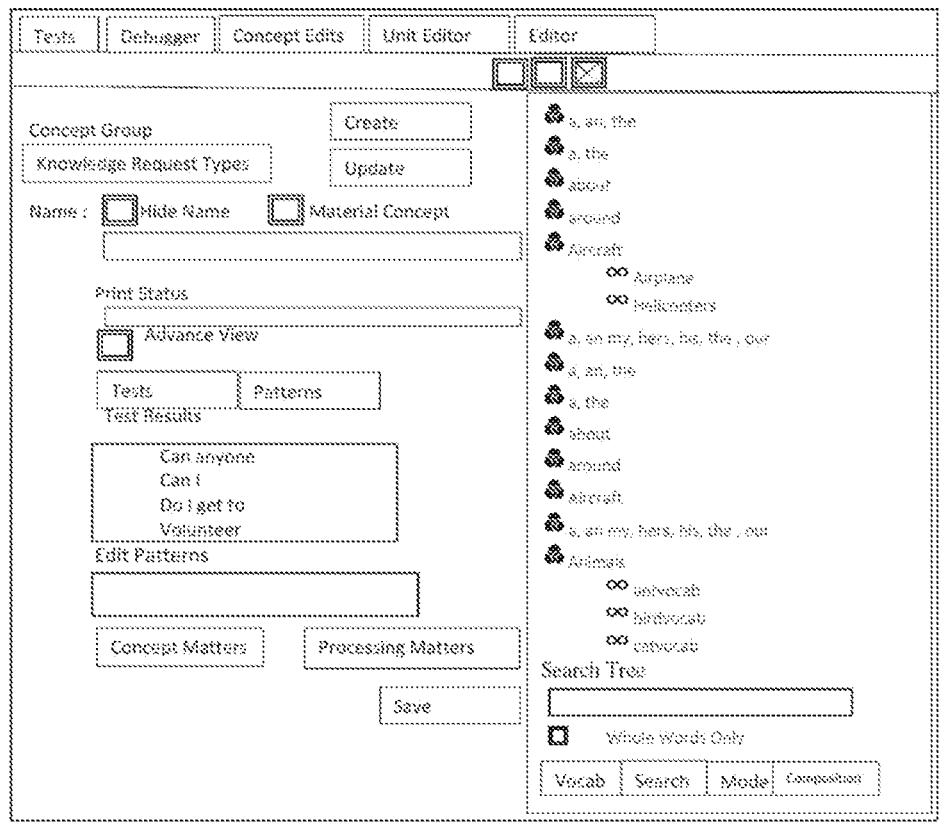

To add Vocab Terms to a Concept pattern, use the following procedure in connection with the user interface shown in FIG. 54:
1. In the Patterns tab, click the <Add> button to generate a blank pattern.
2. Open the Vocab dockable window and select a Vocab Term.
3. Drag and drop the selected Vocab Term into the blank pattern.
4. Repeat steps 2 and 3 as often as desired.
5. If needed, select Helper Terms and Building Blocks from the Helper Terms or Building Blocks dockable windows and drag and drop them into the pattern.
6. Drag and drop to edit the order of the input pattern.
7. Select <Order Matters> and/or <Proximity Matters> if desired.
8. Select Position from drop-down if desired.
9. Click <Save> if steps 7 or 8 have been followed.
10. Repeat steps 1-9 to create as many input patterns as desired.

Generating Files

Once patterns for either Concepts or Units have been changed, it is necessary for the FPML files themselves to be generated. There are currently two options:
<Generate All FPML>: This will generate all FPML files for the project.
<Generate FPML (Change Only)>: This will generate only the FPML files that have recently changed in the database.

Testing Patterns

Once test questions and patterns have been added to the Concept, it is necessary to run a test to ensure correct patterns have been used.

Figure 55:
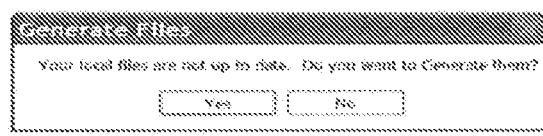
Figure 56:
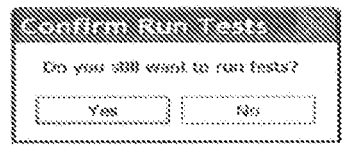

1. Click <Run Tests> in the Tests tab. The dialogue box in FIG. 55 will only appear if changes have been made to the database (i.e.: a pattern has been changed):
2. Click <Yes> to generate FPML (Changes Only) and run test or Click <No> to not generate FPML. The dialogue box in FIG. 56 will only appear if <No> was selected from the Generate Files dialogue box.
3. Click <Yes> to run tests, or click <No> to not run tests.

When the test is completed, the results will show in the Test Questions display next to each question. As discussed above, a green circle indicates success, a yellow circle indicates the Concept was untested or has been marked as InActive, and a red circle indicates failure.

Editing Concepts

Editing a Concept works as follows:
1. Find the Concept in the Concepts dockable window.
2. Double click on the Concept, which will open it in the Concept Editor tab OR right click on the Concept and select Edit→In Main Editor or Edit→In Pop-Up.
3. Make any changes desired.

Deleting Concepts

To delete a Concept, use the following procedure:
1. In the Concepts dockable window, Select the Concept to be deleted and click <Delete> OR right click on a Concept and select Delete.
2. In the Confirm Delete dialogue, click <Yes> to delete the Concept and close the dialogue OR click <No> to close the dialogue without deleting.

Removing Concept Groups

Because Concept Groups are shared by every project that accesses a given database, they may only be removed from the given project using the following procedure:
1. Right-click on the Concept Group to be removed and select Remove from the right-click menu.

Units

Units are the primary form of response to user input. A response is what results from user input. Units ensure that the appropriate responses appear for the each user input. The response may be as simple as a plain text output, or as complex as a series of Application Calls (AppCalls) that trigger specific actions, or any combination thereof. When preparing a Unit, it is important to consider the kinds of questions to which it will respond. What are the key phrases or words that are likely to show up in questions that should trigger the Unit?

What question is the Unit supposed to answer? The answers to these questions will influence the user's choice of Concepts and the structure of the patterns.

In order to trigger the Unit, an input must match all the Concepts and Helper Terms in at least one of the input patterns of the Unit. It is often helpful to determine the Unit's response first, as that will in turn define which questions it will answer.

Units are organized into sets called Situation Groups according to their subject matter. Like Concept Groups, Situation Groups are placed under cascades, except they are set to "Best Match." The placement of these cascades in the load order is usually last, because the Unit cascade outputs the response.

The Units Dockable Window

Figure 57:
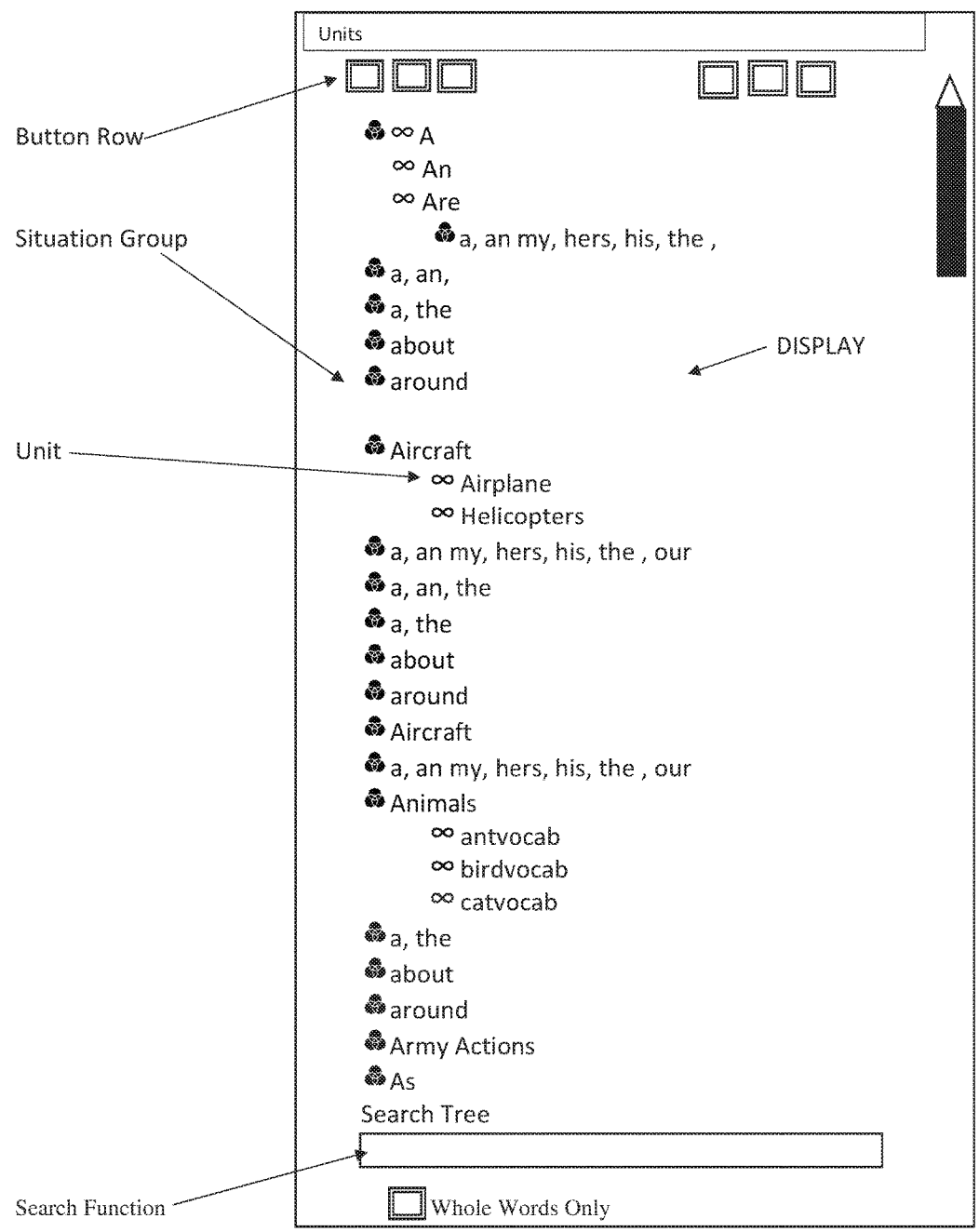

The Units dockable window, shown in FIG. 57, allows the user to view, create, and manage Units and Situation Groups through simple drag and drop functionality. You can also search for Units by name using the Search field. Units contains the following components:

| Component | Description |
|---|---|
| Button Bar | The button bar contains the following:<br>    <Add>, Add → Unit: Adds new Unit.<br>    <Edit>, Edit: Edits selected Situation or Unit.<br>    <Delete>, Delete: Deletes selected Situation or Unit.<br>    <Show Dependencies>: shows dependencies and Web Links for selected Unit.<br>    <Refresh>: Refreshes Units display.<br>    <New Window>: Opens copy of current window.<br>    <Collapse All> Collapses entire tree.<br>    <Expand All> Expands entire tree.<br>    <Back and Forward Navigation>: Navigates between searches. |
| Approval Search | Searches Content Management System for Units matching the Approval Status.<br>    <Search>: Executes search.<br>    Content Management System drop-down: Choose content management system assigned to current project.<br>    Approval Status drop-down: Chooses type of search.<br>        Approved<br>        Disapproved<br>        Pending |
| Units | Display lists responses and Units in their respective Situation Groups as follows:<br>    Situation Group<br>        Unit<br>             Unit Response |
| Search Tree | This field contains the following:<br>    Input Text Field: Searches cascades for specific text.<br>    <Search>: Executes search.<br>    <Search Options>: Opens Search Options window.<br>    Whole Word Only Checkbox: Limits search to complete word matches. |

Figures 58, 59:
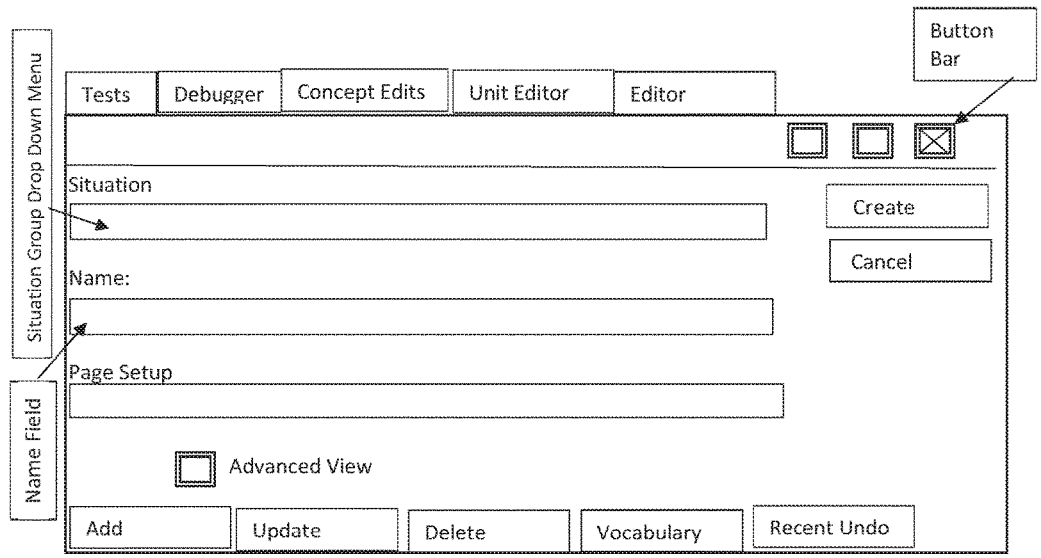

Unit contains two right-click menus as shown in FIG. 58. One is accessed from the Situation Group, the other from the Unit. The right-click menus have the following components:

| Component | Description |
|---|---|
| Add | → situation Group: opens Add New Situation.<br>→ unit: opens Unit Editor tab, with Situation field set to current Situation. |
| Cascade Print Status To All Units (from Situation) | Changes the print status of all Units in selected Situation to the print status of the Situation. |
| Delete | Deletes selected Concept or Concept Group |
| Edit (from Situation) | Opens Edit Situation window. |
| Edit (from Unit) | → In Main Editor: opens Unit in Unit Editor in main window.<br>→In Pop-Up Editor: opens Unit Builder in its own pop-up window. |
| Generate Situation FPML (from Situation) | Generate FPML file for selected Situation. |
| Remove From Application (from Situation) | Remove selected Situation Group from current project. Does not delete from database. The Situation Group can now be found in Unused Items. |
| Request Approval (from Unit) | Submits selected Unit to Web Approval Tool. |
| Set Print Status | Sets Print Status of selected item to:<br>    Test<br>    Production<br>    InActive |
| Show Applications (from Situation) | Shows all applications in which selected Situation Group is used. |
| Show Change Requests | Opens Unit Requests window and shows all change requests for selected Unit. |
| Show Dependencies (from Unit) | Opens Dependencies window and shows all dependencies of selected Unit. |
| Submit Child Units For Approval (from Situation) | Submits all Units in Selected situation to the Web Approval Tool. |
| View File | Opens FPML file of selected Situation or Unit in Editor tab of the main window. |

The Unit Editor Tab

The Unit builder function can be accessed through Unit Editor as shown in FIG. 59, or by right clicking on blank space in Units dockable window and selecting Add→unit, or by double clicking on any Unit in Units dockable window. The Unit builder function has three main tabs: Tests, Patterns, and Response, as well as a set of advanced tabs. Unit Editor contains the following components:

| Component | Description |
| --- | --- |
| Button Bar | This field contains the following:<br>    <Add>: Adds a new Unit to a given group.<br>      <Show Dependencies>: Opens the Show Dependencies window, which displays all of the components affected by the Unit.<br>      <Show In Main Tree>: Highlights Unit in Units dockable window.<br>      <Find In FPML File> Opens FPML file of current Unit in Editor tab.<br>      <Forward> & <Back>: Navigates between previously opened Units.<br>      <View Directives>: Opens Directives dockable window.<br>      <Open Directive Editor>: Opens Directive Builder with current Unit loaded. |
| Situation | Drop-down list: Select the name of the Situation Group to which the Unit will belong. |
| Name | This field contains the name of the Unit. |
| <Create> | Creates new Unit. |
| <Update> | Saves any changes to Situation, Name, and Print Status fields. |
| Print Status | Change Print Status of Unit to the following options:<br>    Production<br>    Test<br>    InActive |
| <Advanced View> selection | Makes the Components, Match Condition, Comments, Response blocks, Nested Units, and Text-To-Speech tabs visible. Default: Not selected. |
| Tabs | The following default tabs are available normally:<br>    Tests: Allows user to manage test questions for Unit.<br>    Patterns: Allows user to manage input patterns for Unit. |

Figure 60:
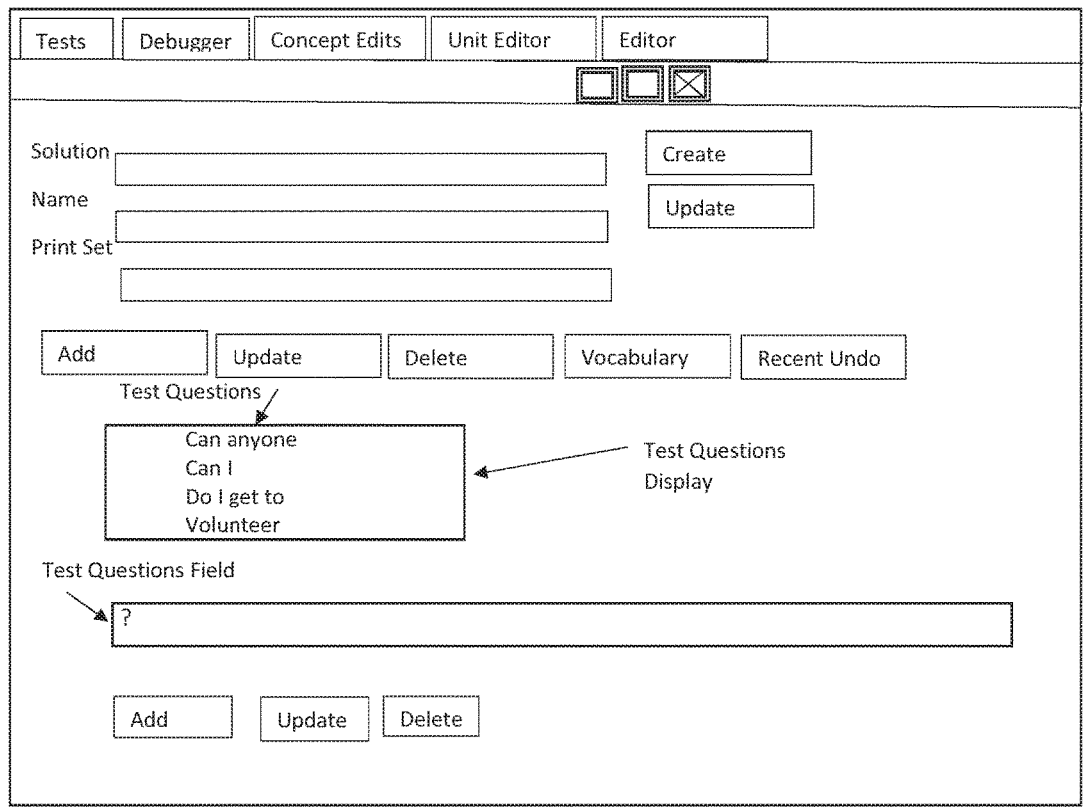

Tests, as shown in FIG. 60, allows the user to create and edit test questions. Test questions represent user inputs that should cause the Unit to trigger. When looking at the set of test questions, it is best to consider the ideas involved. Ideal test questions should represent complete user inputs. In this manner, each Unit can be tested to see how it interacts with other Units. Test questions serve as a useful guide for the creation of input patterns. Tests contains the following components:

| Component | Description |
| --- | --- |
| Button bar | The button bar contains the following:<br>    <Run Tests>: Runs tests on the questions input by the user for the Unit.<br>    <Reload Tests>: Reloads tests.<br>    <Collapse All> Collapses entire tree.<br>    <Expand All> Expands entire tree.<br>    <Edit Test Question>: Allows the user to edit the selected test question.<br>    <Delete>: Allows the user to delete the selected test question. |

-continued

| Component | Description |
| --- | --- |
| | <Set Question Active/Inactive>: Toggles active/inactive for a question. Default for all questions is Active. When inactive, tests are not performed on the question.<br><Debug Question>: Opens Debug tab, allowing the user to view the response generated in response to the question, and the processes leading up to said response.<br><Test Potential Conflicts>: Opens Tests tab with all Concepts used in the Unit input patterns, as well as all Units using those Concepts. |
| Test Questions | This field contains the following:<br>Display: Displays all Test Questions input by the user, as well as their test status. A green circle indicates that the tests succeeded; a yellow circle indicates that the test has yet to be run or is InActive; and a red circle indicates that the test failed.<br>Text Field: Type test questions here.<br>    <Add>: Adds test questions to the display.<br>    <Update>: Updates changes made to a test question.<br>    <Delete>: Deletes a selected test question. |

Figure 61:
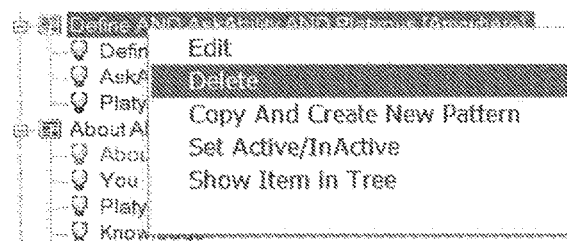

The Tests tab also contains the right-click menu shown in FIG. 61 and includes the following components:

| Component | Description |
| --- | --- |
| Delete | Deletes selected test question. |
| Debug Question | Opens Debugger tab with selected test question loaded. |
| Set Question Active/InActive | Toggles selected test question between Active and InActive status |
| Copy Text | Copies selected test question into Windows clipboard. |
| View Unit Hit | Opens Unit Builder window with the Unit the test question responded with. Only available when test question does not hit current Unit. |

Figure 62:
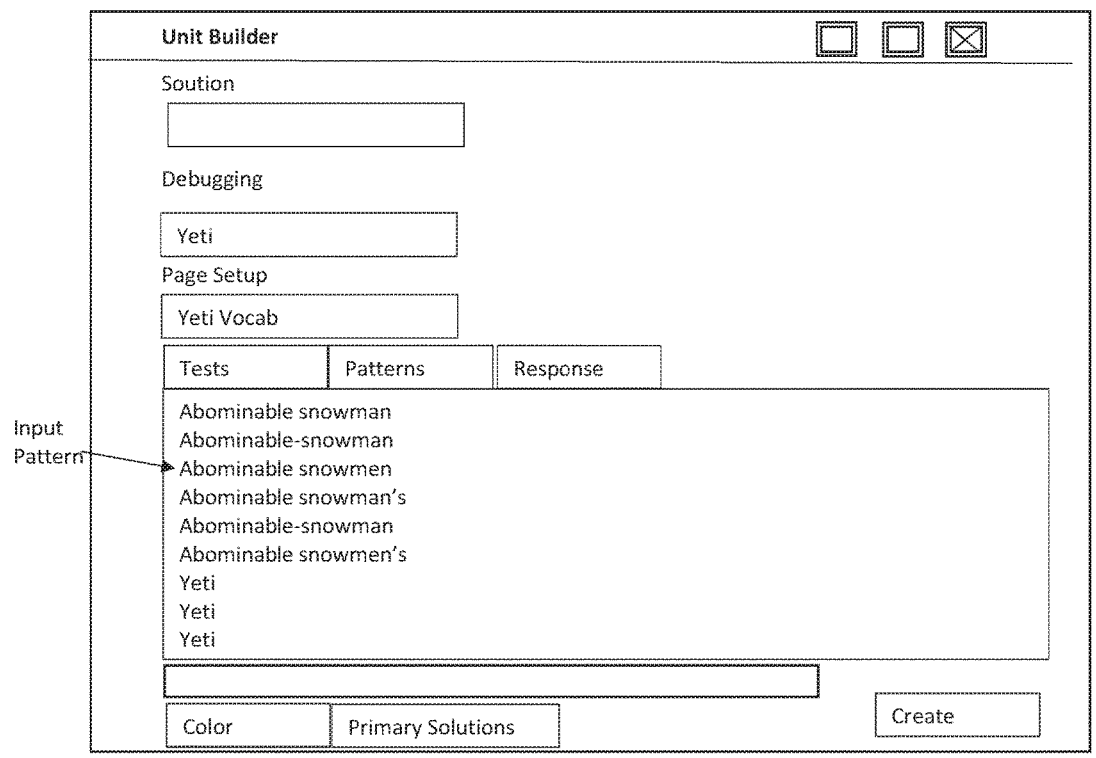

The Patterns tab, as shown in FIG. 62, in the Unit builder looks and functions similarly to the patterns tab found in the Concept builder. Input patterns may consist of Concepts, Building Blocks, Helper Terms, lex types, input files, and Variables. Patterns contains the following components:

| Component | Description |
| --- | --- |
| Button bar | The button bar contains the following:<br>    <Refresh>: Refreshes changes to patterns.<br>    <Collapse All> Collapses entire tree.<br>    <Expand All> Expands entire tree.<br>    <Add>: Adds a blank pattern to the display.<br>    <Edit>: Allows user to edit the name, Position, and Order/Proximity settings of a selected pattern.<br>    <Delete>: Deletes selected pattern.<br>    <Test Potential Conflicts>: Opens Tests tab with all Concepts used in the Unit input patterns, as well as all Units using those Concepts.<br>Show Ignore Items checkbox: When selected, Ignore Concepts folders are visible. Any Concepts/file dropped in these folders will not be |

| Component | Description |
|---|---|
| | considered when that specific input pattern is evaluated. Default: not selected. |
| Patterns | Displays all the patterns created for the Unit. Input patterns are represented thusly: Active input pattern Inactive input pattern |
| Edit Pattern | Edit Pattern Position: Drop-down list determines where the pattern must be located in input in order to trigger the Unit. Choose between "Anywhere," "Beginning," "End," "Entire," or "Substitute." Order Matters checkbox: When selected, the pattern will only trigger if the order of the input matches the order of the pattern. Default is selected. Proximity Matters checkbox: When selected, the pattern will only trigger if the inputs are adjacent to one another. Default is selected. <Save>: Saves changes to pattern name, location, and order/proximity selections. Note: Order Matters and Proximity Matters have no affect on Unit input patterns, except for use with AppEvents. |

Figure 63:
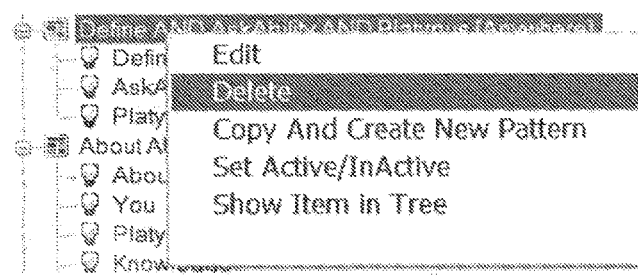

The Patterns tab also has the following right-click menu shown in FIG. 63 along with the following components:

| Component | Description |
|---|---|
| Edit | Opens pattern in the Edit Pattern display below. |
| Delete | Deletes selected pattern. |
| Copy and Create New Pattern | Creates an exact copy of selected pattern and places it as the last pattern in the display. |
| Set Active/InActive | Toggles selected pattern between Active and InActive status. |
| Show Item in Tree | Highlights selected Concept in Concepts dockable window. |

Response Tab

Figure 64:
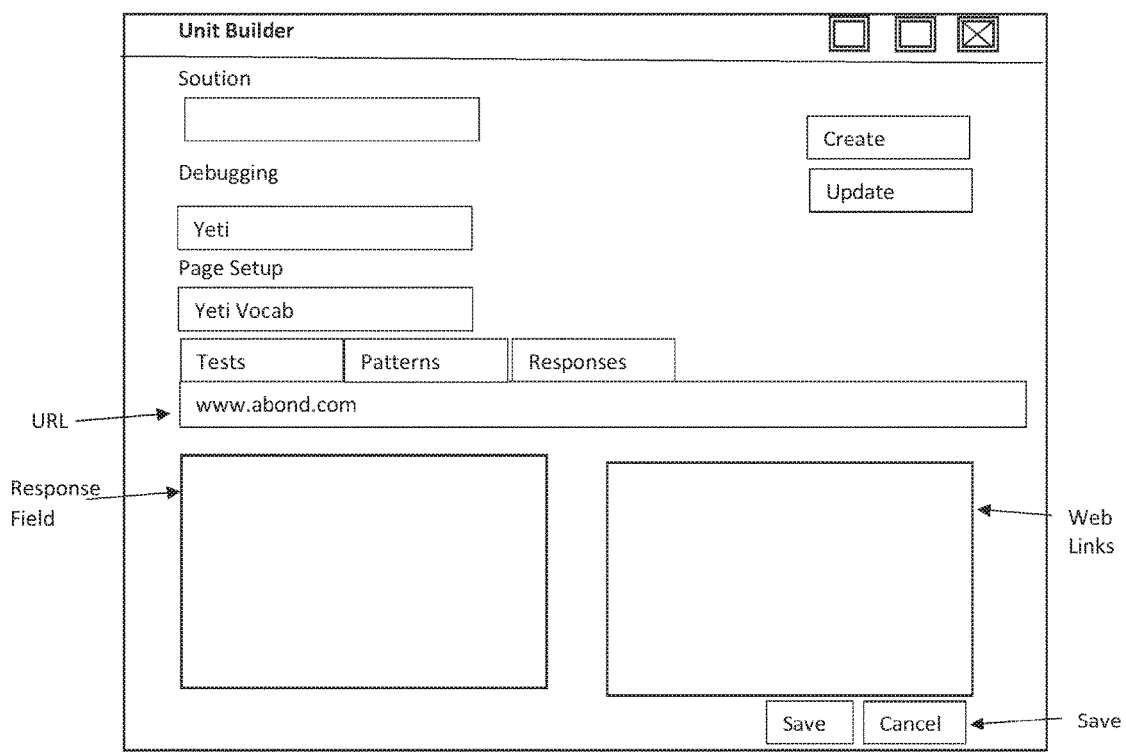

The response tab, as shown in FIG. 64, allows the user to determine the response the Unit gives when triggered. Responses may contain plain text, or FPML tags. This response may also include internet URLs and Web Links. Response contains the following components:

| Component | Description |
|---|---|
| Url | This field contains the following: <Edit Url>: Opens Url Editor with current Urlloaded. <Remove All Url Items>: Removes Url from response. <Show In Tree>: Shows current Url in Url dockable window. <Add>: Opens two new fields for the purpose of creating a new Url: Uri: New Url name field. Label: New Url Label field. <Save>: Saves new Url. Only available through <Add> button. |
| | Uri: displays path for response. Label: displays label of Url for response. Auto Navigate To URL checkbox: When selected, the Unit's triggered response automatically redirects to the selected URL. When not selected, the URL will be displayed as a message link below the response. Drop-down list: list of all available URLs for the response. |
| Web Links | This field contains the following: <Edit Web Link>: Opens Web Link window with selected web link. <Remove Call To Web Link> removes selected Web Link from response. <Show Web Link In Main Window>: Highlights selected Web Link in Web Links dockable window. <Move Call Order Up>: Moves selected Web Link up in relation to other Web Links. <Move Call Order Down>: Moves selected Web Link down in relation to other Web Links. |
| Response | This field is where the response is entered. |
| <Save> | Saves the settings for the response. |
| <Cancel> | Cancels all changes made to the response. |

Figure 65:
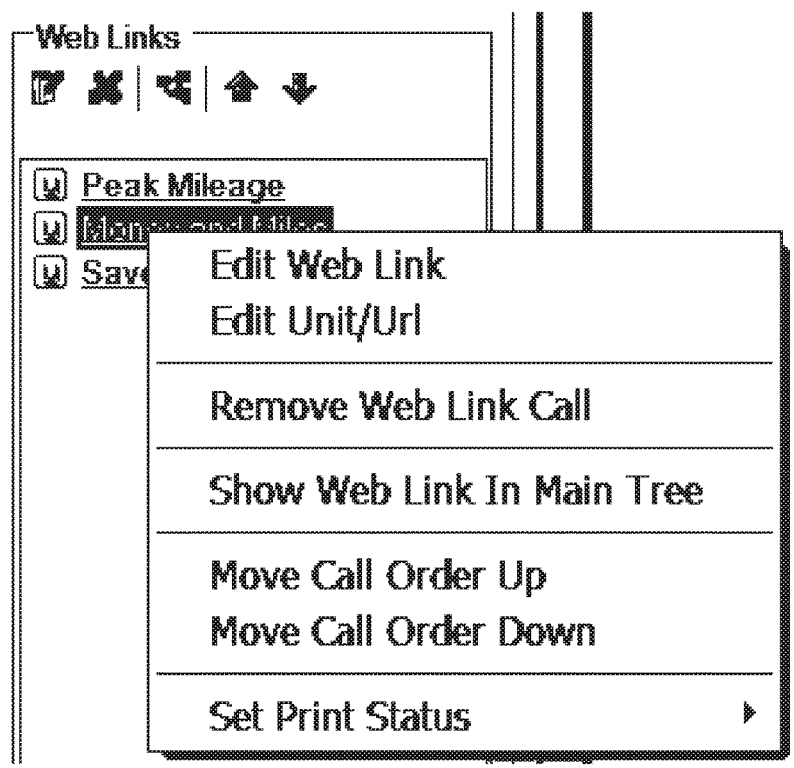

The right click menu shown in FIG. 65 is available from the Web Links display of the Response tab and has the following components:

| Component | Description |
|---|---|
| Edit Web Link | Opens selected Web Link in Web Link window. |
| Edit Unit/Uri | Opens selected Unit/Url in respective Units/Uris editors. |
| Remove Web Link Call | Removes selected Web Link call from response. |
| Show Web Link In Main Tree | Shows selected Web Link in Web Links dockable window. |
| Move Call Order Up | Moves selected Web Link up in relation to other Web Links. |
| Move Call Order Down | Moves selected Web Link down in relation to other Web Links. |
| Set Print Status | Change print status of selected item to the following options: Test Production InActive |

Figure 66:
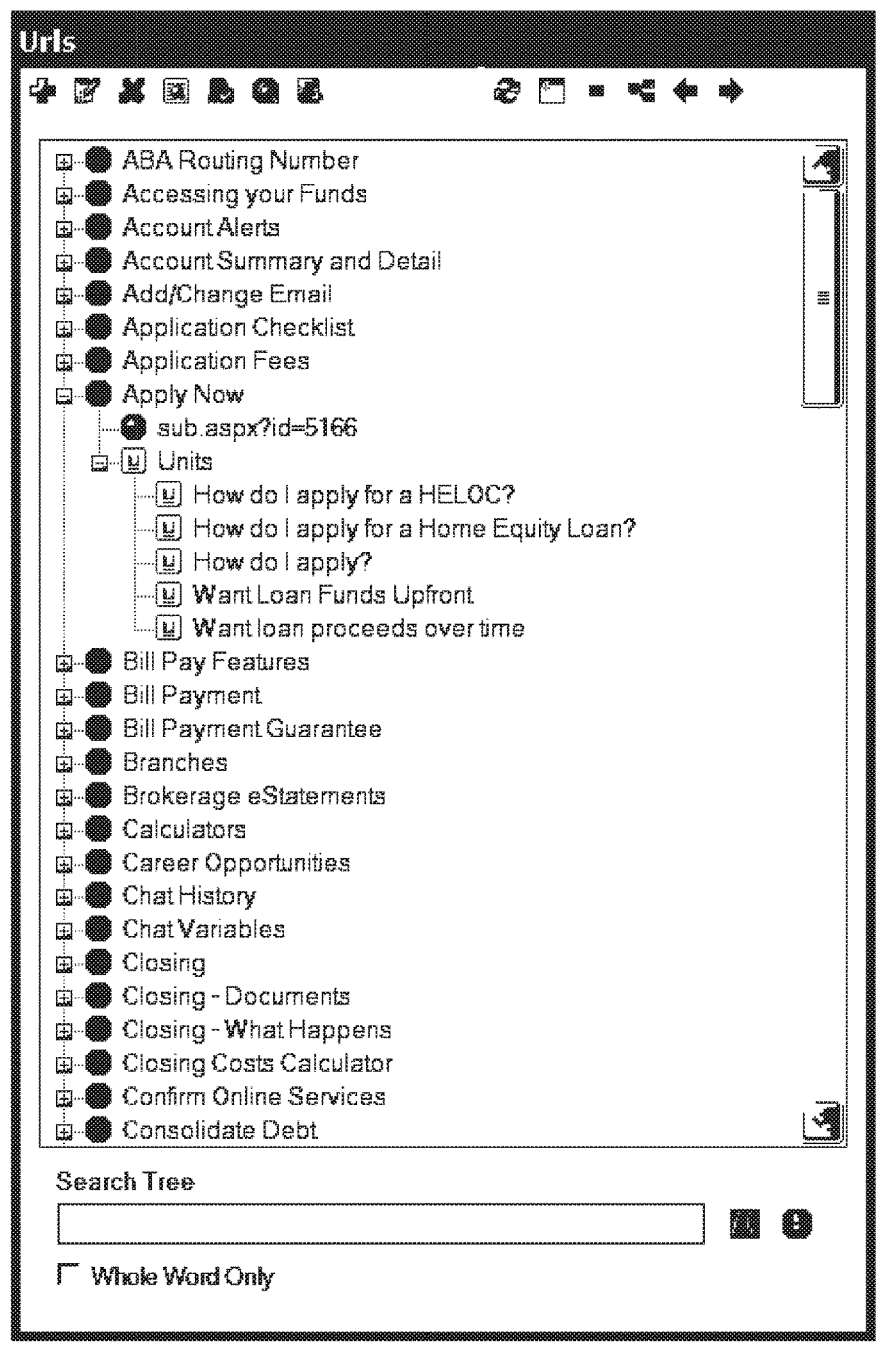

One of the most powerful tools of ActiveAgent is the ability to direct a response to a particular web page. This is done by creating a Url in the Urls dockable window, shown in FIG. 66, then dragging it into the Response tab of the Unit Builder. The Urls dockable window contains the following components:

| Component | Description |
| --- | --- |
| Button Bar | The button bar contains the following:<br><Add>: Adds new Url.<br><Edit>: Edits selected Url.<br><Delete>: Deletes selected Url.<br><Show Dependencies>: shows dependencies for selected Url.<br><Validate All Urls>: Checks the validity of all Urls. Invalid Urls are displayed with an icon.<br><View Url>: Open selected Url in a new web browser.<br><Set Web Server>: Opens Set Web Server Path.<br><Refresh>: Refreshes Uris display.<br><New Window>: Opens copy of current window.<br><Collapse All> Collapses entire tree.<br><Expand All> Expands entire tree.<br><Back and Forward Navigation>: Navigates between searches. |
| Urls | Display lists of all Urls in the project:<br>Url<br>WrongUrl<br>Unit that uses above Url. |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 67:
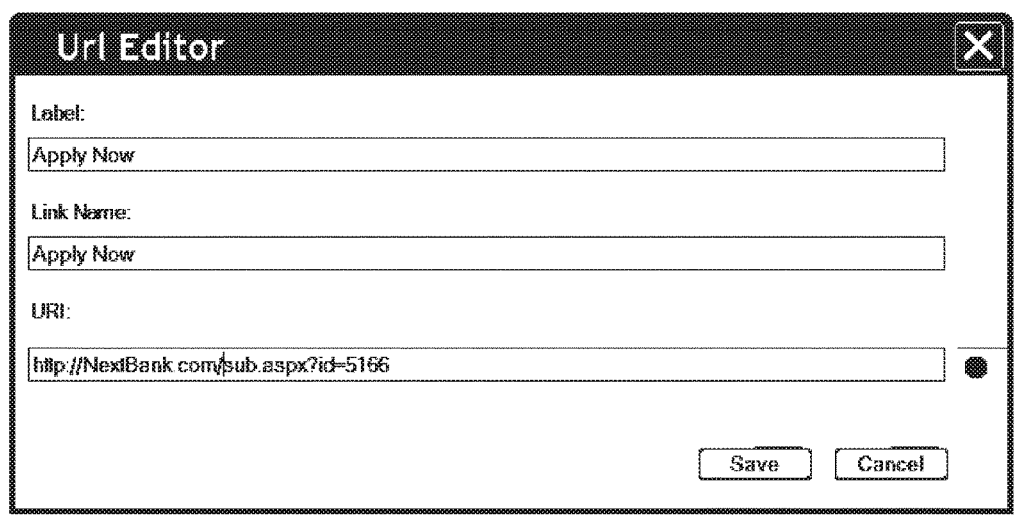

Clicking the <Add> button or right-clicking→Add will open the Edit Url window shown in FIG. 67, which is used to both create and edit Urls. This window has the following components:

| Component | Description |
| --- | --- |
| Label | Text field containing the Active Lab display name for the Url. |
| Link Name | Text field containing the name displayed by the Agent. |
| URI | Text field containing the path for the Url |
| <ViewUrl> | Opens Url in new web browser. |
| <Save> | Save any changes to the Url, OR creates new Url. |
| <Cancel> | Closes window without saving. |

Web Links

Figure 68:
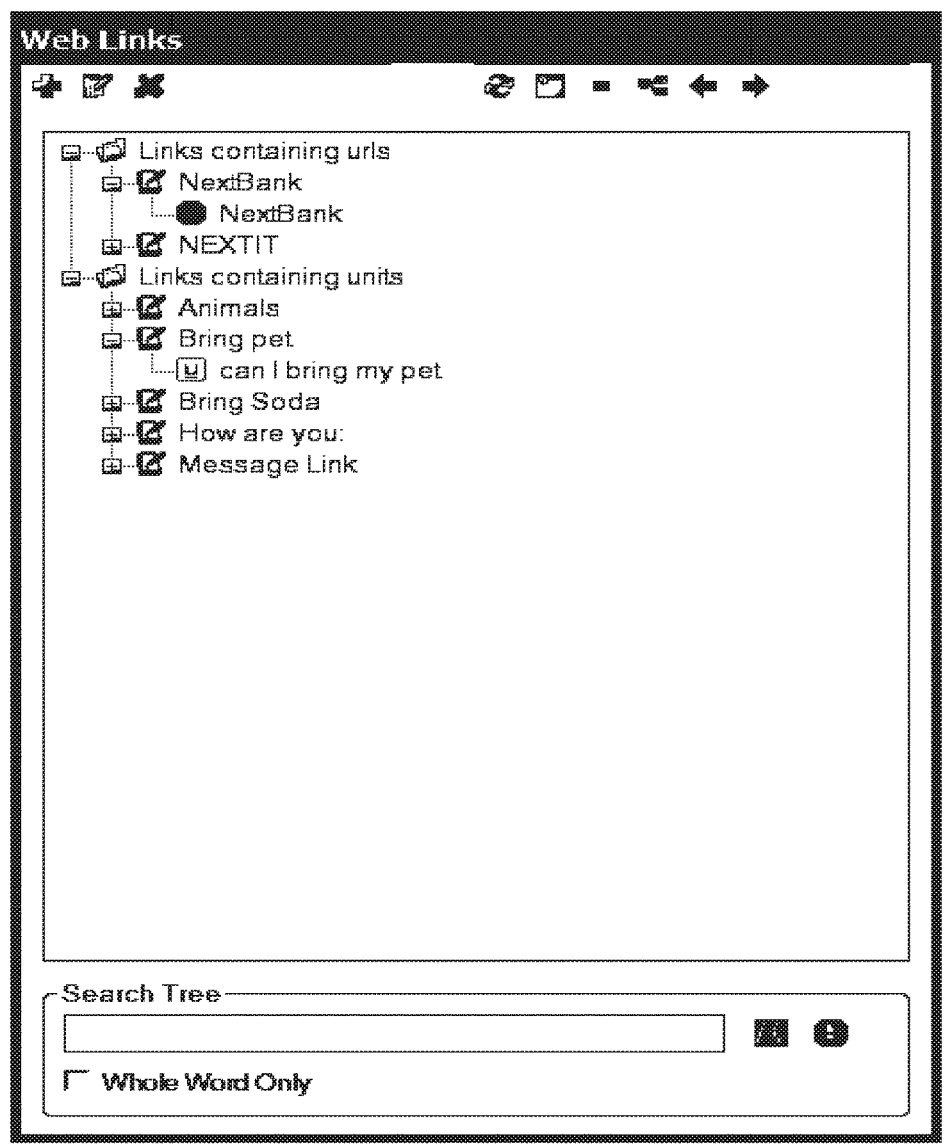

Web Links allow the user to include links directly to other Units and/or Urls along with a response. Web Links are created and edited from the Web Links dockable window shown in FIG. 68. They can be added to any number of responses by dragging the Web Link from the Web Links dockable window to the Web Links field in the Response tab of the Unit Builder.

The Web Links dockable window is separated into two folders: Links Containing Urls, and Links Containing Units. This is done for mainly organizational purposes. The Web Links dockable window contains the following components:

| Component | Description |
| --- | --- |
| Button Bar | The button bar contains the following:<br><Add>: Adds new Web Link.<br><Edit>: Edits selected Web Link.<br><Delete>: Deletes selected Web Link.<br><Refresh>: Refreshes Uris display.<br><New Window>: Opens copy of current window.<br><Collapse All> Collapses entire tree.<br><Expand All> Expands entire tree.<br><Back and Forward Navigation>: Navigates between searches. |
| Uris | Display lists of all Urls in the project:<br>Folder<br>Web Link<br>Url<br>Unit |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 69:

Web Links are created and edited by selecting <Add> or by selecting right-click→Add to open the Web Links window, which is shown in FIG. 69. Web Links Editor has the following components:

| Component | Description |
| --- | --- |
| Agent Link Name | Text field containing the name displayed by the Agent. |
| Lab Display Name | Text field containing the name displayed by the Active Lab. |
| Link Style Dropdown | Choose between Standard and Default |
| Navigation Type Dropdown | Dropdown chooses what type of link the Web Link will use. There are three options:<br>Main Window: Url will appear in the main web browser.<br>PopUp: Url will appear in its own web browser window.<br>Go To Unit: Units response will be displayed. |
| Linked Object | Field has two components:<br>An icon showing whether the Web Link is one of the following:<br>Url<br>Unit<br>The name of the Url or Unit used by the Web Link. |
| <Save> | Save any changes to the Url, OR creates new Url. |
| <Cancel> | Closes window without saving. |

Advanced Tabs

These tabs may only be viewed when <Advanced View> is selected.

| Tab | Description |
| --- | --- |
| Components | This tab displays the Variables, function calls, AppCalls, and Record Lists associated with the Unit. |
| Match Condition | This tab allows the user to create and edit pre- and post-conditions. |

| Tab | Description |
| --- | --- |
| Comments | This tab allows the user to leave comments on the Unit. Note: Comments do not in any way affect the functioning of the software, as they are intended to allow the user to comment on the thought processes and reasoning that went into the designing of the Unit. |
| Response Blocks | This tab allows the user to create response blocks in conjunction with the Response Blocks dockable window. |
| Text-To-Speech | This tab allows the user to attach an individual Text-To-Speech file to the Unit. |

Response Blocks are responses shared by multiple Units in addition to the unique Unit-specific responses. Response Blocks can be manipulated via the Response Blocks dockable window, and the Response Blocks advanced tab found under the Units tab.

The Text-To-Speech tab allows the user to manually attach a voice file to a Unit and has the following features:

| Tab | Description |
| --- | --- |
| Current Status | This display has the following components<br>Text Field: Displays the name of the Text-To-Speech file.<br><Browse>: Opens a Browse window to search for a Text-To-Speech File.<br><Remove>: Removes Text-To-Speech file listed in the Text Field. |
| Status | Shows the progress and results of the file import. |

The following discussion describes various ways to create, test, and edit Units.

Creating a New Situation

Figure 70:
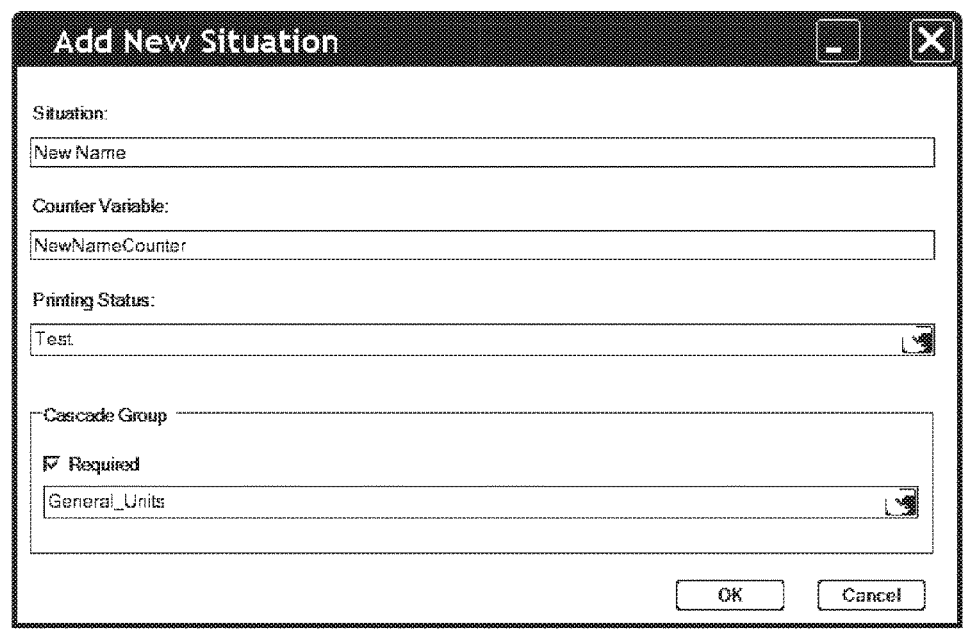

To create a new situation, use the following procedure:
1. In the Units dockable window, right click on a Unit or Situation and select Add→situation, which will open the Add New Situation window shown in FIG. 70.
2. In the Situation field, type the desired name of the Situation Group and hit <Tab> or <Enter>. The Counter Variable field will auto populate.
3. Edit the Counter Variable if desired. Note: Counter Variables can only be a single word.
4. Select a Print Status from the drop-down.
5. Select <Required> check box if desired, or skip to step 7.
6. Choose a Cascade Group from the drop-down menu.
7. Click <OK> to continue and save the changes OR click <Cancel> to close Add New Situation without creating a new situation.

Adding New Units
1. In Units, select a Situation Group and click <Add> OR right-click on a Situation Group and select Add →Unit from the menu to open the Units tab.
2. Select the Situation which the Unit will belong to from the drop-down menu.
3. Type in the Unit Name.
4. Click <Create>.

Adding Questions

Once the Unit has been created, test questions may be added under the Tests tab of the Unit Editor.
1. Type the question in the Test Questions field.
2. Press <Enter> or click <Add> to add the test question to the Test Questions display.

Adding Responses

Each Unit has a response that occurs as a result of an input that matches any of its input patterns. As discussed above, this may be as simple as a single line of text or as complicated as an application action.

Though responses do not require URLs to function, they can benefit from the versatility associated with web pages. To add a URL to a response:
1. Open Uris dockable window.
2. Click and Drag selected Url from the Uris dockable window into the Uri display in the Response tab.
3. Select Auto-Navigate to URL if desired.

To create the response itself:
1. Type in the desired response in the Response field.
2. Click the <Save> button to save the response OR click the <Cancel> button to erase any changes made to the response.

Web Links allows the user to add links to additional web pages and/or Units in the response. To add a Web Link to a response:
1. Open Uris, Web Links, or Units dockable window.
2. Click and Drag selected Url, Web Link, or Unit from the dockable window into the Web Links display in the Response tab. Note: you may be prompted to create a Web Link at this point.
3. Use <Move Call Order Up> and <Move Call Order Down> as desired.

Generating the Patterns

In order to generate a pattern for a Unit, use the following procedure:
1. In Patterns of Units, click <Add> to create a blank input pattern.
2. Drag and drop any desired Concepts from the Concepts dockable window into the blank pattern.
3. Drag and drop any desired Helper Terms from the Helper Terms dockable window into the pattern.
4. Arrange the Concepts and Helper Terms as desired.
5. Select <Order Matters> and/or <Proximity Matters> as desired. Note: no affect will be produced by this step unless AppEvents are used.
6. Choose a pattern position from the Edit Pattern Position drop-down menu.
7. Click <Save> to save any changes.
8. Click <Generate FPML (Changes Only) or <Generate All Fpml> or to enter the pattern into the database if desired.

Use steps 1-7 to create as many patterns as desired. Note: You must double click on the pattern in order to later make any changes to the Position or <Order Matters> and <Proximity Matters> check boxes. Click <Save> to save these changes.

Testing the Patterns

Figure 71:
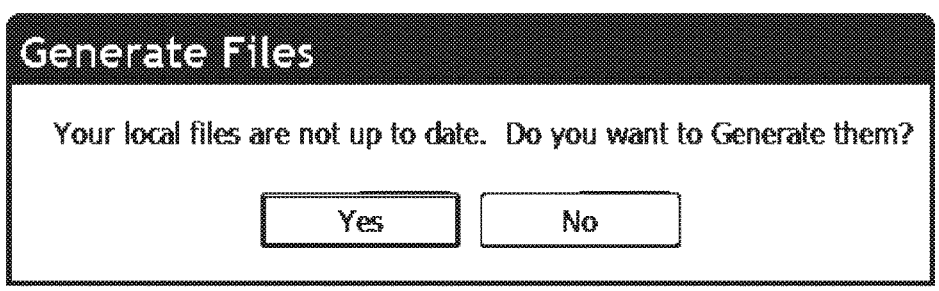
Figure 72:
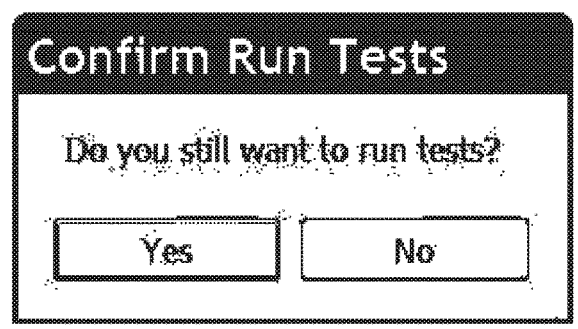

In order to test the input patterns, use the following procedure similar to testing Concepts:
1. Click <Run Tests> in the Tests tab.
2. The dialogue box in FIG. 71 will only appear if changes have been made to the database (i.e.: a pattern has been changed):
3. Click <Yes> to generate FPML (Changes Only) and run test or Click <No> to not generate FPML. Note, select <Yes> if a pattern was changed.
4. The dialogue box in FIG. 72 will only appear if <No> was selected from the Generate Files dialogue box.
5. Click <Yes> to run tests, or click <No> to not run tests.

6. The status of each test question is displayed as a colored ball next to the question. A green circle indicates success, a yellow ball indicates the question was not tested, and a red ball indicates failure. Questions that fail feature a brief summary of the error(s) encountered.

To debug a failed question:
1. Right click on the test question.
2. Select Debug Question. This loads the selected question into the debugger, and allows the user to see the processes that led to the question's failure.

Editing a Unit

To edit a unit, perform the following procedure:
1. Double click on the Unit in the Units OR right click on the Unit and select Edit→In Main Editor or Edit →In Pop-Up Editor. Both methods have the same functionality.
2. Make any changes desired to Name, Situation, or Print Status then click the <Update>.
3. Make any changes to individual input patterns.
   a. Select an input pattern.
   b. If desired, drag and drop a new Concept into the input pattern.
   c. If desired, select or de-select Order Matters.
   d. If desired, select or de-select Proximity Matters.
   e. If desired, select a Position.
   f. Click <Save> to finalize the changes to the input pattern.
4. Make any changes to test questions.
5. Make any changes desired to the response.

To delete a pattern, perform the following procedure:
1. Select the desired input pattern and click <Delete> OR right-click on the selected input pattern and select Delete.
2. In Confirm Delete, click <Yes> to delete the pattern or <No> to close the window without deleting.

To deactivate a pattern, perform the following procedure:
1. Right-click on the desired pattern.
2. Select Set Active/Inactive from the right-click menu.

In the same way that patterns may be deactivated, the same may be done to entire Units.
1. In the main tab Tests, right-click the tests associated with the desired Unit.
2. Select Set Active/Inactive from the right-click menu.

Test questions may be edited using the following procedure:
1. Double-click on the desired test question to open it in the text field.
2. Make any desired changes to the text.
3. Click <Update>

Responses may be edited using the following procedure:
1. If desired, select a new URL by dragging it from the Urls dockable window.
2. Make any changes desired to the text.
3. Click <Save>

Deleting a Unit

To delete a unit, use the following procedure:
1. Select the desired Unit in Units.
2. Right click on the Unit and select Delete.
3. In the Confirm Delete window that appears, click <Yes> to continue and delete the Unit OR select <No> to continue without deleting the Unit.

Directives

Directives are the way conversation scenarios are created for ActiveAgent. They can take the form of a directed conversation, or a series of steps the user needs a person to follow. This section discusses in detail what directives are, along with the different windows that are associated with it, as well as how to implement them.

Definition of a Directive

A Directive can be thought of as a series of Units that are linked together by specific responses, forming conversations. These conversations can be triggered by events on a web page, or by a person's input to ActiveAgent.

Take this simple example:
Person: How are you?
ActiveAgent: I'm fine, thanks! How are
Person: you? Good.
ActiveAgent: I'm glad to hear that.

In this example, there are actually two Units being triggered. The first is the response of "I'm fine, thanks! How are you?" and the second Unit has the response "I'm glad to hear that." The work of the Directive is to make the second Unit only accessible directly after the first Unit has triggered. The reason for this is to prevent ActiveAgent from responding with "I'm glad to hear that" anytime a person types is "Good."

A single Directive is not limited to one conversation stream; it can have many branches, based on the variety of things a person could say to the question of "How are you?"

Person: How are you?
ActiveAgent: I'm fine, thanks! How are
Person: you? Not so good.
ActiveAgent: I'm sorry to hear that.

In this example, the same Unit response was hit, of "I'm fine, thanks! How are you?" but a different response is given.

Directive Trees

Directives are displayed in a Directive Tree, which is a series of responses that can branch out as many times and with as much complexity as the user wants.

In the following example, a single Unit, called the Parent Unit, is triggered. The conversation then flows into Child Units, or Units that can be accessed through Directives.

Initial input: "I want to buy a watch"
Unit 1 (Parent Unit)-"Great! Would you like a gold, silver, or diamond watch?"
  1. Response -"a diamond"
    a. Unit 2-"would you like a small, medium, or large diamond watch?"
      i. Response - "small"
        1. Unit 5-"To purchase a small diamond watch, please . . . "
      ii. Response -"medium"
        1. Unit 6-"To purchase a medium diamond watch, please . . . "
      iii. Response -"large"
        1. Unit 7-"To purchase a large diamond watch, please . . . "
  2. Response -"a gold watch"
    b. Unit 3 "would you like a small, medium, or large gold watch?"
      i. Response - "small"
        1. Unit 8-"To purchase a small gold watch, please . . . "
      ii. Response -"medium"
        1. Unit 9-"To purchase a medium gold watch, please . . . "
      iii. Response -"large"
        1. Unit 10-"To purchase a large gold watch, please . . . "
  3. Response-"a silver watch"
    c. Unit 4-"would you like a small, medium, or large silver watch?"
      i. Response - "small"
        1. Unit 11-"To purchase a small silver watch, please . . . "
      ii. Response -"medium"
        1. Unit 12-"To purchase a medium silver watch, please . . . "
      iii. Response -"large"
        1. Unit 13-"To purchase a large silver watch, please . . . "

As seen in this example, specific responses to a Unit that is set up as a Directive will produce other Units. If a person typed "small" and wasn't in a Directive, no Unit would be triggered. However, if "small" is typed in response to a particular Unit, a specific Unit is triggered. In this manner, conversations can be directed.

Another feature of Directives is that a Child Unit still has all the qualities of a regular Unit. This means that a Child Unit can also be accessed from outside the Directive. For example, Unit 3 from the above example can be set to always respond directly to the question, "Can I buy a gold watch?" even if its Parent Unit has never been triggered.

Directive Dockable Window

Figure 73:
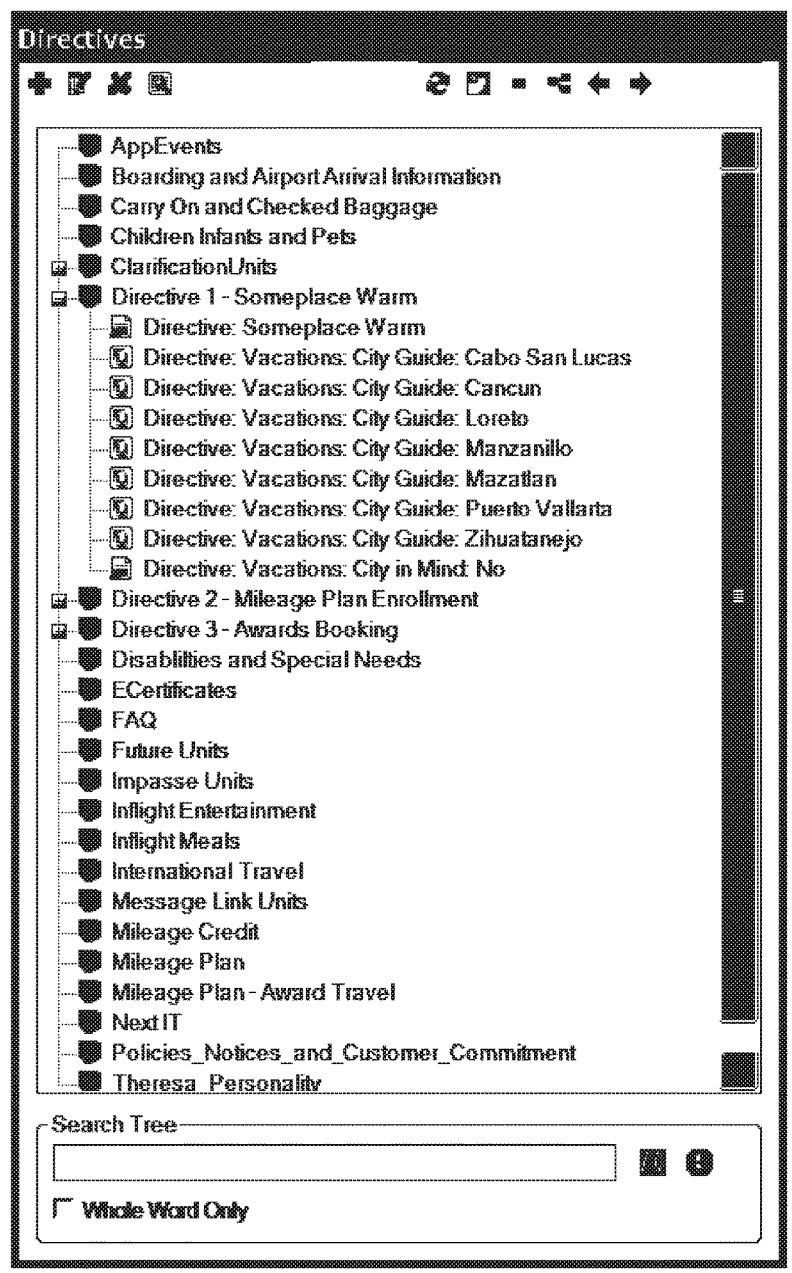

Since Directives are simply Units that have Child Units, the Directives dockable window, as shown in FIG. 73, looks very similar to the Units dockable window. The major difference is that the Directives dockable window will only show Parent Units (Units that have Child Units and that have no Parental Unit above them). The Directives Dockable window has the following components:

| Component | Description |
|---|---|
| Button Bar | The button bar contains the following:<br><Add>: Opens Directive Builder with empty directive.<br><Edit>: Opens Directive Builder for selected Directive.<br><Delete>: Deletes selected Directive.<br><Show Dependencies>: shows dependencies of selected Directive. Note: Currently Directives have no dependencies.<br><Refresh>: Refreshes Directives display.<br><New Window>: Opens copy of current window.<br><Collapse All> Collapses entire tree.<br><Expand All> Expands entire tree.<br><Back and Forward Navigation>: Navigates between searches. |
| Directives | Display lists responses and Units in their respective Situation Groups as follows:<br>Situation Group<br>  Unit<br>  Unprintable Unit<br>  Empty Directive |
| Search Tree | This field contains the following:<br>Input Text Field: Searches for specific text.<br><Search>: Executes search.<br><Search Options>: Opens Search Options window.<br>Whole Word Only Checkbox: Limits search to complete word matches. |

Directive Builder

Directives are created and edited in the Directive Builder window. This window consists of two main Tabs:

Builder Tab: a quick easy way to create directive trees, and responses, and links.

Advanced Tab: a tree view of the entire directive, as well as testing and pattern building for Child Units.

Builder Tab

Figure 74:
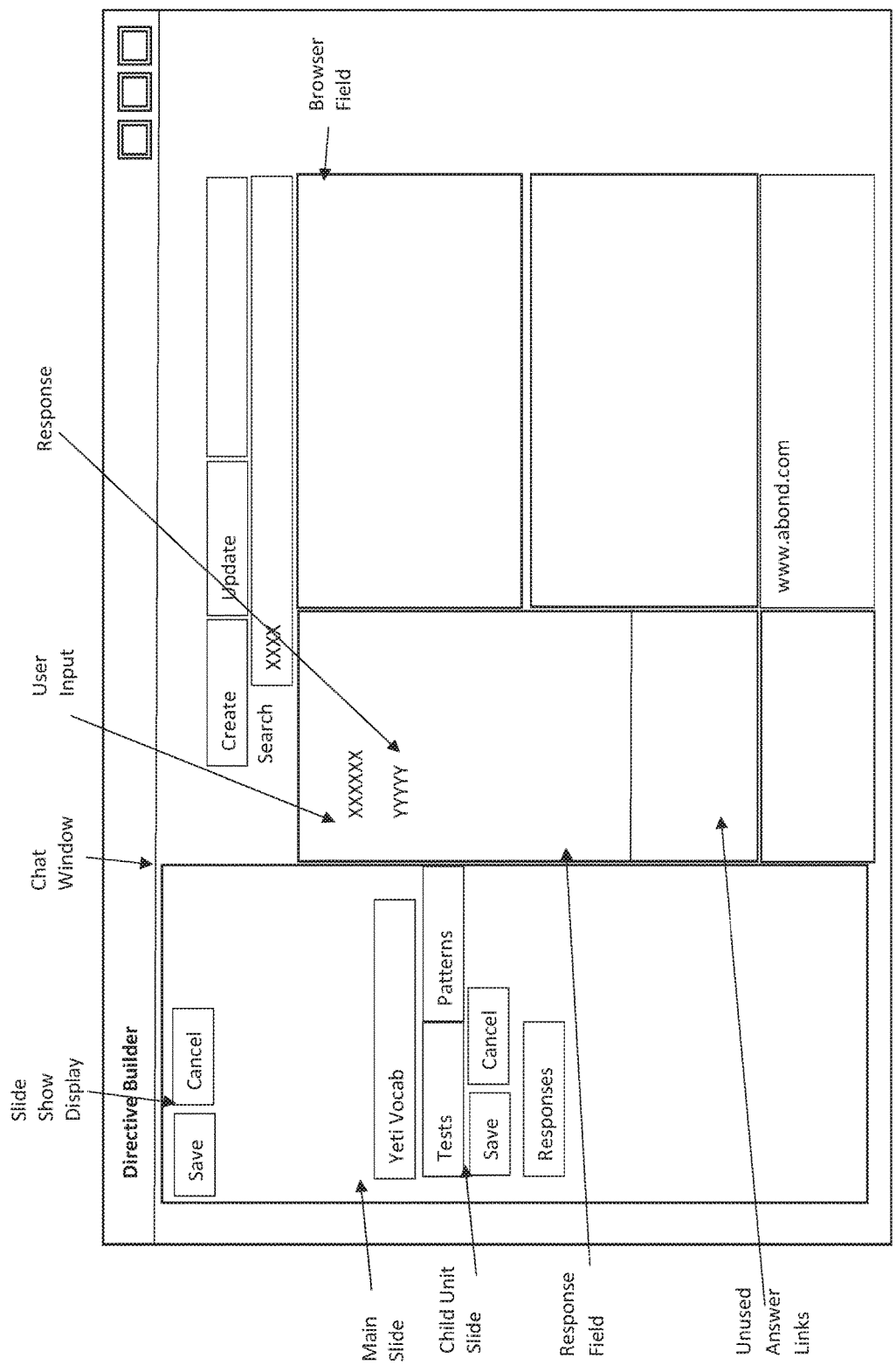

The Builder tab of the Directive Builder window, as shown in FIG. 74, is the easy place to create responses, add Urls and Web Links, and edit tests questions and has the following components:

| Component | Description |
|---|---|
| Slide Show Display | This display has the following components:<br>Main Slide: displays expected User Input and response of Parent Unit.<br>Child Unit Slides: displays response input for Child Units. Click individual Child Unit Slide to view Child Unit response and view any additional Child Units of selected Unit.<br>Right-Click menu:<br>  Add Child: adds empty Child Unit to Directive at current place in Slide Show Display.<br>  Delete: deletes current Child Unit. |
| Chat Window Display | This display gives an editable view of the selected Unit:<br>User Input: displays expected User Input. Click in this field to edit.<br>Response: displays Agent Response. Click in this field to edit.<br>Web Links: displays Web Links for current Unit. Drag Web Links here to add to Unit Response.<br>Unused Answer Links: displays Child Units that are not listed as Web Links for that Unit. Drag to Web Links above to add to Unit Response. This window also contains the following buttons.<br>  <Edit Web Link>: Opens Web Link window with selected web link<br>  <Remove Call To Web Link> removes selected Web Link from response.<br>  <Show Web Link In Main Window>: Highlights selected Web Link in Web Links dockable window.<br>  <Move Call Order Up>: Moves selected Web Link up in relation to other Web Links.<br>  <Move Call Order Down>: Moves selected Web Link down in relation to other Web Links. |
| Browser | Displays the website for the Url associated with current Unit. |
| Url Field | This field is used to edit the Url for current Unit.<br>This field contains the following components:<br>  <Edit Url>: Opens Url Editor with current Urlloaded.<br>  <Remove All Url Items>: Removes Url from response.<br>  <Show In Tree>: Highlights current Url in Uri dockable window.<br>  <Add>: Opens two new fields for the purpose of creating a new Url:<br>    Uri: New Url name field.<br>    Label: New Url Label field.<br>  <Save>: Saves new Url. Only available through <Add> button.<br>Uri: displays Url for response.<br>Label: displays label ofUrl for response.<br>Auto Navigate To URL checkbox: When selected, the Unit's triggered response. When not selected, the URL will display as a message link. |

Advanced Tab

Figure 75:
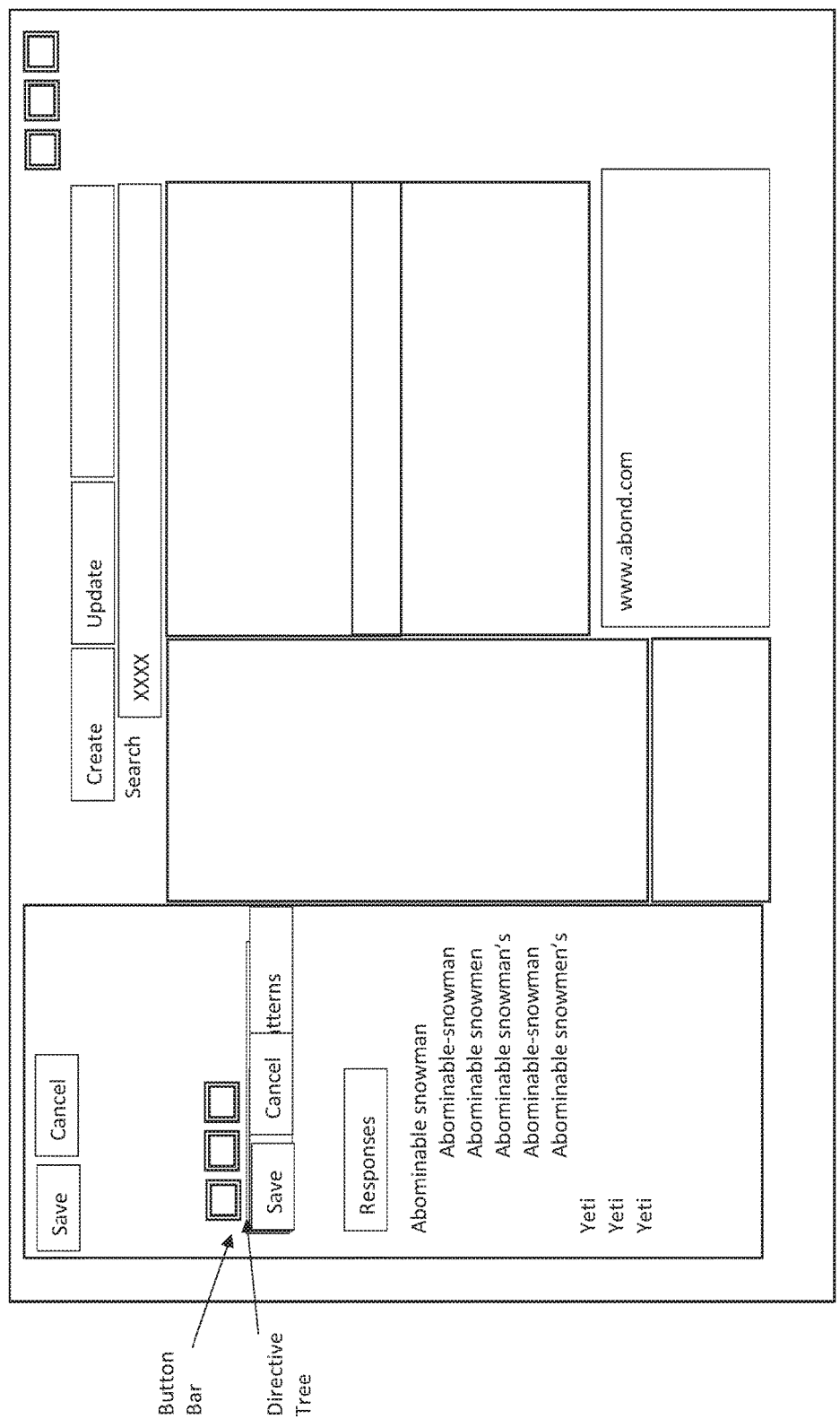

The Advanced tab of the Directive Builder window, as shown in FIG. 75, is where the directive tree can be directly accessed, where patterns and test questions can be added, and where test can be run.

The Advanced tab contains three main sections:

Directive field: the location of the Directive Tree

Edit Info tab: use this tab to add or modify patterns, responses, test questions, Variables, and Urls.

Test tab: where all test questions can be run.

The Directive Tree is a tree view of the entire Directive. Each indent on the tree implies one level further into the tree. Branches on the same level of the tree are linked together with vertical lines.

To access many of the features of the Directives field, access the right click menu. The Directives field has the following components:

| Component | Description |
|---|---|
| Button Bar | The button bar contains the following:<br><Add>: Adds empty User Input or Response, based on which item is currently selected in the Directive Tree.<br><Edit>: Opens Unit Builder for selected Unit or response.<br><Remove>: Removes selected item from Directive Tree<br><Collapse All> Collapses entire tree.<br><Expand All> Expands entire tree.<br><Refresh>: Refreshes Directives display.<br>Show Uris checkbox: Toggles display ofUrls with responses in Directive Tree.<br>Show Variables checkbox: Toggles display of Variables with responses in Directive Tree. |
| Directive Tree | The Directive Tree uses the following Icons:<br>Complete Directive Branch: Indicates a branch of the Directive Tree that has at least a name, a response, and a user input.<br>Incomplete Directive Branch: Indicates a branch of the directive tree that has yet to be completed.<br>Directive Response: Displays response for its corresponding branch of the Directive Tree<br>Incomplete Directive Response: Displays when no response exists for the corresponding branch of the Directive Tree.<br>Unprintable Unit: Displays when a directive is incomplete due to missing user inputs, responses, or patterns<br>Unit: Displays when Directive has all pieces considered to make it complete. |
| Right-Click Menu | The Directive Tree uses the following right-click menu options:<br>Add Prompt/Agent Response: Add response to a branch if none exists.<br>Add User Input: Add a branch to the Directive Tree under selected response.<br>Edit: Opens Unit Builder with selected Unit loaded.<br>Rename: Rename selected item<br>Remove: Removes selected branch and all child branches underneath.<br>Edit Unit: Opens Unit Builder with selected Unit loaded.<br>Create Unit: Opens Unit Builder and creates new Unit from the selected branch.<br>Show Unit In Tree: Highlights selected Unit in Units dockable window.<br>Copy Input/Response: Make a copy of selected branch.<br>Paste Input/Response: Pastes copied Input/Response into selected branch.<br>Set Print Status: Sets Print Status of selected Unit to the following options:<br>  Test<br>  Production<br>  InActive<br>Cascade Print Status To Children: Copies Print Status of selected branch to all child branches. |

Figures 76, 77:
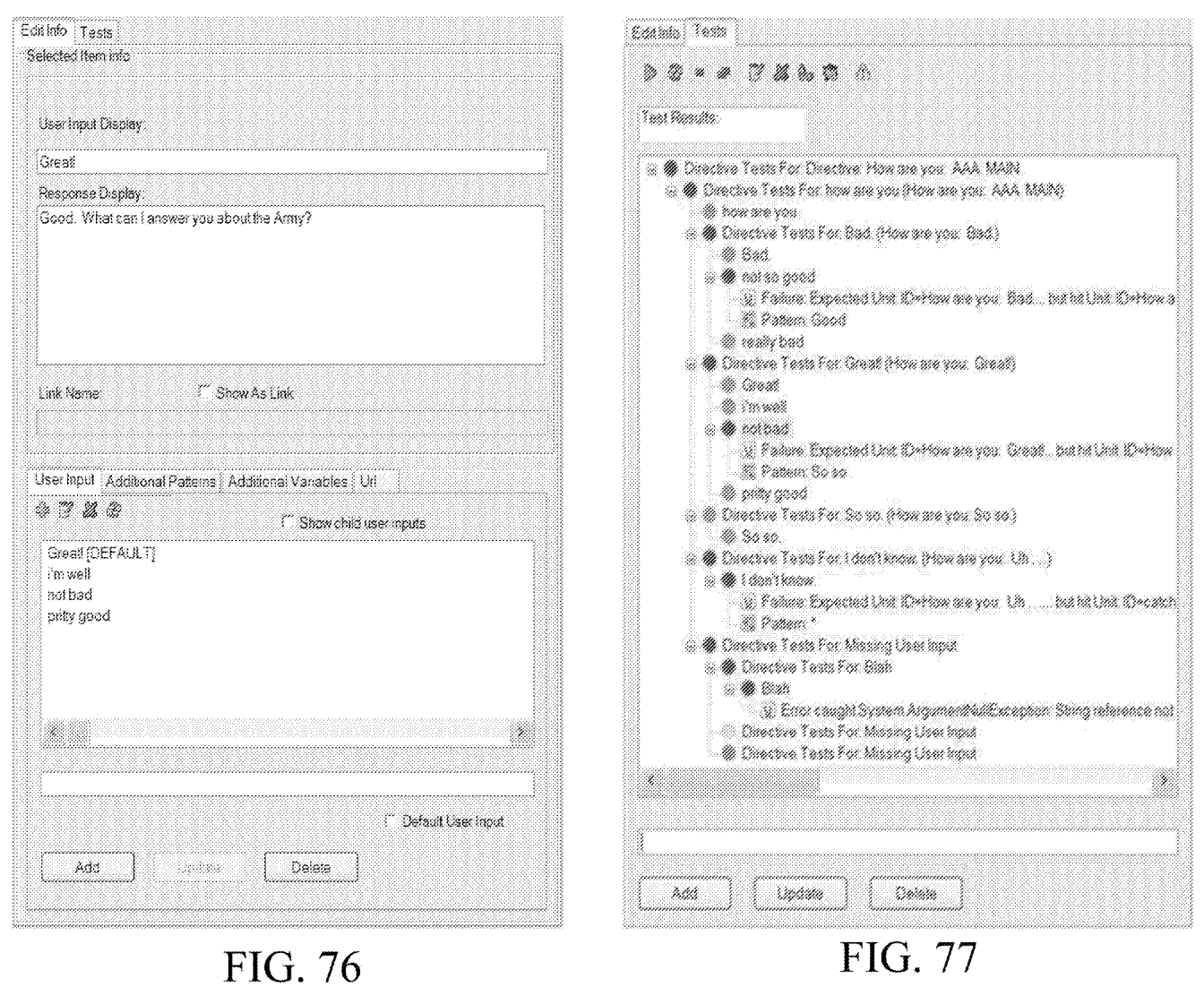

The Edit Info tab, as shown in FIG. 76, allows changes to be made to individual branches of the Directive Tree. The use of this window is similar to the Unit Editor tab for adding test questions, editing responses, and adding patterns.

Test questions and patterns listed under the Edits Tab are Directive specific. This means that they only apply within the Directive, and cannot be accessed unless the previous point in the Directive has been hit. The Edit Info tab has the following components:

| Component | Description |
|---|---|
| User Input Display | The name of the branches displayed in the Directive Builder. |
| Response Display | The Response for the Unit is written here. |
| Show As Link checkbox | Check to show Directive Child as a Web Link. |
| Link Name | Displays the name of the Web Link shown for the Unit. |
| User Input | This tab contains the following:<br><Add New Match Condition>: Add test question to the Directive.<br><Edit Match Condition>: Edit selected test question.<br><Delete Match Condition>: Removes selected test question.<br><Refresh>: Refreshes Directives display.<br>Show child user inputs checkbox: Toggles display of all questions that are associated with selected Unit from outside the Directive.<br>Main window: displays all directive specific test questions for selected Unit.<br>Text field: Field for typing new test questions.<br>Default User Input checkbox: set selected test question as Default (the name in User Input Display field).<br>Add: Add test question.<br>Update: Saves changes to test question.<br>Delete: Deletes selected test question. |
| Additional Patterns | This tab contains the following:<br><Refresh>: Refreshes changes to patterns.<br><Collapse All> Collapses entire tree.<br><Expand All> Expands entire tree.<br><Add>: Adds a blank pattern to the display. |

| Component | Description |
|---|---|
| | <Edit>: Allows user to edit the name, position, and order/proximity settings of a selected pattern.<br><Delete>: Deletes selected pattern.<br><Test Potential Conflicts>: Opens Tests tab with all Concepts used in the Unit input patterns, as well as all Units using those Concepts.<br>Show Ignore Items checkbox: When selected, Ignore Concepts folders are visible. Any Concepts/file dropped in these folders will not be considered when that specific input pattern is evaluated. Default: not selected.<br>Show Child Patterns Checkbox: Toggles display of all patterns that are associated with selected Unit from outside the Directive.<br>Patterns Main Window: all the patterns created for the Unit.<br>Input patterns are represented thusly:<br>    Active input pattern<br>    Inactive input pattern<br>Position: Drop-down list determines where the pattern must be located in input in order to trigger the Unit. Choose between "Anywhere," "Beginning," "End," "Entire," or "Substitute."<br>Order Matters checkbox: When selected, Unit only triggers on same order as input pattern. Selected by default.<br>Proximity Matters checkbox: When selected, inputs must be next to one another in order to trigger Unit. Selected by default.<br><Save>: Saves changes to pattern name, location, and order/proximity selections. Note: Order Matters and Proximity Matters have no affect on Unit input patterns, except for use with AppEvents |
| Additional Variables | Variables listed in this tab will only trigger within the Directive. This tab also contains the following:<br><Edit>: Edit selected Variable<br><Delete>: Removes selected Variable.<br><Refresh>: Refreshes Additional Variables tab. |
| Url | This field contains the following:<br><Edit Url>: Opens Uri Editor with current Urlloaded.<br><Remove All Url Items>: Removes Url from response.<br>    <Show In Tree>: Shows current Url in Uri dockable window.<br><Add>: Opens two new fields for the purpose of creating a new Url:<br>    Uri: New Url name field.<br>    Label: New Url Label field.<br><Save>: Saves new Url. Only available through <Add> button.<br>    Uri: displays Url for response.<br>    Label: displays label ofUrl for response.<br>Auto Navigate To URL checkbox: When selected, the URL will display when the Unit is triggered. When not selected, URL will display as a message link below the response. |

In the Tests tab, shown in FIG. 77, it is possible to test all the test questions for the Directive at the same time. For ease of use, the test questions are set up in a tree format that is identical to that found in the Directive Tree. When the tests are run, the results will show not just which test questions failed, but also in which branches of the Directive the test questions are failing.

Except for the fact that the tests are in the form of a tree, the functionality of Tests is very similar to the Tests tab from the Unit Editor. The Tests Tab has the following components:

| Component | Description |
|---|---|
| Button bar | The button bar contains the following:<br><Run Tests>: Runs tests on the questions input by the user for the Unit.<br><Reload Tests>: Reloads tests.<br>    <Collapse All> Collapses entire tree.<br><Expand All> Expands entire tree.<br>    <Edit Test Question>: Allows the user to edit the selected test question<br><Delete Test Question>: Allows the user to delete the selected test question.<br><Set Question Active/Inactive>: Toggles active/inactive for a question. Default for all questions is Active. When inactive, tests are not performed on the question.<br><Debug Question>: Opens Debug tab, allowing the user to view the output generated in response to the question, and the processes leading up to said output.<br>    <Test Potential Conflicts>: Opens Tests tab with all Concepts used in the Unit input patterns, as well as all Units using those Concepts. |
| Test Questions | This field contains the following:<br>Display: Displays all Test Questions input by the user, as well as their test status. A green circle indicates that the tests succeeded; a yellow circle indicates that the test has yet to be run; and a red circle indicates that the test failed.<br>Text Field: Type test questions here.<br><Add>: Adds test questions to the display.<br><Update>: Updates changes made to a test question.<br><Delete>: Deletes a selected test question. |

Variables

This section describes the creation and editing of Directives using the Directive Builder, and Directives dockable window.

The Builder Tab

When the Directive Builder opens, it will default to the Builder tab. The Parent Unit will be displayed in the upper left corner. From this window, both the Parent Unit and the Child Unit can be edited, and an entire Directive Tree can be easily built. The Builder tab creates an easy way to build a Directive Tree, however patterns and test questions are added using the Advanced tab discussed below.

The left hand side of the Builder tab is a slide show view of the entire Directive. The uppermost slide will always be the Parent Unit of the entire Directive. Below it on smaller slides are all of the Child Units that are directly below it in the Directive Tree.

If a Child Unit is selected, it will increase in size and any of its Child Units will appear in as small slides below it. This can be repeated as long as there are more Child Units below each subsequent Child Unit.

Clicking on any Parent Unit will change the slide show view to show all Child Units of that Unit.

A Directive can be created in a variety of ways from a variety of places. The reason for this is because a Directive is simply multiple Units linked together in a series. This makes creating Directives very flexible.

There are three different ways to begin the process of creating a Directive:

From an existing Unit (either from the Unit Editor tab or Unit Builder window), click <Open Directive Editor> to open the Directive Builder. If the Unit is not already used in a Directive elsewhere, it will appear as the main Parent Unit in the Directive Builder.

From the Directives dockable window, click <Add> to open the Directive Builder.

From the Directives dockable window, right-click Add Directive to open the Directive Builder.

When the Directive Builder opens, it will default to the Builder tab. The Parent Unit will be displayed in the upper left corner. All Child Units will be displayed below.

To add a Child Unit:
Right-click on the enlarged Child Unit and select→Add Child.

To add a Child Unit to an existing Child Unit:
1. Left click on desired Child Unit to bring it to the full size of a Parent Unit
2. Right-click on the desired Parent Unit and select →Add Child.

To delete a Child Unit:
Right-click on the desired Child Unit and select →Delete.

Once a Parent Unit or Child Unit has been created its User Input display can be added or changed:
1. Left Click on desired Parent Unit or Child Unit in the Slide Show Display.
2. Click in the field labeled User Input in the Chat Window display.
3. Type desired User Input.

Once a Parent Unit or Child Unit has been created its Response can be added or changed:
1. Left Click on desired Parent Unit or Child Unit in the Slide Show Display.
2. Click in the field labeled Response in the Chat Window display.
3. Type desired Response.

Once a Parent Unit or Child Unit has been selected, its Web Links can be added and removed, and the order of the Web Links modified.
1. Open Uris, Web Links, or Units dockable window.
2. Click and Drag selected Url, Web Link, or Unit from the dockable window into the Web Links display in the Response tab. Note: you may be prompted to create a Web Link at this point.
3. Use <Move Call Order Up> and <Move Call Order Down> as desired.

Unused Answer Links, listed below Web Links, are the Child Units of the selected Unit. They can be added as Web Links to the Unit by clicking and dragging them from Unused Answer Links to the Web Links field.

Web Links can be removed from the Unit by clicking the <Remove> button.

Urls can be added and removed from the Unit response in a Directive using the same steps as a regular Unit.
1. Open Uris dockable window.
2. Click and Drag selected Url from the Uris dockable window into the Uri display in the Response tab.
3. Select Auto-Navigate to URL if desired.

The Advanced Tab

Figure 78:
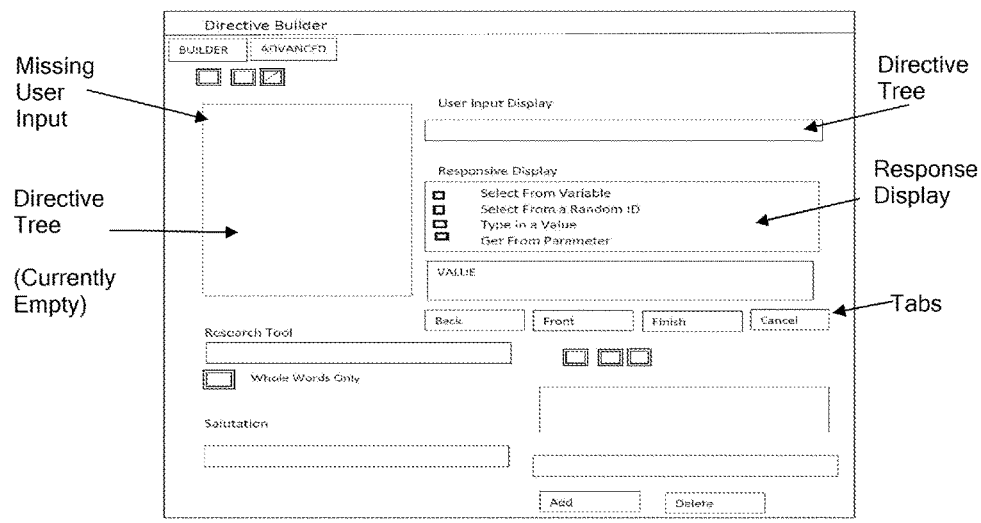

When the Directive Builder window opens, it will default to the Builder tab, as shown in FIG. 78. Click Advanced to view the Advanced tab.

The Advanced tab allows an entire directive to be built and maintained. It includes all the functionality of the Builder tab, just in a different form. It also has the ability to add test questions, add patterns, and actually test the Directive. This section describes the process.

There are two ways to create a Parent Unit. Using Existing Units:
1. Drag any existing Unit from the Units dockable window onto "Missing User Input" in the main Directive Tree window of the Directive Builder.
2. Click <Yes> when prompted to replace the node.

To create a new Parent Unit from the Directive Builder:
1. Right-click on the Missing User Input and select →Add Prompt/Agent Response. An unfinished response will appear below the Unit.
2. Type a name for the response in the Agent Response field and press <Enter>.
3. Type a user input that will display as the name of the Unit in the User Input Display on the Edit Info tab to the right.

Once a Parent Unit is set in the Directive Tree, you can now add possible user responses. Each response will be considered a Child Unit, therefore only add one response per Child Unit desired. There are two ways to add a Child Unit:

Note: These processes can be used on any branch of the Directive Tree to create Child Units for any branch.

Using Existing Units:
1. Drag any existing Unit from the Units dockable window onto the response of the Parent Unit. This becomes the new Child Unit.
2. Enter response in User Input Display in the Edit Info tab to the right.
3. Change the Response Display in Edit Info tab to the right if desired. This will also change the Unit's name in the Unit Editor as well.

Creating a new Child Unit:
1. Right-click on the response of the desired Parent Unit and select→Add User Input.
2. Type the response name in the Input Display in the Edit Info tab to the right and press <Enter>.
3. Type a name for the Unit Response in the Response Display in the Edit Info tab to the right and press <Enter>.

Units that are created in the Directive Builder do not technically exist until they are officially created. This is done by right-clicking on the selected Directive and selecting→Create Unit. The Unit Builder window will open. You may edit the Unit as necessary, or close the window.

Once the Unit is created, it can be found in its corresponding Situation Group in the Units window, or by selecting→Edit Unit from the right-click menu. Patterns and test questions created from the Unit Editor can be accessed from outside the Directive, while patterns and test question created inside the Directive Builder will only operate when in the Directive.

There are three ways to edit both the User Input Display and Response Display:

Left click twice slowly on any input or response in the Directive Tree to open a text field to edit the item.

Right-click on any input or response in the Directive Tree and select Rename to open a text field to edit the item.

With the Edit Info tab open, left-click on any input or response to make that Unit display on the Edit Info tab. The User Input Display and Response Display can now be directly edited.

To delete any branch of the Directive Tree, including any Child Units of that branch:
1. Select Unit to be deleted by left clicking on either the response or User Input.
2. Click <Remove> or right-click and select →Remove.

Note: Removing a Unit from the Directive Builder does not delete the Unit from the project if it has already been created.

Adding Test Questions within a Directive

To add test questions that will only apply within the Directive, follow these steps:
1. Select chosen Child Unit by left-clicking on it in the Directive Tree.
2. Select the User Input tab under the Edit Info tab.

Type test question into the text field and press <Enter> or <Add>. Repeat this step as many times as desired.

To add test questions that will only apply within the Directive, follow these steps:
1. Select chosen Child Unit by left-clicking on it in the Directive Tree.
2. Select the User Input tab under the Edit Info tab.
3. Select Test question and click <Delete> OR double click on selected test question so it appears in the text field and click <Delete>. Repeat this step as desired.

To edit test questions within a Directive, follow these steps:
1. Select chosen Child Unit by left-clicking on it in the Directive Tree.
2. Select the User Input tab under the Edit Info tab.
3. Select Test question and click either <Edit> or double click on the test question. It will appear in the text field below.
4. Edit the test question in the text field.
5. Press <Enter> or click <Update>. Repeat steps 3-5 as many times as desired.

Adding Patterns to Child Units

Adding a pattern to a Child Unit within the Directive will limit that pattern to work only in the Directive. Adding these patterns is done in the exact same way as it is done in the Patterns tab of the Unit Editor.
1. In Additional Patterns of Edit Info, click <Add > to create a blank input pattern.
2. Drag and drop any desired Concepts from the Concepts dockable window into the blank pattern.
3. Drag and drop any desired Helper Terms from the Helper Terms dockable window into the pattern.
4. Arrange the Concepts and Helper Terms as desired.
5. Select <Order Matters> and/or <Proximity Matters> as desired. Note: Currently, these options only affect AppEvents.
6. Choose a pattern position from the Edit Pattern Position drop-down menu.
7. Click <Save> to save any changes.
8. Use steps 1-7 to create as many patterns as desired. Note: You must double click on the pattern in order to later make any changes to the Position or <Order Matters> and <Proximity Matters> check boxes. Click <Save> if you make these changes.
9. Click <Generate FPML (Changes Only) or <Generate All Fpml> or to enter the pattern into the database if desired.

To edit patterns within a directive, perform the following procedure:
1. Select chosen Child Unit by left-clicking on it in the Directive Tree.
2. Select the Additional Patterns tab under the Edit Info tab.
3. Select pattern and click either  <Edit> or double click on the pattern. It will appear in the Edit Pattern field below.
4. Edit the pattern by either dragging and dropping new Concepts into the input pattern or deleting Concepts.
5. If desired, select or de-select Order Matters.
6. If desired, select or de-select Proximity Matters.
7. If desired, select a Position.
8. Click <Save> to finalize the changes to the input pattern if steps 5, 6 or 7 were followed.

To delete patterns within a directive perform the following procedure:
1. Select chosen Child Unit by left-clicking on it in the Directive Tree.
2. Select the Additional Patterns tab under the Edit Info tab.
3. Select the desired input pattern and click  <Delete> OR right-click on the selected input pattern and select Delete.
4. In Confirm Delete, click <Yes> to delete the pattern or <No> to close the window without deleting.

To deactivate patterns within a directive, perform the following procedure. When set inactive, a pattern will not trigger the Unit when matched.
1. Select chosen Child Unit by left-clicking on it in the Directive Tree.
2. Select the Additional Patterns tab under the Edit Info tab.
3. Right-click on the desired pattern.
4. Select Set Active/Inactive from the right-click menu.

Additional Variables within a Directive

To add a Variable to a Directive, drag and drop any chosen Variable from the Components dockable window into the Additional Variables tab under Edit Info.

Adding a Url within a Directive

Though responses do not require URLs to function, they can benefit from the versatility associated with web pages. To add a URL to a response:
1. Select chosen Child Unit by left-clicking on it in the Directive Tree.
2. Select the Url tab under the Edit Info tab.
3. Open Urls dockable window.
4. Click and Drag selected Url from the Urls dockable window into the Uri display in the Url tab.
5. Select Auto-Navigate to URL if desired.

To remove a URL from a response:
1. Select chosen Child Unit by left-clicking on it in the Directive Tree.
2. Select the Url tab under the Edit Info tab.
3. Select  <Remove All Url Items>.

Testing Directives

Figure 79:
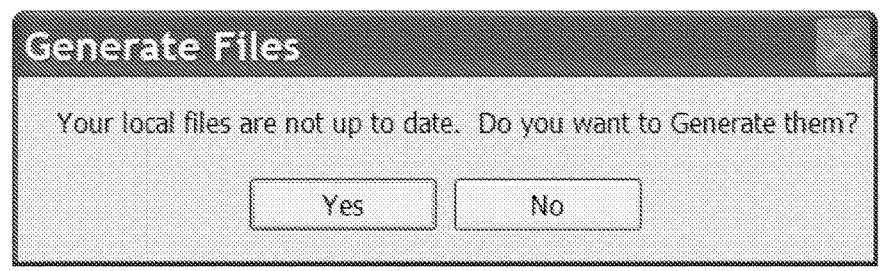
Figure 80:
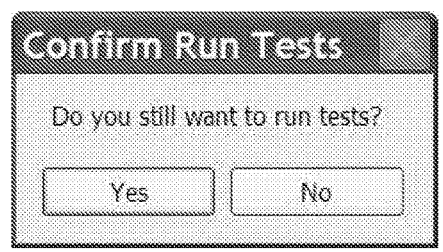

To test only the test questions associated with the Directive, follow these steps:
1. Select the Tests tab from the Advanced tab within the Directive Builder.
2. Click <Run Tests>. The dialogue box shown in FIG. 79 will only appear if changes have been made to the database (i.e.: a pattern has been changed).
3. Click <Yes> to generate FPML (Changes Only) and run test or Click <No> to not generate FPML. The following dialogue box will only appear if <No> was selected from the Generate Files dialogue box.
4. Click <Yes> to run tests, or click <No> to not run tests in the box shown in FIG. 80.

The status of each test question is displayed as a colored ball next to the question. A green circle indicates success, a yellow ball indicates the question was not tested, and a red ball indicates failure. Questions that fail feature a brief summary of the error(s) encountered.

To debug a failed question:
1. Right click on the test question.
2. Select Debug Question. This loads the selected question into the debugger, and allows the user to see the processes that led to the question's failure.

Variables

Variables are means by which the KB may store information captured in a conversation for later use. This section discusses Variables and Record Lists as they fit into Units and Concepts.

Components Dockable Window

Figure 81:
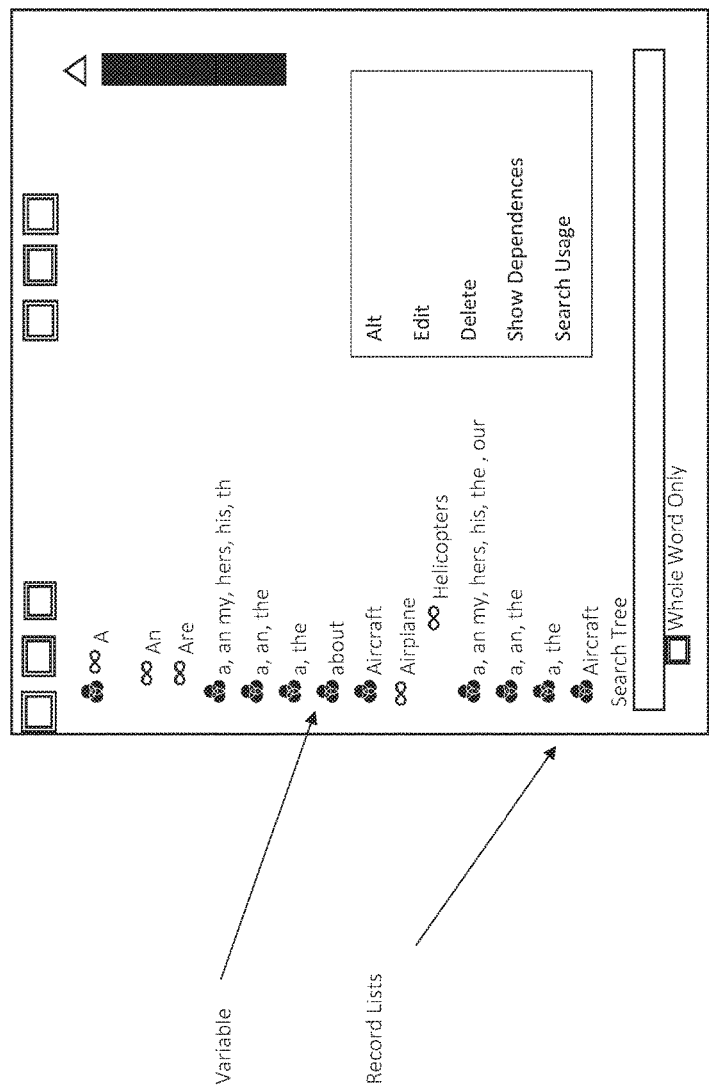

Variables and Record Lists are accessed via Components, along with AppCalls. The Components dockable window is shown in FIG. 81 and includes the following components:

| Component | Description |
|---|---|
| Button Bar | The button bar contains the following:<br><Add>: Opens Variable, Record List, Function, and AppCall Editors, depending on which is currently highlighted.<br><Edit>: Opens Variable, Record List, Function, and AppCall Editors, depending on which is currently highlighted.<br><Delete>: Deletes selected item.<br><Show Dependencies>: shows dependencies and web links for selected Unit.<br><Refresh>: Refreshes Components display.<br><New Window>: Opens a copy of the current window.<br><Collapse All>: Collapses entire tree.<br><Expand All>: Expands entire tree.<br><Back and Forward Navigation>: Navigate between searches. |
| Components display | Shows all available Variable Types, Variables, and Record Lists thusly:<br>Variable type<br>  Variable<br>    Variable that is saved in Chat Logs<br>  Record List |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

The above components only apply to Variables and Record Lists.

Variables

Variables are components used for profiling and contextualization. When used for profiling, they log a site user's activities on the user's site, and any information they might divulge, such as name, IP address, e-mail address, or credit card number.

Variables are means by which a user may allow certain Units to trigger only in specific situations. Much like Directives, they allow for greater specificity in a Unit's functioning. The user may specify the type of Variable, the Variable's name, and the Variable's initialization value (be it true/false, empty string, or other value). Furthermore, the user may specify whether Variable information is saved in the chat logs. Note: If the Save In Chat Logs selection is not checked, all information gained from the Variable will be lost when the site-user leaves the chat. Save In Chat must be selected to view the information at a later time.

Variables are grouped together by type. This is done mostly for organizational purposes. There are three categories of Variables:

System Variables: System Variables are set by the Context IQ Engine.
    Application Variables: Application Variables are set by the parent application.
    User-defined Variables: These variables can represent a single value, an array, or a Record List.

Figure 82:
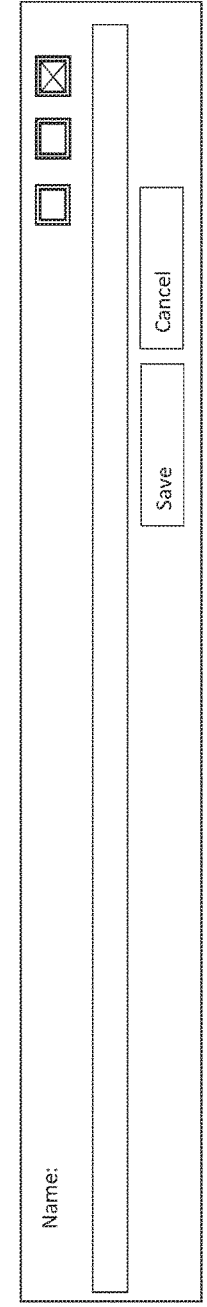

By clicking on Variables, and selecting <Add> or selecting a Variable Type and selecting <Edit>, the Variable Type window shown in FIG. 82 will appear. Variable Type includes the following components:

| Component | Description |
|---|---|
| Name | Name of the Variable Type. |
| Make Public checkbox | Makes Variable publicly available if selected. |
| <Save> | Saves changes made. |
| <Cancel> | Closes window without saving changes made. |

Figure 83:
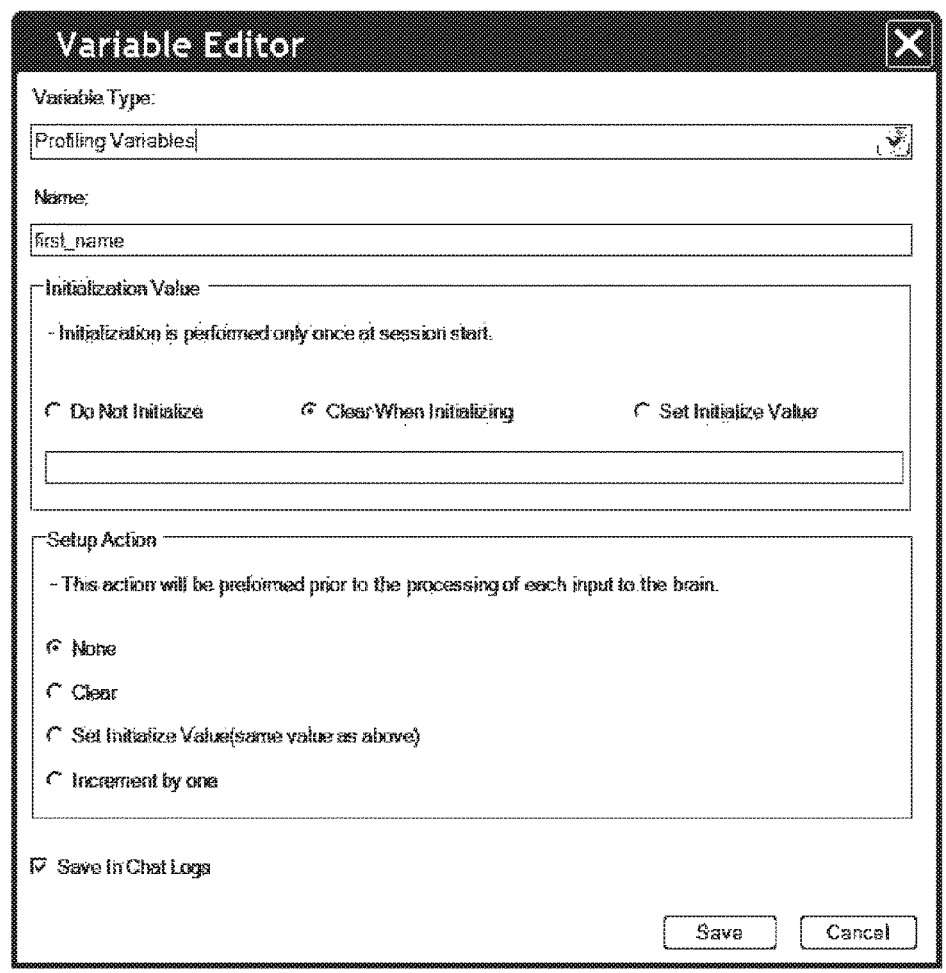

Variable Editor, shown in FIG. 83, allows the user to create and edit specific Variables and includes the following components:

| Component | Description |
|---|---|
| Variable Type drop-down/field | Select type from list. |
| Name | Name of the Variable. |
| Initialization Value | The value of the Variable at the start of every session. There are three options:<br>Do Not Initialize: If selected, Variable will not initialize.<br>Clear When Initializing: If selected, value=".".<br>Set Initialize Value: Variable is set to the entered initialization Variable. |
| Setup Action | The action selected in this field will be performed prior to the processing of each input. There are four options:<br>None: Nothing is done.<br>Clear: Value of Variable is cleared.<br>Set Initialize Value: Variable is set to the entered initialization Variable.<br>Increment by one: value of Variable will increase by one. |
| Save In Chat Logs checkbox | If selected, chat logs record usage of Variable in question. |
| <Save> | Saves changes made to Variable. |
| <Cancel> | Closes window without saving changes. |

View Variable Initialization and Setup

Selecting→Admin→View Variable Initialization And Setup will open the Variables window. The Variables window is a list of all Variables associated with the project, as well as what value the Variables are set to at either initialization or setup (before each User Input).

Figure 84:
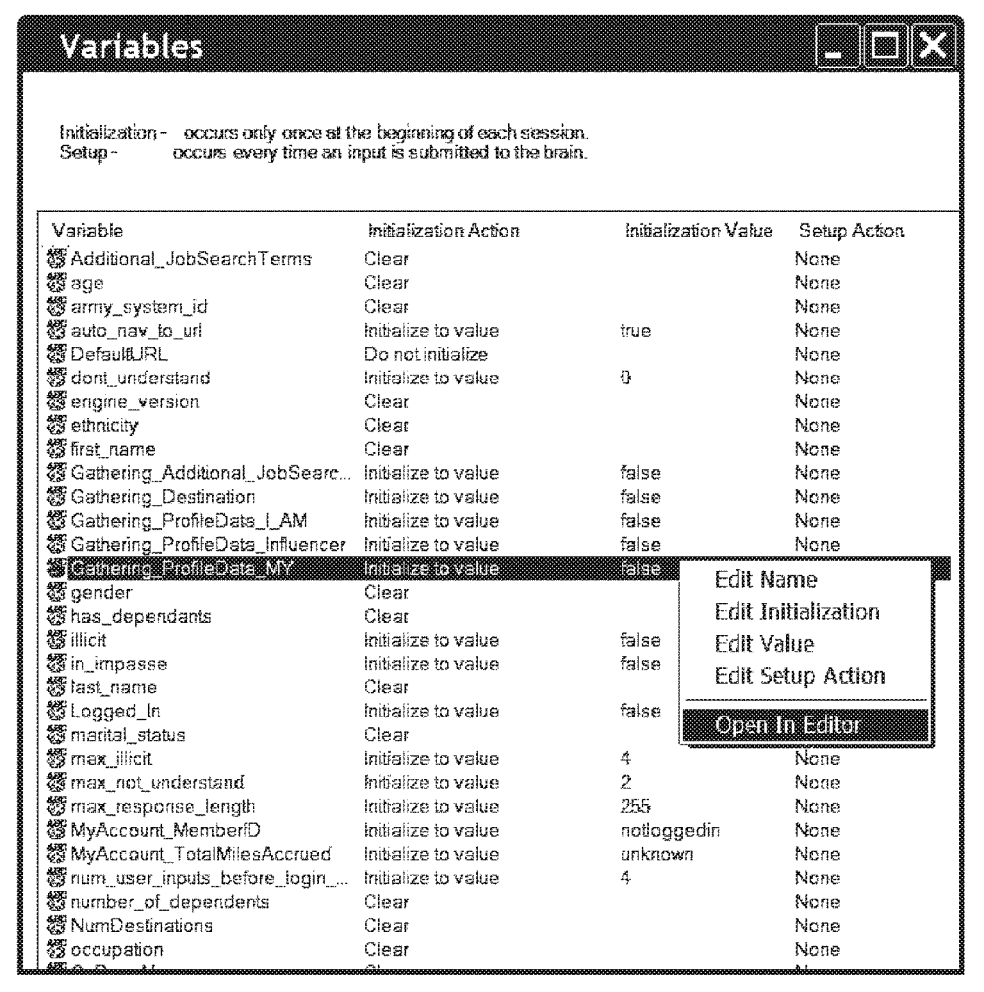

The Variables window, shown in FIG. 84, is broken up into four distinct columns:

Variable: This column displays the name of the Variable.
Initialization Action: This column displays what is done to the Variable at the beginning of each session. A Variable can be set to a value, cleared, or not initialized at all.
Initialization Value: This column displays the value the Variable is set to at either initialization or setup.
Setup Action: This column displays what action is taken before every user input.

The Variables window also contains the following right-click menu:

| Component | Description |
| --- | --- |
| Edit Name | Opens field to edit the name of the Variable. |
| Edit Initialization | Opens drop-down to change Initialization Action. |
| Edit Value | Opens field to edit Initialization Value |
| Edit Setup Action | Opens drop-down to change Setup Action field. |
| Open In Editor | Opens selected item in Variable Editor. |

Record Lists

Record Lists are lists of Variables that work in conjunction with one another. They are used when information should be grouped together and when an unspecified number of values is possible.

Figure 85:
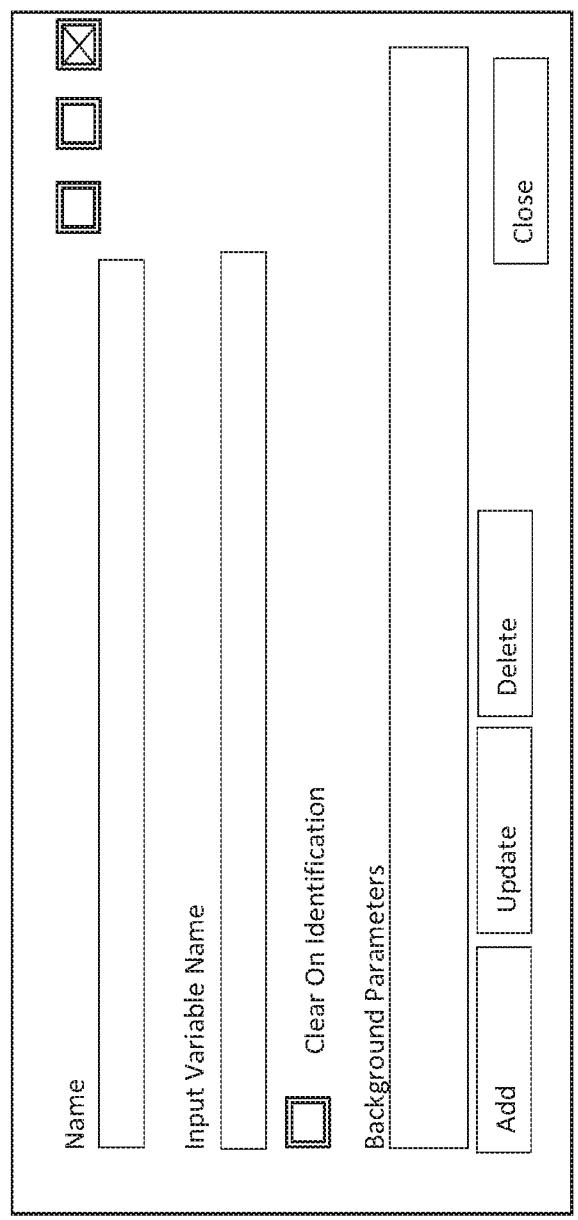

The Record List Editor, shown in FIG. 85, allows the user to specify the name of the Record List, the index Variable name, and the required parameters and includes the following components:

| Component | Description |
| --- | --- |
| Main | This field contains the following:<br>Name: Input field for the name of the Record List.<br>  <Save>: Saves Record List to the project. This button must be clicked in order to add parameters.<br>Index Variable Name: Text input field for name of index Variable.<br>Clear on Initialization checkbox: When selected, clears Record List once initialized. |
| Required Parameters | This field contains the following:<br><Edit Required Parameter>: Allows user to edit selected required parameter in Required Parameters field.<br><Delete Required Parameter>: Deletes selected required parameter.<br>Display: Lists all required parameters.<br>Text input field: Required parameters typed here.<br>  <Add>: Adds field input to display list, saves parameter.<br>  <Update>: Updates changes made to selected desired parameter. |

| Component | Description |
| --- | --- |
| | <Delete>: Deletes selected required parameter. |
| <Close> | Closes window. |

Figures 86, 87:
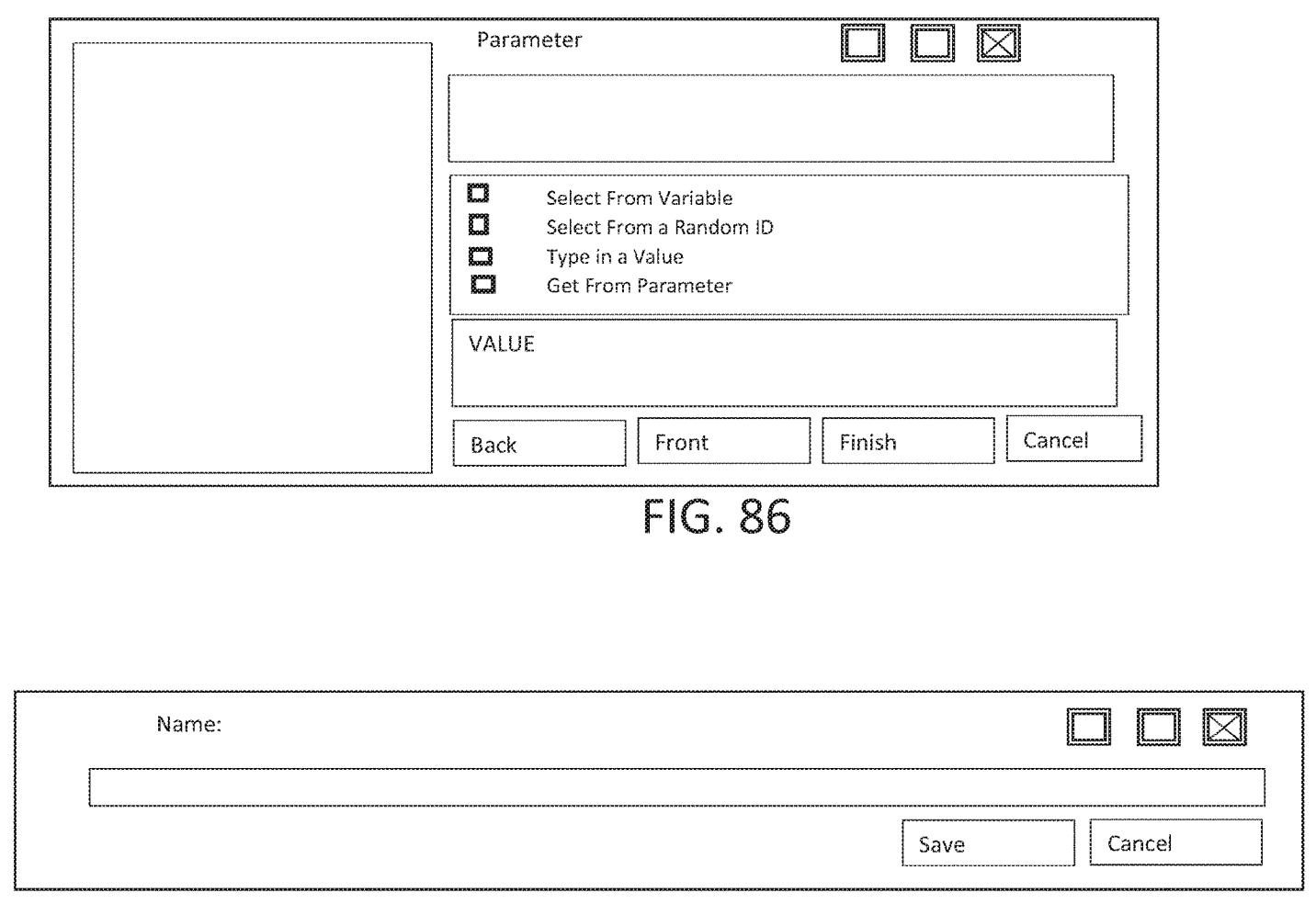

Record List configuration appears whenever a Record List is added to a Concept, Unit; or Response Block. The Configure Record List window, shown in FIG. 86, will open automatically and includes the following components:

| Component | Description |
| --- | --- |
| Parameter display list | List of available parameters |
| Parameter display | Selected parameter. |
| <Select Parameter Value Type> radio selection | Choose between the following:<br>  <Select from a Variable>: Assigns parameter value from a Variable already assigned.<br>  <Select from a Record List>: Pulls value from another Record List.<br>  <Type in a value>: Specific typed input.<br>  <Set from pattern>: Select one of the following values to assign to the parameter:<br>    Wild Card<br>    VInput File<br>    Lex Type |
| Value field/drop-down | Value to assign to current parameter. |
| <Back> | Navigates to previous parameter. |
| <Next> | Navigates to next parameter. |
| <Finish> | Closes window with changes saved. |
| <Cancel> | Closes window without saving changes. |
| Select A Value | Appears when no value is selected. |

The following section discusses the procedures involved in creating, maintaining, and using Variables and Record Lists.

Managing Variables and Record Lists

This sub-section deals with creating, editing and deleting Variables and Record Lists. These operations are performed via Components. To create variable types, perform the following procedure in connection with FIG. 87:

1. Select "Variables" and click <Add> OR right-click on "Variables" and select Add.
2. In Variable Type, type in a Name for the Variable Type
3. If desired select the Make Public check box.
4. Click <Save> to save the Variable Type OR click <Cancel> to close the window without saving.

To edit an existing variable type:

1. Select the desired Variable Type in Components and click <Edit> OR double-click on the desired Variable Type OR right-click on the desired Variable Type and select Edit from the right-click menu.
2. In Variable Type, make any changes to Name or Make Public.
3. When finished, click <Save> to close the window and save changes, OR click <Cancel> to close the window without saving changes.

Figure 88:
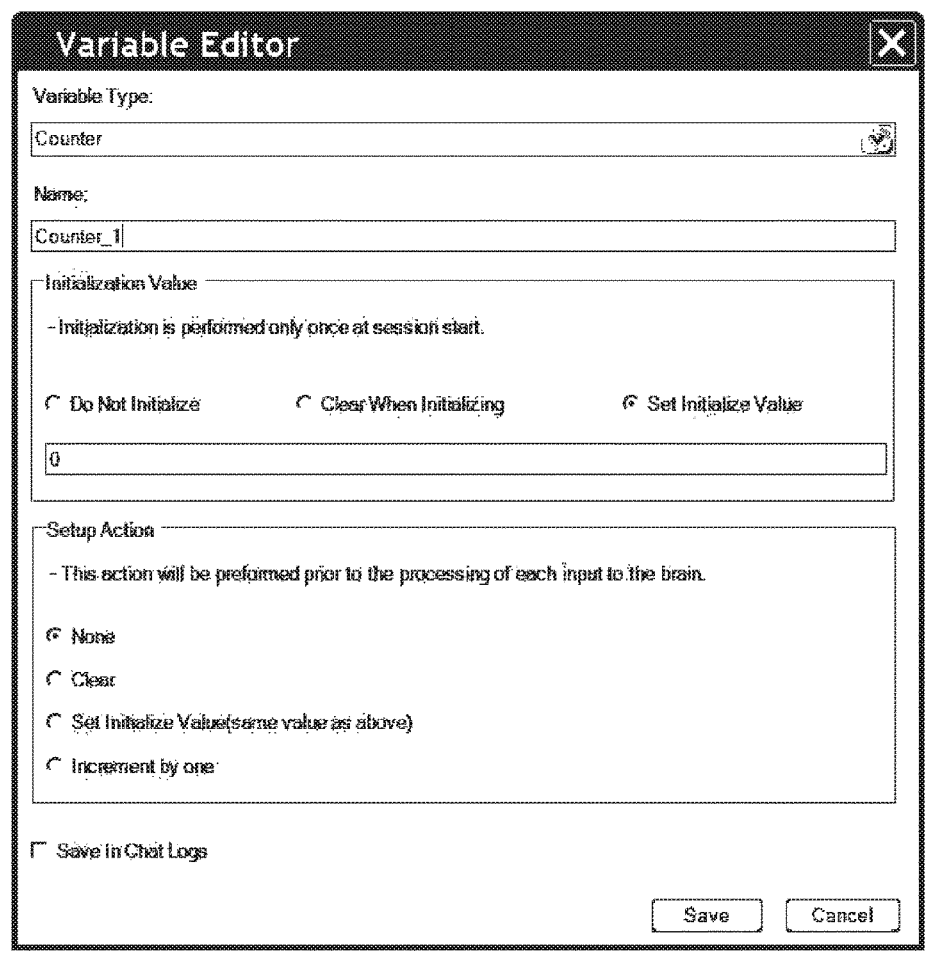

To create variables perform the following procedure in connection with FIG. 88:

1. In Components, select a Variable Type and click <Add> OR right-click on a Variable Type and select Add from the right-click menu.
2. In Variable Editor, select Variable Type from the drop-down-list. Defaults to the Variable Type you were on when you clicked <Add>.

Figure 89:
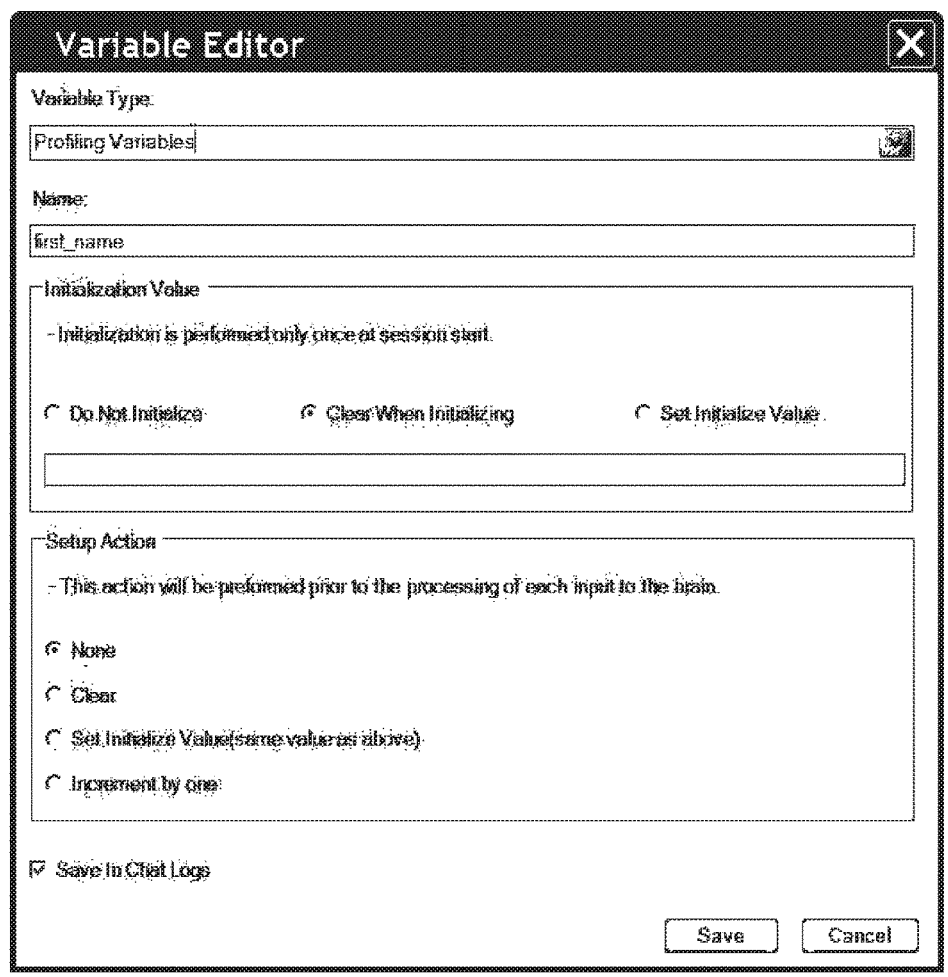

3. Select a Variable Type from the dropdown
4. Type in a Name for the Variable.
5. Select an Initialization Value from one of the radio buttons.
   a. If <Set Initialize Value> is selected, enter a value in the appropriate field.
6. Select a Setup Action from one of the radio buttons.
7. If desired, select Save in Chat Logs. Default is unchecked.
8. Click <Save> to save the Variable and close the window OR click <Cancel> to close the window without saving the Variable To edit variables, perform the following procedure in connection with FIG. 89:
1. In Components, select the desired Variable and click <Edit> OR double-click on the desired Variable OR right-click on the desired Variable and select Edit from the right-click menu.
2. In Variable Editor, make any changes to Variable Type, Name, Initialization Value, Setup Action, or Save in Chat Logs as needed.
3. Click <Save> to close the window and save all changes made OR click <Cancel> to close the window without saving changes.

To delete variables:
1. In Components, select the desired Variable and click <Delete> OR right-click on the desired Variable and select Delete from the right-click menu.
2. In Confirm Delete, click <Yes> to delete the Variable OR click <No> to close the window without deleting the Variable.

Figure 90:
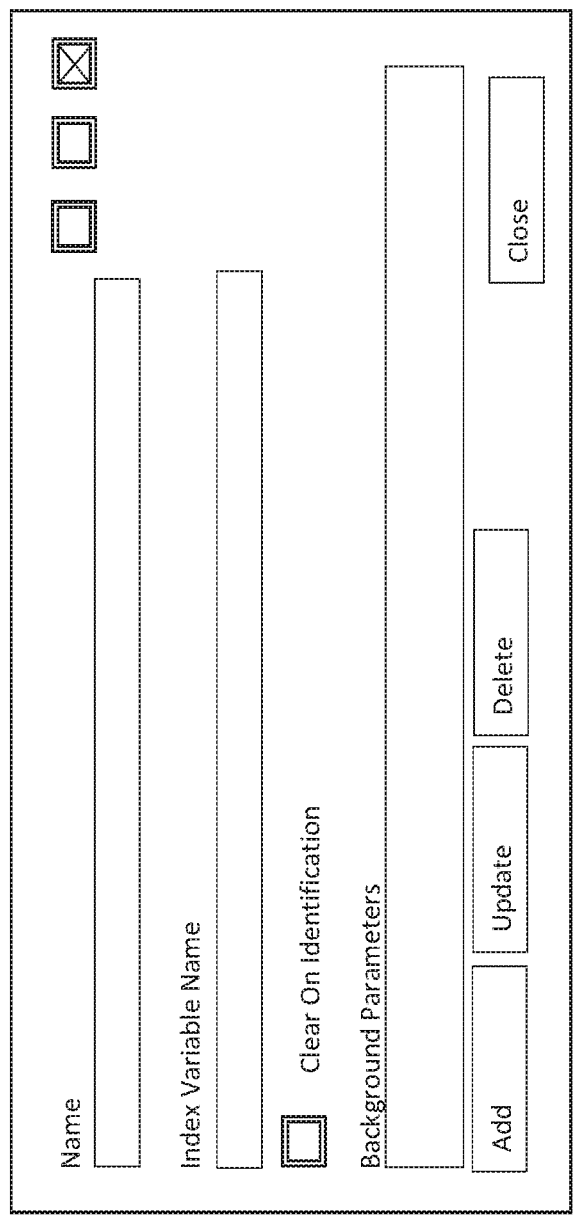

To creating record lists, perform the following procedure in connection with FIG. 90:
1. In Components, select "Record Lists" and click ••"" <Add> OR right-click on "Record Lists" and select Add.
2. In Record List Editor, type in a Name.
3. Type in an Index Variable Name. Note: This must be different from the name of the Record List. A common means of doing this while making the association between the index Variable and Record List clear is to simply type the name of the Record List, followed immediately by "index" Thus, the index Variable for Record List "state" would be "stateindex"
4. Click <Save>.
5. If desired, select Clear on Initialization. If selected, this will set Record List name to "." and set index to "O".
6. Type a desired required parameter in Required Parameters input field.
7. Click <Add>.
8. Repeat steps 6 & 7 as often as desired.
9. When finished, click <Close>.

Figure 91:
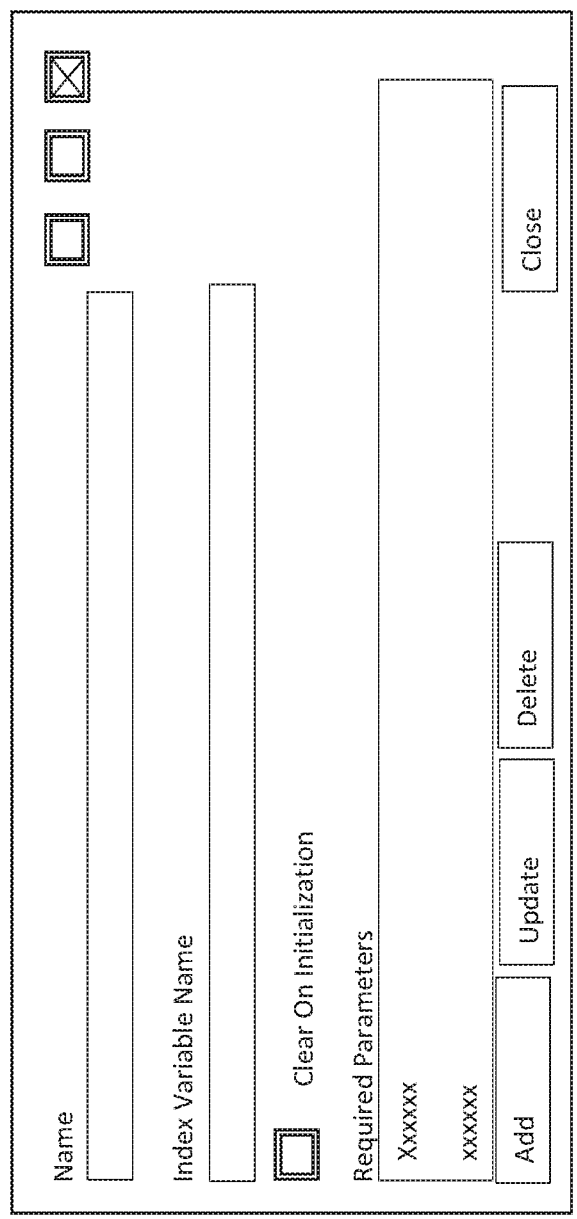

To edit record lists, perform the following procedure in connection with FIG. 91
1. In Components, select the desired Record List and click <Edit> OR double-click on the desired Record List OR right-click on the desired Record List and select Edit.
2. In Record List Editor, make any changes to Name or Index Variable Name desired.
3. Click <Save>.
4. To edit a required parameter:
   a. Select the desired required parameter.
   b. Make any changes in the Required Parameters field.
   c. Click <Update> to make the changes, or click <Delete> to remove the required parameter.
5. When finished, click <Close>.

To deleting record lists, perform the following procedure:
1. In Components, select the desired Record List and click <Delete> OR right-click on the Record List and select Delete from the right-click menu.
2. In Confirm Delete, click <Yes> to delete the Record List from the project OR click <No> to close the window without deleting.

Using Variables and Record Lists

When Variables and Record Lists are placed in a Concept or Unit, they are assigned a value. This sub-section concerns the assigning of value for Variables and Record Lists.

Figure 92:
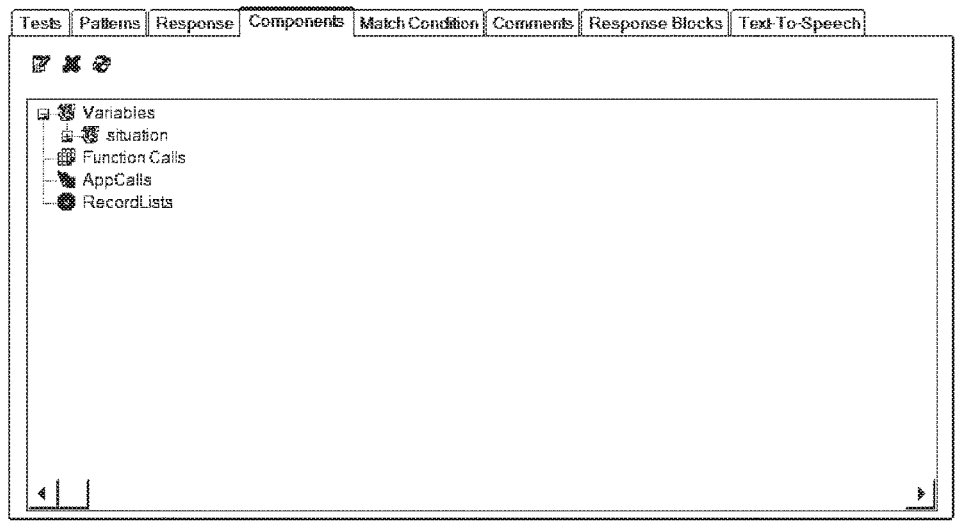
Figure 93:
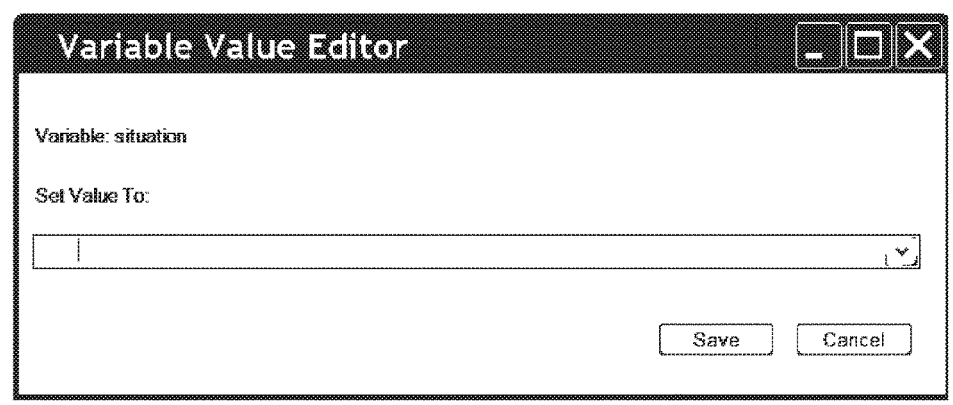

To set variables in concepts and units, perform the following procedure:
1. Open the desired Unit or Concept in the appropriate tab.
2. Select Advanced View.
3. Open Components as shown in FIG. 92.
4. Drag the desired Variable from Components to the tab.
5. In Variable Value Editor, as shown in FIG. 93, type in the desired value in the Set Value To field. This value will henceforth be available for all other Variables in the drop-down list.
6. When finished, click <Save> to close the window and save the Variable OR click <Cancel> to close the window without saving the Variable.
7.

To remove variables from concepts and units, perform the following procedure:
1. Open the Concept or Unit in question in the appropriate tab.
2. Select Advanced Tabs
3. Open Components.
4. Select the Variable in question and click <Delete> OR right-click on the Variable in question and select Delete from the right-click menu.
5. In Confirm Remove Variable, click <Yes> to remove the Variable from the Concept or Unit OR click <No> to close the window without removing the Variable.

Figure 94:
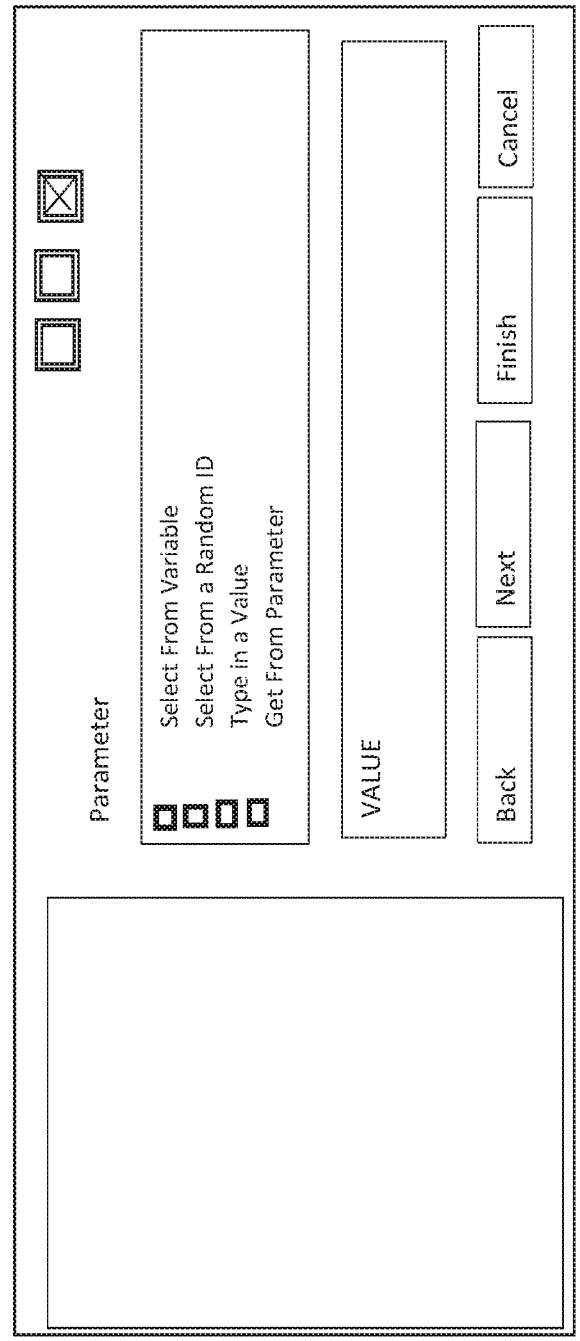

To set record lists in concepts and units, perform the following procedure in connection with FIG. 94:
1. Open the Concept or Unit in the appropriate tab.
2. Select Advanced View.
3. Open Components.
4. Drag and drop the desired Record List from Components into Components.
5. In Configure Record List, select the Parameter Value Type from the radio buttons for each parameter.
6. Select a Value from the drop-down list.
7. Click <Next>.
8. Repeat steps 5-7 for each parameter.
9. When finished, click <Finish> to close the window and add the Record List to the Concept or Unit OR click <Cancel> to close the window without setting values for the Record List.

To removing a record list from a concept or unit, perform the following procedure:
1. Open the Concept or Unit in the appropriate tab.
2. Select Advanced View.
3. Open Components.
4. Select the Record List in question and click <Delete> OR right-click on the Record List and select Delete from the right-click menu.
5. In Confirm Remove Record List, click <Yes> to remove the Record List from the Concept or Unit OR click <No> to close the window without removing the Record List.

Advanced Vocabulary

Advanced vocabulary refers to items that may be used to add greater flexibility to Concepts and Units, as well as discern the differences between various types of inputs. This section describes Variables, lex types, Wild Cards, and input files.

Lex Types

Lex types classify user inputs to further specify what is to be matched. Lex types function as placeholders that determine the type of input that is recognized. For instance, lex types are used to differentiate between numerical inputs and word inputs, or between units of weight and units of distance.

Figure 95:
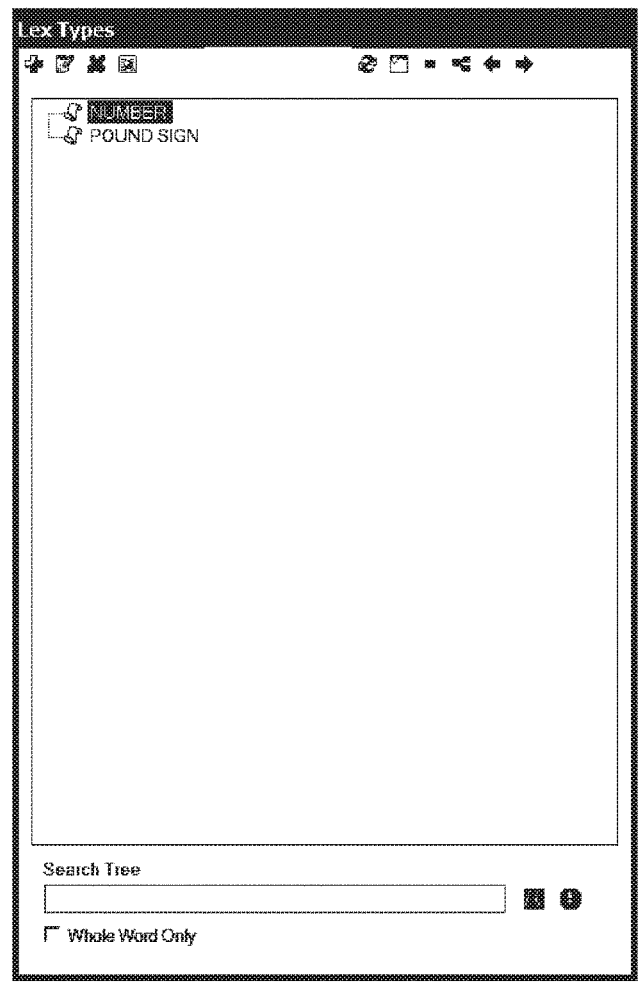

Lex Types includes a dockable window, shown in FIG. 95, which provides the user with a means by which lex types may be created, edited, and deleted. Lex Types contains the following components:

| Component | Description |
| --- | --- |
| Button bar | The button bar contains the following:<br><Add>: Adds a new lex type.<br><Edit>: Opens Lex Builder with selected lex type loaded.<br><Delete>: Deletes selected lex type.<br><Show Dependencies>: Shows all Concepts in which the selected lex type appears.<br><Refresh>: Reloads the Lex Types display list.<br><New Window>: Opens a copy of the current window.<br><Collapse All> Collapses entire tree.<br><Expand All> Expands entire tree.<br><Back and Forward Navigation>: Navigates between searches. |
| Lex Types | Displays available lex types, represented thusly:<br>Lex type |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 96:
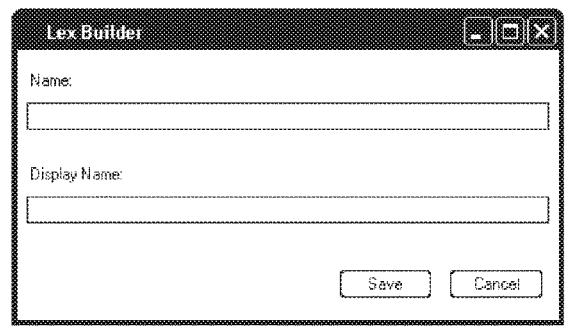

Lex files are static files that are edited manually using a text editor or the Editor tab. They may be added to a project through the lab by means of a Lex Builder component. A Lex Builder window is shown in FIG. 96 and includes the following components.

| Component | Description |
| --- | --- |
| Name | Input field for lex type name |
| Display Name | Input field for display name of lex type. |
| <Save> | Saves lex type to project. |
| <Cancel> | Closes window without saving lex type to project. |

Wild Cards are place-holders that allow the user to create more flexible input patterns for Concepts. A Wild Card is placed between two Vocab Terms to indicate that there may be any words in between the Vocab Terms. There are three Wild Cards, and they are applicable to all projects:

Match Any: this Wild Card can hold the place of zero or more words.

Match One: This wildcard holds the place of one and only one unspecified word in a pattern.

Match One or More: This Wild Card holds the place of one or more words.

Figure 97:
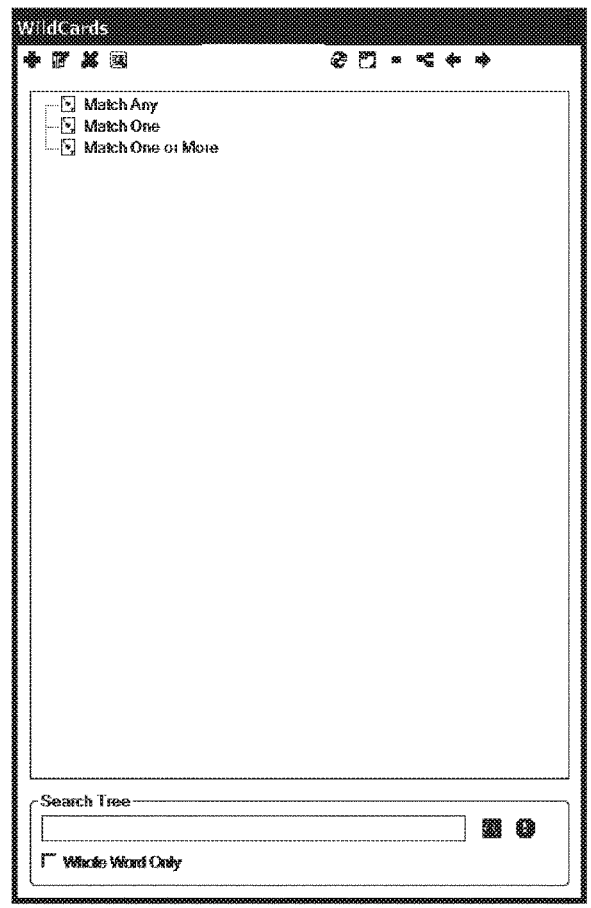

Wild cards includes a dockable window shown in FIG. 97 and includes the following components.

| Component | Description |
| --- | --- |
| Button Bar | The button bar contains the following:<br><Add>: Adds new Wild Card. Note: While it is theoretically possible to add a new Wild Card, the existing ones are all that are needed.<br><Edit>: Edits selected Wild Card. Note: Do not do this without consultation of development team.<br><Delete>: Deletes selected Wild Card. Note: Do not do this without consultation of development team.<br><Show Dependencies>: Dependencies are not supported for Wild Cards.<br><Reload>: Refreshes Wild Cards display.<br><New Window>: Opens copy of current window.<br><Collapse All> Collapses entire tree.<br><Expand All> Expands entire tree.<br><Back and Forward Navigation>: Navigates between searches. |
| Wild Cards | Displays all available Wild Cards, which are indicated thusly:<br>Wild Card |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 98:
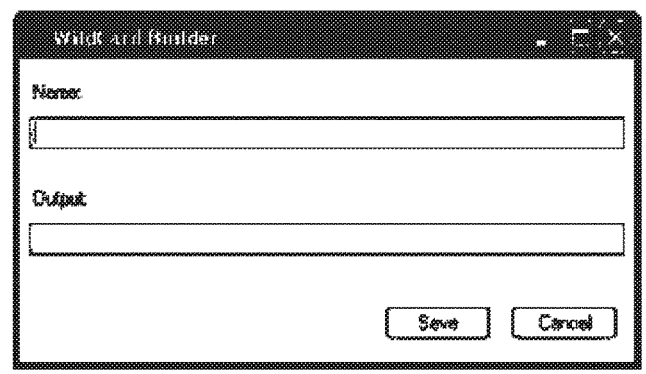

The Wild Card Builder, shown in FIG. 98, allows the user to create and edit a Wild Card's settings and has the following components.

| Component | Description |
| --- | --- |
| Name | Wild Card name |
| Output | The symbol used to indicate Wild Cards presence in match data.<br>Match All: [*]<br>Match One or More: [+]<br>Match One: [.] |
| <Save> | Saves Wild Card. |
| <Cancel> | Closes window without saving Wild Card. |

Input Files are lists of words in a text file (*.txt). They are used as substitutes for large groups of words, such as names and locations. An Input File can be placed in the pattern for a Concept just like a single Vocab Term. The pattern for the Concept will then trigger if any word in the Input File is hit, much like a Building Block.

Figure 99:
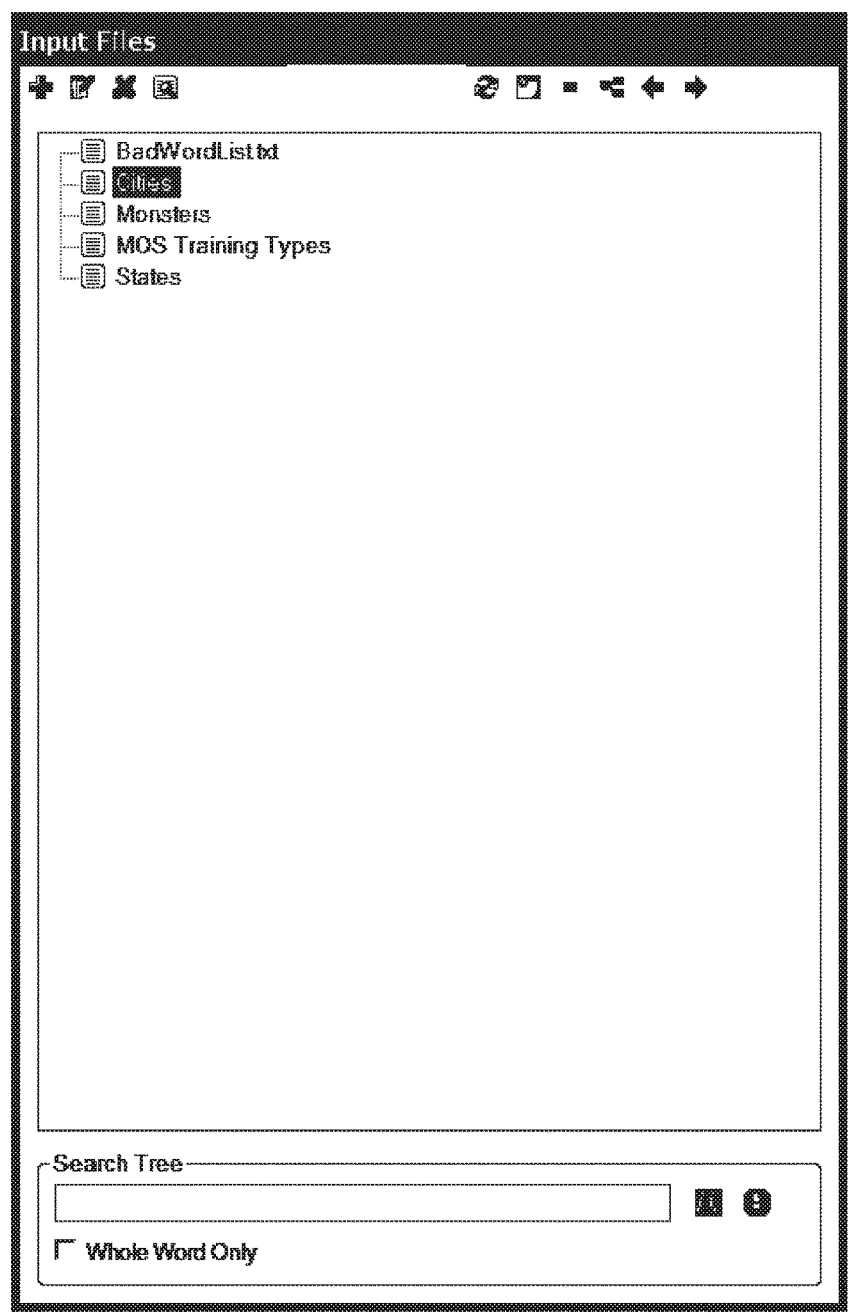

Once an Input File has been created, it can be compared against all Vocab in the KB. Any overlapping words are converted to Vocab in the Input File. In this way, common misspellings can be included if a word has already been assigned to a Vocab Term. Input files are accessed via a dockable window of the same name, illustrated in FIG. 99 and having the following components.

| Component | Description |
| --- | --- |
| Button bar | The button bar contains the following:<br><Add>: Adds new input file.<br><Edit>: Opens Input File Builder with selected input file open.<br><Delete>: Deletes selected input file.<br><Show Dependencies>: Shows all Concepts in which the selected input file appears.<br><Refresh>: Refreshes Input Files display<br><New Window>: Opens copy of current window.<br><Collapse All> Collapses entire tree.<br><Expand All> Expands entire tree.<br><Back and Forward Navigation>: Navigates between searches. |
| Input Files | Displays all available input files for the project thusly:<br>Input File |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

Figure 100:
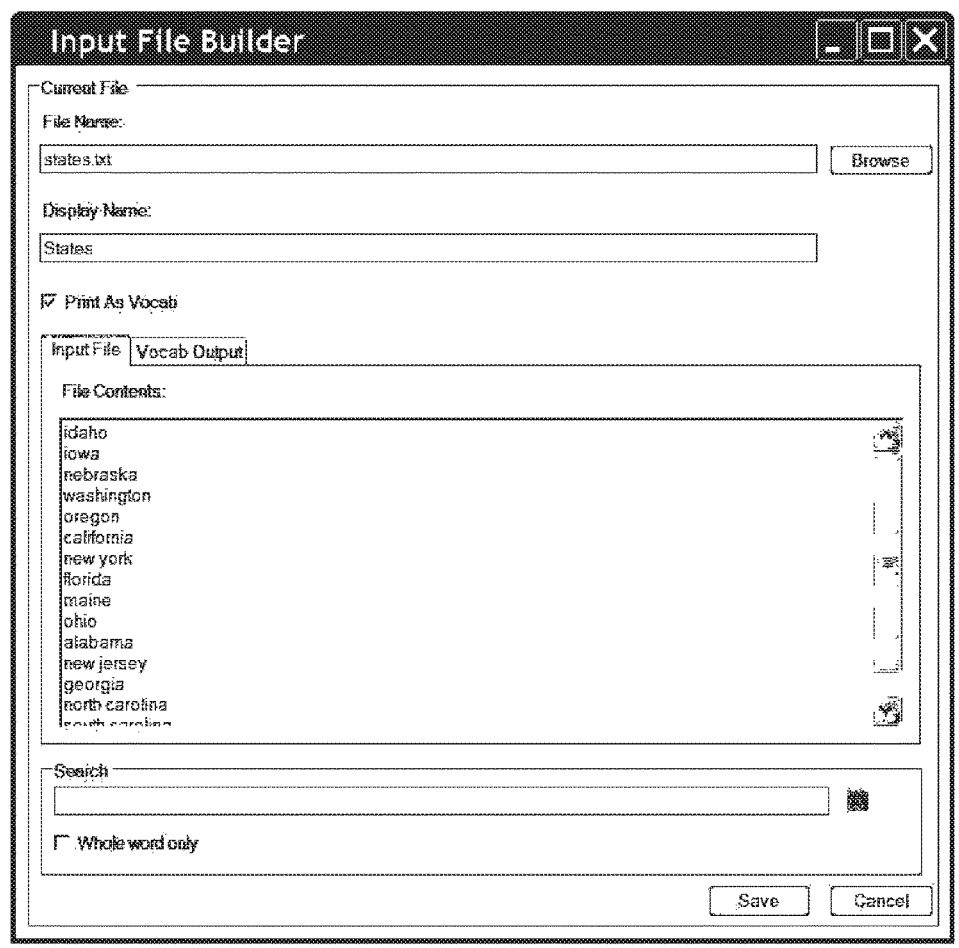

Input File Builder, shown in FIG. 100, is used to create and edit input files. Each word or phrase should be on its own line of the text file. Input File Builder has the following components.

| Component | Description |
| --- | --- |
| File Name | Text input field for the file name.<br><Browse>: Allows user to browse for existing text file. |
| Display Name | Name as it appears in the Active Lab. |
| Print As Vocab checkbox | Check to enable contents of the Input File to be generated as Vocab. |
| Input File tab | Enter words and phrases here. One per line. |
| Vocab Output tab | Input File is converted to existing Vocab here. This tab contains the following:<br><Create Vocab Output>: replaces entries with Vocab Terms if they exist and displays the results in the Vocab Output field.<br><Save Output>: Opens Browse window to save the Vocab output.<br>Vocab Results display: shows the Input File contents after <Create Vocab Output> has been pressed. |
| Search Tree | This field is used to:<br>Allows user to search for specific text in the input file tree.<br><Search>: Executes search.<br>Whole Word Only Checkbox: Limits search to complete word matches. |
| <Save> | Saves input file. |
| <Cancel> | Closes Input File Builder without saving additions. |

The next section deals with the procedures involved in managing lex types and input files. As mentioned above, lex types are created as part of the overall lex file, which is created manually by the administrator.

To add a lex type to a project, use the following procedure. Note that corresponding FPML must be manually entered into the static file *.lex before this will have any affect.

In Lex Types, click <Add> OR right click anywhere in the window to open a right-click menu and select Add.

Figure 101:
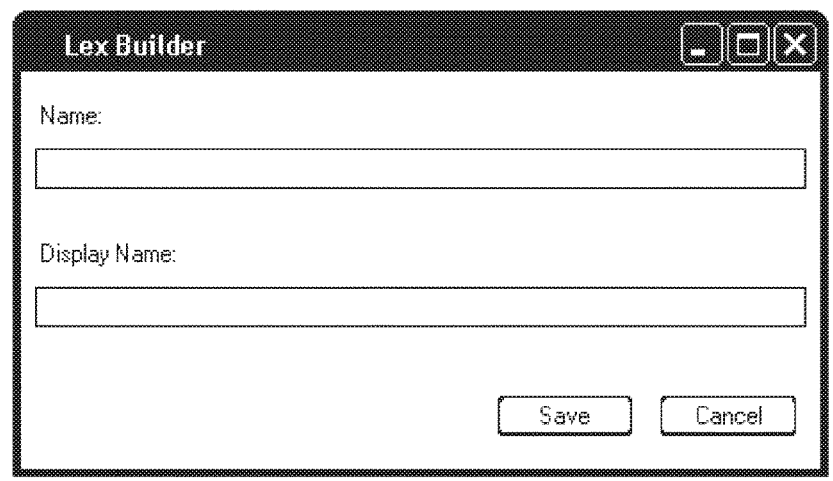

In the Name field (FIG. 101), input the name of the desired lex type.

Type the desired Display Name in the appropriate field. While this name may be any name, it would be best to stick to a name that accurately represents the lex type's function.

Click <Save> to close Lex Builder and add the lex type to the project OR click <Cancel> to close the window without adding the lex type to the project.

Figure 102:
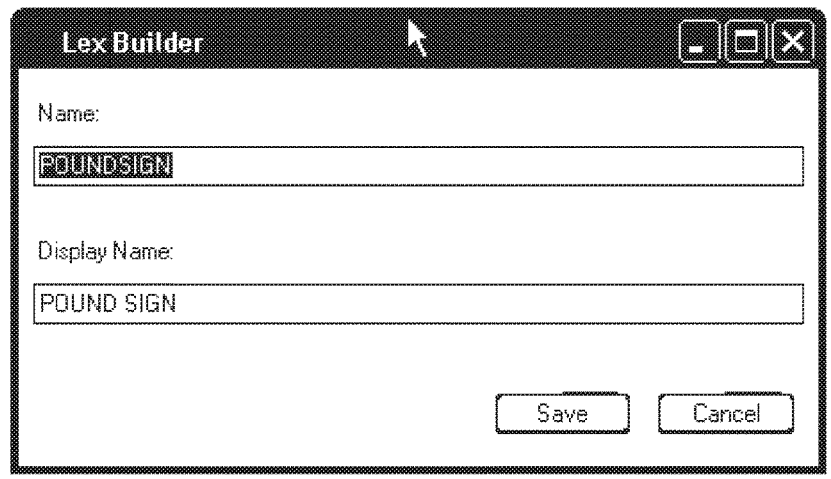

To edit lex types, use the following procedure in connection with FIG. 102:
1. In Lex Types, double-click on the desired lex type OR select the desired lex type and click <Edit> OR right-click on the desired item to open a right-click menu and select Edit.
2. Make any changes desired to the Name and/or Display Name fields.
3. Click <Save> to close the window and save changes OR click <Cancel> to close the window without saving.

Lex types may be added to the input patterns of Concepts just like any other form of vocabulary. To do so, use the following procedure:
1. Open the desired Concept in Concept Editor.
2. Select Patterns.
3. Create an input pattern OR open a previously existing input pattern.
4. In Lex Types, drag the desired lex type into the desired pattern.
5. Make any desired changes to Position, Order and Proximity.
6. Click <Save>.

To delete a lex type from a project, use the following procedure:
1. In Lex Types, select the desired file and click <Delete> OR right-click on the desired file to open a right-click menu and select Delete.
2. In the Confirm Delete dialogue, click <OK> to delete the file OR click <Cancel> to close the dialogue without deleting the lex type.

Managing Wild Cards

This sub-section deals with creating, editing, and adding Wild Cards to Concepts.

In one or more embodiments, Wild Cards are created by the administrator only. To add a Wild Card to a Concept input pattern, use the following procedure:
1. In the Wild Cards dockable window, click and drag the desired Wild Card into an input pattern in the Concepts Patterns tab.
2. Change the order of the input pattern as desired.
3. Make any changes to Position, Order, and Proximity selections as desired.
4. Click <Save>

Input files are manipulated primarily through Input Files. This sub-section outlines the procedures involved in creating, editing, and deleting input files.

Creating Input Files
1. In Input Files, click <Add> OR right-click in the window and select Add from the right-click menu.

Figure 103:
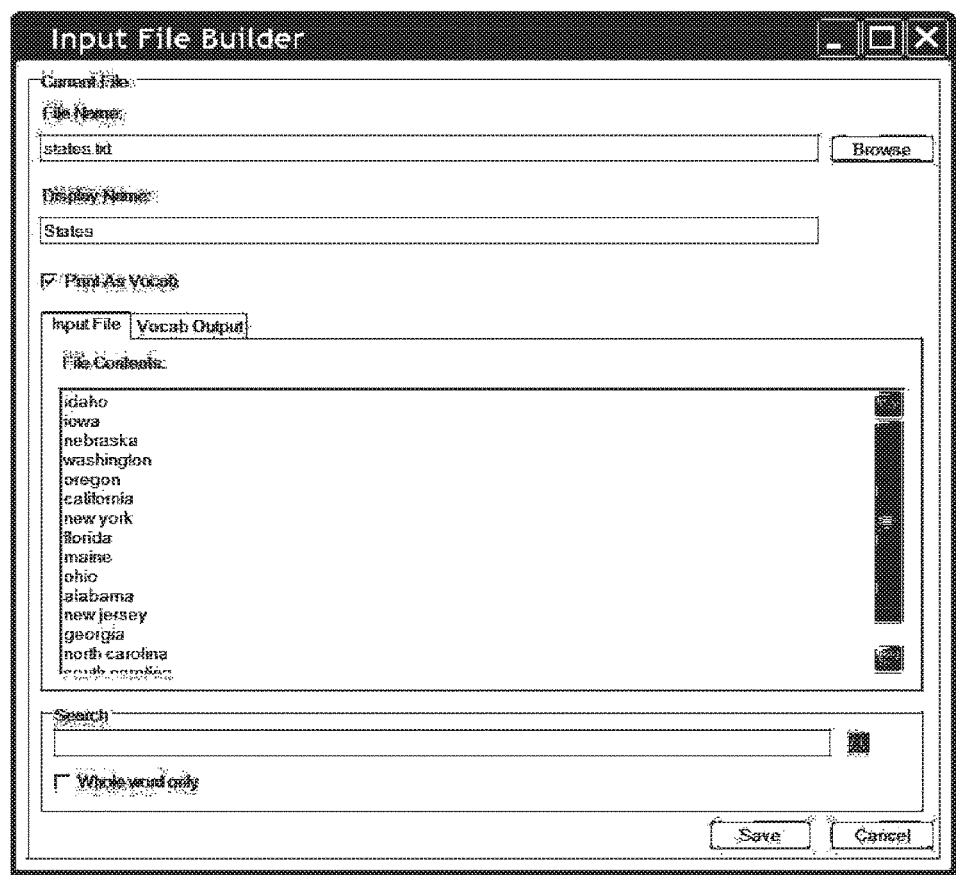

2. In Input File Builder (FIG. 103), type a file name into the File Name field OR browse for an existing file using <Browse>. Note: the File Name must end with the file extension *.txt.
3. Enter desired word or phrase on one line in File Contents. Repeat as often as desired.
4. Select Vocab Output tab, or skip to step 8.
5. Select <Create Vocab Output>.
6. Review Vocab Results to ensure proper results.
7. Click <Save Output>. This will open a Browse window to select a name and location of the output file.
8. Click <Save>.

Editing Input Files
1. Double-click on the desired input file in Input Files OR right-click on the desired input file and select Edit from the right-click menu.
2. Make any changes desired in Input File Builder and click <Save> OR click <Cancel> to close the window without saving changes.
3. Select Vocab Output tab, or skip to step 6.
4. Select <Create Vocab Output>.
5. Review Vocab Results to ensure proper results.
6. Click <Save Output>. This will open a Browse window to select a name and location of the output file.

Adding Input Files to Concepts
1. Open the desired Concept in Concept Editor.
2. Open Patterns.
3. Create a blank input pattern by clicking <Add>.
4. In Input Files, select the desired input file.
5. Drag the desired input file from Input Files to the blank input pattern.
6. Add any desired Vocab Terms, Helper Terms, or Building Blocks.
7. Make any changes to Position, Order, and Proximity.
8. Click Save>

Deleting Input Files
1. In Input Files, select the desired Input File and click <Delete> OR right-click on the input file and select Delete in the right-click menu.
2. In the Confirm Delete box, select <OK> to delete the input file from the project OR click <Cancel> to close the box without deleting.

Advanced Response Items

This section deals with advanced response items, specifically Dynamic Functions, AppCalls, Conditional Statements and Response Blocks. All of these items are used primarily, though not exclusively, in response-related capacities.

This section examines the principles behind Conditional Statements, AppCalls, Response Blocks, and Dynamic Functions.

Conditional Statements

Conditional statements represent the necessary prerequisites for a specific action being taken. They are used in Response Blocks and often for data-mining operations. In such situations, the conditional statement is a pre-established Variable value. The value of this Variable will then determine the way in which a Unit that contains the given Response Block functions. For instance, a Unit might respond differently based upon whether the user registers as male or female. The user's gender thus functions as the pre-condition of the Response Block.

Components Window

Figure 104:
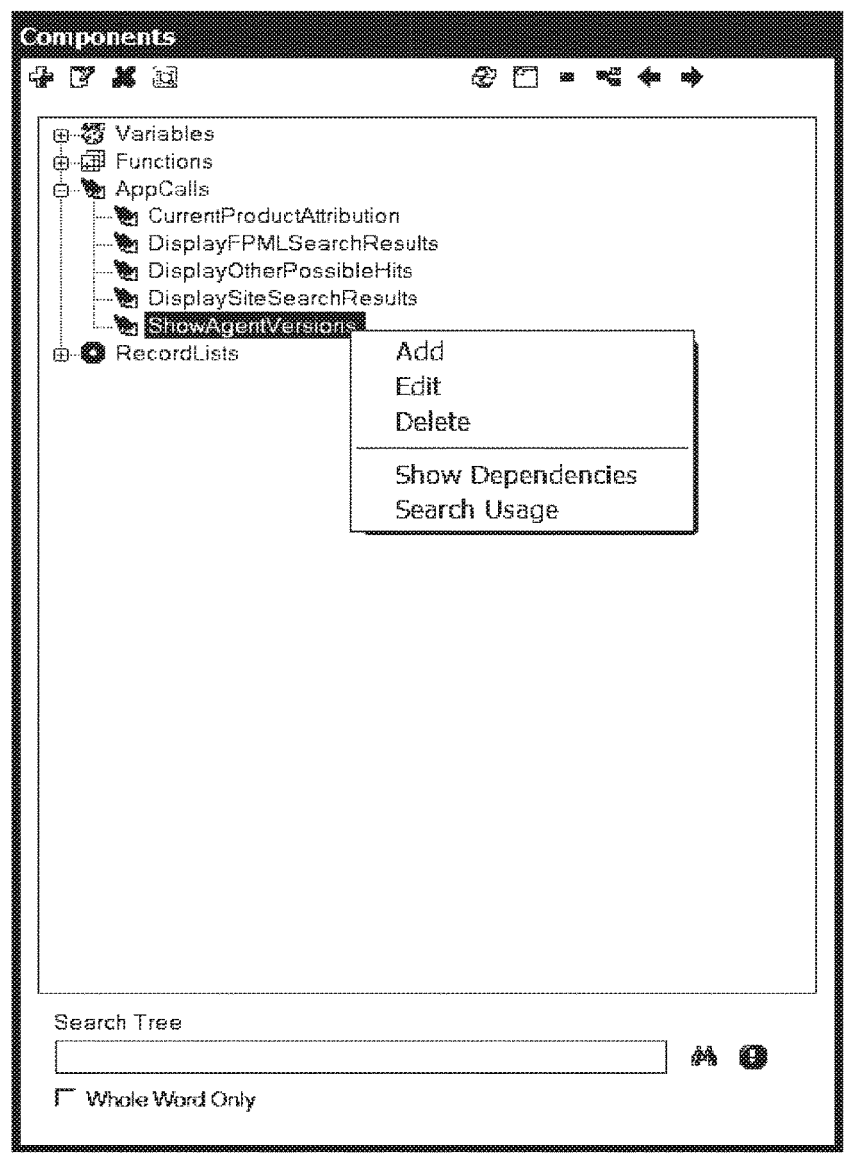

AppCalls are accessed via Components (FIG. 104), along with the previously mentioned Variables and Record Lists. Components contains the following AppCall-related components.

| Component | Description |
| --- | --- |
| Button bar | The button bar contains the following:<br><Add>, Add: Creates new AppCall.<br><Edit>, Edit: Opens AppCall Editor with selected AppCall open.<br><Delete>, Delete: Deletes selected AppCall from project.<br><Show Dependencies>, Show Dependencies: Shows all Units and Concepts in which the selected AppCall appears.<br><Refresh>: Refreshes Components display.<br><New Window>: Opens copy of current window.<br><Collapse All> Collapses entire tree.<br><Expand All> Expands entire tree.<br><Back and Forward Navigation>: Navigates between searches. |
| Components display | Display list of all available components. AppCalls are listed thusly:<br>AppCalls |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |
| Right-click menu → | This right-click menu contains the following:<br>→ Add: Creates new AppCall.<br>→ Edit: Opens AppCall Editor for the selected AppCall.<br>→ Delete: Deletes selected AppCall from project.<br>→ show Dependencies: Opens Show Dependencies window for selected AppCall.<br>Search Usage: Opens Search Usage window. |

AppCalls

AppCalls, short for "Application Calls," are a form of response wherein an external application is used. For example, a Unit might have an AppCall that opens a new program or fills out a form when triggered.

The AppCall consists of two parts. The first is the call to the outside application.

The second part of an AppCall is to define what parameters (ex: the value of a Variable) needs to be passed along with the AppCall.

Figure 105:
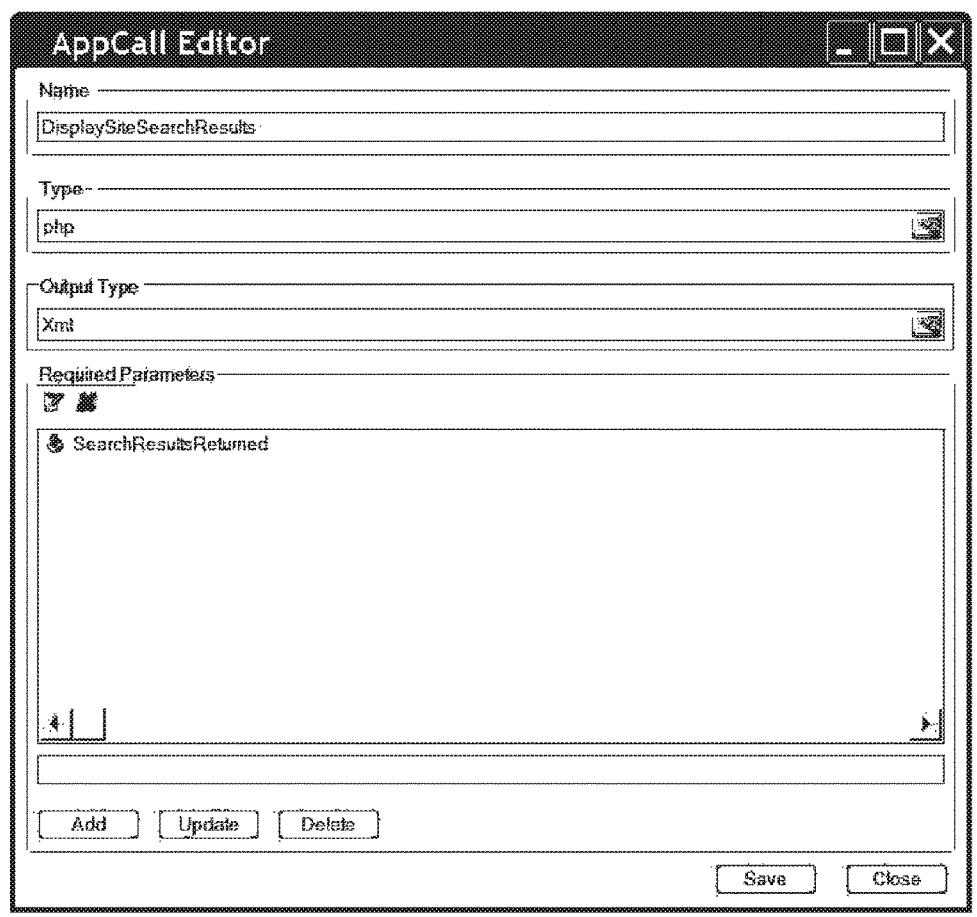

AppCall Editor (FIG. 105) contains the following components:

| Component | Description |
| --- | --- |
| Name | Text field that contains the name of the AppCall |
| Type | Drop-down that gives options for the type of AppCall. Select Php if generating FPML for ActiveAgent, the remaining if used for that corresponding product. |
| Output Type | Drop-down that gives options for the type of output for the AppCall.<br>Standard: For products other than ActiveAgent or older versions of ActiveAgent. |

| Component | Description |
| --- | --- |
| Required Parameters | Xml: For all current ActiveAgent products. Parameters are placeholders for data that will be passed to an external application. This field contains the following:<br>    <Edit>: Edits selected required parameter.<br>    <Delete>: Deletes selected required parameter.<br>Display: List of all required parameters in AppCall.<br>Text input field: Input required parameters here.<br>    <Add>: Adds input to Required Parameters display.<br>    <Update>: Updates input.<br>    <Delete>: Deletes selected required parameter. |
| <Save> | Adds AppCall to Components. |
| <Close> | Closes window. |

Configure AppCall Window

Figure 106:
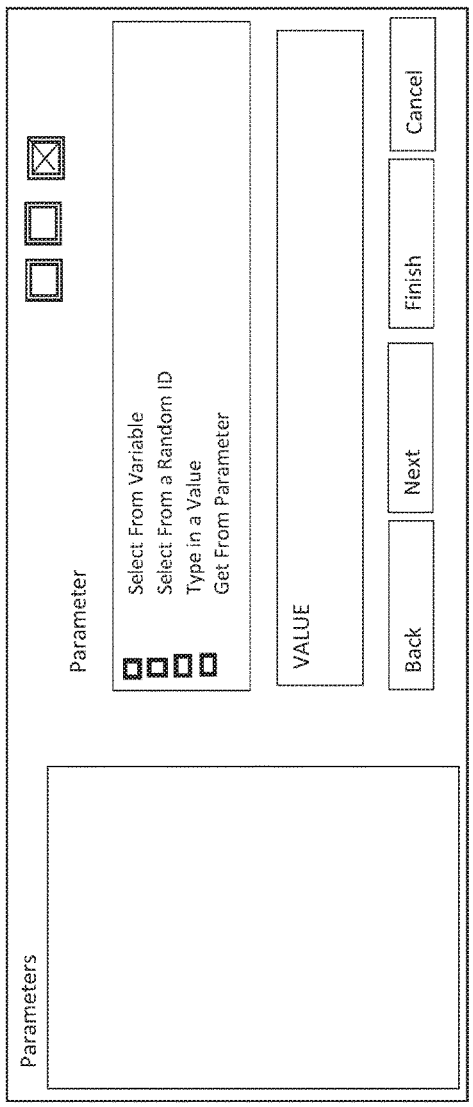

The Configure AppCall window (FIG. 106) will appear when a particular AppCall is brought into a Unit and contains the following components.

| Component | Description |
| --- | --- |
| Parameters<br><Set Parameter Value Type> radio selection | List of all available parameters.<br>Specifies what information is sent with the AppCall. Choose from the following:<br>    <Select From a Variable>: Sets parameter as a pre-assigned Variable<br>    <Select From a Record List>: Sets the parameter to a previously assigned Record List.<br>    <Type In a Value>: Sets the parameter to a manually-typed value<br>    <Set From Pattern>: In general, this option is not used. Sets the parameter to one of the following from an input pattern:<br>        wild-card<br>        lex type<br>        Input File |
| Value | Value for parameter. |
| <Back> | Previous parameter. |
| <Next> | Next parameter. |
| <Finish> | Closes window with changes saved. |
| <Cancel> | Closes window without saving changes. |

Search AppCall Usage

Figure 107:
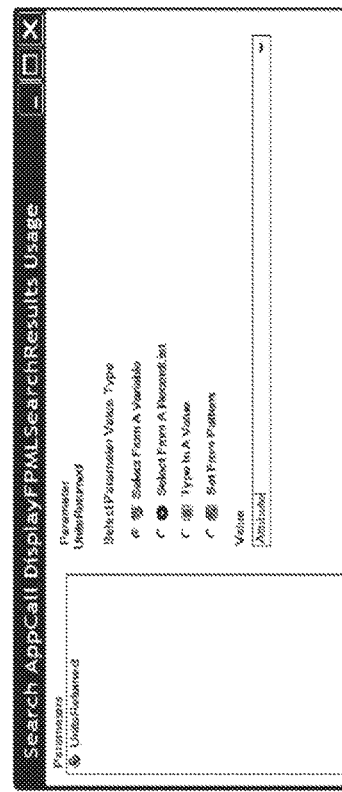

The Search AppCall Usage window (FIG. 107) is accessible exclusively through the right-click menu on the Components dockable window. This window allows the user to search for all uses of an AppCall and a particular associated parameter. This window has the following components.

| Component | Description |
| --- | --- |
| Parameters<br><Set Parameter Value Type> radio selection | List of all available parameters.<br>Choose from the following:<br>    <Select From a Variable>: Sets parameter as a pre-assigned Variable<br>    <Select From a Record List>: Sets the parameter to a previously assigned Record List.<br>    <Type In a Value>: Sets the parameter to a manually-typed value<br>    <Set From Pattern>: Sets the parameter to one of the following from an input pattern:<br>        wild-card<br>        lex type<br>        Input File |
| Value | Value for parameter. |
| <Search> | Searches for all Concepts and Units that use the AppCall with selected parameters. |
| <Cancel> | Closes window. |

Response Blocks

Response Blocks are responses that are shared by multiple Units, which may or may not have other additional response features, such as AppCalls, Dynamic Functions, or Record Lists, which coincide. Response Blocks are also used when more control over the print order of the Unit is desired. They also provide a means of data-mining when combined with dynamic functions. Response Blocks may be added to both Concepts and Units by means of dragging and dropping them into the Response Blocks tab.

Figure 108:
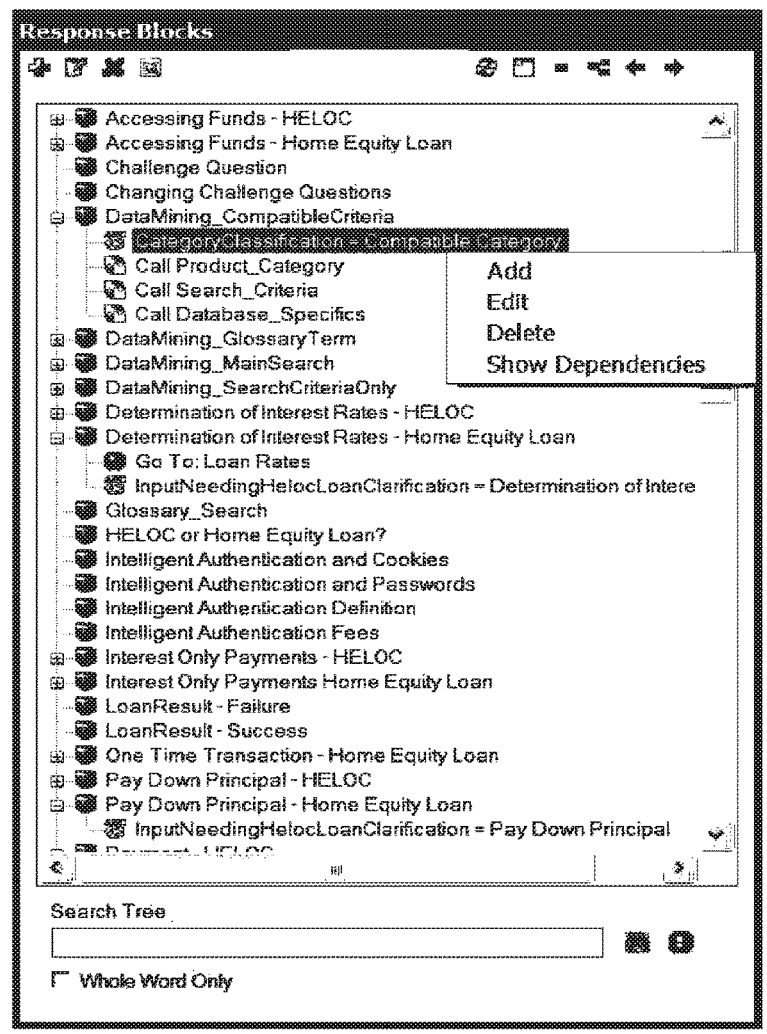

Response Blocks Dockable Window, shown in FIG. 108, has the following components.

| Component | Description |
| --- | --- |
| Button bar | The button bar contains the following:<br>    <Add>: Adds new Response Block.<br>    <Edit>: Opens selected Response Block for editing.<br>    <Delete>: Deletes selected Response Block.<br>    <Show Dependencies>: Shows all Concepts and Units in which selected Response Block appears.<br>    <Refresh>: Refreshes Response Blocks display<br>    <New Window>: Opens copy of current window.<br>    <Collapse All> Collapses entire tree.<br>    <Expand All> Expands entire tree.<br>    <Back and Forward Navigation>: Navigates between searches. |
| Response Blocks | Display of all available Response Blocks and their dynamic functions, listed thusly:<br>Response Block<br>    Call item: Dynamic Function<br>    Call item: Variable<br>    Call item: Url<br>    Call item: Clear<br>    Call item: Copy<br>Incomplete Response Block |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |

-continued

| Component | Description |
| --- | --- |
| Right-click menu | This right-click menu contains the following:<br>→ Add: Creates new Response Block.<br>→ Edit: Opens selected Response Block for editing..<br>→ Delete: Deletes selected Response Block from project.<br>→ show Dependencies: Opens Show Dependencies window with selected Response Block. |

Figure 109:
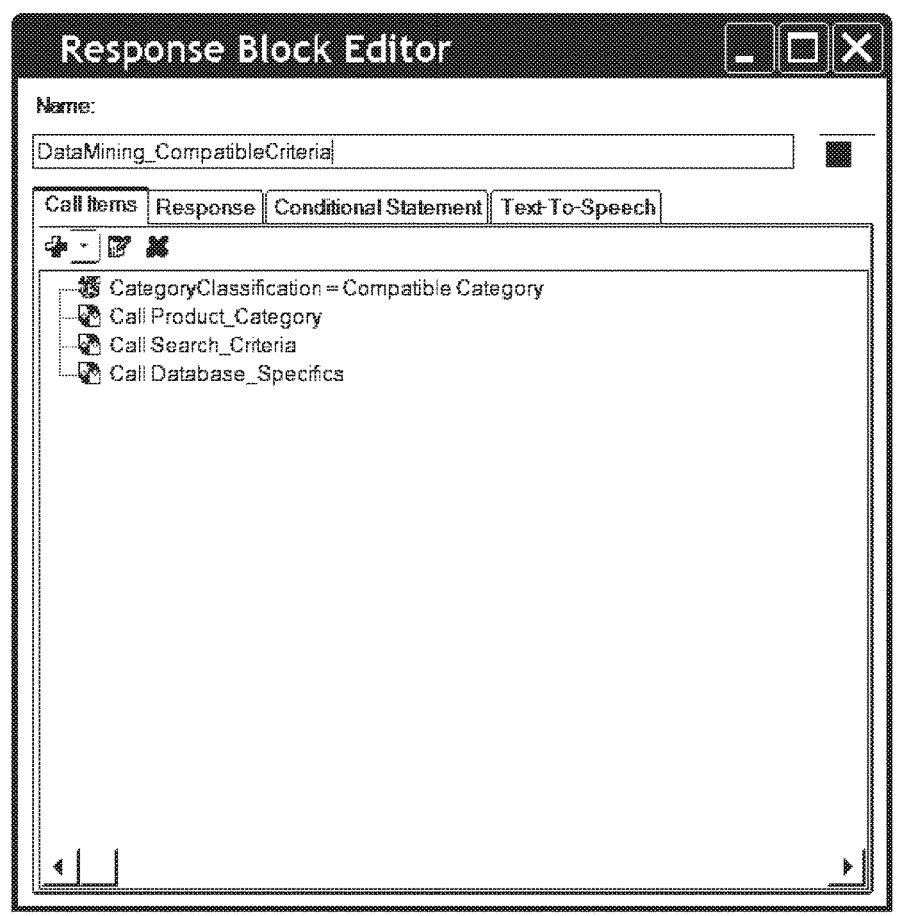

The Response Block Editor window, shown in FIG. 109, includes the following components.

| Component | Description |
| --- | --- |
| Name | Name of Response Block.<br><Save>: Saves Response Block to project. |
| Tabs | The following tabs are found in Response Block Editor:<br>Call Items: Tab that provides access to call items, such as Record Lists and dynamic functions.<br>Response: plain text response or tagged statement.<br>Conditional Statement: Conditional statements.<br>Text To Speech: add a particular Text-To-Speech file. |

The following discussion describes aspects of the tabs of the Response Block Editor window.

Call Items are Record Lists, AppCalls, Variables, and dynamic functions that are used when the Response Block is called. Variables, AppCalls, and Record lists are set to the value listed here, similar to the Components tab in the Unit Editor. Call Items contains the following components:

| Component | Description |
| --- | --- |
| Button Row | The button row contains the following:<br><Add>: Adds new call item.<br>→ copy Record List Request.<br><Edit>: Edits selected call item.<br><Delete>: Deletes selected call item. |
| Call Items Display | Display of all call items in Response Blocks. |

Response allows the user to set a plain text and/or tagged response associated with the Response Block and includes the following components.

| Component | Description |
| --- | --- |
| <Save> | Saves response input. |
| Response | Either plain text or FPML response. |

Conditional Statement allows the user to associate specific conditional statements with the Response Block and includes the following components.

| Component | Description |
| --- | --- |
| <Add> | Adds a new statement. |
| <Save> | Saves configuration. |
| <Delete> | Deletes statement. |
| <Choose Type> radio selection | Select one of the following:<br>Build Dynamic Statement<br>Type Static Statement |
| Dynamic Statement | This tab allows the user to construct a dynamic statement. It is only available if <Build Dynamic Statement> is selected. It contains the following:<br><Add New Match Condition>: Adds new match condition<br><Edit Match Condition>: Edits selected match condition<br><Delete Match Condition>: Deletes selected match condition.<br>Match Condition: Display of all match condition statements. |
| Static Statement | This tab allows the user to type a static statement, and is only available if the user selects <Type Static Statement>. |

Text-To-Speech allows the user to select a specific Text-To-Speech File for the Response Block. Text-To-Speech includes the following components.

| Component | Description |
| --- | --- |
| Current File | Name of Text-To-Speech file |
| <Browse> | Opens Browse window to select a particular Text-To-Speech file. |
| <Remove> | Remove selected Text-To-Speech file. |
| Status | Displays load information about an added Text-To-Speech file. |

Dynamic Functions

Figure 110:
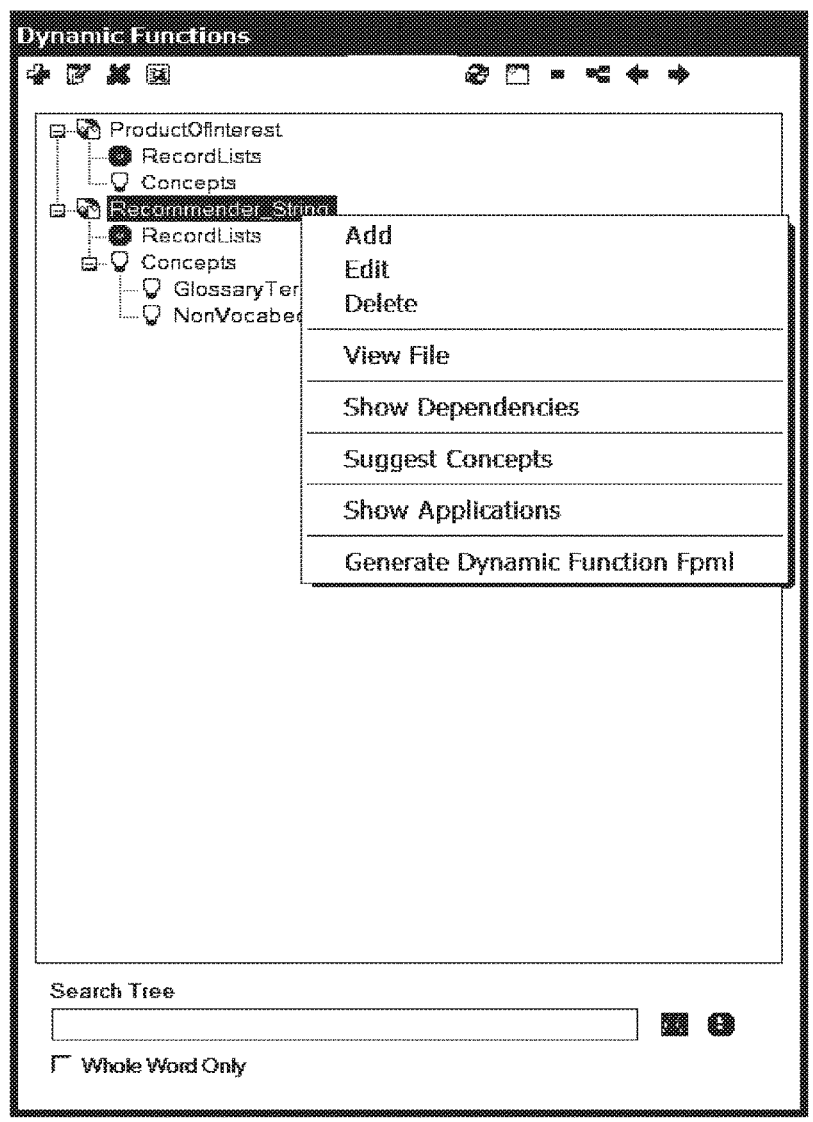

Dynamic functions serve as a means for profiling site users and running searches based upon ranges (such as "cameras between $100 and $200"). They are used in Call Items for Response Blocks. Each dynamic function must reside in its own cascade, which must bear the same name. This cascade must have leveling enabled. Dynamic functions has a dockable window as shown in FIG. 110 and includes the following components.

| Component | Description |
| --- | --- |
| Button bar | The button bar contains the following:<br><Add>: Adds new dynamic function.<br><Edit>: Opens Dynamic Function Editor with selected dynamic function loaded.<br><Delete>: Deletes selected dynamic function.<br><Show Dependencies>: Shows all Concepts in which the selected dynamic function appears. |

| Component | Description |
|---|---|
| | <New Window>: Opens copy of current window.<br><Refresh>: Reloads Dynamic Functions display list.<br><Collapse All> Collapses entire tree.<br><Expand All> Expands entire tree.<br><Back and Forward Navigation>: Navigates between searches. |
| Dynamic Functions display | Displays a list of all dynamic functions available, as well as the Concepts in which they appear, and the Record Lists of which they are components. |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |
| Right-click menu | This right-click menu contains the following:<br>→ Add: Creates new Dynamic Function.<br>→ Edit: Opens selected Dynamic Function for editing..<br>→ Delete: Deletes selected Dynamic Function.<br>→ View File: Opens Dynamic Function in Editor.<br>→ show Dependencies: Opens Show Dependencies window with selected Dynamic Function.<br>→ suggest Concepts: Searches for Concepts containing the Record List used by the Dynamic Function. If the Concept is not used by the Dynamic Function, it is suggested.<br>→ show Applications: Shows all applications that use selected Dynamic Function.<br>→ Generate Fpml For Function: Generates the FPML associated with the selected dynamic function. |

A Dynamic Function Editor, shown in FIG. 111 is provided and includes the following components.

| Component | Description |
|---|---|
| Name | Text input field for the name of the Dynamic Function. |
| Type | Dropdown to assign a Cascade Group Type to the Dynamic Function will belong. There are four options:<br>Dynamic Functions Best Match<br>Dynamic Functions Match All<br>Dynamic Functions Search and Replace<br>Dynamic Functions |
| Cascade Group | The name of the Cascade Group that the Dynamic Function will belong. This is required to be identical to the Name. |
| Lex File | This field contains the following:<br><Load New Lex> Loads new Lex file.<br>Lex file: Drop-down list to select lex file. Default is lex file associated with the open project. |
| Pattern Override | Selecting a Pattern Override will change the Position of the patterns in the Concepts only while the Dynamic Function is processed. The following Positions are available:<br>None<br>Beginning<br>End<br>Entire |
| Print Order | Where the Dynamic Function appears in load order. |
| <Save> | Saves dynamic function. |
| <Cancel> | Closes window without saving. |

Managing Advanced Response Items

This section deals with managing the AppCalls, Response Blocks, and dynamic functions. AppCalls are found in Components. This sub-section deals with the procedures involved in creating, editing, and using AppCalls. Creating new app calls can be performed using the AppCall Editor shown in FIG. 112 using the following procedure:
1. In the Components dockable window, select the AppCalls object.
2. Open the AppCall Editor window.
3. Enter a name for the AppCall in the Name field.
4. Select a Type from the drop-down list.
5. Select an Output Type from the drop-down list.
6. Enter a string of FPML in the Required Parameters field.
7. Click <Add>.
8. Repeat steps 6 & 7 as often as desired.
9. Click <Save>.

To edit AppCalls, perform the following procedure using the AppCall editor of FIG. 112:
1. Double-click on the desired AppCall in Components OR select the desired AppCall and right-click on the desired AppCall and select Edit from the right-click menu.
2. In AppCall Editor, double click on the desired required parameter OR select the desired required parameter and click <Edit> OR right-click the desired required parameter and select Edit from the right-click menu.
3. Make any changes in the Required Parameters field and click <Update> to replace the old required parameter OR click <Add> to add the new form as an additional required parameter.
4. Repeat steps 2 & 3 as often as needed.
5. When finished, click <Close>.

To delete AppCalls, perform the following procedure using the editor of FIG. 112:
1. Select the desired AppCall in Components and click <Delete> OR right-click on the desired AppCall and select Delete from the right-click menu.
2. In the Confirm Delete dialogue, click <Yes> to delete the AppCall OR click <Cancel> to close the dialogue without deleting.

To create new response blocks, perform the following procedure:
1. In Response Blocks, right-click in the window and select Add from the right-click menu.
2. In Response Block Editor, enter a Name and click <Save>.
3. In Call Items, add any desired Dynamic Functions, Record Lists, AppCalls, or Variables by dragging them from their respective dockable window. You may be prompted to set the value the item will have when the Response Block is triggered.

4. In Response, type in the desired response and click <Save>.
5. In Conditional Statement, click <Add>
6. Select <Build Dynamic Statement> or <Type Static Statement>.
   a. If <Build Dynamic Statement> is selected, use the following procedure:
      1. Choose Concatenator from the drop-down list.
      11. Click <Add>.
      111. Set Variables for each operand in Match Condition.
   b. If <Type Static Statement> is selected, use the following procedure:
      i. Type the desired static statement into the Static Statement tab.
7. In Text-To-Speech, select a particular Text-To-Speech by clicking <Browse> if desired.

To edit response blocks, perform the following procedure:
1. In Response Blocks, select the desired Response Block and click <Edit> OR right-click on the desired Response Block and select Edit from the right-click menu. Either of these will open Response Block Editor.
2. Make any changes desired in Call Items, Response, Conditional Statement, and Text-To-Speech desired.

To deleting response blocks, perform the following procedure:
1. In Response Blocks, select the desired Response Block and click <Delete>.
2. In Confirm Delete, click <Yes> to delete the Response Block OR click <No> to close the window without deleting the Response Block.

To create new dynamic functions, perform the following procedure:
1. In Dynamic Functions, click <Add>, opening Dynamic Function Editor.
2. Enter a Name for the new dynamic function. The name entered will be copied into Cascade Group automatically.
3. Select a Type from the drop-down menu.
4. Insure that the proper lex file is loaded.
5. Select a Pattern Override from the drop-down menu.
6. Select a Print Order.
7. Click <Save> to close Dynamic Function Editor and save the dynamic function OR click <Cancel> to close the window without saving.

To edit dynamic functions, perform the following procedure:
1. In Dynamic Functions, select the desired dynamic function and click <Edit> OR double click on the desired dynamic function OR right-click on the desired dynamic function and select Edit from the right-click menu.
2. Make any changes desired in Dynamic Function Editor to the Name, Type, Lex File, Pattern Override, and Print Order.
3. Click <Save> when finished to close the window OR click <cancel> to close the window without saving changes.

To delete dynamic functions, perform the following procedure:
1. In Dynamic Functions select the desired item and click <Delete> OR right-click on the desired dynamic function and select Delete from the right-click menu.
2. In the Confirm Delete dialogue, click <Yes> to delete the dynamic function or <No> to close the dialogue without deleting.

Using Advanced Response Items

Until they are placed in a Concept or Unit, advanced response items are just empty templates that do not actually contain any information, just the form. Like Variables, they must be assigned values in order to function properly.

To call AppCalls from a Concept or Unit, perform the following procedure:
1. Double-click on the desired Concept or Unit in the Concepts or Units dockable window, respectively, to open it in the appropriate tab.
2. In the Concept Editor or Unit Editor, select <Advanced View>.
3. Open the Components advanced tab.
4. Drag the desired AppCall from the Components dockable window to the Components tab.
5. In Configure AppCall, select a Parameter Value Type the first parameter.
6. Select a Value.
7. Click <Next>.
8. Repeat steps 5-7 for each parameter.
9. When finished, click <Finnish> to close the window.

AppCalls may also be manually input into the response of a Unit in the Response tab.

To use response blocks in a concept or unit, perform the following procedure:
1. Open the desired Concept or Unit in its respective tab.
2. Select Advanced View.
3. Open Response Blocks.
4. Drag the desired Response Block from the dockable window to the Concept or Unit.

Response Blocks can also be incorporated into the Concept or Unit by adding it to Wild Cards within any input patterns.

Dynamic Functions are added to Concepts and Units as part of Response Blocks, which are in turn added to Concepts and Units as described above. To add dynamic functions to a concept or unit, perform the following procedure:
1. Open the desired Response Block from Response Blocks.
2. Drag the desired Dynamic Function from its dockable window into the Call Items tab of Response Block Editor.
3. Add the Response Block to the Concept or Unit using the procedures described above.

Testing and Debugging

Testing and its sister function, debugging, are important elements of creating a successful project. To this end, this section will examine both the testing and debugging features of Active Lab.

Details of Tests

Figure 113:
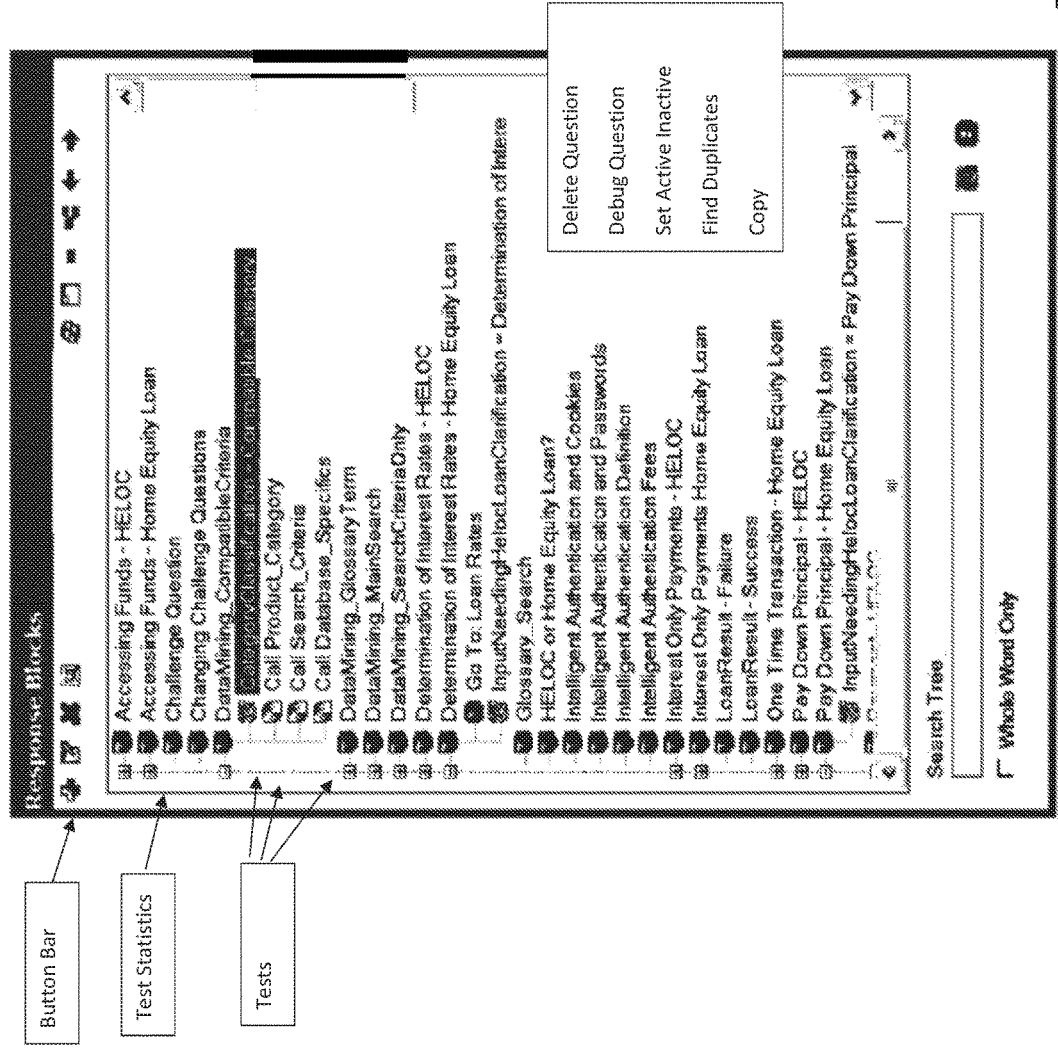

While tests for each Unit and Concept may be found in the respective tabs, it is also possible to view the tests for the entire project in a Tests Tab shown in FIG. 113. This tab displays the results for every single test in the project.

Unit tests are organized by Situation Group, while Concept tests are organized by Concept Group. Each Concept Group and Situation Group may be expanded to view its constituent parts, and each of these in turn may be expanded to view the individual test questions.

As with the tests in individual Units and Concepts, green circles represent success, yellow circles represent a test that did not run, and red circles indicate a failed test. If one test for one Unit or Concept shows up red, the status of the Unit or situation itself will show red, and will in turn lead to a red status for the Situation Group or Concept Group in which it appears. This status is also reflected on the project as a whole. Thus, if so much as one test question in one Concept in the entire project shows red, the entire project will be red. Put simply, the status of any group is only as good as that of its worst constituent.

The Tests Tab contains the following components.

| Component | Description |
|---|---|
| Button bar | The button bar contains the following:<br><Run Tests>: Runs all tests. Note: In order to ensure that the tests are up-to-date, always force generate all FPMLfirst.<br><Reload Tests>: Reloads all tests.<br><Collapse All> Collapses entire tree.<br><Expand All> Expands entire tree.<br><Add>: Adds new test to selected Concept or Unit in Test Editor.<br><Edit>: Edits selected test question in Test Editor.<br><Delete>: Deletes selected test question.<br><Debug Question>: Sends selected question to Debugger, where match data may be viewed.<br><Set Question Active/Inactive>: Toggles question to active or inactive. Default is active. Inactive questions will not be tested, and therefore will not affect the over-all status of the Concept, Unit, or group.<br>Icon shows when tests may not be up to date. |
| Test Statistics | This display shows the percentage passed, along with a ratio of Passed/Non Passed of all Units, Unit Tests, Concepts, and Concept Tests, respectively. |
| Test Selection drop-down list | Selection of tests. Allows user to narrow down the tests to be displayed or run. |
| Search Tree | This field contains the following:<br>Input Text Field: Searches cascades for specific text.<br><Search>: Executes search.<br><Back and Forward Navigation>: Navigates between searches. |
| Right-Click Menu | The right-click menu will change based on whether a Unit, Concept, or test question is selected. In general, it contains the following options:<br>Edit: Opens Test Editor.<br>Delete Question: Deletes selected question.<br>Debug Question: Opens Debugger tab and loads selected question into the debugger.<br>Set Active/Inactive: Toggles status of selected test question between Active and InActive.<br>Find Duplicates: Searches all tests for duplicate of selected question.<br>Copy: Copies selected test question into Windows clipboard. |

Figure 114:
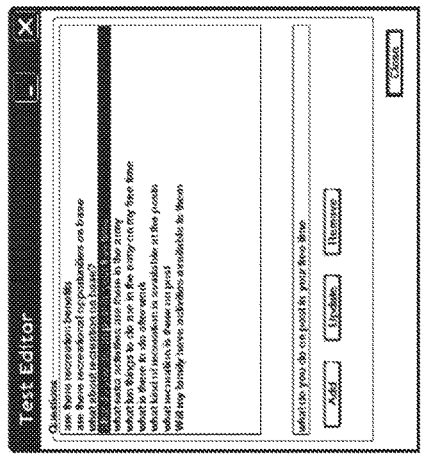

Test Editor, shown in FIG. 114, allows the user to add and edit test questions for a Unit or Concept without opening the respective tab associated with such. Test Editor contains the following components.

| Component | Description |
|---|---|
| Questions | This field contains the following:<br>Display: List of test questions within the Concept or Unit.<br>Text Input Field: Edit and add questions here.<br><Add>: Adds Questions input.<br><Update>: Saves Questions input changes.<br><Remove>: Removes selected question. |

Details of Debugger

The Debugger enables you to validate the FPML to make sure it is syntactically correct. Syntax is only one part of creating FPML. The other is ensuring the right response and action is taken for the right input. The Debugger also allows you to see what response will be given for a given input. To further aid in testing and validating FPML, the Debugger allows entire input scripts to be run in order to verify comprehensive response results.

Figure 115:
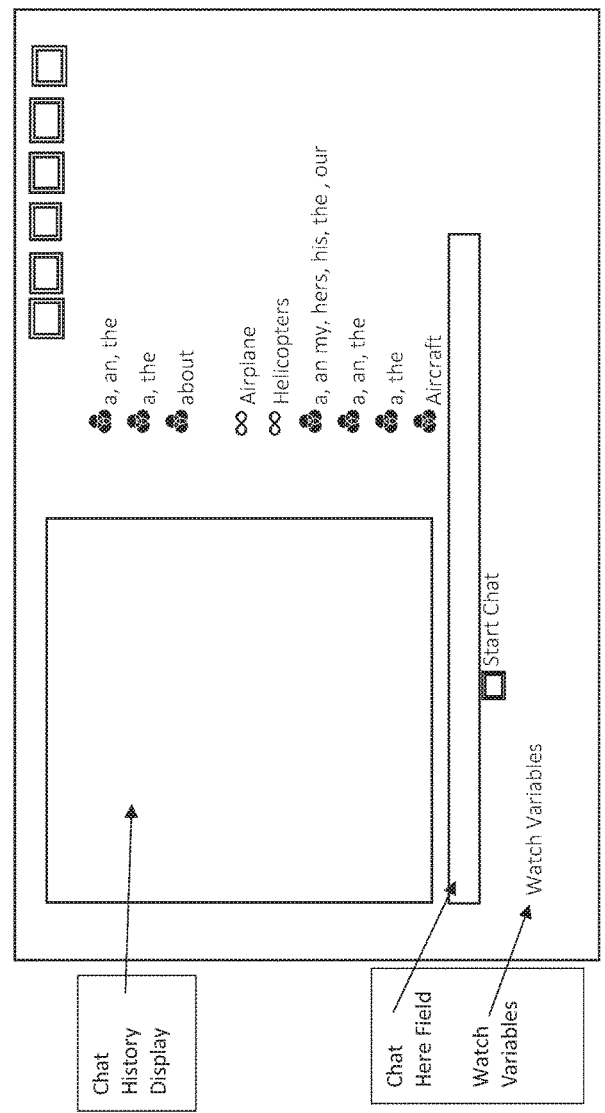

FIG. 115 illustrates the debugger tab which has the following components.

| Component | Description |
|---|---|
| Chat Control dockable window | This window allows the user to interact with the project. Its components are as follows:<br><Reload Debugger's FPML>. Reloads the FPML into the debugger, either the entire project, or just those files that have been altered.<br><Set/Clear Show Lex Types as Type>. When toggled, shows lex types in match data. Default is not toggled.<br>Chat History display. Displays the interaction between user and Agent.<br>Chat Here field. Allows the user to input questions to the Agent as if it were a live person.<br><Send to Chat> button. Sends input from Chat Here field. |
| Match Data | This tab displays the Vocab Terms, Concepts, and Units hit by the user's input in the Chat Here field. This following icons are also used:<br>User Input: displays next to the original user input (also known as the Pre-processed string).<br>Pre-Processed String: displays next to a processed string that will be sent to the next series of Cascades (also known as a Processed string).<br>Hit Concept: Concept that has been triggered by the input.<br>Lower Scoring Concept: Concept that was triggered, but has been eliminated from the Cascade because it did not score as high as another Concept that it was Best Matched with.<br>Lower Scoring Unit: Unit that was triggered, but did not score high enough to give its response. |

-continued

| Component | Description |
| --- | --- |
| | Highest Scoring Unit: Unit that scored the highest, and whose response is therefore used. Score: Displays the score of the Concept or Unit that it is above it. Pattern: Displays the pattern that triggered the Concept or Unit above it. Static File Hit: Displays what line in a Static File that is triggered. This tab also has the following buttons:    <Collapse All>: Collapses entire tree.    <Expand All>: Expands entire tree.    <Find Tied Scores>: Displays in red all scores that tied.    <Copy Debug Data To Another PopUp>: Opens copy of Match Data tab in new window. |
| App Calls | This tab displays all the App Calls that were triggered from the user's input in the Chat Here field, along with their corresponding values. |
| Brain Variables | This tab shows the brain Variables triggered by the user's input in the Chat Here field, along with their corresponding value. |
| Web Page | This tab displays the web page that was triggered from the user's input in the Chat Here field. It also has the following displays:    Web Sever Base Uri field: domain name or Url used to append Urls that written with only the relative path (or path not including a domain).    <Save>: saves Web Server Base Url    FPML Page Variable: displays label of displayed web page. Click link to open Uri Editor.    Current Web Page: displays path for displayed web page. Click link to open web page in new window. |
| FPML Error Message | This tab displays all FPML errors that have recently occurred. It also has one button:    <Clear Error Message>: Clears the FPML Error Message tab. |
| Load Data | This tab displays the load status of all the FPML files in the database to ensure that they are available. Errors appear in red. |
| Raw Match Data | This tab displays the raw FPML code that is used to generate the Unit's response. |
| Watch Variables | This dockable window, normally hidden, displays a list of chosen Variables, as well as their current value. This window also has the following right-click menu:    → Add: Opens a text field to type the name of desired Variable.    → Edit: Edit the name of selected Variable    → Delete: Removes selected Variable from Watch Variables window.    → Clear All: Removes all Variables from the Watch Variables window.    → Copy Record Set Xml to Clipboard: Copies an Xml version of selected Record List to Window clipboard. |

The Debugger is designed to allow users great flexibility in their testing and debugging processes. After a KB has been thoroughly debugged in Active Lab, it is recommended to also test it in the Active Agent application before using it live. The Debugger environment does not replicate the AppCalls, as they are defined in the application using the FPML.

Chat Control

The Chat Control dockable window, usually residing on the left hand side of the Debugger tab, is used to directly ask questions to the Agent.

Anything entered into the Chat Here window will be processed by Active Lab. The response will be displayed in the Chat History window directly above it. The processes that occur to receive that response are displayed in the variety of tabs that appear in the Debugger.

Note: Any time that "Send To Debugger" is selected elsewhere in Active Lab, the Debugger tab is opened and the selected test question in entered into the Chat Here field and processed.

The Match Data Tab

Match Data, as described above, displays the procedure used by the project to trigger the Unit. More specifically, it shows how the pre-processed string is converted into Vocab and Helper Terms, which Concepts are triggered by the Vocab and Helper Terms, then which Units are then triggered by those Concepts.

Here is a breakdown of the pieces of the Match Data:

The User Input entry displays the natural language form of the user's input, also known as the Pre-processed string.

The first Pre-Processed String entry shows the string after it has been processed through the Vocab cascades, but before it is sent to the Concept cascades.

All Concepts that are triggered by the first Modified String will be displayed as a Concept Hit or as a Lower Scoring Concept. The Score of the Concept listed, as well as what pattern triggered it.

Multiple Pre-Processed String entries will show the string as it is processed through all the Concept cascades, but before it is sent to the Unit cascades. Vocab and Helper Terms are still displayed, and now Concepts are displayed as {cp Concept Name cp}.

The Highest Scoring Unit, along with any other Lower Scoring Units, are the last items displayed at the bottom of the Match Data tab. The score for each Unit that was triggered is displayed, along with which pattern triggered the Unit.

When no Unit is triggered, the processed string is handled by FPML that is hand written in Static Files. The Static File Hit will list which line within the listed static file was hit.

Note: In case of a tie, the Unit that was triggered last will be listed as the Highest Scoring Unit. In case of a tie between Concepts that are in a Best Match cascade, the Concept that was triggered last will be listed as a Concept Hit.

Figures 116, 117:
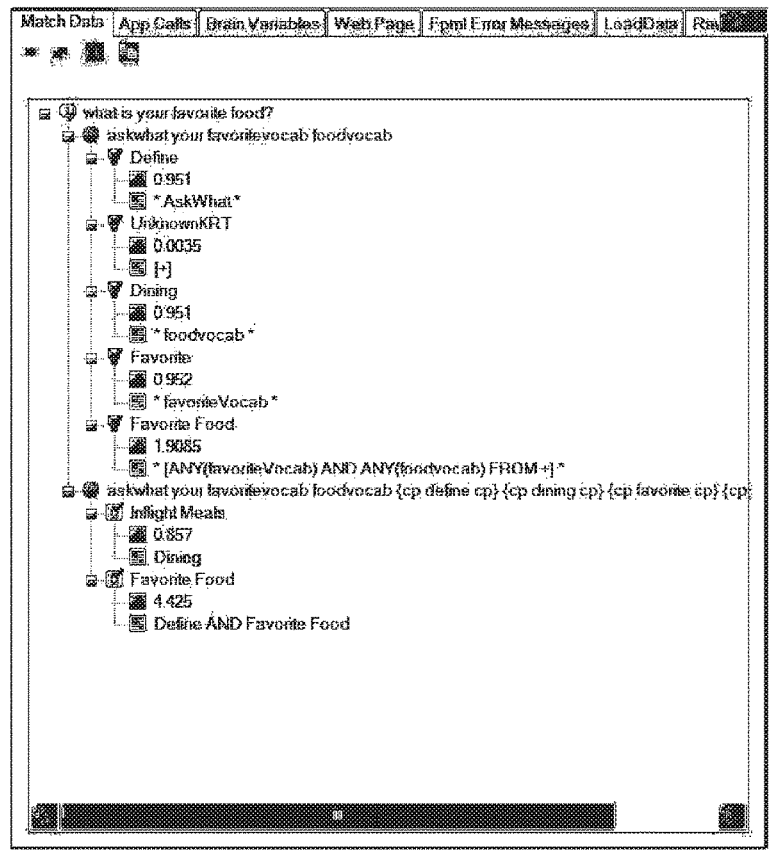

FIG. 116 shows an example of Match Data. Here you can see how the User Input string "what is your favorite food" is converted into the Vocab and Helper Terms "askwhat your favoritevocab foodvocab". The Concepts that are triggered are Define, Dining, Favorite, and Favorite Food. Two Units were triggered, Inflight Meals, and Favorite Food. The response that is delivered comes from the Unit that scored the highest, which in this case is Favorite Food.

The App Calls Tab

The App Calls tab, shown in FIG. 117, displays the information on any AppCalls triggered by the Unit or Concept. It is important to note that while the information may be displayed, the Debugger does not actually perform the AppCall operation in question.

The Brain Variables Tab

The Brain Variables tab, shown in FIG. 118, displays information on the processes occurring within the program's Context IQ Engine, or "brain", as well as the current value of all Variables after a question has been asked in the Debugger.

Right-click on any Variable and select Add Watch to add selected Variable to the Watch Variables window.

The Web Page Tab

Figure 119:
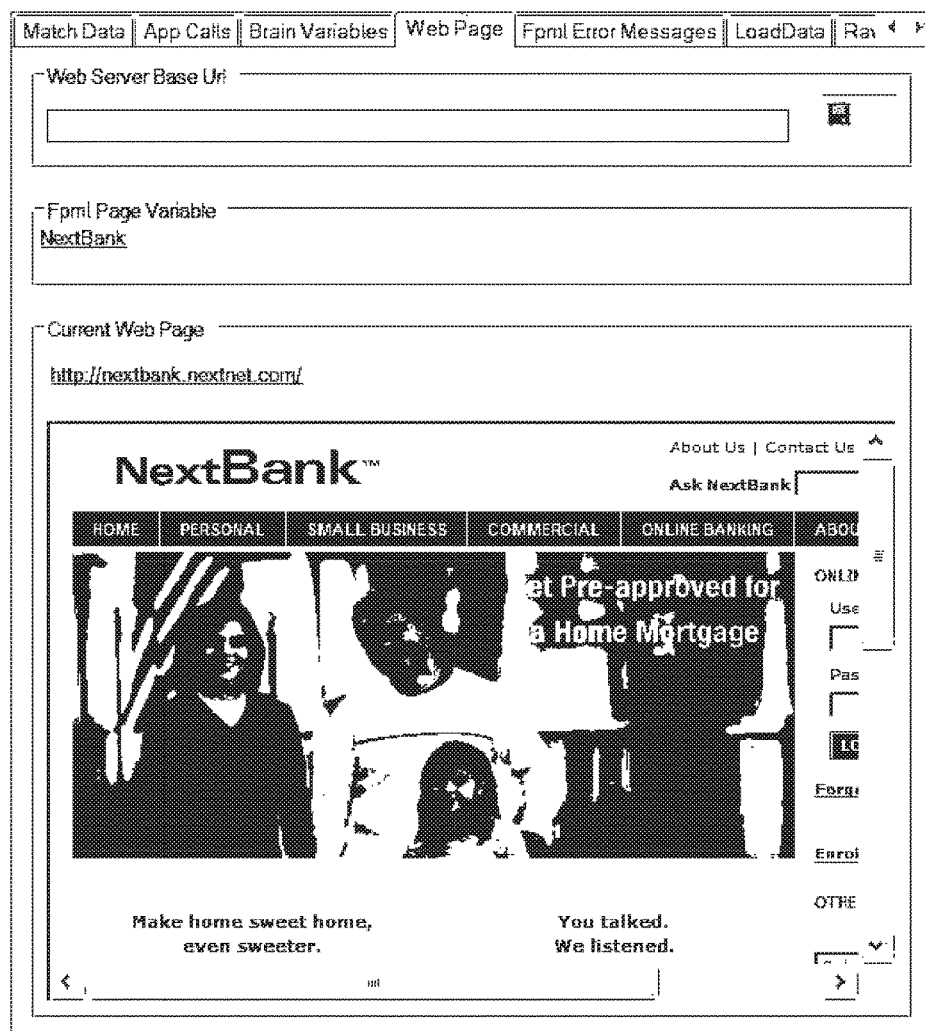

The Web Page tab, shown in FIG. 119, displays which web page was triggered by the Unit Response, along with the Url label and a link to that page.

The Fpml Error Messages Tab

Figure 120:
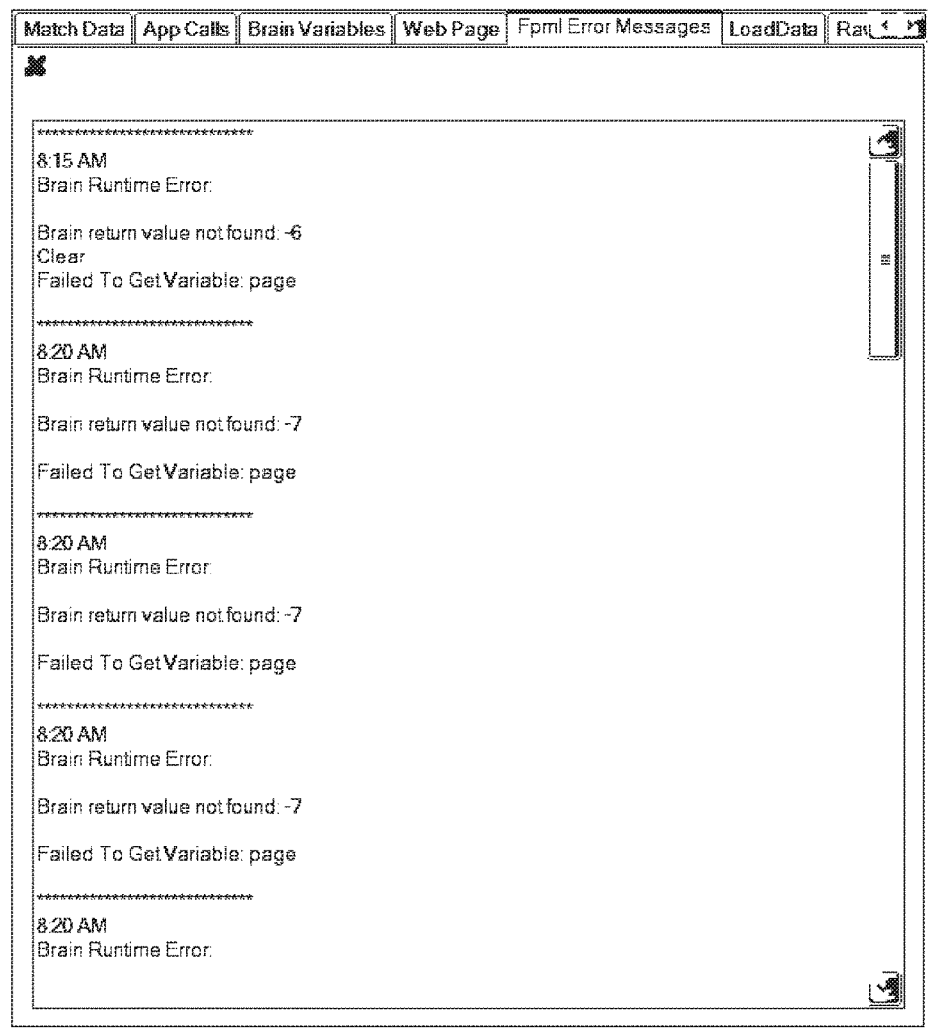

The Fpml Error Messages tab, shown in FIG. 120, shows errors that have occurred in the FPML, along with when they occurred. This screen can be cleared by clicking on the <Clear Error Message> Button.

The Load Data Tab

The Load Data tab, shown in FIG. 121, displays the loading process of all the FPML involved in the Unit. Files that did not load properly are displayed in a prominent color, such as red.

Each entry in the Load Data tab displays consists of an action and a file path. Common actions include: Loading, Learning, and IRDLL. Each *.FPML file that is loaded correctly will be listed in black, and errors will be listed in red.

The Raw Match Data Tab

The Raw Match Data tab, shown in FIG. 122, shows exactly how the Pre-processed string is handled all the way to the output that is displayed back to the user. This tab shows the actual FPML code as it processes the input string through each cascade and static file.

Watch Variables Dockable Window

The Watch Variables window, shown in FIG. 123, is used, literally, to watch the value of any number of selected Variables. Any time the value of a Variable changes, that change will immediately be seen in this window.

Variables can be easily added or removed from Watch Variables, using the available right-click menu.

Viewing Dependencies

Figure 124:
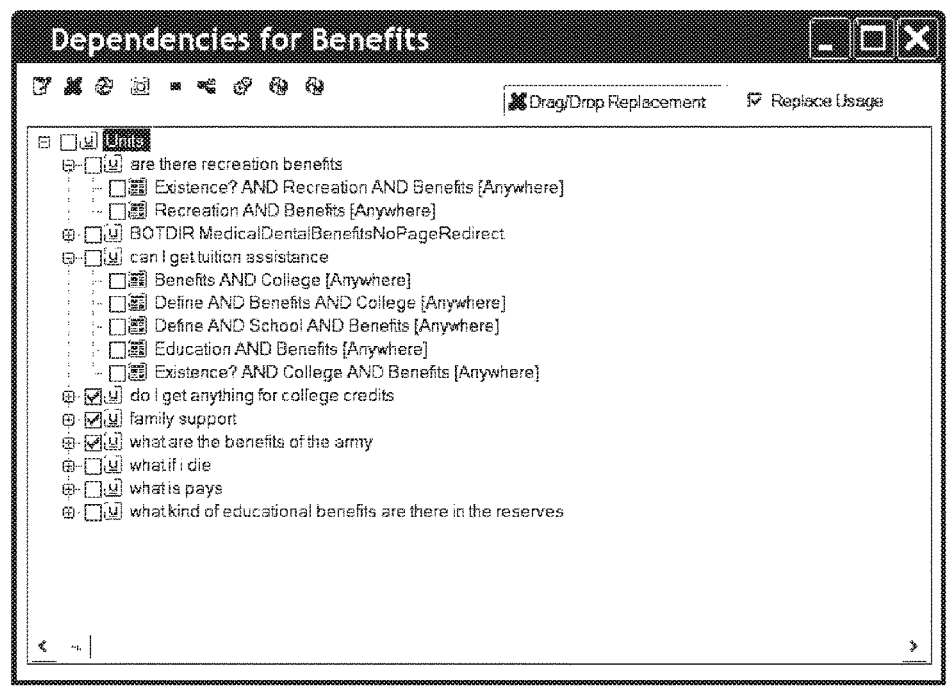

One of the most powerful tools to track down problems is the Dependencies window shown in FIG. 124. A Dependency is a list of all items in the project that use the selected item. For example, if <Show Dependencies> was selected from a Concept, all Units and Building Blocks that used that Concept would be displayed in the Dependencies window. If <Show Dependencies> was selected from a Vocab, all Concepts and Building Blocks that used that Vocab would be displayed.

The Dependency window can be opened by selecting a particular item and choosing <Show Dependencies> from many of the Button Bars. It is also available on many different right-click menus.

Displayed in FIG. 124 is the Dependencies window. In this image, the dependencies for the Concept "Benefits" has been found. The Units that use the Concept "Benefits" are listed here, as well as the patterns within those Units that use the Concept.

The Dependencies window has the following components:

| Component | Description |
| --- | --- |
| Replace Usage checkbox | Check to view Drag/Drop Replacement field and view a check box next to each item in Dependencies. |
| Drag/Drop Replacement field | Drag and Drop one item that will replace all checked items in the Dependencies Display |
| Button bar | The button bar contains the following: <Edit>: Opens selected items Editor window. <Delete Item And Ignore All Dependencies>: Deletes selected regardless if it has dependencies. <Refresh>: Refreshes display and collapses entire tree. <Show Dependencies>: Show dependencies of selected item. <Collapse All> Collapses entire tree. <Expand all> Expands entire tree. <Create Tests From Units/Concepts>: Opens Tests tab with only tests that are used for the Units and Concepts currently in the Dependencies window. <Show In Main Tree>: Highlights selected item in its corresponding dockable window. <Replace>: Replaces the searched item with the item in the Drag/Drop Replacement field if selected line is checked. |
| Dependencies Display | Displays all dependencies for searched item in a tree format, including all patterns that use the searched item. Check boxes will only appear if Replace Usage checkbox is selected. |

Testing Conditions

Figure 125:
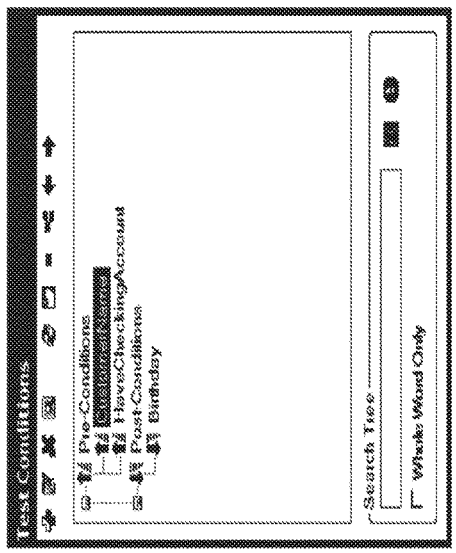

The Test Conditions dockable window, shown in FIG. 125, is used to artificially assign the value of Variables of Record Lists for the purposes of testing.

There are two Test Conditions that can be set to Variables and Record Lists Pre-Conditions and Post-Conditions. These conditions are then assigned to any number of test questions.

When a Pre-Condition and inserted into a test question, the value of the condition is set just prior to the test question being run. When a Post-Condition is set into a test question, the value of the condition is set just after the test question is run.

Test Conditions contains the following components:

| Component | Description |
| --- | --- |
| Button bar | The button bar contains the following: <Add>: Opens Create new Pre/Post Condition window. <Edit>: Open Edit window to edit test conditions. <Delete>: Deletes selected test condition. <Show Dependencies>: Currently has no effect. <New Window>: Opens copy of current window. <Refresh>: Reloads Test Conditions Display. <Collapse All> Collapses entire tree. <Expand All> Expands entire tree. <Back and Forward Navigation>: Navigates between searches. |

-continued

| Component | Description |
|---|---|
| Test Conditions Display | The Display shows the different test condition in tree format:<br>Pre-Condition<br>Post Condition |

Create/Edit New Pre/Post-Condition

Figure 126:
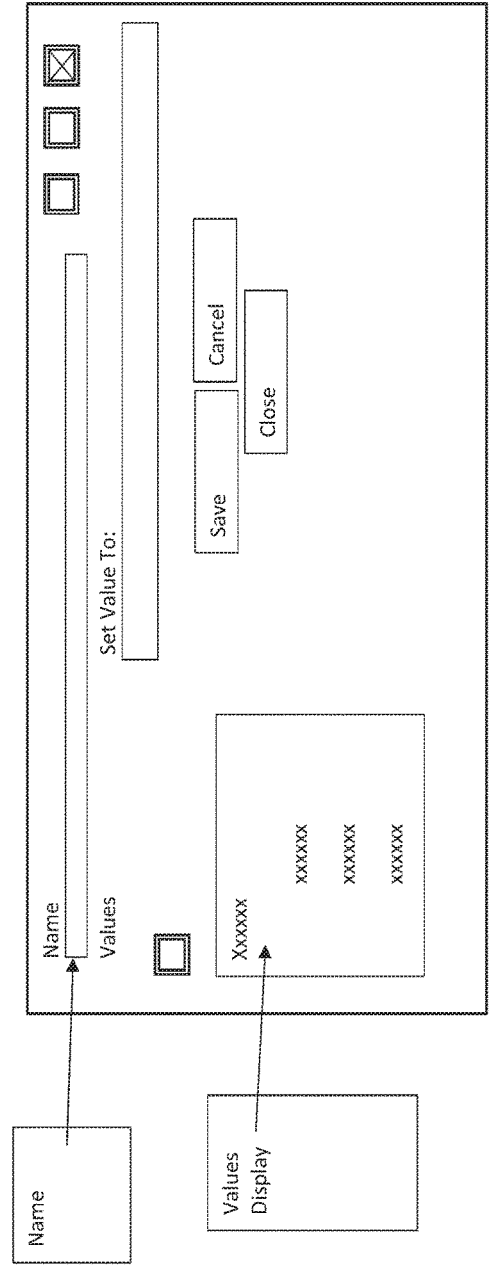

Creating and editing pre and post conditions is completed using three different windows, an example of which is shown in FIG. 126, all with identical functionality:

Create New Pre-Condition

Create New Post-Condition

Edit

Edit contains the following components:

| Component | Description |
|---|---|
| Name | This field has two components:<br>Text Field: Location of the name of the condition<br><Save>: Saves the name of the condition. |
| Values | Values has two components:<br><Delete>: Deletes selected Variable or Record List from condition.<br>Values Display: Shows values set for all Variables and Record Lists for the condition. |
| Set Value To Display | This Display will show differently if a Variable or Record List has been selected in Values. If a Variable has been selected, the display has the following components:<br>Text Field: Value of the Variable or Record list is set here.<br><Save>: Save value of Variable or Record List<br><Cancel>: Do not save value of Variable or Record List.<br><Close> Closes the window.<br>If a Record list has been selected, the display has the following components:<br>Index Value: Determines Load Order of the Test Condition.<br>Parameter: Lists name of the parameter being edited.<br>Radio Buttons<br>  Set Text Value: Sets the value of the Variable to the value listed in the Text Field below.<br>  Set Variable: Sets the value of the Variable to one selected from the dropdown below.<br><Save>: Saves the value of the Record List parameter.<br><Cancel>: Does not save the value of the Record List parameter.<br><Close>: Closes the window. |

Managing Tests and Debugger

This section deals with the procedures involved in testing and debugging.

Managing Tests

This sub-section deals with adding new test questions, editing existing test questions, and running tests.

Adding New Test Questions

Figure 127:
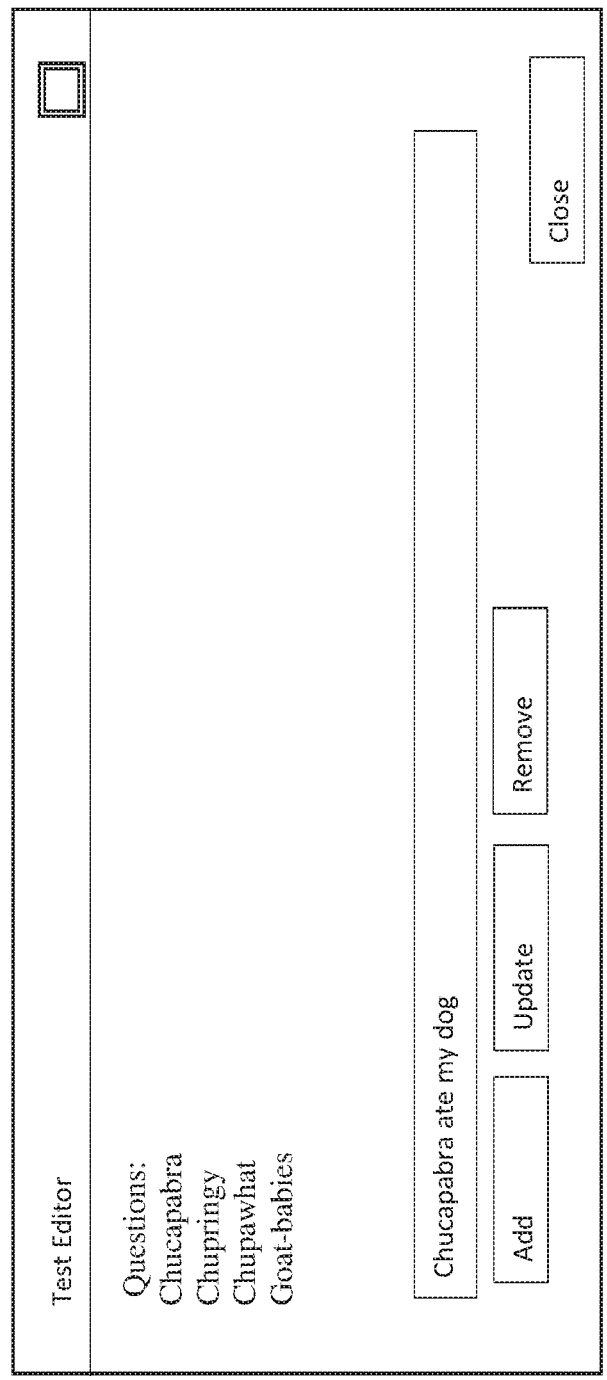

In addition, new test questions may be added in Tests. To add a new test question, use the following procedure in connection with the window shown in FIG. 127:

1. In Tests, select the desired Unit or Concept to which the new question will be added.
2. Click <Add> to open Test Editor.
3. In Test Editor, type the desired test question in Question.
4. Click <Add>
5. Repeat steps 3 & 4 as often as desired.
6. When finished, click <Close>.

Editing Test Questions

Test questions may be edited in Test Editor or in Concept Editor or Unit Editor, respectively. The following is the procedure for editing a test found in Tests in its appropriate tab:

1. Double click on the desired test question. The appropriate Unit Editor or Concept Editor tab will open.
2. Follow the procedures for editing a test questions as described in Concepts—Adding Questions or Units—
3. Adding Questions.

To edit test questions in Test Editor, use the following procedure:

1. In Tests, select the desired test question and click <Edit> OR double-click on the desired test question. This will open Test Editor with the test questions for the selected Unit or Concept loaded.
2. Make any changes desired to the selected test question and click <Update>.
3. When finished, click <Close>.

Deleting Test Questions

To delete a test question in Tests, use the following procedure:

1. Select the desired test question and click <Delete> OR right-click on the desired test question and select Delete from the right-click menu.
2. In Confirm Delete, click <Yes> to delete the test question OR click <No> to close the window without deleting.

To delete a test question in Test Editor, use the following procedure:

1. Select the desired test question in Tests and click <Edit> OR double-click on the desired test question; either of these methods will open the test question in Test Editor.
2. Ensure that the test question is selected and click <Remove>.
3. In Confirm Delete, click <Yes> to delete the test question OR click <No> to close the window without deleting the test question.

Running Tests

To run tests in Tests, use the following procedure:

1. Ensure that all FPML is up-to-date by selecting <Generate FPML (Changes Only)> OR<Generate All FPML>. Select the tests to be run from Test Selection.
2. Click <Run Tests>. This may take a while
3. Examine the results.

Debugging Questions

After examining the test results, it is important to examine the causes of any failures that might have cropped up. To debug a question (particularly a failed question), use the following procedure:

1. In Tests, select the desired test question and click <Debug Test Question> OR right-click on the desired test question and select Debug Question from the right-click menu.
2. In Debugger, examine results.

Debugging

This sub-section deals specifically with the procedures involved in debugging Units and Concepts.

Manual Debugging Procedures

Manual debugging is useful for running scripts through the FPML. To manually debug a project, use the following procedure:
1. In Debugger, type an input into Chat Here.
2. View the response in Chat History.
3. Examine results in Match Data, App Calls, Brain Variables, Web Page, FPML Error Messages, LoadData, and Raw Match Data.

Debugging from Outside the Debugger

To debug any question automatically from outside the Debugger, simply right-click on the test question and select Debug Question. This will have the same effect as typing the question into the Debugger directly.

Dependencies

This sub-section shows the different uses of the Dependencies window.

Find Dependency

There are two ways to find the dependencies on an item:
Right-click on selected item and choose show Dependencies.
Highlight the selected item and choose <Show Dependencies>

Replace Usage

To replace either one item or a large group of a selected item with another, follow this procedure.
1. Select item to be replaced by right clicking and choosing show Dependencies OR by choosing <Show Dependencies> from the Button Bar. This will open the Dependencies window.
2. Check Replace Usage checkbox in Dependencies.
3. Drag replacement item into Drag/Drop Replacement field.
4. Check all boxes in Dependencies Display that have the searched for item that will be replaced. Note: Checking an item higher in the tree will check all items that are included in that branch.
5. Click <Replace>. The searched item will be replaced with the replacement item.

Test Conditions

This sub-section will describe the creation, editing, and use of Test Conditions.

Creating Test Conditions

The steps for creating both Pre and Post Condition are the same:
1. Open the Test Conditions dockable window.
2. Highlight either Pre-Conditions or Post-Conditions, depending on which will be created.
3. Select <Add> OR right-click→Add. Create New Pre/Post Condition will open.
4. Type desired Name and press <Enter> or <Save>. The name of the window will change to Edit followed by the name of the Test Condition.
5. Drag desired Variable or Record List into Values Display from Components dockable window. The Set Value To Display will activate. Repeat for all Variables and Record Lists desired for selected
6. Click <Expand> to view Variables and/or Record Lists.
7. Highlight the first Variable or Record List item.
8. Click <Save>.
9. Change Set Value Display to the desired value of the Variable or Record List. Repeat steps 5-8 for each Variable and Record List.
10. Click <Close>.

Editing Test Conditions

The steps for creating both Pre and Post Condition are the same:
1. Open the Test Conditions dockable window.
2. Double click on chosen Pre/Post Condition OR highlight chosen Pre/Post Condition and click <Edit>.
3. Edit Name field and press <Enter> or click <Save>.
4. Click <Expand> to view Variables or Record Lists used by the test condition.
5. Left-click once to bring up a Variable or Record List parameter in the Set Value To display.
6. Edit Set Value To display as desired. Repeat steps 5 and 6 as many times as needed.
7. Click <Save>.
8. Click <Close>.

Deleting Test Conditions

The steps for deleting both Pre and Post Condition are the same:
1. Open the Test Conditions dockable window.
2. Click on chosen Pre/Post Condition and click <Delete OR highlight chosen Pre/Post Condition and right-click Delete.

Adding a Test Condition to a Test Question

Once a Test Condition has been created, it can be linked with any number of test questions:
1. Open the Tests tab in either the Concept Editor or the Unit Editor.
2. Open the Test Conditions dockable window.
3. Drag selected Test Condition from the Test Conditions dockable window to the desired test question in the Tests tab. A window will pop up prompting whether to add the Test Condition to all tests for the Unit/Concept.
4. Select <Yes> or <No> in the pop-up.

Removing a Test Condition from a Test Question

To remove a Test Condition from a test question, follow this procedure:
1. Open the Tests tab in either the Concept Editor or the Unit Editor
2. Highlight the name of the test condition and click <Delete> or right-click on the name of the test condition and select→Delete.

Static Files and Editor

The Editor tab allows the user to view and interact with the raw FPML code of static files and lex files that forms the basis of all of Active Lab's operations.

The Editor tab, shown in FIG. 128, has the following components:

| Component | Description |
| --- | --- |
| Button Bar | The button bar contains the following:<br><New>: Starts a new *.fpml file.<br><Open>: Opens an existing<br><Save>: Saves the currently open *.fpml file.<br><Cut>: Revoves selected text from the currently open *.fpml file.<br><Copy>: Copies selected text from the currently open *.fpml file to the clipboard.<br><Paste>: Inserts copied text from the clipboard into the currently open *.fpml file at a selected location.<br><Search>: Allows the user to search the currently open *.fpml file for text. |

| Component | Description |
| --- | --- |
| Editor | Text field displays the text of an *.fpml file, and allows the user to edit it as desired. |

Using Editor

The Editor can be used in the same manner as other text editors. There are also customizable shortcuts which can be configured in the shortcuts.xml file located in the directory with Active Lab.

Static Files

Static Files are FPML files created manually using either a standard text editor or Active Lab's Editor tab. They allow the user to create custom FPML functions beyond Active Lab's capabilities should such a need arise. Static files must be created manually outside of the lab and then imported into the database using the Static Files dockable window.

Lex Files

Lex Files are instrumental to the proper function of a project, and as such should generally be left alone by the user. The user may view and edit Lex files through the Editor tab, though this is not generally recommended for most users.

Change Request

While change requests do not directly affect the functioning of a project, they represent a way for the user to view feedback from other users regarding the construction of the project. In this regard, they can be quite useful in the process of fine-tuning the components of a project.

Figure 129:
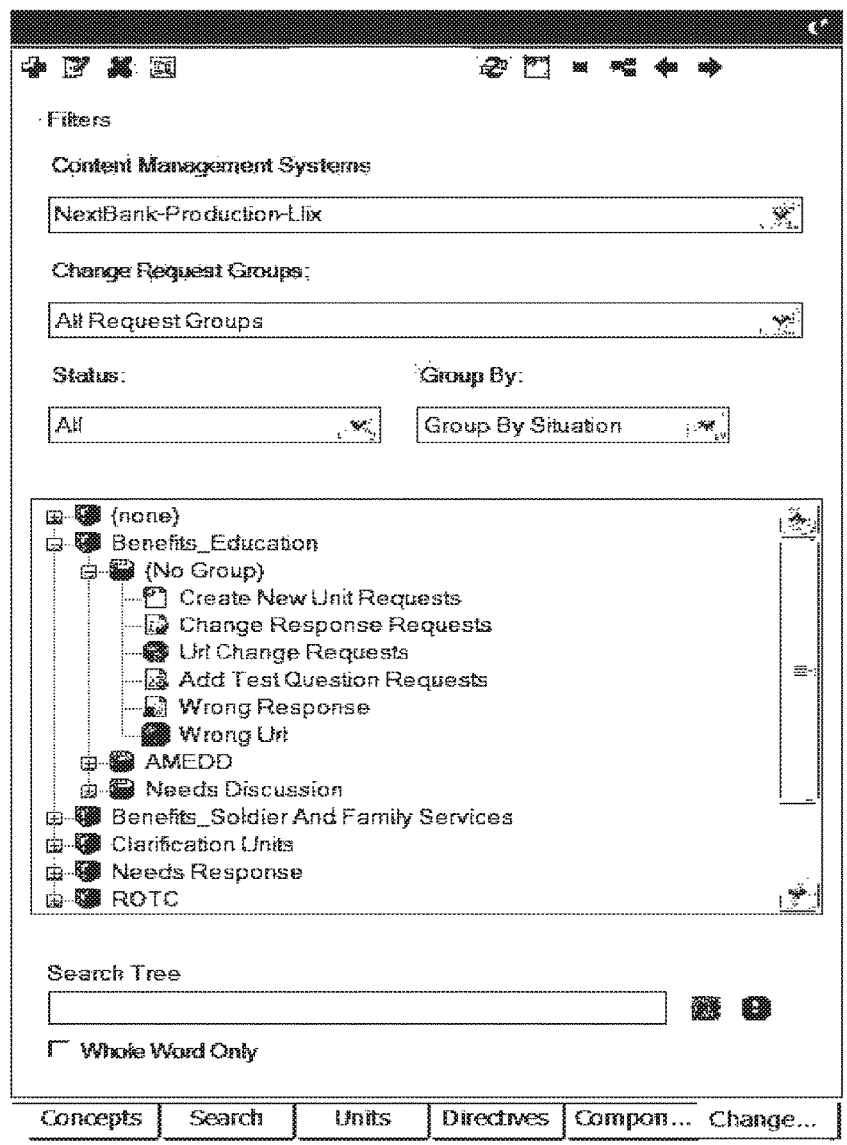

Because all of these change requests pertain to Units, they may be accessed through their respective Units or through Change Requests. This dockable window contains the components illustrated in FIG. 129 and described in the table below.

Change request management occurs primarily within the dockable window of the same name. The right-click menu allows the user to go directly to the Unit in question and make any changes. Change requests may not be deleted, as they serve as a record of the changes made to the project.

There are six types of change requests:
Create New Unit Requests
Change Response Request
Url Change Request
Add Test Question Request
Wrong Response
WrongUL

| Component | Description |
| --- | --- |
| Button bar | The button bar contains the following:<br><Add>: Add new Request Group.<br><Edit>: Edit Request Group.<br><Delete>: Deletes selected Request Group.<br><Show Dependencies>: Currently has no effect.<br><New Window>: Opens copy of current window.<br><Refresh>: Reloads Change Request display list.<br><Collapse All> Collapses entire tree.<br><Expand All> Expands entire tree.<br><Back and Forward Navigation>: Navigates between searches. |
| Filters | Select the filters used to find current change requests. This field contains the following dropdowns:<br>Content Management System: Select appropriate Content Management System<br>Change Request Groups: Select from available groups.<br>Status: Select status of change requests to view:<br>All<br>Pending<br>Assigned<br>Group By: Select how the display will organize the change requests:<br>(none): No organization.<br>Group By User<br>Group By Unit<br>Group By Situation |
| Change Requests display | Displays change requests in tree view, organized by type:<br>Create New Unit Requests<br>Change Response Request<br>Url Change Request<br>Add Test Question Request<br>Wrong Response<br>WrongURL |
| Search Tree | This field contains the following:<br>Input Text Field: Searches cascades for specific text.<br><Search>: Executes search.<br><Search Options>: Opens Search Options window.<br>Whole Word Only Checkbox: Limits search to complete word matches. |
| Right-Click Menu | The following right-click menu only applies to the change request item:<br>→ View Details: Opens corresponding request window.<br>→ Accept Change: Accept change request. Item will now appear as regular item in Active Lab |

Create New Unit Request

New Unit request can be edited, changed, and implemented in the Create New Unit Requests window. This window is broken up into two tabs: the Create Unit Request tab, which shows all the parameters for the Unit; and the Request Information tab, which shows history, comments, and the option to ignore the request.

Figure 130:
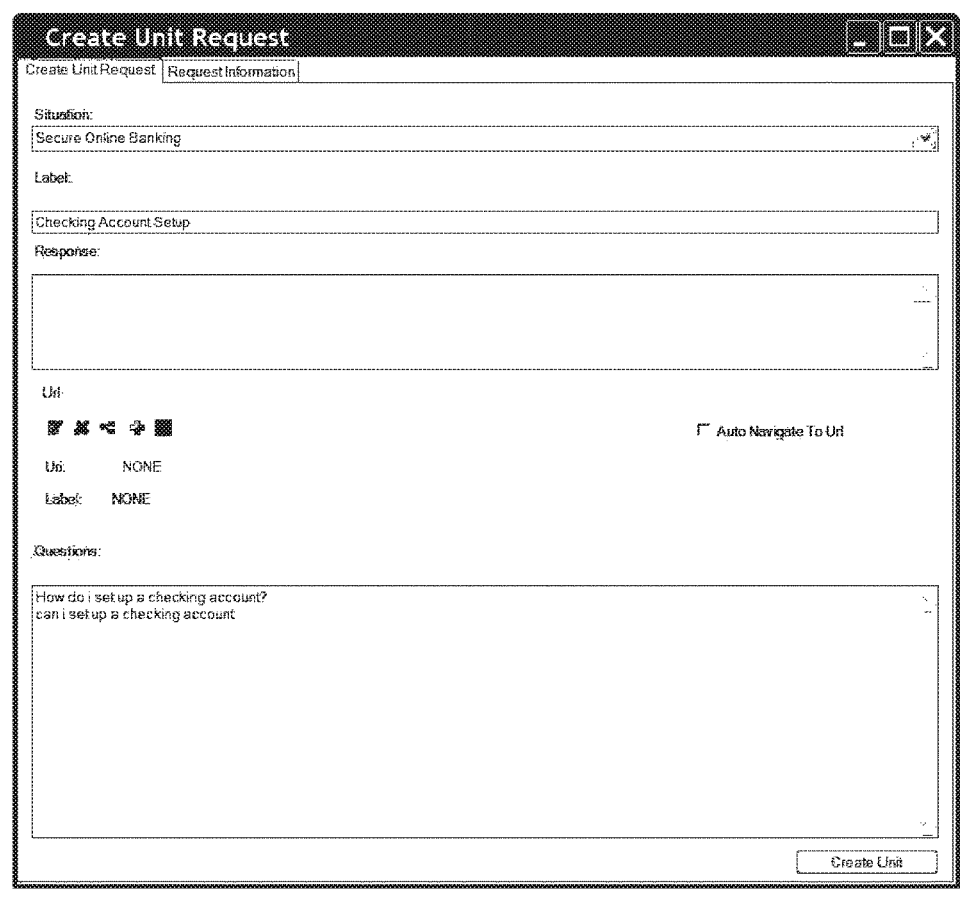

FIG. 130 illustrates the Change Unit Request tab which includes the following components:

| Component | Description |
| --- | --- |
| Situation | Dropdown that chooses the Situation Group for the new Unit. |
| Label | Text Field that displays the name of the Unit. |
| Response | Text field where the Unit's response is written. |
| Url | This field contains the following:<br><Edit Url>: Opens Uri Editor with current Urlloaded.<br><Remove All Url Items>: Removes Url from response.<br><Show In Tree>: Shows current Url in Uri dockable window.<br><Add>: Opens two new fields for the purpose of creating a new Url:<br>Uri: New Url name field.<br>Label: New Url Label field. |

| Component | Description |
|---|---|
| | <Save>: Saves new Url. Only available through <Add>button.<br>Uri: displays path for response.<br>Label: displays label ofUrl for response.<br>Auto Navigate To URL checkbox: When selected, the Unit's triggered response automatically redirects to the selected URL.<br>Drop-down list: list of all available URLs for the response. |
| Questions | Text field where test questions are listed. Note: Only use one test question per line. |
| <Create Unit> | Creates the Unit in appropriate Situation Group. |

Figure 131:
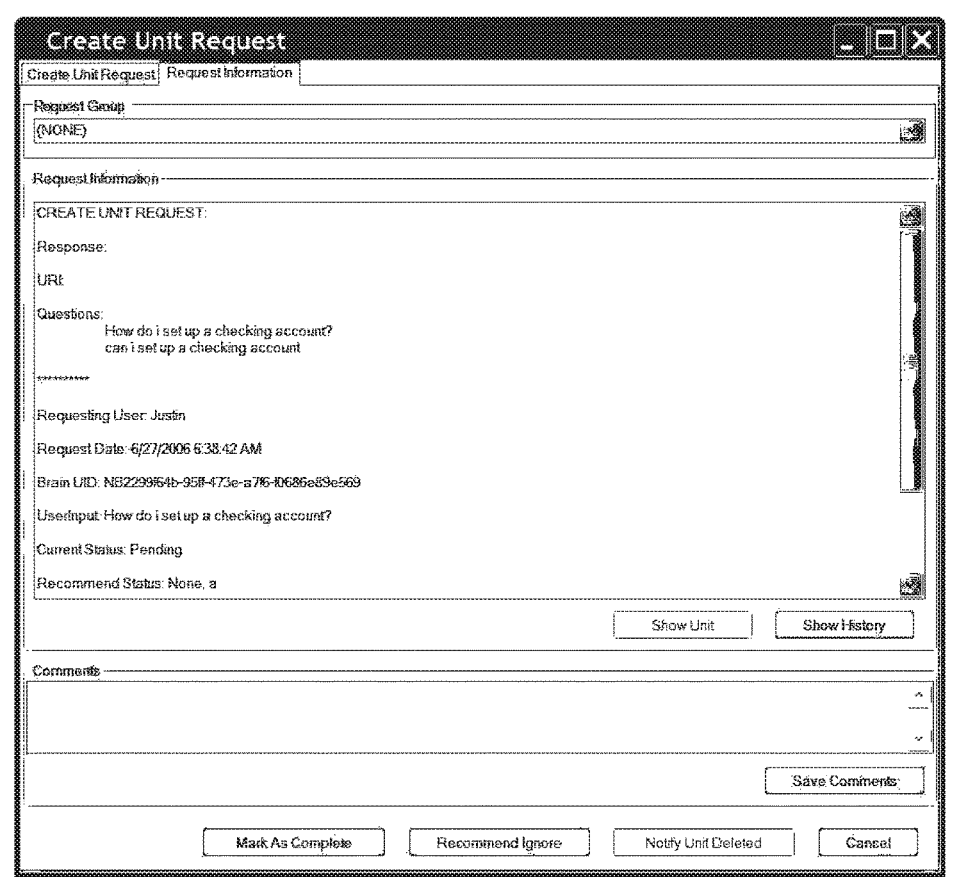

The Request Information tab is shown in FIG. 131 and includes the following components:

| Component | Description |
|---|---|
| Request Group dropdown | Choose from available pre-set group that created the request. |
| Request Information | Field displays all information relating to the Unit, including:<br>Request Information Display, which includes:<br>Response<br>URI<br>Questions<br>Requesting User<br>Request Date<br>Brain UID<br>User Input<br>Current Status<br>Recommend Status<br>Unit ID<br>Comments<br><Show Unit>: Highlights Unit in Units dockable window.<br><Show History>: Shows Request History for the change request. |
| Comments | This field has two components:<br>Text Field: New comments are typed here.<br><Save Comments>: Saves new comments. |
| <Mark As Complete> | Marks the change request as completed outside of the change request. |
| <Recommend Ignore> | Marks the change request as ignored. |
| <Notify Unit Deleted> | Notifies Content Management System that the Unit is deleted. |
| <Cancel> | Closes the window making no changes. |

Figure 132:
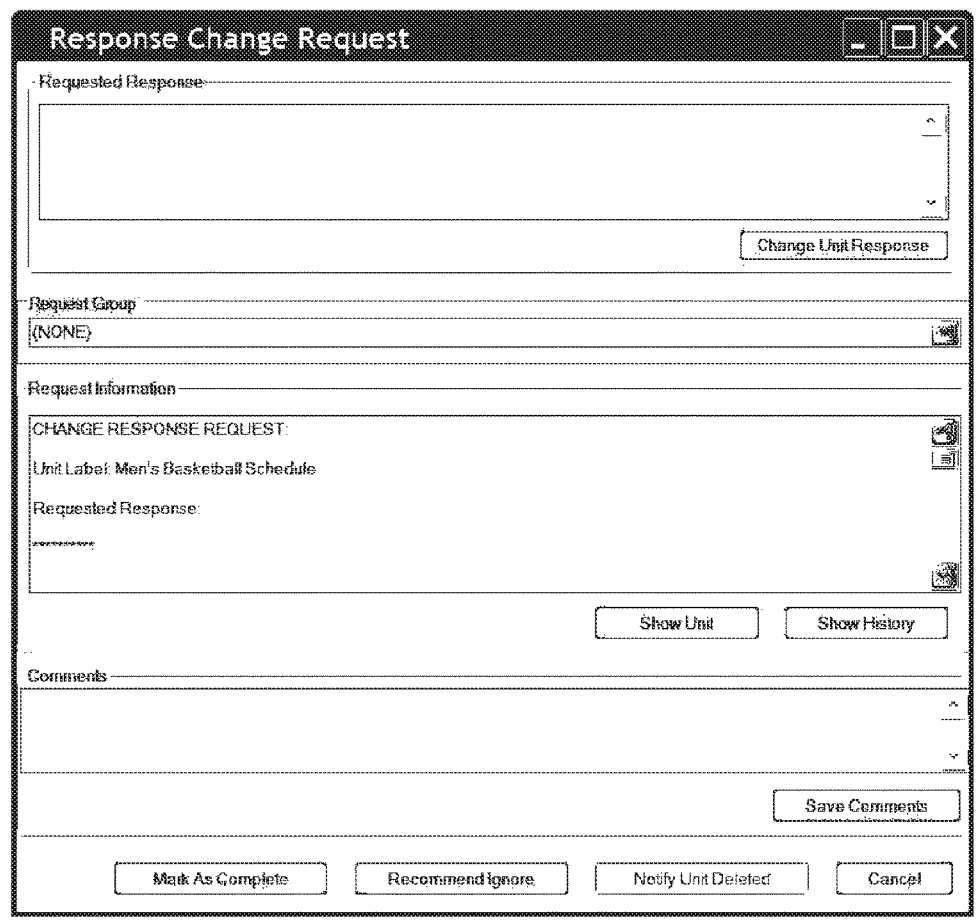

The Response Change Request window, illustrated in FIG. 132, is used to edit, implement, or ignore requests to change the response of a Unit and includes the following components.

| Component | Description |
|---|---|
| Requested Response | This field contains two components:<br>Text Field: New response is listed here.<br><Change Unit Response>: Changes the response of the Unit to the one listed in the above text field. |
| Request Group dropdown | Choose from available pre-set group that created the request. |
| Request Information | Field displays all information relating to the Unit, including:<br>Request Information Display, which includes:<br>Unit Label<br>Requested Response<br>Old Response<br>Old URI<br>Old Unit Label<br>Is Approval Required<br>Requesting User<br>Request Date<br>Brain UID<br>User Input<br>Current Status<br>Recommend Status<br>Unit ID<br>Comments<br><Show Unit>: Highlights Unit in Units dockable window.<br><Show History>: Shows Request History for the change request. |
| Comments | This field has two components:<br>Text Field: New comments are typed here.<br><Save Comments>: Saves new comments. |
| <Mark As Complete> | Marks the change request as completed outside of the change request. |
| <Recommend Ignore> | Marks the change request as ignored. |
| <Notify Unit Deleted> | Notifies Content Management System that the Unit is deleted. |
| <Cancel> | Closes the window making no changes. |

Url Change Request

Figure 133:
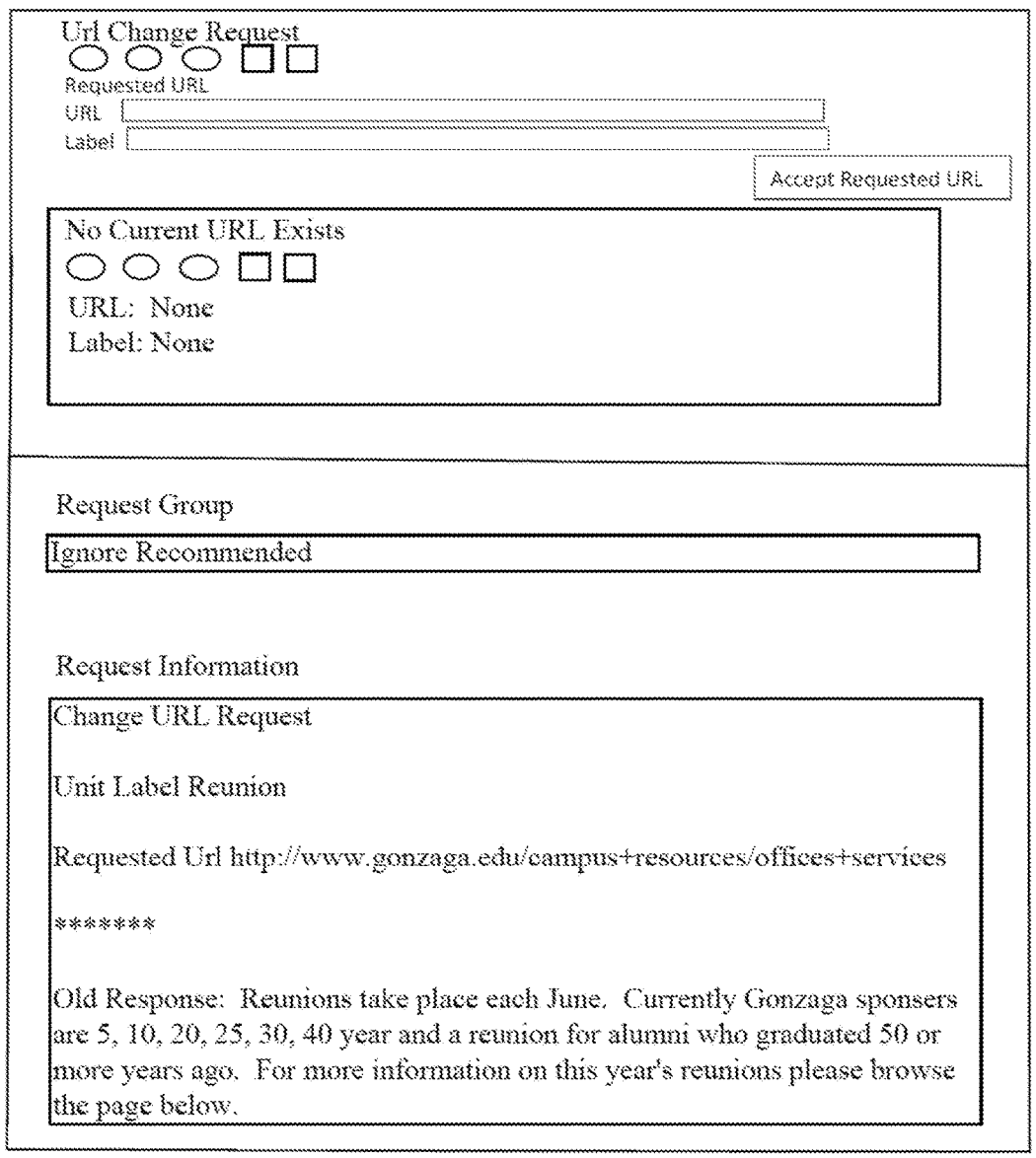

The Url Change Request window, illustrated in FIG. 133, is used to edit and accept Url change requests and includes the following components.

| Component | Description |
|---|---|
| Requested Url | This field contains the following:<br><Edit Url>: Opens Url Editor with current Url loaded.<br><Remove All Url Items>: Removes Url from response.<br><Show In Tree>: Shows current Url in Url dockable window.<br><Add>: Opens two new fields for the purpose of creating a new Url:<br>Uri: New Url name field.<br>Label: New Url Label field.<br><Save>: Saves new Url. Only available through <Add>button.<br>Uri: displays path for response.<br>Label: displays label ofUrl for response.<br>Auto Navigate To URL checkbox: When selected, the Unit's triggered response automatically redirects to the selected URL.<br>Drop-down list: list of all available URLs for the response. |
| <Accept Requested Url | Changes the Url to the one listed in the Request Url field. |
| Current Uri/No Current URL Exists | Field visible only ifUrl exists for the Unit. Contains identical options as Requested Url field. |
| Request Group dropdown | Choose from available pre-set group that created the request. |

-continued

| Component | Description |
|---|---|
| Request Information | Field displays all information relating to the Unit, including:<br>Request Information Display, which includes:<br>  Unit Label<br>  Requested Uri<br>  Old Response<br>  Old URI<br>  Old Unit Label<br>  Is Approval Required<br>  Requesting User<br>  Request Date<br>  Brain UID<br>  User Input<br>  Current Status<br>  Recommend Status<br>  Unit ID<br>  Comments<br>  <Show Unit>: Highlights Unit in Units dockable window.<br>  <Show History>: Shows Request History for the change request. |
| Comments | This field has two components:<br>Text Field: New comments are typed here.<br><Save Comments>: Saves new comments. |

Add Question to Unit Request

Figure 134:
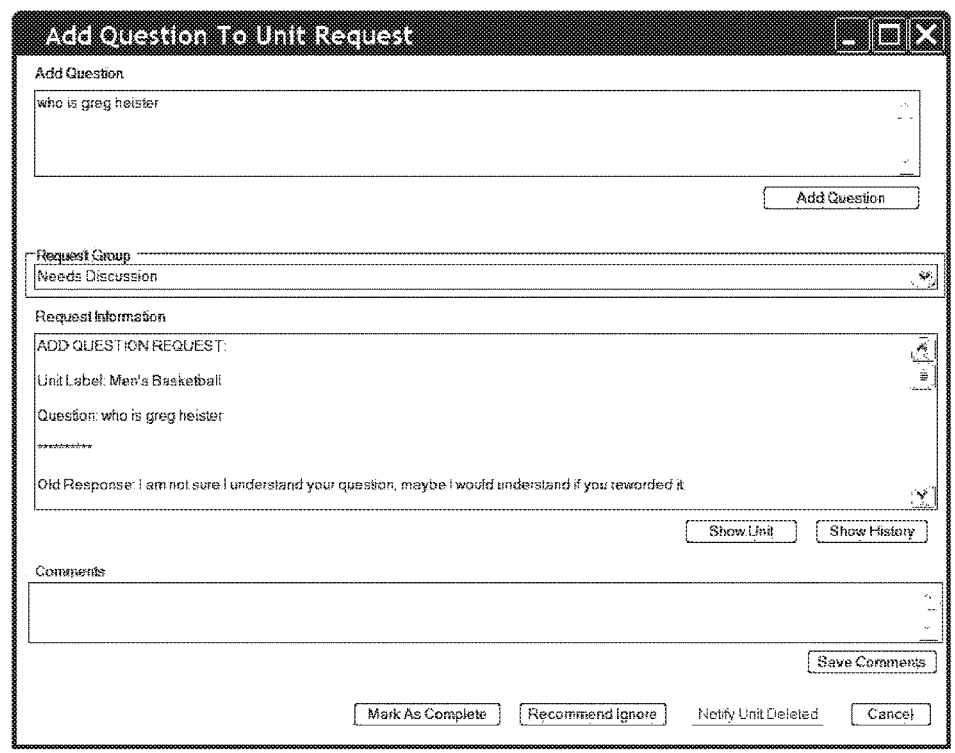

The Add Question To Unit Request window, illustrated in FIG. 134, is used to edit and accept test questions that will be added to the corresponding Unit and includes the following components.

| Component | Description |
|---|---|
| Add Question | This field contains the following:<br>Text Field: Test question is listed here.<br><Add Question>: Adds question in Add Question field to the Unit listed in the Request Information field. |
| Request Information | Field displays all information relating to the Unit, including:<br>Request Information Display, which includes:<br>  Response<br>  URI<br>  Questions<br>  Requesting User<br>  Request Date<br>  Brain UID<br>  User Input<br>  Current Status<br>  Recommend Status<br>  Unit ID<br>  Comments<br>  <Show Unit>: Highlights Unit in Units dockable window.<br>History for the change request. |
| Comments | This field has two components:<br>Text Field: New comments are typed here.<br><Save Comments>: Saves new comments. |
| <Mark As Complete> | Marks the change request as completed outside of the change request. |
| <Recommend Ignore> | Marks the change request as ignored. |
| <Notify Unit Deleted> | Notifies Content Management System that the Unit is deleted. |
| <Cancel> | Closes the window making no changes. |

Wrong Response/Wrong Url

Figure 135:
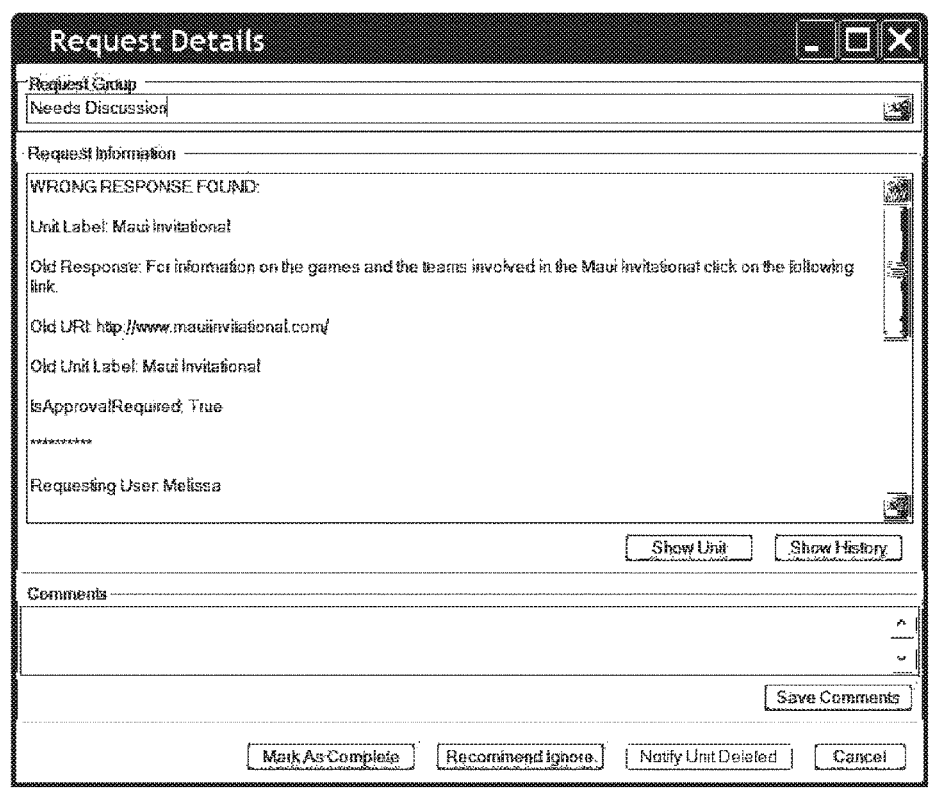

The Request Details window, illustrated in FIG. 135, is used to view Wrong Responses and Wrong Url change requests and includes the following components. This window does not have the functionality to change Units, however it can mark whether a response has been changed.

| Component | Description |
|---|---|
| Request Information | Field displays all information relating to the Unit, including:<br>Request Information Display, which includes:<br>  Response<br>  URI<br>  Questions<br>  Requesting User<br>  Request Date<br>  Brain UID<br>  User Input<br>  Current Status<br>  Recommend Status<br>  Unit ID<br>  Comments<br>  <Show Unit>: Highlights Unit in Units dockable window.<br>  <Show History>: Shows Request History for the change request. |
| Comments | This field has two components:<br>Text Field: New comments are typed here.<br><Save Comments>: Saves new comments. |
| <Mark As Complete> | Marks the change request as completed outside of the change request. |
| <Recommend Ignore> | Marks the change request as ignored. |
| <Notify Unit Deleted> | Notifies Content Management System that the Unit is deleted. |
| <Cancel> | Closes the window making no changes. |

EXAMPLE SYSTEM

Figure 136:
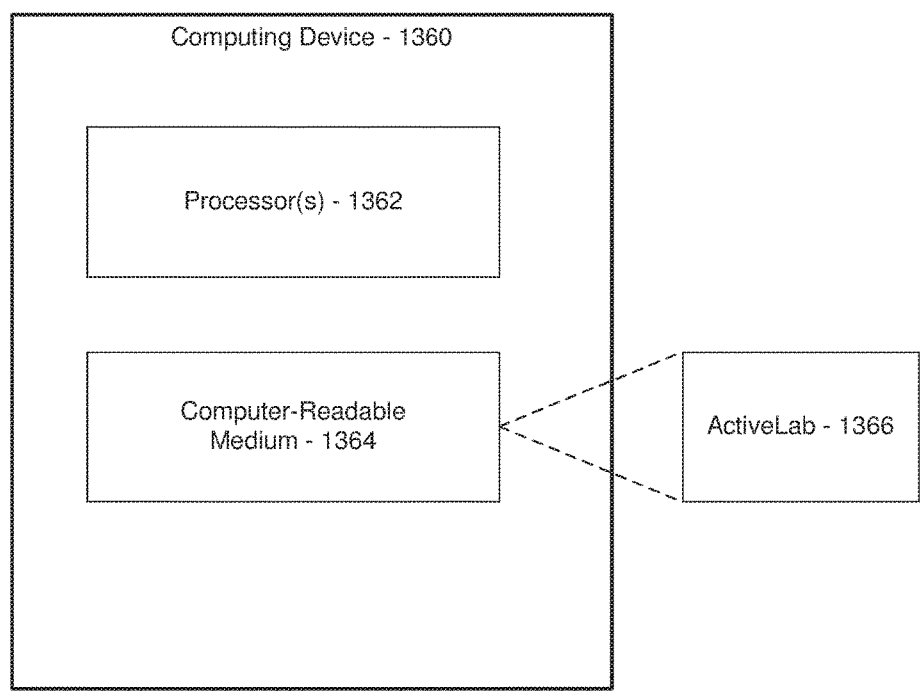
FIG. 136 illustrates an example system in accordance with one or more embodiments.

FIG. 136 illustrates an example system in accordance with one or more embodiments. Here, the system includes a computing device 1360 that can be any suitable computing device such as a desktop device, laptop, handheld computing device and the like. In this example, computing device 1360 includes one or more processors 1362 and one or more computer-readable storage media 1364. Media 1364 can comprise any suitable storage media such as ROM, RAM, a hard disk, flash memory, optical media, magnetic media and the like.

In one or more embodiments, computer-readable instructions reside on the computer-readable media and implement the functionality described above. Such functionality can reside in the form of an application referred to as Active Lab 1366. Active Lab 1366 can present the various user interfaces described above and can implement the described functionality.

CONCLUSION

Various embodiments provide a tool, referred to herein as "Active Lab" that can be used to develop, debug, and maintain knowledge bases. These knowledge bases (KBs) can then engage various applications, technology, and communications protocols for the purpose of task automation, real time alerting, system integration, knowledge acquisition, and various forms of peer influence.

In at least some embodiments, a KB is used as a virtual assistant that any real person can interact with using their own natural language. The KB can then respond and react however the user wants: answering questions, activating applications, or responding to actions on a web page.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
under control of one or more processors executing computerized instructions stored in memory:
causing a virtual assistant to be presented via a computing device to enable a conversation with a user in a natural language, wherein the computerized instructions are configured via a graphical user interface that receives features of a knowledge base for storage in the memory, the features of the knowledge base organized to trigger outputs according to units of vocabulary patterns arranged in the features of the knowledge base, wherein the units of vocabulary patterns are stored in the memory with respective labels for each feature;
receiving a speech input string via the virtual assistant during the conversation;
converting the speech input string to converted data by substituting portions of the speech input string with sets of terms bearing corresponding labels that refer back to the respective labels of the knowledge base;
matching the respective labels to the corresponding labels to identify a digital response to the speech input string; and
causing the digital response to be presented to the user in real-time via the virtual assistant.

2. The method of claim 1, further comprising:
receiving the speech input string; and
causing the virtual assistant to provide a natural language response to the speech input string; and
wherein the natural language response for the speech input string is linked in the knowledge base to the converted data via the label.

3. The method of claim 1, further comprising configuring the virtual assistant for human simulation by linking in the knowledge base a series of the units of vocabulary patterns to map the digital response to one or more of the sets of terms in the converted data.

4. The method of claim 1, further comprising obtaining a parameter value of a variable stored in the memory for use in converting the speech input string during the conversation between the user and the virtual assistant,
wherein the parameter value includes at least one of:
a user name;
an email address;
an IP address;
a credit card number;
a user's gender; or
information related to user activity on a site.

5. One or more non-transitory computer-readable storage media storing instructions that, when executed by one or more processors, cause the one or more processors to perform operations comprising:
causing a virtual assistant to be presented via a computing device to enable a conversation with a user in a natural language, wherein the virtual assistant is configured with instructions stored in computerized memory to access features of a knowledge base stored in a computer readable media, the features of the knowledge base organized to trigger parent responses and child responses according to units of vocabulary patterns arranged in the features of the knowledge base, wherein the vocabulary patterns are stored in the memory with respective labels and the instructions implement the following steps:
receiving a speech input string via the virtual assistant during the conversation;
substituting portions of the speech input string with sets of terms bearing corresponding labels that refer back to the respective labels of the knowledge base;
converting the speech input string to converted data comprising the sets of terms;
matching the respective labels and the corresponding labels to determine a parent response for responding to the speech input string that is received during the conversation;
causing the virtual assistant to provide the parent response; and
based on at least one of a value that is external to the conversation, a value that is obtained from an application, or a value that is obtained from a previous conversation between the user and the virtual assistant, determining a child response for responding to additional user input that is received during the conversation, the child response being accessible via the parent response.

6. The one or more non-transitory computer-readable storage media of claim 5, wherein the parent response is associated with a unit that maps a pattern of concepts that is determined for the user input to the parent response.

7. The one or more non-transitory computer-readable storage media of claim 6, wherein the pattern of concepts includes at least one of an order of the concepts or a proximity of the concepts to each other.

8. The one or more non-transitory computer-readable storage media of claim 5, wherein the parent response is determined based at least in part on one or more values related to at least one of activity of the user on a site or previous user input from the user during the conversation.

9. The method of claim 1, further comprising:
determining a pattern of terms for the converted data, each of the terms of the patterns of terms comprising at least one of:
one or more vocab terms comprising a grouping of at least one of one or more unambiguous synonyms of a word in the speech input or one or more spelling variations of the word in the speech input; or
one or more wildcards that each function as a placeholder for a word or words.

10. The method of claim 1, further comprising:
wherein the response indicates that the task was performed by the application.

* * * * *